(12) United States Patent
Strähler et al.

(10) Patent No.: US 11,219,303 B2
(45) Date of Patent: Jan. 11, 2022

(54) BRUSH PRODUCT AND METHOD FOR THE PRODUCTION THEREOF

(71) Applicant: TRISA HOLDING AG, Triengen (CH)

(72) Inventors: Reto Strähler, Adligenswil (CH); Jost Lötscher, Büron (CH); Oskar Trevisan, Oftringen (CH); Martin Zwimpfer, Lucerne (CH)

(73) Assignee: TRISA HOLDING AG, Triengen (CH)

( * ) Notice: Subject to any disclaimer, the term of this patent is extended or adjusted under 35 U.S.C. 154(b) by 363 days.

(21) Appl. No.: 16/092,707

(22) PCT Filed: Apr. 12, 2017

(86) PCT No.: PCT/EP2017/058757
§ 371 (c)(1),
(2) Date: Oct. 10, 2018

(87) PCT Pub. No.: WO2017/182355
PCT Pub. Date: Oct. 26, 2017

(65) Prior Publication Data
US 2019/0159581 A1 May 30, 2019

(30) Foreign Application Priority Data

Apr. 20, 2016 (EP) .................................... 16166248
Aug. 19, 2016 (EP) .................................... 16184981

(51) Int. Cl.
*A46B 9/06* (2006.01)
*A46B 9/04* (2006.01)
(Continued)

(52) U.S. Cl.
CPC ................. *A46B 9/06* (2013.01); *A46B 3/04* (2013.01); *A46B 3/06* (2013.01); *A46B 9/04* (2013.01);
(Continued)

(58) Field of Classification Search
CPC .... A46B 9/06; A46B 3/04; A46B 3/06; A46B 9/04; A46B 2200/1066; A46D 3/045
See application file for complete search history.

(56) References Cited

U.S. PATENT DOCUMENTS 1,022,920 A 4/1912 Anderson
1,125,532 A 1/1915 Himmel
(Continued)

FOREIGN PATENT DOCUMENTS

AU 2003252861 A1 4/2005
CH 169312 A 8/1934
(Continued)

OTHER PUBLICATIONS

Oct. 23, 2018 International Preliminary Report of Patentability issued in International Patent Application No. PCT/EP2017/058757.

(Continued)

*Primary Examiner* — Dung Van Nguyen
(74) *Attorney, Agent, or Firm* — Oliff PLC

(57) ABSTRACT

A brush product, in particular a toothbrush, having a base body with a head part with a front and a rear side, which includes a bristle carrier with a longitudinal axis and a transverse axis and a bristle field protruding therefrom, wherein the bristle field is formed by at least one group of cleaning elements; a handle part; and a neck part connecting the head part and the handle part; wherein the bristle carrier is provided with bristles which are mounted without being anchored and wherein the bristle carrier includes substantially a central support area, an upper support area, a lower support area, a right support area and a left support area, in which the groups of cleaning elements are arranged. Also, a corresponding method and tool.

7 Claims, 46 Drawing Sheets

(51) Int. Cl.
  *A46B 3/04* (2006.01)
  *A46B 3/06* (2006.01)
  *A46D 3/04* (2006.01)
(52) U.S. Cl.
  CPC ...... *A46D 3/045* (2013.01); *A46B 2200/1066* (2013.01)

(56) References Cited

U.S. PATENT DOCUMENTS

| | | |
|---|---|---|
| 1,142,698 A | 6/1915 | Grove et al. |
| 1,191,556 A | 7/1916 | Blake |
| 1,268,544 A | 6/1918 | Cates |
| 1,537,726 A | 5/1925 | Alma |
| 1,588,785 A | 6/1926 | Van Sant |
| 1,598,224 A | 8/1926 | Van Sant |
| 1,612,035 A | 12/1926 | Lorenzo |
| 1,796,893 A | 3/1931 | McVeigh |
| 1,908,510 A | 5/1933 | Dodson |
| 1,993,763 A | 3/1935 | Touchstone |
| 2,042,239 A | 5/1936 | Planding |
| 2,129,082 A | 9/1938 | Byrer |
| 2,139,245 A | 12/1938 | Ogden |
| 2,164,219 A | 6/1939 | McGerry |
| 2,172,624 A | 9/1939 | Robert |
| 2,263,802 A | 11/1941 | Grusin |
| 2,266,195 A | 12/1941 | Hallock |
| 2,279,355 A | 4/1942 | Wilensky |
| 2,298,156 A | 10/1942 | Person |
| 2,476,201 A | 7/1949 | Ligoure |
| 2,486,847 A | 11/1949 | Hokett |
| 2,488,873 A | 11/1949 | Charles |
| 2,604,649 A | 7/1952 | Stephenson et al. |
| 2,614,556 A | 10/1952 | Staunt |
| 2,637,870 A | 5/1953 | Cohen |
| 2,706,825 A | 4/1955 | Blakeman |
| 2,882,544 A | 4/1959 | Hadidian |
| 2,935,755 A | 5/1960 | Leira et al. |
| 3,082,457 A | 3/1963 | Lucibello et al. |
| 3,103,027 A | 9/1963 | Birch |
| 3,103,679 A | 9/1963 | Clemens |
| 3,110,918 A | 11/1963 | Tate, Jr. |
| 3,129,449 A | 4/1964 | Cyzer |
| 3,177,509 A | 4/1965 | Cyzer |
| 3,188,673 A | 6/1965 | Newman |
| 3,229,318 A | 1/1966 | Clemens |
| 3,230,562 A | 1/1966 | Birch |
| 3,263,258 A | 8/1966 | Burge |
| 3,316,576 A | 5/1967 | Urbush |
| 3,398,421 A | 8/1968 | Rashbaum |
| 3,553,759 A | 1/1971 | Sober et al. |
| 4,114,222 A | 9/1978 | Serediuk |
| 4,211,217 A | 7/1980 | Gueret |
| 4,240,452 A | 12/1980 | Jean |
| 4,291,431 A | 9/1981 | Lewis, Jr. |
| 4,302,863 A | 12/1981 | Droeser |
| 4,429,434 A | 2/1984 | Sung-shan |
| 4,543,679 A | 10/1985 | Rosofsky et al. |
| 4,545,087 A | 10/1985 | Nahum |
| D282,318 S | 1/1986 | Herzfeld et al. |
| 4,633,542 A | 1/1987 | Taravel |
| 4,654,922 A | 4/1987 | Chen |
| 4,694,844 A | 9/1987 | Berl et al. |
| 4,751,761 A | 6/1988 | Breitschmid |
| 4,776,054 A | 10/1988 | Rauch |
| 4,783,874 A | 11/1988 | Perches et al. |
| 4,890,349 A | 1/1990 | Nitzsche |
| 4,972,542 A | 11/1990 | Moshos et al. |
| 4,979,782 A | 12/1990 | Weihrauch |
| 5,033,797 A | 7/1991 | Rueb |
| 5,120,225 A | 6/1992 | Amit |
| 5,159,736 A | 11/1992 | Newell |
| 5,184,368 A | 2/1993 | Holland |
| 5,186,627 A | 2/1993 | Amit et al. |
| 5,228,166 A | 7/1993 | Gomez |
| 5,269,038 A | 12/1993 | Bradley |
| 5,283,921 A | 2/1994 | Ng |
| 5,305,489 A | 4/1994 | Lage |
| 5,325,560 A | 7/1994 | Pavone et al. |
| 5,357,644 A | 10/1994 | Theriault |
| 5,372,501 A | 12/1994 | Shalvi |
| 5,398,366 A | 3/1995 | Bradley |
| 5,435,032 A | 7/1995 | McDougall |
| 5,454,626 A | 10/1995 | Schiffer et al. |
| 5,474,366 A | 12/1995 | Strutt et al. |
| 5,483,722 A | 1/1996 | Scheier et al. |
| 5,500,975 A | 3/1996 | Sano |
| 5,511,276 A | 4/1996 | Lee |
| 5,524,312 A | 6/1996 | Tan et al. |
| 5,528,786 A | 6/1996 | Porat et al. |
| 5,535,474 A | 7/1996 | Salazar |
| 5,584,690 A | 12/1996 | Maassarani |
| 5,604,951 A | 2/1997 | Shipp |
| 5,628,082 A | 5/1997 | Moskovich |
| 5,651,158 A | 7/1997 | Halm |
| 5,689,850 A | 11/1997 | Shekalim |
| 5,715,011 A | 2/1998 | Bramwell |
| 5,728,408 A | 3/1998 | Boucherie |
| 5,799,353 A | 9/1998 | Oishi et al. |
| 5,799,354 A | 9/1998 | Amir |
| 5,802,656 A | 9/1998 | Dawson et al. |
| D399,349 S | 10/1998 | Barth |
| 5,839,148 A | 11/1998 | Volpenhein |
| 5,864,915 A | 2/1999 | Ra |
| 5,875,510 A | 3/1999 | Lamond et al. |
| 5,896,614 A | 4/1999 | Flewitt |
| 5,926,897 A | 7/1999 | Volpenhein |
| 5,930,860 A | 8/1999 | Shipp |
| 5,946,758 A | 9/1999 | Hohlbein et al. |
| 5,964,508 A | 10/1999 | Maurer |
| 5,987,688 A | 11/1999 | Roberts et al. |
| 5,991,959 A | 11/1999 | Raven et al. |
| 6,041,467 A | 3/2000 | Roberts et al. |
| 6,044,514 A | 4/2000 | Kaneda et al. |
| D425,306 S | 5/2000 | Beals et al. |
| 6,115,870 A | 9/2000 | Solanki et al. |
| 6,138,315 A | 10/2000 | Schmitt et al. |
| 6,138,316 A | 10/2000 | Weihrauch |
| 6,151,745 A | 11/2000 | Roberts et al. |
| 6,161,245 A | 12/2000 | Weihrauch |
| 6,178,582 B1 | 1/2001 | Halm |
| 6,219,874 B1 | 4/2001 | van Gelder et al. |
| 6,290,302 B1 | 9/2001 | Boucherie |
| 6,290,303 B1 | 9/2001 | Boucherie |
| 6,311,358 B1 | 11/2001 | Soetewey et al. |
| 6,314,606 B1 | 11/2001 | Hohlbein |
| 6,374,448 B2 | 4/2002 | Seifert |
| 6,389,634 B1 | 5/2002 | Devlin et al. |
| 6,523,907 B1 | 2/2003 | Buckner et al. |
| 6,546,586 B2 | 4/2003 | Cho |
| 6,553,604 B1 | 4/2003 | Braun et al. |
| 6,564,416 B1 | 5/2003 | Claire et al. |
| D477,465 S | 7/2003 | Reilly et al. |
| 6,681,777 B2 | 1/2004 | Gueret |
| 6,702,394 B2 | 3/2004 | Boucherie |
| 6,704,965 B2 | 3/2004 | Ale et al. |
| 6,764,142 B2 | 7/2004 | Kwon |
| 6,779,851 B2 | 8/2004 | Bouchiere |
| 6,826,797 B1 | 12/2004 | Chenvainu et al. |
| 6,886,207 B1 | 5/2005 | Solanki |
| 6,993,804 B1 | 2/2006 | Braun et al. |
| 6,996,870 B2 | 2/2006 | Hohlbein |
| 7,143,462 B2 | 12/2006 | Hohlbein |
| 7,354,112 B2 | 4/2008 | Fischer et al. |
| 7,418,759 B2 | 9/2008 | Huber et al. |
| 7,419,225 B2 | 9/2008 | Fischer et al. |
| 7,503,093 B2 | 3/2009 | Weihrauch |
| 7,841,041 B2 | 11/2010 | Moskovich et al. |
| 7,975,343 B2 * | 7/2011 | Hohlbein .............. A46B 9/06 15/110 |
| 8,091,170 B2 * | 1/2012 | Moskovich ............ A46B 5/007 15/110 |
| 8,561,247 B2 | 10/2013 | Moskovich et al. |
| 9,655,435 B2 | 5/2017 | Kraemer et al. |
| 2001/0024060 A1 | 9/2001 | Boucherie |

(56) References Cited

U.S. PATENT DOCUMENTS

| | | |
|---|---|---|
| 2001/0029639 A1 | 10/2001 | Seifert |
| 2001/0050507 A1 | 12/2001 | Boucherie |
| 2002/0004964 A1 | 1/2002 | Luchino et al. |
| 2002/0116778 A1 | 8/2002 | Kwon |
| 2002/0162183 A1 | 11/2002 | Cho |
| 2003/0132661 A1 | 7/2003 | Sato et al. |
| 2004/0070258 A1 | 4/2004 | Kwon |
| 2004/0074034 A1 | 4/2004 | Russell |
| 2004/0083569 A1 | 5/2004 | Kweon et al. |
| 2004/0117934 A1 | 6/2004 | Pfenniger et al. |
| 2004/0164604 A1 | 8/2004 | Boucherie |
| 2005/0000049 A1* | 1/2005 | Hohlbein ............... A46B 3/005 15/111 |
| 2005/0066464 A1 | 3/2005 | McKay |
| 2005/0116528 A1 | 6/2005 | Boucherie |
| 2006/0096053 A1 | 5/2006 | Fischer et al. |
| 2006/0107478 A1 | 5/2006 | Boucherie |
| 2007/0170772 A1 | 7/2007 | Kwon et al. |
| 2008/0148502 A1 | 6/2008 | Fischer et al. |
| 2008/0179938 A1 | 7/2008 | Kwon et al. |
| 2008/0224529 A1 | 9/2008 | Kwon et al. |
| 2008/0238182 A1 | 10/2008 | Fischer et al. |
| 2008/0271276 A1 | 11/2008 | Garberg et al. |
| 2009/0013489 A1 | 1/2009 | Binet et al. |
| 2010/0223745 A1 | 9/2010 | Kraemer et al. |
| 2010/0223746 A1 | 9/2010 | Mueller |
| 2011/0138560 A1* | 6/2011 | Vitt ................... A46B 15/0081 15/167.1 |

FOREIGN PATENT DOCUMENTS

| | | |
|---|---|---|
| DE | 558852 C | 9/1932 |
| DE | 1883020 U | 11/1963 |
| DE | 1210409 B | 2/1966 |
| DE | 1273482 B | 7/1968 |
| DE | 7533143 U | 2/1976 |
| DE | 8215266.7 U1 | 9/1982 |
| DE | 3528596 A1 | 2/1987 |
| DE | 3529953 A1 | 3/1987 |
| DE | 3744630 A1 | 7/1989 |
| DE | 3928919 A1 | 3/1991 |
| DE | 4027288 A1 | 3/1992 |
| DE | 4029610 A1 | 3/1992 |
| DE | 9400231.2 U1 | 5/1994 |
| DE | 4330171 A1 | 3/1995 |
| DE | 19542393 A1 | 5/1997 |
| DE | 19604533 A1 | 8/1997 |
| DE | 19857032 A1 | 7/1999 |
| DE | 19818553 C1 | 8/1999 |
| DE | 19817704 A1 | 10/1999 |
| DE | 1 983 2436 A1 | 1/2000 |
| DE | 10047699 A1 | 4/2001 |
| DE | 2000 6311 U1 | 8/2001 |
| DE | 10028530 A1 | 12/2001 |
| DE | 202004018612 U1 | 3/2005 |
| DE | 102006026712 A1 | 12/2007 |
| EP | 0169312 A1 | 1/1986 |
| EP | 0189816 A2 | 8/1986 |
| EP | 0322562 A1 | 7/1989 |
| EP | 0346646 A2 | 12/1989 |
| EP | 0 405 204 A2 | 1/1991 |
| EP | 0471312 A2 | 2/1992 |
| EP | 0472857 A1 | 3/1992 |
| EP | 0 519 677 A1 | 12/1992 |
| EP | 0 567 672 A1 | 11/1993 |
| EP | 0 704 179 A1 | 4/1996 |
| EP | 0 716 821 A1 | 6/1996 |
| EP | 0 972 464 A1 | 1/2000 |
| EP | 0 972 465 A1 | 1/2000 |
| EP | 0783850 B1 | 3/2001 |
| EP | 1234525 A2 | 8/2002 |
| EP | 1 425 989 A1 | 6/2004 |
| EP | 1 449 458 A1 | 8/2004 |
| EP | 1864588 A2 | 12/2007 |
| EP | 1 894 489 A2 | 3/2008 |
| GB | 438091 A | 11/1935 |
| GB | 1537526 A | 12/1978 |
| JP | H05-76416 A | 3/1993 |
| JP | H06-327517 A | 11/1994 |
| JP | H08-214947 A | 8/1996 |
| JP | 2000-000118 A | 1/2000 |
| JP | 2000342334 A | 12/2000 |
| JP | 2001-218623 A | 8/2001 |
| JP | 200210832 A | 1/2002 |
| JP | 2002-136341 A | 5/2002 |
| JP | 2002-345554 A | 12/2002 |
| JP | 2004254779 A | 9/2004 |
| JP | 2006167027 A | 6/2006 |
| JP | 2008-194497 A | 8/2008 |
| KR | 10-0403967 B1 | 6/2002 |
| RU | 2004133332 A | 3/2006 |
| SU | 1752336 A1 | 8/1992 |
| WO | 94/22346 A1 | 10/1994 |
| WO | 96/20654 A1 | 7/1996 |
| WO | 97/14330 A1 | 4/1997 |
| WO | 98/01055 A1 | 1/1998 |
| WO | 98/43514 A1 | 10/1998 |
| WO | 9937181 A1 | 7/1999 |
| WO | 00/21406 A1 | 4/2000 |
| WO | 00/30495 A1 | 6/2000 |
| WO | 00/47083 A1 | 8/2000 |
| WO | 00/53054 A1 | 9/2000 |
| WO | 00/60980 A2 | 10/2000 |
| WO | 0064307 A1 | 11/2000 |
| WO | 00/74522 A1 | 12/2000 |
| WO | 0076369 A2 | 12/2000 |
| WO | 01/21036 A1 | 3/2001 |
| WO | 01/87101 A2 | 11/2001 |
| WO | 02/05679 A1 | 1/2002 |
| WO | 02/11583 A2 | 2/2002 |
| WO | 02/38004 A1 | 5/2002 |
| WO | 03/043459 A2 | 5/2003 |
| WO | 2004/037038 A1 | 5/2004 |
| WO | 2004/082428 A2 | 9/2004 |
| WO | 2004093718 A1 | 11/2004 |
| WO | 2007016802 A1 | 2/2007 |
| WO | 2007043848 A1 | 4/2007 |
| WO | 2009/000903 A1 | 12/2008 |

OTHER PUBLICATIONS

Oct. 23, 2020 Office Action Issued in U.S. Appl. No. 16/100,914.
Aug. 22, 2016 Office Action issued in U.S. Appl. No. 14/460,888.
Jul. 7, 2017 Office Action issued in U.S. Appl. No. 14/460,888.
Feb. 27, 2018 Office Action issued in U.S. Appl. No. 14/460,888.
Sep. 17, 2010 Office Action issued in Korean Application No. 10-2005-701487.
Aug. 19, 2013 Notice of Allowance issued in U.S. Appl. No. 13/765,151.
Apr. 23, 2013 Office Action issued in U.S. Appl. No. 13/765,151.
Jun. 8, 2015 Office Action issued in U.S. Appl. No. 14/083,896.
Sep. 17, 2015 Notice of Allowance issued in U.S. Appl. No. 14/083,896.
Jun. 25, 2018 Office Action issued in U.S. Appl. No. 14/962,542.
Dec. 1, 2011 International Search Report issued in International Patent Application No. PCT/EP2011/003858.
Feb. 19, 2013 International Preliminary Report on Patentability issued in International Patent Application No. PCT/EP2011/003858.
Jun. 26, 2017 Office Action issued In U.S. Appl. No. 14/715,034.
Nov. 30, 2017 Office Action issued in U.S. Appl. No. 14/715,034.
Aug. 7, 2014 Office Action issued in U.S. Appl. No. 13/816,843.
U.S. Appl. No. 13/816,843, filed Feb. 13, 2013 in the name of Hess et al.
U.S. Appl. No. 14/715,034, filed May 18, 2015 in the name of Hess et al.
Apr. 29, 2014 Office Action issued in U.S. Appl. No. 13/816,843.
Jul. 25, 2012 Office Action issued in U.S. Appl. No. 13/317,652.
Mar. 9, 2012 Office Action issued in U.S. Appl. No. 13/317,652.
Boucherie AFT Anchorless Technology Toothbrush, date unknown.
Signal Toothbrush, date unknown.

(56) References Cited

OTHER PUBLICATIONS

May 27, 2010 Office Action issued in U.S. Appl. No. 12/382,220.
Dec. 13, 2010 Office Action issued in U.S. Appl. No. 12/382,220.
Sep. 4, 2017 International Search Report issued in International Patent Application No. PCT/EP2017/058757.
Sep. 4, 2017 Written Opinion of the International Search Authority issued in International Patent Application No. PCT/EP2017/058757.
Feb. 23, 2011 Office Action issued in U.S. Appl. No. 12/379,186.
Aug. 25, 2010 Office Action issued in U.S. Appl. No. 12/379,186.
Jan. 13, 2010 Office Action issued in U.S. Appl. No. 12/379,186.
Mar. 17, 2010 International Search Report issued in Patent Application No. PCT/EP2009/003999.
Dec. 13, 2010 International Preliminary Report on Patentability issued in Patent Application No. PCT/EP2009/003999.
Jul. 2, 2012 Office Action issued in U.S. Appl. No. 12/991,528.
Oct. 2, 2012 Office Action issued in U.S. Appl. No. 12/991,528.
Jun. 5, 2013 Notice of Allowance issued in U.S. Appl. No. 12/991,528.
U.S. Appl. No. 10/362,590, filed Mar. 17, 2003 in the name of Fischer et al.
Jan. 24, 2006 Office Action issued in U.S. Appl. No. 10/362,590.
Jun. 13, 2006 Office Action issued in U.S. Appl. No. 10/362,590.
Oct. 4, 2006 Notice of Allowance issued in U.S. Appl. No. 10/362,590.
U.S. Appl. No. 11/362,069, filed Feb. 27, 2006 in the name of Fischer et al.
Dec. 12, 2006 Office Action issued in U.S. Appl. No. 11/362,069.
Jul. 18, 2007 Office Action issued in U.S. Appl. No. 11/362,069.
Dec. 14, 2007 Notice of Allowance issued in U.S. Appl. No. 11/362,069.
U.S. Appl. No. 11/987,506, filed Nov. 30, 2007 in the name of Fischer et al.
May 12, 2008 Office Action issued in U.S. Appl. No. 11/987,506.
Aug. 19, 2008 Notice of Allowance issued in U.S. Appl. No. 11/987,506.
U.S. Appl. No. 11/987,504, filed Nov. 30, 2007 in the name of Fischer et al.
May 14, 2008 Office Action issued in U.S. Appl. No. 11/987,504.
Aug. 21, 2008 Notice of Allowance issued in U.S. Appl. No. 11/987,504.
U.S. Appl. No. 12/068,730, filed Feb. 11, 2008 in the name of Fischer et al.
Jul. 9, 2008 Office Action issued in U.S. Appl. No. 12/068,730.
Dec. 12, 2008 Notice of Allowance issued in U.S. Appl. No. 12/068,730.
Nov. 5, 2012 Office Action issued in U.S. Appl. No. 13/067,844.
Jan. 31, 2013 Notice of Allowance issued in U.S. Appl. No. 13/067,844.
U.S. Appl. No. 13/765,151, filed Feb. 12, 2013 in the name of Pfenniger et al.
U.S. Appl. No. 14/083,896, filed Nov. 19, 2013 in the name of Pfenniger et al.
U.S. Appl. No. 14/962,542, filed Dec. 8, 2015 in the name of Pfenniger et al.
U.S. Appl. No. 12/991,528, filed Dec. 6, 2010 in the name of Loetscher et al.
U.S. Appl. No. 13/952,017, filed Jul. 26, 2013 in the name of Loetscher et al.
Dec. 30, 2013 Office Action issued in U.S. Appl. No. 13/952,017.
May 2, 2014 Office Action issued in U.S. Appl. No. 13/952,017.
Jul. 30, 2014 Office Action issued in U.S. Appl. No. 13/952,017.
Nov. 12, 2014 Office Action issued in U.S. Appl. No. 13/952,017.
Mar. 23, 2015 Office Action issued in U.S. Appl. No. 13/952,017.
Jun. 22, 2015 Notice of Allowance issued in U.S. Appl. No. 13/952,017.
Feb. 26, 2015 Notice of Allowance issued in U.S. Appl. No. 13/816,843.
May 11, 2018 Notice of Allowance issued in U.S. Appl. No. 14/715,034.
U.S. Appl. No. 16/100,914, filed Aug. 10, 2018 in the name of Hess et al.
Jan. 29, 2016 Office Action issued in U.S. Appl. No. 14/460,888.
Dec. 14, 2012 Office Action issued in U.S. Appl. No. 13/317,652.
Jan. 29, 2013 Office Action issued in U.S. Appl. No. 12/991,528.
Dec. 28, 2020 Office Action issued in U.S. Appl. No. 16/414,455.
U.S. Appl. No. 12/382,220, filed Mar. 11, 2009 in the name of Fischer et al.
Apr. 4, 2011 Notice of Allowance issued in U.S. Appl. No. 12/382,220.
U.S. Appl. No. 14/460,888, filed Aug. 15, 2014 in the name of Fischer et al.
Apr. 10, 2015 Office Action issued in U.S. Appl. No. 14/460,888.
Dec. 4, 2017 Notice of Allowance issued in U.S. Appl. No. 14/460,888.
Sep. 3, 2015 Office Action issued in U.S. Appl. No. 14/460,888.
U.S. Appl. No. 13/815,924, filed Mar. 18, 2013 in the name of Fischer et al.
Oct. 16, 2013 Office Action issued in U.S. Appl. No. 13/815,924.
May 20, 2014 Notice of Allowance issued in U.S. Appl. No. 13/815,924.
U.S. Appl. No. 13/317,652, filed Oct. 25, 2011 in the name of Fischer et al.
Mar. 5, 2013 Notice of Allowance issued in U.S. Appl. No. 13/317,652.
U.S. Appl. No. 12/379,186, filed Feb. 13, 2009 in the name of Fischer et al.
Jul. 20, 2011 Notice of Allowance issued in U.S. Appl. No. 12/379,186.
U.S. Appl. No. 11/878,718, filed Jul. 26, 2007 in the name of Huber et al.
May 15, 2008 Office Action issued in U.S. Appl. No. 11/878,718.
Oct. 8, 2008 Notice of Allowance issued in U.S. Appl. No. 11/878,718.
U.S. Appl. No. 11/878,720, filed Jul. 26, 2007 in the name of Huber et al.
Feb. 19, 2008 Office Action issued in U.S. Appl. No. 11/878,718.
Dec. 31, 2008 Office Action issued in U.S. Appl. No. 11/878,718.
Apr. 8, 2009 Notice of Allowance issued in U.S. Appl. No. 11/878,718.
U.S. Appl. No. 12/457,913, filed Jun. 25, 2009 in the name of Huber et al.
Jan. 25, 2010 Office Action issued in U.S. Appl. No. 12/457,913.
Jul. 7, 2010 Office Action issued in U.S. Appl. No. 12/457,913.
Dec. 17, 2010 Office Action issued in U.S. Appl. No. 12/457,913.
May 27, 2011 Notice of Allowance issued in U.S. Appl. No. 12/457,913.
U.S. Appl. No. 13/137,319, filed Aug. 5, 2011 in the name of Huber et al.
Nov. 21, 2011 Office Action issued in U.S. Appl. No. 13/137,319.
Apr. 23, 2012 Office Action issued in U.S. Appl. No. 13/137,319.
Jul. 27, 2012 Notice of Allowance issued in U.S. Appl. No. 13/137,319.
U.S. Appl. No. 10/388,744, filed Mar. 17, 2003 in the name of Pfenniger et al.
Aug. 23, 2004 Office Action issued in U.S. Appl. No. 10/388,744.
Apr. 19, 2005 Office Action issued in U.S. Appl. No. 10/388,744.
Aug. 10, 2005 Notice of Allowance issued in U.S. Appl. No. 10/388,744.
U.S. Appl. No. 11/291,911, filed Dec. 2, 2005 in the name of Pfenniger et al.
Feb. 7, 2006 Office Action issued in U.S. Appl. No. 11/291,911.
Sep. 6, 2006 Notice of Allowance issued in U.S. Appl. No. 11/291,911.
U.S. Appl. No. 11/645,664, filed Dec. 27, 2006 in the name of Pfenniger et al.
Jul. 27, 2007 Office Action issued in U.S. Appl. No. 11/645,664.
Jan. 23, 2008 Office Action issued in U.S. Appl. No. 11/645,664.
Aug. 27, 2008 Office Action issued in U.S. Appl. No. 11/645,664.
Mar. 6, 2009 Notice of Allowance issued in U.S. Appl. No. 11/645,664.
U.S. Appl. No. 12/379,992, filed Mar. 5, 2009 in the name of Pfenniger et al.
Jul. 9, 2009 Office Action issued in U.S. Appl. No. 12/379,992.
Apr. 8, 2010 Notice of Allowance issued in U.S. Appl. No. 12/379,992.
U.S. Appl. No. 12/805,064, filed Jul. 9, 2010 in the name of Pfenniger et al.
Nov. 8, 2010 Office Action issued in U.S. Appl. No. 12/805,064.
Apr. 1, 2011 Notice of Allowance issued in U.S. Appl. No. 12/805,064.

(56) References Cited

OTHER PUBLICATIONS

U.S. Appl. No. 13/067,844, filed Jun. 29, 2011 in the name of Pfenniger et al.
Jan. 30, 2012 Office Action issued in U.S. Appl. No. 13/067,844.
Jun. 26, 2012 Office Action issued in U.S. Appl. No. 13/067,844.
Dec. 5, 2018 Office Action issued in U.S. Appl. No. 14/962,542.
Apr. 2, 2021 Office Action issued in U.S. Appl. No. 16/100,914.
Partial Machine Translation of JP 2001-218623, published Aug. 14, 2001.
Aug. 9, 2021 Office Action Issued in U.S. Appl. No. 16/100,914.

* cited by examiner

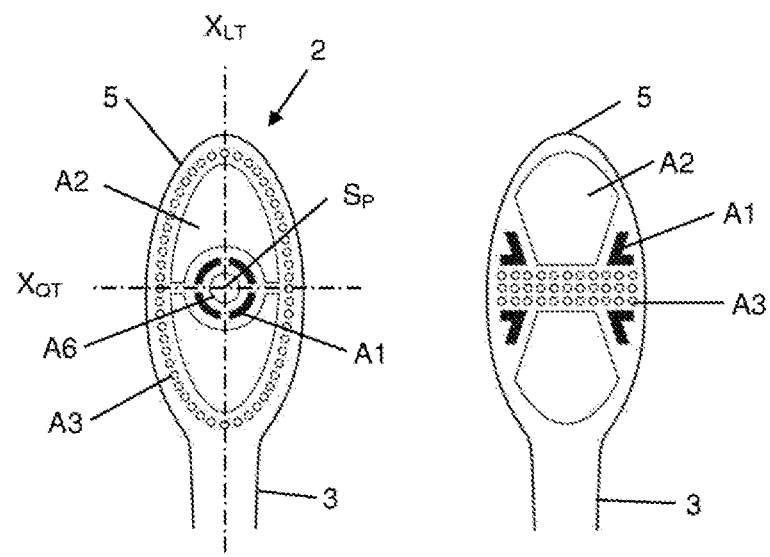
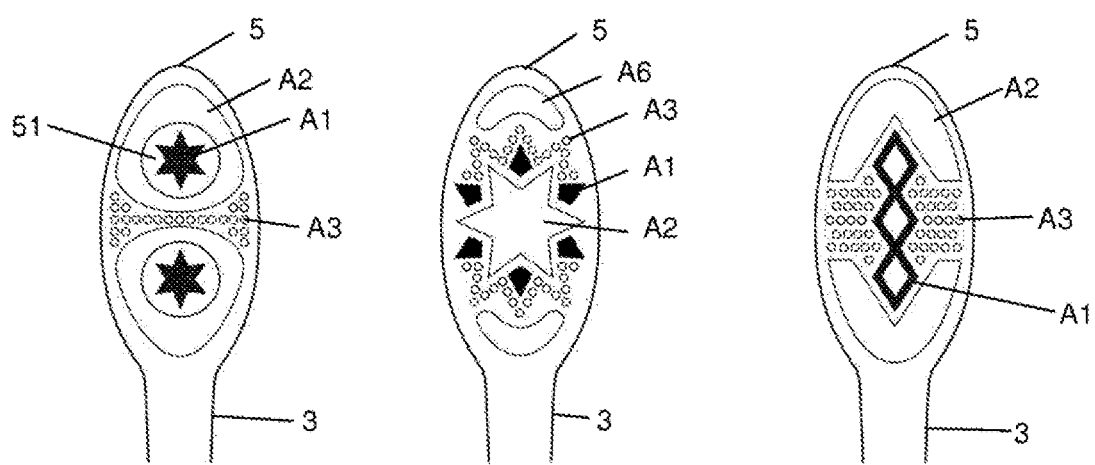

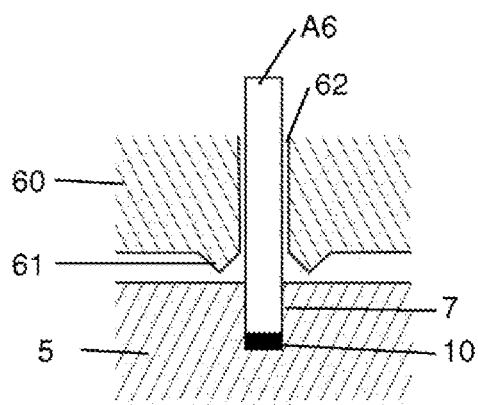
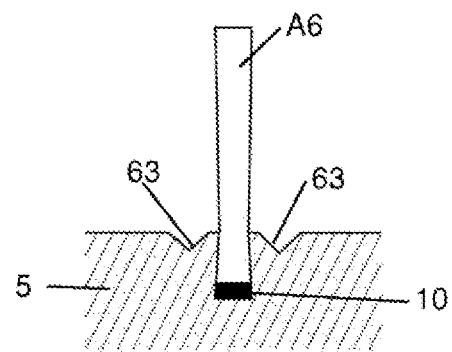
Fig. 56a  Fig. 56b
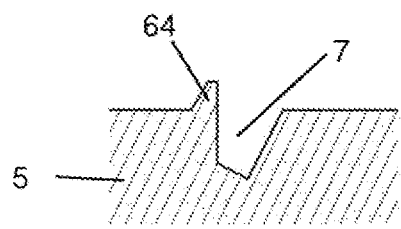
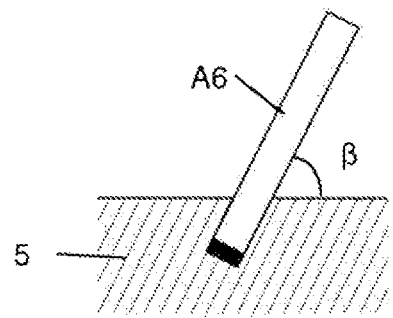
Fig. 57a  Fig. 57b

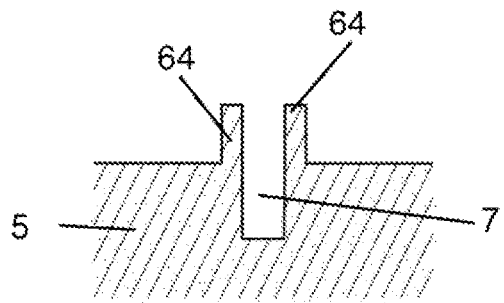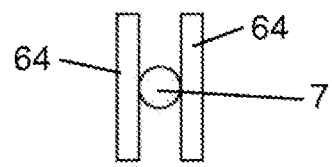
Fig. 58a  Fig. 58b
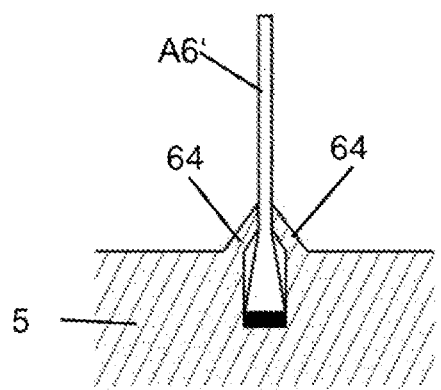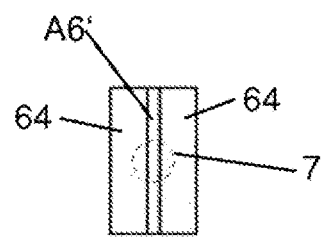
Fig. 59a  Fig. 59b
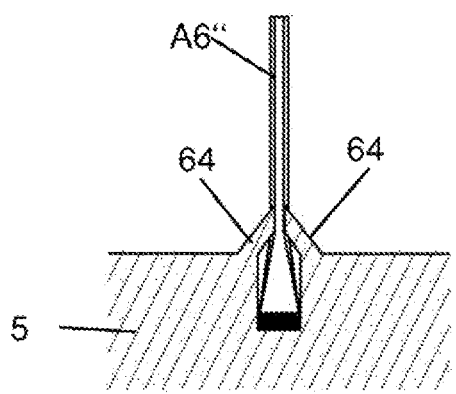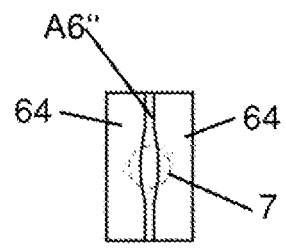
Fig. 60a  Fig. 60b

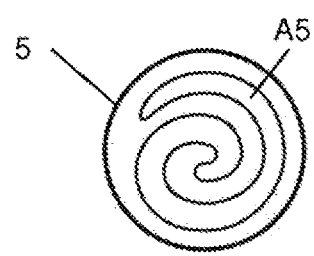
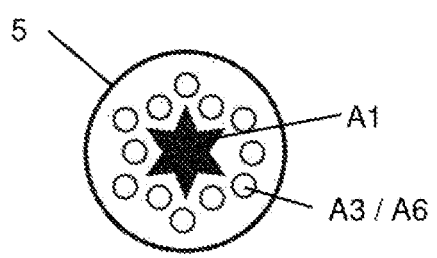
Fig. 66  Fig. 67
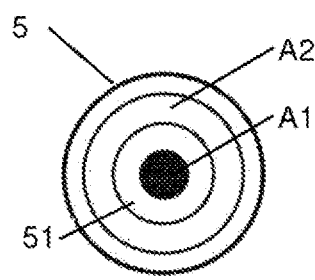
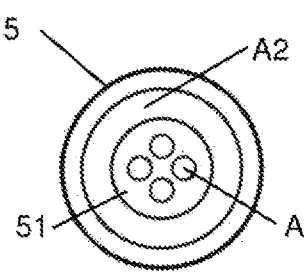
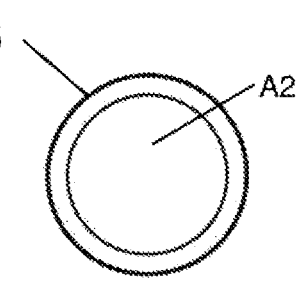
Fig. 68  Fig. 69  Fig. 70

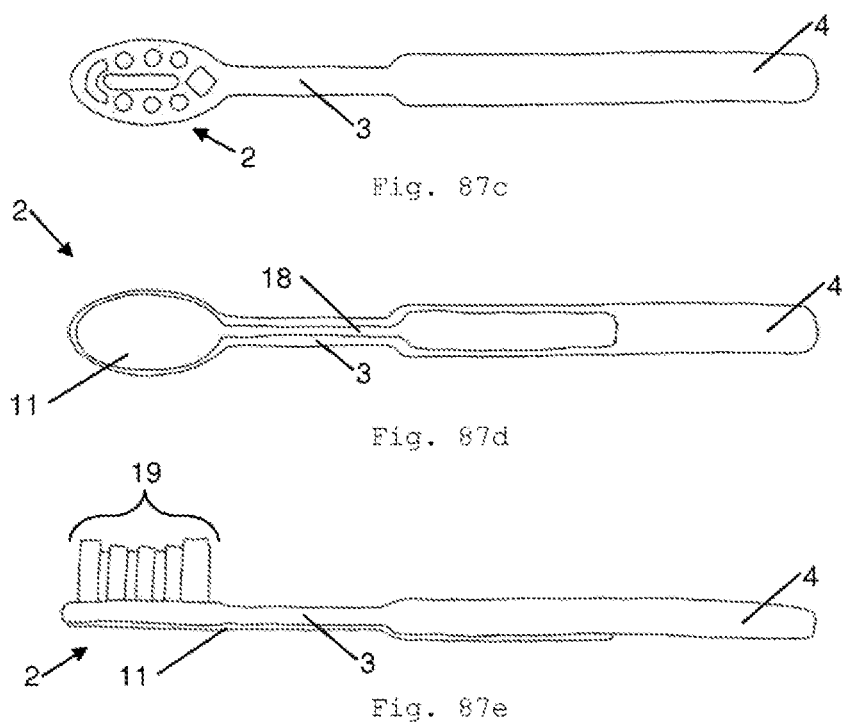
Fig. 87c
Fig. 87d
Fig. 87e
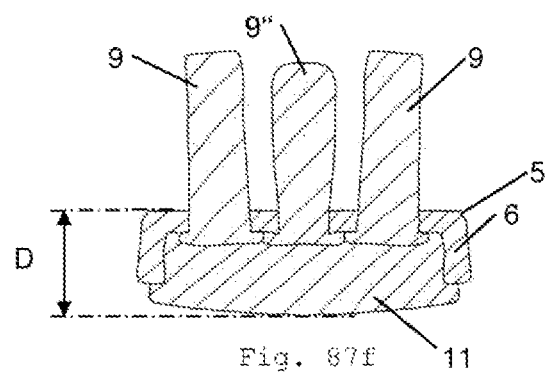
Fig. 87f
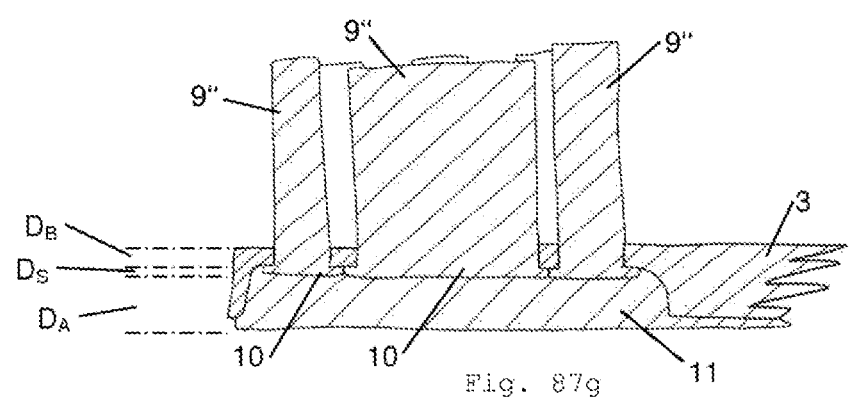
Fig. 87g

BRUSH PRODUCT AND METHOD FOR THE PRODUCTION THEREOF

The invention relates to a brush product, in particular a toothbrush, where the bristle field is formed by multiple different groups of cleaning elements, as well as to a corresponding production method or tool.

US 2002/0004964 A1 discloses a toothbrush which comprises a certain variability with regard to the arrangement of various types of bristles in order to achieve, on the one hand, an efficient tooth cleaning action and in order, on the other hand, to be able to bring about quick drying of the toothbrush after use by using individual bristles with a relatively large diameter and correspondingly large spaces between the individual bristles.

EP 0 165 546 B1 discloses a further toothbrush which is able to achieve varied effects in dental care by means of a diverse stock of bristles and which takes account of varying wear and tear.

EP 0 150 785 B1 describes a method for binding bristles to a bristle carrier, which bristles each consist of thermoplastic materials, by the bristles at the one end thereof and the bristle carrier at the bristle receiving side thereof being melted, bristles and bristle carrier then being joined together and held in said position where applicable until the melt solidifies, the bristle ends being heated such that the oriented, stretched molecules are formed back into the non-oriented lumped molecular form and, as a result, a thickening is formed at the bristle end, and the bristles are pressed with the thickened end thereof into the melted bristle carrier until the melt thereof merges again behind the thickened end. Molding can take place in said recesses for installing the bristles prior to or during the heating of the receiving side of the bristle carrier. Such a method is generally designated as a hot tufting method or an HT method.

DE 20 2016 102 996 U1 describes a device for producing a brush which comprises at least one bristle or at least one bristle tuft, the brush having a bristle carrier with at least one anchor opening for the at least one bristle or the at least one bristle tuft, the device comprising a holder for the bristle carrier and a tool part realized as an extrusion punch with at least one receiving opening for the at least one bristle or the at least one bristle tuft, the receiving opening opening out on the end face of the tool part facing the bristle carrier, and the tool part having heating which heats at least portions of the end face and is realized and regulated such that the end face is heated to a maximum temperature of 140° C., in particular a maximum of 130° C. The at least one bristle tuft is melted at the rear bristle ends thereof and is inserted into the corresponding anchor opening of the bristle carrier. Pressure and heat are then exerted onto the bristle carrier by way of the tool part which is realized as an extrusion punch, the plastic material of the bristle carrier deforming plastically and consequently the anchor opening closing around the bristle tuft such that the bristle tuft is anchored non-releasably on the bristle carrier. In this case, the bristle melt forms an anchoring aid on the rear ends of the bristle tuft with a larger base than the bristle tuft cross section. This is an HT method in this case also.

Further methods for fastening bristles to or in a bristle carrier are described in EP 0 346 646 B2, WO 00/28856, EP 0 812 143 B1, WO 93/12690 or U.S. Pat. No. 6,752,949 B2.

WO 2014/092674 A1 additionally discloses an oral hygiene appliance which comprises a body having a head portion with a front side and a rear side, at least one cleaning element being arranged on the front side of the head portion of the body, and having an edge which extends from the rear side of the head part of the body, the edge comprising one or multiple weakened portions and extending along a peripheral region of the head portion of the body and elastic material being arranged on the rear side of the head portion of the body and the edge being arranged around at least part of the elastic material.

WO 2016/008576 A1 describes a carrier plate, for instance for a toothbrush, having a plurality of holes which penetrate the carrier plate, into which bristle bundles consisting of bristles are insertable and are fastenable in an anchorless manner to the carrier plate, the carrier plate comprising a plurality of material projections on the rear side thereof remote from the bristle bundles inserted into the holes, the material projections being meltable and pressable into a bundle fastening plane for fastening the bristle bundles to the carrier plate.

DE 10 2013 100 194 A1 describes a device and a method for producing brushes, in particular toothbrushes, which comprise multiple bristles which are joined together to form bristle tufts. In this case, there is at least one tuft carrier present which comprises multiple holes for the insertion of bristle tufts, the hole form of which corresponds to the tuft form of the brushes to be produced. By means of a welding device, the bristles of tufts inserted into the tuft carrier are melted together on the rear side of the tuft carrier and, by forming a layer of bristle melt, are welded together. The tuft carrier plus bristle tufts is then non-releasably connected to the brush handle by means of welding (e.g. ultrasound welding). The brush handle preferably has a corresponding recess for the anchoring of the tuft carrier.

WO 2012/000689 A1 discloses a method for producing brushes by means of a device where first of all either a prefabricated base part is provided, to which the bristle tuft is fastened and which forms a portion of the finished brush, a separate support layer being applied to the rear of the base part, or at least one prefabricated base part, which is formed by overmolding multiple bristle tufts with bristle ends that have been melted together beforehand, the base part provided with bristles then being fed to an injection molding tool and positioned therein, each base part resting in a cavity of a mold half of the injection mold with the edge thereof on the edge of an opening which proceeds from the assigned cavity and the bristle tufts projecting into the opening, and finally a brush portion being injected onto the rear side of the base part.

WO 2012/123004 A1 discloses a method for producing in particular toothbrushes by means of a device, which method comprises the following steps: remove bristle tufts sequentially from a bristle store, in which the bristles are accommodated packed in parallel; convey the removed bristle tuft by means of a conveying device to a base part which forms part of the finished brush and has openings for receiving individual bristle tufts; push the bristle tuft sequentially into the assigned opening on the rear side of the base part, a guide plate with deflection channels being provided between the conveying device and the rear side of the base part device, through which the bristle tufts are pushed into the opening in the base part; and fasten the bristle tuft to the base part in an anchorless manner.

WO 2013/050181 A1 describes a method and a device for producing brushes, in particular toothbrushes, which provide that openings for bristle tufts are present in a bristle carrier, which openings have offset centroids and/or other geometries where they open out at the front and the rear thereof.

Finally, WO 2013/159799 A1 discloses a bristle carrier injection molding device for injection molding a bristle carrier of a brush, which comprises openings in which the bristle tufts are plugged, the device including a first and a second injection mold half which, in the closed state, define between them at least one cavity which represents a bristle carrier and is to be filled with liquid plastics material, the first mold half having a first surface which forms the rear side of the bristle carrier and the second mold half a second surface which forms the front side of the bristle carrier. Protruding projections, which proceed from the first and/or second surfaces, are present for forming the openings. The cross section of the projection of an opening at the transition between the first surface and the adjoining projection is different to the cross section of the projection assigned to same opening at the transition between the second surface and the assigned projection, i.e. another cross-sectional form is provided for instance or a different number of cross sections which branch off from the projection.

It is the object of the present invention to provide brush products, the bristle fields of which are even more variable and comprise a further improved cleaning action, as well as to specify a corresponding method for producing such brush products.

Said object is achieved according to the invention by means of a brush product, in particular a toothbrush, comprising a basic body having a head part with a front side and a rear side which includes a bristle carrier with a longitudinal axis and a transverse axis as well as a bristle field protruding therefrom, wherein the bristle field is formed by at least one group of cleaning elements; a handle part; and a neck part which connects the head part to the handle part; wherein the bristle carrier is provided with bristles in an anchorless manner and wherein the bristle carrier comprises substantially a central carrier region, an upper carrier region, a lower carrier region, a right-hand carrier region and a left-hand carrier region, in which the groups of cleaning elements are arranged; as well as by means of a method for producing a brush product which is provided with anchorless bristles, in particular a toothbrush, comprising a basic body having a head part, which includes a bristle carrier with a bristle field which protrudes therefrom, as well as having a handle part and a neck part which connects the head part to the handle part, wherein a possible method (AFT method) for production includes at least the following steps: (a) inject a basic body from one or multiple hard and/or soft materials having a recess for a bristle plate in the head part and inject a separate carrier plate from one or multiple hard and/or soft materials and/or material for injected bristles (soft elements and/or injected bristles are injected on the carrier plate as an option); (b) provide the bristles by means of machining and/or cutting and/or rounding and/or joining bundles (picks) and/or splitting bundles (picks) into the desired form, for example into the form of puck bundles and/or into the form of mini bundles and/or into the form of grid bundles and/or into the form of long bundles and/or into the form of conventional bundles and insert the bundles into recesses in the carrier plate; (c) melt the bristles at the rear ends thereof provided for mounting in the bristle carrier on the rear side of the carrier plate, bristle melt forming, in this case, an anchoring aid on the carrier plate; the bristle melt can extend over multiple bundles of the carrier plate. (d) Insert the carrier plate with the anchored bristle bundles into the recess provided in the basic body; (e) connect the carrier plate to the basic body non-releasably, for example by means of ultrasound welding, pressing, bonding, thermal processes, mechanical processes etc. or a combination of processes (for example pressing combined with heat).

In an AFT method, a bundle is formed in the carrier plate of the brush from conventional, extruded bristles which are preferably formed by a single contiguous hole and preferably also by a contiguous melt carpet, to form which at least the bristles of the one bundle are melted at the rear end thereof.

A further possible method (HT method) for production includes at least the following steps: (a) inject a basic body from one or multiple hard and/or soft materials and/or material for injected bristles having blind holes and/or recesses for bristle bundles in the head part; soft elements and/or injected bristles are injected on the basic body as an option, (b) prepare the bristles by means of chemical processing and/or mechanical processing and/or cutting and/or rounding and/or joining and/or splitting bundles (picks) into the desired form, for example into the form of puck bundles and/or into the form of mini bundles and/or into the form of grid bundles and/or into the form of long bundles and/or into the form of conventional bundles and insert the bundle into a holding/pressing device; (c) melt the bristles at the rear ends thereof of the bristle bundle provided for mounting in the bristle carrier and form a preferably contiguous bristle melt; (d) insert the molten bristle bundle by means of a holding/pressing device into the corresponding blind holes and/or recesses in the basic body, it being possible to have already preheated the basic body prior to inserting the bristle bundle; (e) heat the bristle carrier at least in part preferably by means of the holding/pressing device; and (f) mount the bristles by exerting pressure and under the influence of heat by means of the holding/pressing device onto the head part in such a manner that the plastics material of the head part deforms such that at least the geometry of the blind holes and/or recesses assumes the form of an anchor at least in part. The bristle melt on the rear ends of the bristle bundle forms an anchoring aid in this case.

In the case of HT methods, a bundle is formed in a blind hole of the basic body of the brush from conventional, extruded bristles which are preferably formed by a single contiguous blind hole and preferably also by a contiguous bristle melt, to form which at least the bristles of the one bundle are melted at the rear ends thereof.

The plastics material of the bristle carrier is heated during mounting (f) preferably to a temperature which is equal to or slightly higher than the glass transition temperature thereof but lies below the melting point thereof.

The plastics material of the bristle carrier is preferably heated to a temperature (calculated in degrees Kelvin), which lies between 2% and 12%, further preferably between 4% and 10% and even more preferred between 6% and 8% above the glass transition temperature thereof. This applies in particular to bristle carrier materials where the glass transition temperature thereof is greater than or equal to 300° Kelvin. In the case of bristle materials with a glass transition temperature of less than 300° K, between 10% and 40%, preferably between 20% and 30% above the glass transition temperature (once again calculated in degrees Kelvin). In the case of very high pressures, however, it is also possible to work below the glass transition temperature.

In a preferred manner, the holding/pressing device comprises on the end face thereof a corresponding heating device (the heating can also be effected, however, by means of a separate heating device) by way of which the entire contact surface between the holding/pressing device and the bristle carrier is regularly heated. As an option, the bristle carrier can also already have been preheated by means of an additional device prior to the mounting of the bundle. This can additionally increase the speed and consequently the throughput.

The contact time between the holding/pressing device and the bristle carrier is preferably between 7 seconds and 9 seconds, further preferably between 7.5 seconds and 8.5 seconds and even more preferred between 7.75 seconds and 8.25 seconds.

The holding/pressing device preferably exerts a pressure of between 250 bar and 350 bar on the bristle carrier, further preferably between 275 bar and 325 bar (i.e. in particular in dependence on the material and contact time). Above all when having to work below the glass transition temperature of the respective material, pressure ranges of between 420 bar and 620 bar, more preferred between 460 bar and 580 bar and even more preferred between 500 bar and 540 bar are advantageously used.

In a preferred embodiment of the present invention, the cleaning elements of a group of cleaning elements are arranged substantially symmetrically in the central carrier region, the cleaning elements of a group of cleaning elements are arranged above the transverse axis of the bristle carrier in the upper carrier region, the cleaning elements of a group of cleaning elements are arranged below the transverse axis of the bristle carrier in the lower carrier region, the cleaning elements of a group of cleaning elements are arranged to the right of the longitudinal axis of the bristle carrier in the right-hand carrier region and the cleaning elements of a group of cleaning elements are arranged to the left of the longitudinal axis of the bristle carrier in the left-hand carrier region.

The term substantially symmetrical is to be understood in the present case as the corresponding cleaning elements of a group of cleaning elements being arranged in the central carrier region in a mirror-symmetrical manner, preferably to the longitudinal and/or transverse axis of the bristle carrier, and/or in a point symmetrical manner, preferably to the intersection point between the longitudinal axis and the transverse axis of the bristle carrier.

The cleaning elements in the lower and upper carrier regions are preferably arranged in a mirror-symmetrical manner to the transverse axis of the bristle carrier and/or in a point-symmetrical manner to the intersection between the longitudinal axis and the transverse axis. Further preferably, the cleaning elements in the left-hand and right-hand carrier regions are arranged in a mirror-symmetrical manner to the longitudinal axis of the bristle carrier and/or in a point-symmetrical manner to the intersection between the longitudinal axis and the transverse of the bristle carrier.

In a further preferred embodiment, the central carrier region is arranged somewhat offset in the direction of the lower and/or of the upper and/or of the right-hand and/or of the left-hand carrier region of the bristle carrier. However, it can also extend into each of said carrier regions, i.e. both into the lower and/or the upper and/or the right-hand and/or the left-hand carrier region of the bristle carrier.

In a further preferred embodiment of the present invention, the bristle field is formed by two, three, four, five or six different groups of cleaning elements.

In a particularly preferred manner, the bristle field is formed on the bristle carrier by two to five, even more preferred from three to four groups of cleaning elements. As a result, it is possible to achieve a particularly good match between a high degree of variability of the bristle carrier on the one hand and an effective cleaning action on the other hand.

In a further preferred embodiment of the present invention, the first group of cleaning elements includes soft elements and/or formations of injected bristles, the second group of cleaning elements puck bundles, the third group of cleaning elements mini bundles, the fourth group of cleaning elements grid bundles, the fifth group of cleaning elements long bundles and the sixth group of cleaning elements conventional bundles. Said groups of cleaning elements are distinguished in general by good interaction and an increase in the cleaning action.

In a further preferred embodiment of the present invention, at least the puck bundles and/or the mini bundles and/or the grid bundles and/or the long bundles and/or the conventional bundles comprise bristles which abut against one another. Consequently, the bundles visually also form one unit. The corresponding cleaning action of the bundles and the production of the bundles can be designed optimally in this way. When the rear ends (not the usage side) are melted, said bristles are joined together and form a unit. Preferably using the AFT method, the bristle melt of the individual bundles can be joined to form a so-called melt carpet which covers at least part of the rear side of the carrier plate.

In a further preferred embodiment of the present invention, one or multiple of the groups of cleaning elements can be arranged in each of the carrier regions. Preferably no more than four groups of cleaning elements are arranged in one carrier region, further preferably no more than three groups of cleaning element and even more preferred no more than two groups of cleaning elements. The respectively desired cleaning actions can be finely adjusted and optimized in this way too.

In a further preferred embodiment of the present invention, the soft elements and/or injected bristles of the first group of cleaning elements are formed by means of injection molding and preferably from at least one soft material component and/or at least one material for injected bristles.

The soft elements and/or injected bristles of the first group of cleaning elements are produced in the present case by means injection molding as well as without conventional extruded bristles (these are preferably used for the cleaning elements of groups two to six). They preferably consist of soft material or of bristle material for injected bristles.

The particular advantage of said first group of cleaning elements is that they can be used as massage elements for massage and/or cleaning of, for instance, the palate (soft elements) and for cleaning the surfaces of the tooth surface and for cleaning the interdental regions (the injected bristles are preferably realized in a conical manner and produced from a special material for this purpose).

The soft elements and/or injected bristles of the first group of cleaning elements are preferably anchored on the hard material (i.e. for instance according to the AFT, IMT or HT method).

The soft elements and/or injected bristles of the first group of cleaning elements can be provided as individual elements (i.e. for instance a soft element with a surface area) or as formations (i.e. multiple soft elements or multiple injected bristles each with its own surface area).

The surface area or areas, in this case, can comprise a recess or recesses. Said recesses can be empty or, however, other cleaning elements can be contained therein. Empty recesses or spaces serve, in principle, for improved freedom of movement of the bristles and in general of the cleaning elements (i.e. where this is wanted).

The soft elements and/or injected bristles of the first group of cleaning elements can be realized additionally such that they follow at least in part the outside contour of the brush head (which corresponds substantially to the outer edge thereof), and preferably at least around 20% or 30% or 40% or 50% of the corresponding outside contour length.

In a preferred manner, the injected bristles realize regular forms on a surface area, i.e. they are realized, for example, in a row-shaped, wave-shaped, grid-shaped (open or closed), fishbone-shaped (with straight or angled bones), star-shaped, diamond-shaped, hourglass-shaped, crescent-shaped, circle-shaped, circular-ring-shaped, circle-segment-shaped, semi-circle-ring-shaped, quadrant-ring-shaped manner or on a line following the contour of the surface area.

In the event of multiple soft elements and/or injected bristles inside a bristle field, they are preferably arranged symmetrically to one another, i.e. for instance in a mirror-symmetrical manner to the longitudinal axis and/or to the transverse axis of the bristle carrier or, however, in a point-symmetrical manner to the intersection between the longitudinal axis and the transverse axis.

Formations of soft elements and/or injected bristles (i.e. multiple surfaces areas) are preferably arranged in a structured manner. They can follow a line, for example, and, in this case, form, for instance, a wave or wave form. The formations can also follow a geometry and form, for example, a circle or an oval. In a preferred manner, the formations also comprise their own symmetry, i.e. they are arranged, for instance, in a mirror-symmetrical manner and/or in a point-symmetrical manner.

The soft elements and/or injected bristles (both as individual elements or as formations) preferably comprise a topography. This can be realized in a flat, dome-shaped, trough-shaped, cup-shaped, battlement-shaped, minaret-shaped, row-shaped, circular-ring-shaped manner, in the form of logos or letters, in a raised or recessed manner etc.

Within the topography of soft elements and/or injected bristles, in a preferred manner recurring and combined forms such as honeycombs, grids, longitudinal profiles or transverse profiles.

The surface structure of the soft elements and/or injected bristles is preferably designed in a polished, eroded or structured manner.

The soft elements and/or injected bristles comprise a height which is preferably 1, 2 or 3 mm shorter than the height of conventional, extruded bristles.

The position of the soft elements and/or injected bristles is preferably perpendicular to the brush head (i.e. in the demolding direction of the injection mold) or, however, at an angle thereto, it also being possible to design a cone form in an opening or closing manner.

Special characteristics can be provided for the soft elements and/or injected bristles as a result of adding special master batches (e.g. abrasive particles) or, however, as a result of using water-soluble polymers.

The production of the soft elements and/or injected bristles is effected in a preferred manner together with the hard material of the brush head (HT, IMT) or the hard material of the carrier plate (AFT) (multi-component injection molding). As an alternative to this, a separate injection molding process and a subsequent insertion or joining of the soft elements and/or of the injected bristles to the brush head or carrier plate can be provided prior to or after the mounting of the bristle bundle. In this case, the soft element and/or the injected bristles can be produced as a single component part consisting only of one material (soft element produced from soft material or the injected bristles produced from a material for injected bristles) or, however, can be provided as a two-component part (soft element produced from soft material and hard material in 2-component injection molding), the hard material serving for anchoring with the hard material of the brush head or carrier plate (for instance by means of welding, bonding, mechanical or thermal processes or combinations thereof).

In a further preferred embodiment of the present invention, the puck bundles of the second group of cleaning elements take up a surface on the bristle carrier of at least 25 mm$^2$, preferably at least 50 mm$^2$ and particularly preferred of at least 75 mm$^2$.

The term puck bundles, i.e. of the second group of cleaning elements, is to be understood in the present case as one or a small number of large contiguous bundles with a high degree of bristle density in the bristle field and preferably with a large number of bristles in one single bundle. The individual bristles abut against one another with a high degree of density. The bristles of the bundle are, as a rule, connected together by way of a contiguous melt carpet or a bristle melt. In the case of the AFT method, other ones (not just puck bundles) can also be connected to the same melt carpet. In the case of the HT method, one puck bundle, as a rule, forms a bristle melt which is not connected by other bundles.

The bristle density in a puck bundle is preferably between 70 and 200 bristles/mm$^2$, further preferably between 100 and 170 bristles/mm$^2$.

The number of bristle ends per puck bundle is preferably between 200 and 10000, further preferably between 500 and 5000, even more preferred between 800 and 5000 and even further preferred between 1000 and 4000. In the case of very large puck bundles which can cover a significant proportion of the bristle field, it is possible to exceed 10000 bristle ends.

The density of the puck bundles on the brush head is 1, 2, 3, 4, 5 or 6, preferably between 1 and 4, further preferably between 2 and 3 puck bundles per brush head.

A high bristle density and consequently a particularly effective surface cleaning can be obtained in this way.

The puck bundles preferably comprise a thicker melt bath than other bundle forms as well as an anchoring edge. They can be produced using IMT and AFT methods or, however, also using hot tufting or HT methods.

The puck bundles can also be provided as individual elements (i.e. with a surface area) or as formations (i.e. with multiple surface areas).

The puck bundles can also comprise or surround one, two, three, four, five, six or multiple recesses or spaces, the recesses being able to be empty or unoccupied (not occupied by bristles) or being able to contain other cleaning elements or bundle forms (e.g. mini bundles, conventional bundles).

The puck bundles or the surface areas thereof can be realized in a circle-shaped, circle-ring-shaped, circle-segment-shaped, star-shaped, triangular, polygonal, rectangular or square manner (in each case also with a preferably centrally-arranged recess), etc.

The outer contours of the puck bundles preferably follow substantially at least in part the outer contours of the brush head. The puck bundle or the edge thereof is preferably arranged in part following parallel with the outer contour of the brush head. They can follow at least around 20%, 30%, 40% or 50% of the corresponding contour length.

Identical bristles are preferably used for the puck bundles, further preferably tapered bristles. Bristles that are tapered as finely as possible with a nominal diameter of the non-tapered bristle part of 0.025-0.175 mm, preferably 0.05-0.125 mm, are used in this case. This ensures a fine structure in spite of the very high bristle density. However, it is also possible for different bristle types to be mixed. The differences can exist, in this case, in the diameter, the color or colors, the master batch used and the characteristics thereof, the production or number of materials used (conventionally extruded or co-extruded or bristles produced from multiple material components), the shape of the tips (tapered or rounded), the materials used or the cross-sectional form, etc.

It is consequently possible in any case to use various bristles in different puck bundles inside a bristle field or, however, also inside one single puck bundle.

The puck bundles are arranged inside a bristle field preferably in a mirror-symmetrical manner to the longitudinal axis and/or to the transverse axis of the bristle carrier and/or in a point-symmetrical manner (preferably to the intersection point between the two axes).

The topography (to be understood in this document as a surface formed by bristle ends or cleaning elements on the usage side) within a puck bundle is preferably realized in a flat, dome-shaped, trough-shaped, cup-shaped, battlement-shaped, minaret-shaped, row-shaped manner, in the form of logos or letters, in a raised or recessed manner etc.

The topographies are supported further preferably by means of various bristle colors, bristle types and/or various bristle diameters within a puck bundle. I.e. different bristle lengths can have various characteristics, identical bristle lengths being able to have identical characteristics.

The topography of a puck bundle preferably forms the forms. In this case, these can be regular, recurring forms such as, for instance, honeycombs, grids, longitudinal profiles, transverse profiles or, however, longitudinal and transverse profiles.

The symmetry of the topography inside a puck bundle can be mirror-symmetrical to the longitudinal and/or transverse axis of the bristle carrier and or point-symmetrical (preferably to the intersection point between the two axes).

The position of the bristles of a puck bundle in relation to the brush head can be designed in a conical manner (bristles are at angles to the anchoring plane or also to one another) and are conically opening or conically closing (e.g. with a round base surface as truncated cone). As an alternative to this, the puck bundle can assume, for instance, an angled position. In this case, the bristles would assume substantially the same angle in relation to the brush head e.g. with a rectangular base surface as a parallelepiped (3D rhomboid). Any surface areas can obviously be used for this type of puck bundle (for possible forms of surface areas see further above).

In a preferred embodiment, puck bundles are provided with exposed bristle melt. The form of such recesses or spaces can be, for instance, circular, oval, square, triangular, rectangular, star-shaped, linear, grid-shaped, etc. The zones of exposed bristle melt can be planar or assume only thin lines. The zones of exposed bristle melt can realize a recurring structure (grid-shaped, checkered, etc.). The recurring structures can also occur in part regions of the exposed bristle melt. Further preferably, they follow the contour of the puck bundle. The exposed bristle melt is to be understood in this connection as molten bristle material (bristle melt) which on its own assumes part of the usage-side surface in the bristle field. In this sense, the exposed bristle melt is not covered on the usage side by a material of the carrier plate (AFT) or bristle carrier (HT, IMT) and is reachable as a result from the usage side.

The bundle density in the case of the puck bundles is preferably 5 bundles to 450 mm$^2$, preferably to 750 mm$^2$ (i.e. on average 90 mm$^2$ per bundle, preferably 150 mm$^2$ per bundle).

The anchoring of the puck bundles is preferably effected using an AFT, HT or IMT method (in mold tufting).

In the present case, the term pick (or pick bundle) is to be understood as a machine-side unit for forming bristle bundles (the statements obviously apply analogously to all described bundle forms). In the conventional anchor punch method, one pick realizes one bristle bundle.

In the case of the anchor punch method, a bundle is formed from conventional, extruded bristles in a blind hole of the basic body of the brush. A bundle in the brush head as a rule comprises the same number of bristles as a pick (bundle) of the punch machine. The conventional bristles are folded and fastened in the blind hole by means of anchors.

In the case of anchorless methods (HT, AFT, IMT), individual picks can be further split or joined together in the following process in order to achieve the desired bundle form or bundle size. The size of the pick can be varied with modern production plants, a large spectrum in the number of split bristles can be achieved, in this case, for example with a so-called variable arc. A pick can thus include, as a rule, between 20 and 150 bristles, preferably between 30 and 130, in dependence on the application/process technology, etc. The bristle type, the bristle color and the bristle diameter can be variable within a pick. The different types are mixed correspondingly, fed to the production machine or are mixed by means of special processes on the production machine during the splitting procedure.

The bristles can be processed, rounded or tapered prior to the splitting into picks. The splitting for puck bundles can be effected in one operation, i.e. the bristles for the puck bundle are split in one operation to form a unit (a pick) or, however, the puck bundle is put together from multiple (individual) picks.

The bristle melt, in particular using the HT method, preferably forms a contiguous, sturdy layer at least within the puck bundle (as it is not supported on a larger surface). The thickness of the bristle melt is in principle larger than that in the case of the AFT method, preferably larger by 0.5-1.5 mm, even more preferred by 1 mm.

In the case of the puck bundles, in a preferred manner the rear bristle ends are melted (as an option they can also be cut beforehand). In the case of excessive bristle melt on the outside edges, (it being displaced there), this is formed as an option to the desired contour, for example by means of punching, cutting etc. and/or an edge is generated for anchoring.

As an option, exposed melt can be generated within a puck bundle by means of a tool-side supporting pin. Melt preferably remains, in this case, contiguously over the supporting pin (in the case of an AFT or IMT method) or a hole is formed for anchoring (in the case of an HT method). The thickness of the exposed melt is preferably between 0.1 mm and 1 mm. Using the AFT method, mounting can occur, for instance, by means of a thin frame as carrier plate. As an alternative to this, however, the puck bundle can also be produced separately and fed to and mounted in the AFT or HT machine as a mounting part.

In a further preferred embodiment of the present invention, the mini bundles of the third group of cleaning elements comprise a number of bristles per bundle of no more than 20, preferably of no more than 18 and particularly preferred of no more than 16.

The term mini bundles is to be understood in the present case as the smallest bundles with very few conventional, extruded bristles which abut against one another. The mini bundles are preferably arranged in formations/groups (multiple surface areas). However, they can also be arranged individually (one surface area).

The number of bundles per formation, in this case, is preferably 2, 3, 4, 5, 6, 7, 8, 9, 10, 11 or 12. Further preferably, the number of bristles per bundle is less than 20, preferably less than 18, quite particularly preferred less than 16.

The number of mini bundle formations per bristle field is preferably 1, 2, 3, 4, 5, 6, 7, 8 or 9.

The great advantage of the mini bundles is in the very efficient interdental cleaning action, in addition carpet forming (in the bristle field) is prevented by the use of mini bundles.

The anchoring of the bristles is effected in the case of the mini bundles, as also in the case of conventional bundles, preferably by means of the AFT or HT method. In a preferred manner, formations with different bristles can be formed.

The surface area of the mini bundles is preferably circular, but it can also be oval, square, polygonal, crescent-shaped, rectangular or multi-cornered.

The identical bristles per bundle are preferably used for the mini bundles. The mini bundles consist in a further preferred manner of one single pick or of part of a pick (e.g. ½ pick, ⅓ pick or ¼ pick). As described above, it is also possible to split the smallest possible picks on the machine side further in order to arrive at the very low number of bristles per mini bundle. The splitting can be made after the pick in an additional method step.

Different bristles can be used in different mini bundles. The differences exist, for instance, in the diameter, the colors, the master batch, the bristle type (conventional extruded or co-extruded bristles), the form of the bristles (tapered or rounded), the materials used or else in the cross section.

Individual mini bundles can form formations (groups).

A formation of mini bundles is formed from mini bundles with a similar number of bristles and/or is arranged in a structured manner and/or has identical surface areas.

Different bristles or bristles can be used within a formation of mini bundles in the individual mini bundles (e.g. conventional bristles and tapered bristles can be used in a formation of mini bundles).

The individual mini bundles or the formations of mini bundles are set apart from the other cleaning elements of the other groups of cleaning elements as regards distance and/or geometric design.

The formations can be arranged in a structured manner, for instance following a line, they can form, for example, a wave. However, they can also follow a certain geometry and form, for instance, a circle, an ellipse, a triangle, a rectangle, a square or a polygon (in each case tightly filled or with gaps or spaces). The formations can also comprise symmetries (i.e. for instance point symmetry and/or mirror symmetry).

A formation of mini bundles can follow a line, at least in part along the outer contour of the brush head, which preferably includes at least around 20%, 30%, 40% or 50% of the corresponding contour length.

The symmetry of the arrangement of multiple formations produced from mini bundles within a bristle field preferably comprises a symmetry with reference to the longitudinal axis and/or the transverse axis and/or a point symmetry. Multiple identical formations of mini bundles can be arranged on the bristle field.

The topography within a formation of mini bundles can be designed for example in a flat, dome-shaped, trough-shaped, cup-shaped, battlement-shaped, minaret-shaped, row-shaped manner, in the form of logos or letters, in a raised or recessed manner, etc.

The topographies can be supported by means of different bristle colors, bristle types and different diameters within a formation of mini bundles.

Recurring forms such as, for instance, honeycombs, grids, longitudinal profiles, transverse profiles and longitudinal and transverse profiles can be provided as forms within a topography of a formation of mini bundles.

The symmetry of the topography within a formation of mini bundles can be designed as mirror symmetry with reference to the longitudinal and/or transverse axis and/or as point symmetry.

With regard to the bristle position, different positions of the mini bundles can be provided within a formation, such as, for instance, a V position, an X position, bundles with a perpendicular position combined with bundles which are angled in relation to the brush head or else bundles which are angled conically outward away from the center.

The anchoring of the mini bundles is effected in a preferred manner by means of AFT, IMT or HT methods.

The rounding and/or pointing of the mini bundles is effected in a preferred manner prior to the splitting into picks. Splitting devices or methods, which are particularly suitable for mini bundles, include, for example, a variable arc which is designed especially for this purpose and is not discussed at this point (determines the range of variability) and/or the additional splitting of the picks in the subsequent process sequence on the production machine.

In the case of the mini bundles, in particular in the case of the AFT method, the bristle melt should preferably combine, otherwise the mini bundles fall out (on account of the reduced size).

As an option, exposed melt can also be provided as an option within a mini bundle formation. This is proposed above all in the case of a mini bundle formation, the mini bundles being very close together.

In a further preferred embodiment of the present invention, the grid bundles of the fourth group of cleaning elements comprise a grid-shaped or honeycomb-shaped structure formed from bristles, the side walls comprising in the cross section of said structure a width of no more than 12 bristles, preferably of no more than 8 bristles and particularly preferred of no more than 5 bristles.

The term grid bundles is to be understood in the present case as a preferably contiguous grid structure, in particular a honeycomb structure produced from conventional, extruded bristles (or bristles). The grid bundles comprise relatively thin side walls, i.e. preferably with a (grid wall) width of less than 12 bristles, further preferably of less than 8 bristles and particularly preferred of less than 5 bristles.

A grid bundle preferably includes 1, 2, 3, 4, 5, 6, 7, 8, 9, 10, 11 or 12 grid bundle structural elements.

A structural element, in this case, is a smallest, recurring component of the grid. Multiple structural elements of different form and/or size can be used per grid bundle. I.e. triangles can be used with rectangles in the same grid bundle.

The stability of the grid bundles is achieved with the connection in or to the bristle carrier. The advantage of the grid bundles lies in particular in the very good interdental cleaning (on account of the thin side walls). In addition, the grid bundles also prevent carpet formation. Furthermore, the honeycomb structure serves, where applicable, as a reservoir for toothpaste.

The anchoring of the grid bundles is effected as in the case of conventional bundles by using AFT, IMT or HT methods. Individual grid bundle structural elements of a grid bundle (i.e. for instance individual polygons, ellipses, diamonds, circles, rings, honeycombs, triangles or squares) can have different bristles.

It is also possible to provide the grid bundles as individual elements (i.e. with a surface area) or as formations (i.e. with multiple surface areas).

The forms of the grid bundles correspond to the surface area of the individual or assembled structural elements (in other words, a grid bundle can consist of an individual structural element or else of multiple assembled structural elements), the assembled structural elements forming, for instance, polygon forms, chains, Olympia ring patterns, ellipse forms, diamond forms, honeycomb forms, triangle forms or square forms, etc. In this case, individual structural elements preferably comprise the identical form—with the identical or else different orientation.

Identical bristles are preferably used in each case per structural element. However, individual side walls of structural elements which form a polygon can comprise different filaments. In a preferred manner, the individual structural elements consist of multiple picks. In the case of polygons, the individual picks preferably each form a side wall.

Different bristles (or bristles) can be used in different structural elements of the same grid bundle. The differences, in this case, can include the diameter, the colors, the master batch, the bristle type (conventional or co-extruded bristles), the form (tapered or rounded bristles), the material used or the cross-sectional form, etc.

Different bristles can also be used in the grid bundles within the individual structural elements (e.g. rounded and tapered bristles in individual structural elements of the grid bundle).

One single grid bundle or multiple grid bundles can be arranged on a brush head (or on a bristle carrier). The grid bundles are set apart from other cleaning elements of the groups of cleaning elements with regard to distance and geometric arrangement.

The grid bundles can also be arranged for instance following a line (e.g. forming a wave). They can follow a geometry (e.g. form a circle) and they can comprise a symmetry.

The symmetry of the arrangement of multiple grid bundles within a bristle field preferably includes a mirror symmetry with reference to the longitudinal and/or the transverse axis and/or a point symmetry. Multiple identical grid bundles can also be arranged on the bristle carrier.

The topography within a grid bundle can be, for example, flat, dome-shaped, trough-shaped, cup-shaped, battlement-shaped, minaret-shaped, row-shaped, in the form of logos or letters, raised or recessed, etc.

The topographies can be supported by means of different bristle colors, bristle types and different diameters within a grid bundle. Identical bristle lengths preferably have identical characteristics.

Recurring forms such as, for instance, honeycombs, grids, longitudinal profiles, transverse profiles and longitudinal and transverse profiles can be provided as forms within the topography of a grid bundle. The topography patterns can be regularly repeated at least in part regions.

The symmetry of the topography within a grid bundles is preferably designed as mirror symmetry with reference to the longitudinal and/or transverse axis and/or as point symmetry.

Different positions of the bristles relative to the brush head surface (e.g. to the side walls) can be provided within a grid bundle. Bristles with a perpendicular position can be combined with bristles which are angled in relation to the brush head or else with bristles which are angled conically outward away from the center or inward toward the center.

Grid bundles can also include curved grids (i.e. structural elements with curved lines) along with "straight" grids (i.e. with structural elements with straight lines).

Further preferably, concentric elements or structural elements can produce a concentric grid. In this case, the various concentric elements can comprise various topographies and heights.

In a preferred manner, distances between the concentric elements are between 0.5 mm and 3 mm. The individual concentric elements, in this case, can comprise various forms. Concentric elements can be circles, ellipses, polygons, triangles, squares, rectangles or also irregular elements, etc.

The anchoring of the grid bundles is preferably effected by means of AFT, IMT or HT methods.

The bristles can be rounded or tapered prior to splitting.

The bristles are split in a preferred manner into multiple picks which are joined together again subsequently when the bristles are mounted and then realize the grid. In this case, the bristle type, the bristle color and the bristle diameter can be different per pick.

An empty space can be generated using the HT method for instance by an elevation in the basic body, it being possible to create a recess for anchoring the bristle bundle.

Exposed melt within a grid bundle can also be generated here using the AFT method with a tool-side supporting pin, the melt preferably remaining contiguous by way of the pin (i.e. using the AFT or IMT method).

In a further preferred embodiment of the present invention, the long bundles of the fifth group of cleaning elements comprise a contiguous structure produced from at least 6 picks, preferably from at least 10 picks and particularly preferred from at least 15 picks.

The term long bundles is to be understood in the present case as bundles which consist of extruded bristles and comprise a substantial extent on the brush head (with contiguous bristle melt or a contiguous melt carpet). The long bundles also comprise relatively thin side walls, with a width of less than 12 bristles, preferably of less than 8 bristles and particularly preferred of less than 5 bristles. A long bundle, however, has—in contrast to the grid bundles—no closed, recurring elements.

The long bundles also comprise significant advantages with interdental cleaning (in particular on account of the relatively thin side walls). In addition, they prevent carpet formation and serve as a reservoir for toothpaste. The toothpaste can be cleaned even better on account of the preferably present opening.

The anchoring of the long bundles is effected as in the case of conventional bundles using AFT, IMT or HT methods. Long bundles can have various bristles.

The surface areas of the long bundles are realized in particular in a long and narrow manner. In this case, the length is greater than the width by a multiple (factor 10, in a preferred manner factor 15-40). In this case, recurring structures, open structures and closed structures are also possible (recurring closed structures are associated with grid bundles). Possible designs, in this case, are fishbone-shaped, wave-shaped, (open) grid-shaped, spiral-shaped, line-shaped, oval or rectangular, etc.

The bristles used for the long bundles consist of multiple picks, various bristles being able to be used. The differences, in this case, consist here in the diameter, the colors, the master batch, the bristle type (conventionally extruded or co-extruded), the form (tapered or rounded), the materials or the cross section, etc.

Individual long bundles or multiple long bundles can be used per brush head. Preferably, 1, 2, 3, 4 or multiple long bundles are used on a brush head. The long bundles are set apart from other cleaning elements of the other groups of cleaning elements with reference to the distance and geometrically.

The symmetry of the arrangement of multiple long bundles within a bristle field is preferably designed in a mirror-symmetrical manner with reference to the longitudinal axis and/or the transverse axis and/or in a point symmetrical manner. Multiple identical long bundles can be arranged on the bristle field.

The orientation or alignment of the long bundles can also be in particular longitudinally or transversely or else about a point (e.g. in the form of a spiral).

The topography within a long bundle can be, for example, flat, rising toward one end, falling toward one end, dome-shaped, trough-shaped, cup-shaped, battlement-shaped, minaret-shaped, row-shaped, wave-shaped, sawtooth-shaped in the form of logos and/or letters, raised or recessed, etc.

The topographies can be supported by means of different bristle colors, bristle types and different diameters within a long bundle. Identical bristle lengths are once again preferably provided with identical characteristics.

Recurring forms such as, for instance, honeycombs, grids, longitudinal profiles, transverse profiles or longitudinal and transverse profiles can be provided as forms within the topography of a long bundle.

The symmetry of the topography within a long bundle is preferably designed in a mirror-symmetrical manner with reference to the longitudinal and/or transverse axis and/or in a point-symmetrical manner.

Different positions of the bristles in relation to the brush head surface (e.g. in the case of the side walls) are conceivable within a long bundle. Bristles with a perpendicular position can be combined with bristles which are angled in relation to the brush head center or else with bristles which are angled conically outward away from the center. Different angular positions are preferably also combined with different bristle lengths.

In principle, a brush with one single long bundle is also possible, i.e. a continuous form with a wound bristle bundle. The windings, in this case, can extend in the longitudinal direction of the brush head or else in the transverse direction of the brush head or at least can extend partially following the outer contour of the brush head. Also possible is a continuous helical or spiral design or else a continuous (open) grid-shaped or else a continuous fishbone-shaped design (with straight or angled bones or side arms).

Compartmentalization is additionally possible in the case of the long bundles (i.e. covering the bristle end—in top view—more surface than the bristle base). In the case of a corresponding angular arrangement of the bristles, the bristles are at least partially at an angle to the perpendicular. The angle in relation to the perpendicular, in this case, is preferably between 1° and 30°, further preferably between 10° and 20°.

The anchoring of the long bundles is effected using an AFT, IMT or HT method.

The free bristle ends are preferably rounded or tapered prior to the splitting. Further preferably, the splitting is effected into multiple picks, which are joined together again subsequently. In this case, the bristle type, the bristle color and the bristle diameter can be different per pick.

Exposed melt is also possible within a long bundle within the framework of the AFT and HT method.

In a further preferred embodiment of the present invention, the conventional bundles of the sixth group of cleaning elements include no more than 5 picks, preferably 3 picks and particularly preferred 1 pick.

The term conventional bundles is to be understood in the present case as bundles with between 20 and 40 holes per bristle field when the bristle field is formed purely from bundles of said sixth group. The conventional bundles consist regularly of a few picks. Some conventional anchorless bundles are known and are used in anchorless brushes.

The conventional bundles can comprise different surface areas, for example can be realized in a crescent-shaped, semi-circle ring-shaped, circle-shaped, oval, triangular, square, rectangular, pentagonal and polygonal, arrowhead-shaped manner or else in the form of a rounded stump, etc.

The conventional bundles can be formed from different bristles (tapered or rounded free bristle ends) which, where applicable, also comprise different colors.

Different positions in relation to the brush head are also conceivable in the case of conventional bristles, i.e. angle in relation to the perpendicular (cf. upward), where applicable in the form of 3D compartmentalization (i.e. with a trumpet-funnel-like geometry).

The convention bundles can be produced using AFT, IMT or HT methods.

The extruded (conventional) bristles, which can be used in the present case for groups two to six of the above-named groups of cleaning elements, are described below with reference to the design, the production, the possible forms and the arrangement.

The (conventional) extruded bristles (tapered or cylindrical) are formed from hard and/or soft material, in a preferred manner from polyamide (PA) or polyester (PBT).

Production can be effected as a result of extrusion of one material or as a result of extrusion of more than one material (co-extrusion).

In contrast to injected bristles or rubber-elastic massage and/or cleaning elements which are produced using injection molding, conventional bristles are extruded, cut, processed and inserted on the bristle carrier using a suitable method (see further below in this respect).

The longitudinal form of the bristles can be cylindrical, mechanically tapered, chemically tapered (above all with polyester (PBT)), undulated, rotated or helical.

Preferred cross-sectional forms are circular, round, triangular, rectangular, square, elliptical, polygonal, trapezoidal, rhomboid or rhombic.

A diameter of between 0.075 mm and 0.25 mm and a cross-sectional surface of between 0.002 mm$^2$ and 0.2 mm$^2$ is sufficient for oral hygiene products.

A diameter of between 0.025 mm and 0.2 mm and a cross-sectional surface of between 0.001 mm$^2$ and 0.15 mm$^2$ is sufficient for cosmetic products.

The surface of the bristles is smooth or textured. The bristles are regularly combined to form bundles.

It must be mentioned in this context that in the present case possible tongue cleaners are formed from hard material and/or from soft material and/or combinations of hard material and soft material and/or material for injected bristles. Production is effected using an injection molding method. The arrangement of tongue cleaners can be effected, for example, on the rear side of the brush head.

In a further preferred embodiment of the present invention, the head part, the handle part and/or the neck part is or are formed from at least one hard and/or one or multiple soft material components.

In a further preferred embodiment of the present invention, the hard material component(s) is or are formed from styrene polymerizates such as styrene acrylonitrile (SAN), polystyrene (PS), acrylonitrile butadiene styrene (ABS), styrene methyl methacrylate (SMMA) or styrene butadiene (SB); polyolefins such as polypropylene (PP) or polyethylene (PE) (preferably also in the form of high density polyethylene (HDPE) or low density polyethylene (LDPE)); polyesters such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethyl terephthalate (PCT-A) or glycol-modified polycyclohexylene dimethyl terephthalate (PCT-G); cellulose derivatives such as cellulose acetate (CA), cellulose acetate butyrate (CAB), cellulose propionate (CP), cellulose acetate phthalate (CAP) or cellulose butyrate (CB); polyamides (PA) such as PA 6.6, PA 6.10 or PA 6.12; polymethyl methacrylate (PMMA); polycarbonate (PC); polyoxymethylene (POM); polyvinylchloride (PVC); polyurethane (PUR) and/or from polyamide (PA).

In a further preferred embodiment of the present invention, the hard material component is formed from polypropylene (PP) with a modulus of elasticity of between 1000 and 2400 N/mm$^2$, preferably of between 1200 and 2000 N/mm$^2$ and particularly preferred of between 1300 and 1800 N/mm$^2$. Said materials are distinguished in practice by particularly suitable flexibility characteristics.

Hard material is preferably used for or in non-sturdy structure-carrying elements, i.e. for example in the handle part, in the neck part and in the head part.

If multiple hard materials are used (for example in two-component or multi-component injection molding) or if materials are connected by means of ultrasound welding, the hard materials used preferably together form a material closure.

As an alternative to this, it is possible to use multiple materials which do not form a material closure in two-component or multi-component injection molding. In the case of said pairings, a positive locking closure is provided (undercuts and/or openings and/or partial and/or entire overmolding, etc.).

The second injected hard material then shrinks onto the first injected material during cooling and forms a shrinkage connection. Examples of possible hard material pairings which do not form material closure are polypropylene and polyester or else polypropylene and styrene acrylonitrile.

In a further preferred embodiment of the present invention, the soft material component(s) is or are formed from a thermoplastic styrene elastomer (TPE-S) (preferably a styrene ethylene butylene styrene copolymer (SEBS) or styrene butadiene styrene copolymer (SBS)); a thermoplastic polyurethane elastomer (TPE-U); a thermoplastic polyamide elastomer (TPE-A); a thermoplastic polyolefin elastomer (TPE-O); thermoplastic polyester elastomer (TPE-E) and/or silicone.

Polyethylene (PE) and polyurethane (PU) can be used both as hard material and as soft material components.

Particularly preferred as soft materials in the present case are thermoplastic elastomers (TPEs) with a Shore hardness A of less than 90, preferably of less than 50 and even further preferably of less than 30.

In a preferred manner, a material closure is formed by soft materials with hard materials during overmolding in a two-component or multi-component injection molding process.

In a further preferred embodiment of the present invention, the material or materials for the injected bristles are formed from a thermoplastic polyamide elastomer (TPE-A), preferably Grillflex EG 5930 produced by EMS Chemie AG; a thermoplastic polyester elastomer (TPE-E), preferably Riteflex 672 AF Nat or Riteflex RKX 193 RF Nat by Ticona Polymers or Hytrel 7248 by DuPont; and particularly preferred from a thermoplastic polyurethane (TPU).

The TPE-U materials particularly preferred in the present case comprise better flow characteristics in relation to the alternatives as well as faster solidification (i.e. faster crystallization, the molecule chains already combining at high temperatures).

The materials for injected bristles are further preferably thermoplastic elastomers and have a Shore D hardness of between 0 and 100, preferably of between 30 and 80.

Special forms of soft materials, which as a rule have higher Shore hardnesses than soft materials from which soft-elastic cleaning/massage elements or handle grip zones or, for instance, tongue cleaners are produced, are used for injected bristles.

During the injection molding process (two-component or multi component injection molding), materials for injected bristles as a rule do not form a material closure with the other soft and/or hard materials used (e.g. with the carrier plate or the brush head). As a result, a positive locking closure is provided for any connections to other hard or soft materials (undercuts and/or openings and/or partial and/or entire overmolding, etc.). The material for injected bristles injected second then shrinks onto the first injected hard or soft material during cooling and thus forms a shrinkage connection.

So-called bioplastics (that is to say plastics materials which consist of renewable raw materials) or else water-soluble polymers can be used in general as special materials in the present case.

Bioplastics consist of raw materials and basic materials. Considered as raw materials are, for example: maize, hemp, sugar, castor oil, palm oil, potatoes, wheat, sugar cane, rubber, wood, castor plant/wonder tree. Examples of basic materials from raw materials are: cellulose, starch, lactic acid (PLA), glucose, chitin, chitosan.

The use of bioplastics is particularly advantageous in the present HT method in relation to other methods because there are no metal anchors used which, with the body, have to create minimum anchoring for the bristle bundles; along with the injection molding of the bristle carrier no special connection processes such as overmolding the bristles or ultrasound welding of the carrier plate are applied and in the HT method only the carrier body is plastically deformed in order to anchor the bristles. A bioplastic is used advantageously not only for the brush handle but also for the bristles so that the brush consists almost entirely of bioplastics.

In a preferred embodiment of the HT method according to the invention, to bring about the deformation of the geometry of the blind holes and/or recesses, the holding/pressing device, corresponding with the region of the blind holes and/or recesses in the bristle carrier, comprises one or multiple projections which penetrate into the head part when pressure is exerted and thus bring about a material displacement, by means of which the bristle bundles are fixedly surrounded or anchored. The bristle bundles can be clamped at the side in a particularly effective manner in this way.

In a further preferred embodiment of the method according to the invention, the one or the multiple projections of the holding/pressing tool can be realized, for example, in a triangular or bead-shaped form when seen in cross section. Said designs have proved to be particularly suitable to generate strong side clamping. They also contribute additionally to better anchoring geometry in the region of the molten bristle ends.

In a further preferred embodiment of the method according to the invention, to bring about the deformation of the geometry of the blind holes and/or recesses in step (a), one or multiple additional material reservoirs are injected in the region of the blind holes and/or recesses on the bristle carrier, which material reservoirs, when pressure is exerted by means of the holding/pressing device, are pressed into the head part (i.e. deform plastically) and thus bring about a material displacement, as a result of which the bristle bundles are fixedly surrounded. Well above-average (side) clamping as well as also better anchoring geometry in the region of the molten bristle ends in the bristle carrier can also be achieved in this way.

In reverse, it is also possible to provide recesses that are not occupied by bristle bundles in the bristle carrier. Said recesses can then receive excessive material during the material displacement and close entirely or only in part.

A further embodiment of the HT method relates to the mounting of additional non-bristle-carrying (cleaning) elements or applicators on the bristle carrier. These are inserted into the holding/pressing device in the production process in addition to the bristle bundles and are guided into the recesses of the bristle carrier with the bristle bundles melted on the rear ends in step d) and are then anchored analogously to the bristle bundles in a further part of the process. The melting of the bristle bundles is preferably effected before the additional non-bristle-carrying elements are inserted into the holding/pressing device.

Additional elements preferably consist of a lower part produced from hard material and an upper part produced from soft material or other materials that are sensible for the application (e.g. foamed material, textile element, etc.). The lower part produced from hard material serves above all for anchoring and forms an anchoring aid on the lower part, as the bristle bundles (e.g. as the bristle melt of the bristle bundle).

Depending on the stability, it is, however also conceivable for the upper part to be inserted directly into the recess of the bristle carrier and the lower part consequently not to be necessary.

The cleaning elements or bundle forms described in this document can be used on the brush head individually or in any possible combination of between several and all of the cleaning elements or bundle forms described in this document without departing from the framework of this invention. In particular, the cleaning elements or bundle forms described in this document can be used in a bristle field individually, in combinations of two, three, four, five, six or further cleaning elements or bundle forms. The combinations or categories mentioned and described in detail show examples with particularly good cleaning action.

The cleaning elements described up to now can also be combined with further cleaning elements not described in this document without departing from the framework of this invention.

The production methods described in this document for anchoring and/or producing cleaning elements or bundle forms on a brush head, can be used individually or in any possible combination of between several and all of the production methods described in this document for anchoring and/or producing cleaning elements on a brush head without departing from the framework of this invention. In particular, the production methods described in this document for anchoring and/or producing cleaning elements on a brush head can be used individually, in combinations of two, three, four, five, six or further.

Particularly preferred embodiments of the present invention with a particularly high level of cleaning and care additionally include, in particular, the following combinations of the above-described groups of cleaning elements which are defined in the present case as categories A to M.

In the case of said preferred categories A to M, it is obviously also possible for individual types/forms of cleaning elements to be left out or additional types/forms of cleaning elements to be supplemented without departing from the framework of the invention.

Category A

Bristle carriers of category A preferably include at least cleaning elements of the first group of cleaning elements (soft elements and/or injected bristles), of the second group of cleaning elements (puck bundles) and of the third group of cleaning elements (mini bundles). Further preferably, bristle carriers of category A can also include cleaning elements of the sixth group of cleaning elements (conventional bundles).

Further preferably, two puck bundles are provided in category A, one being arranged in the upper carrier region and one being arranged in the lower carrier region. As an alternative to this, only one puck bundle can also be arranged in the central carrier region. In the case of the two variants, the puck bundle or the puck bundles can comprise recesses into which, for instance, one or multiple mini bundles or one or multiple conventional bundles or else one or multiple soft elements and/or formations of injected bristles are inserted.

Further preferably, in category A one or multiple soft elements and/or formations of injected bristles can be arranged between the two puck bundles (i.e. substantially in the central region with, where applicable, a spatial extension into the left-hand and right-hand carrier region). However, it is also possible for the soft elements and/or formations of injected bristles only to be arranged in the right-hand and left-hand regions. In the case of the variant with a puck bundle, the soft elements and/or injected bristles are arranged in a preferred manner around the puck bundle.

The mini bundles in category A are arranged further preferably in formations in the central carrier region, with, where applicable, a spatial extension into the left-hand and right-hand carrier region. The mini bundles, however, can also follow, at any rate in part, the outer contour of the bristle carrier.

The conventional bundles in category A are arranged in a further preferred manner right at the front in the frontmost carrier region, where applicable additionally also right at the back in the rear carrier region. In addition, the conventional bundles are arranged in a preferred manner in the region around the puck bundle or in recesses of puck bundles.

Category B

Bristle carriers of category B preferably include at least cleaning elements of the first group of cleaning elements (soft elements and/or injected bristles), of the third group of cleaning elements (mini bundles) and of the fifth group of cleaning elements (long bundles). Further preferably, bristle carriers of category B can also include cleaning elements of the sixth group of cleaning elements (conventional bundles).

Further preferably, two long bundles are provided in category B, one being arranged in the upper carrier region and one being arranged in the lower carrier region. The two long bundles, however, can also be arranged in the left-hand and right-hand carrier regions.

As an alternative to this, only one long bundle can also be arranged in the central carrier region which also extends, where applicable, spatially into the upper and lower carrier regions. In the case of the two variants, the long bundle or the long bundles can comprise free regions into which, for instance, one or multiple mini bundles or else one or multiple soft elements and/or formations of injected bristles are inserted or at least project in part and/or they are at least partially surrounded.

In a further alternative to this, a long bundle can also follow the outer contour of the bristle carrier and enclose the remaining bundles at least in part. However, it is also conceivable for said long bundle to be surrounded at least in part by mini bundles.

Further preferably, in category B one or multiple soft elements and/or formations of injected bristles can be arranged between the two long bundles (i.e. substantially in the central region with, where applicable, a spatial extension into the left-hand and right-hand carrier region). However, it is also possible for the soft elements and/or injected bristles only to be arranged in the right-hand and left-hand carrier regions or only to be arranged in the upper and lower carrier regions.

In the case of the variants with a long bundle which encloses or surrounds the remaining bundles at least in part, the soft elements and/or injected bristles or the soft element are arranged in a preferred manner centrally within the long bundle. In the case of a centrally arranged long bundle, however, the soft elements and/or the injected bristles can be arranged in the left-hand and right-hand as well as in the upper and lower carrier regions.

The mini bundles in category B are further preferably arranged in formations in the central carrier region, with, where applicable, a spatial extension into the left-hand and right-hand as well as the upper and lower carrier regions. However, the mini bundles can also follow, at any rate in part, the outer contour of the bristle carrier.

The conventional bundles in category B are arranged in a further preferred manner right at the front in the frontmost carrier region, where applicable additionally also right at the back in the rear carrier region. In addition, the conventional bundles are arranged in a preferred manner in the region around the soft elements and/or injected bristles.

Category C

Bristle carriers of category C preferably include at least cleaning elements of the second group of cleaning elements (puck bundles), of the third group of cleaning elements (mini bundles) and of the sixth group of cleaning elements (conventional bundles).

Further preferably, in category C one or two puck bundles are provided which assume a substantial part of the surface of the bristle carrier, i.e. more than ⅓ of the bristle carrier surface, in a further preferred manner more than 40% of the bristle carrier surface and even more preferred more than 50% of the bristle carrier surface. It is also possible to provide multiple puck bundles which are arranged in a mirror-symmetrical manner to one another and assume the above-named part of the bristle carrier surface.

In the event of one puck bundle, it is preferably arranged centrally, but also extends, on account of the size thereof, clearly into the upper, lower, left-hand and right-hand carrier regions. As an alternative to this, the one large puck bundle can also extend around the bristle carrier and also comprise a central recess.

In the event of two puck bundles, these are arranged in a preferred manner in the upper and in the lower carrier regions and leave a smaller central carrier region free (which, as a rule, is smaller than one of the puck bundles).

Variants with two smaller puck bundles and one larger puck bundle are also conceivable, of the smaller puck bundles one being arranged in the upper carrier region and the other in the lower carrier region and the larger puck bundle being arranged in the central carrier region. The larger puck bundle can once again comprise a recess.

The mini bundles in category C are preferably arranged in the recesses of the large puck bundle. In the event of two or multiple puck bundles, the mini bundles can, however, also be arranged in the central carrier region, preferably in formations. In the case of one large centrally arranged puck bundle, the mini bundles can be arranged in a flanking manner in the left-hand and right-hand carrier regions (where applicable, also as a formation) or else they can follow the outer contour of the bristle carrier and, for instance, surround the large puck bundle.

The conventional bundles in category C are arranged in a preferred manner right at the front in the frontmost carrier region, where applicable additionally also right at the back in the rear carrier region. In addition, the conventional bundles are arranged in a preferred manner in the region around the puck bundles. However, they can also be arranged in the recesses of the large puck bundle (where applicable, together with mini bundles). In the event of two large puck bundles in the upper and lower carrier region, the conventional bundles are preferably arranged to the left or to the right of the central carrier region.

Category D

Bristle carriers of category D preferably include at least cleaning elements of the first group of cleaning elements (soft elements and/or injected bristles), of the second group of cleaning elements (mini bundles) and of the sixth group of cleaning elements (conventional bundles). It is also conceivable, in principle, for cleaning elements of the third group of cleaning elements (mini bundles) to be used in place of the conventional bundles.

Further preferably, in category D one or two puck bundles are provided which assume a substantial part of the surface of the bristle carrier, i.e. more than ⅓ of the bristle carrier surface, in a further preferred manner more than 40% of the bristle carrier surface and even more preferred more than 50% of the bristle carrier surface. It is also possible to provide multiple puck bundles which are arrange symmetrically to one another and assume the abovementioned substantial part of the bristle carrier surface.

In the event of one large puck bundle, it can extend around the bristle carrier and comprise a central recess.

In the event of two puck bundles, these are arranged in a preferred manner in the upper and in the lower carrier regions and leave a smaller central carrier region free (which, as a rule, is smaller than one of the puck bundles).

In the event of multiple smaller, symmetrically arranged puck bundles, these can be arranged in all the carrier regions, however, spaces are left in each case for conventional bundles or soft elements and/or formations of injected bristles.

The soft elements and/or formations of injected bristles in category D are preferably arranged in the recesses of the large puck bundles. In the event of two or multiple puck bundles, the soft elements and/or injected bristles can also be arranged, however, precisely in the central carrier region.

The conventional bundles in category D are arranged in a preferred manner right at the front in the frontmost carrier region, where applicable additionally also right at the back in the rear carrier region. However, they can also be arranged in the recesses of the large puck bundles (where applicable, together with soft elements and/or injected bristles).

In the event of multiple smaller, symmetrically arranged puck bundles, the conventional bundles and the soft elements and/or formations of injected bristles are preferably arranged in the spaces (as a rule centrally or following the outer contour).

Category E

Bristle carriers of category E preferably include at least cleaning elements of the first group of cleaning elements (soft elements and/or injected bristles), of the third group of cleaning elements (mini bundles) and of the sixth group of cleaning elements (conventional bundles). It is also conceivable, in principle, for cleaning elements of the fifth group of cleaning elements (long bundles) to be used additionally.

Further preferably, one central soft element and/or formations of injected bristles is/are arranged in category E. However, multiple soft elements and/or formations of injected bristles can also be arranged symmetrically to one another, for instance one in the upper, lower and central carrier regions. Two soft elements and/or formations of injected bristles which are symmetrical to one another can also be arranged on the left-hand and right-hand side of the carrier. Further preferably, one soft element and/or injected bristles is/are arranged in the central carrier region.

In the event of a centrally arranged soft element and/or injected bristles, these can be surrounded by mini bundles and/or surround the soft element and/or formations of injected bristles, the mini bundle or the mini bundles are arranged in spaces or recesses of the soft elements and/or injected bristles (i.e. individually or in formations).

The conventional bundles in category E are arranged in a preferred manner right at the front in the frontmost carrier region, where applicable additionally also right at the back in the rear carrier region. In a preferred manner, the soft element and/or injected bristles surround mini bundles which are arranged in the central carrier region.

Category F

Bristle carriers of category F preferably include at least cleaning elements of the first group of cleaning elements (soft elements and/or injected bristles), of the fourth group of cleaning elements (grid bundles) and of the sixth group of cleaning elements (conventional bundles). Further preferably, category F additionally includes cleaning elements of the third group of cleaning elements (mini bundles). It is also conceivable, in principle, for cleaning elements of the second group of cleaning elements (puck bundles) to be used in place of the conventional bundles.

In a preferred manner, the grid bundles according to category F are arranged in the form of assembled structural elements in the central carrier region. Assembled structural elements can also be arranged in the upper and in the lower carrier regions. In a further preferred embodiment, the assembled structural elements are separated in the individual carrier regions by conventional bundles and/or soft elements and/or formations of injected bristles. In addition, conventional bristles and/or mini bundles can be arranged within the surfaces surrounded by the individual structural elements. Furthermore, it is also possible for grid bundles in the form of assembled structural elements to be present in each case in the left-hand and right-hand carrier regions. In this case, the assembled structural elements can follow the outer contour of the bristle carrier. The soft elements and/or injected bristles can then assume the central carrier region. Individual structural elements, which, where applicable, are separated by soft elements and/or injected bristles, can also be arranged in each case in the side carrier regions.

Mini bundles are preferably arranged in formations in the region of the soft elements and/or injected bristles in the case of category F. However, it is also conceivable for the mini bundles to follow, at any rate in part, the outer contour of the bristle carrier.

The conventional bundles in category F are arranged in a preferred manner right at the front in the frontmost carrier region, where applicable additionally also right at the back in the rear carrier region. The conventional bundles can also be present here in the form of small puck bundles (i.e. if for instance the grid bundles assume relatively little space, e.g. less than 50% of the surface of the bristle carrier).

Category G

Bristle carriers of category G preferably include at least cleaning elements of the first group of cleaning elements (soft elements and/or injected bristles), of the fifth group of cleaning elements (long bundles) and of the sixth group of cleaning elements (conventional bundles). Further preferably, the category G additionally also includes cleaning elements of the third group of cleaning elements (mini bundles). In another further preferred embodiment, the category G can additionally also include cleaning elements of the second group of cleaning elements (puck bundles).

The soft elements and/or injected bristles are preferably arranged in the central carrier region in category G and further preferably are surrounded by one or multiple long bundles. Mini bundles (in a preferred manner in formations) and conventional bundles can additionally be arranged in the surrounded region. However, the mini bundles can also surround a long bundle and follow the outer contour of the bristle carrier in any event in part.

In one variant, however, a long bundle can also be arranged centrally and be surrounded by soft elements and/or injected bristles as well as, where applicable, by conventional bundles. Further preferably, a long bundle can also surround one or multiple conventional bundles in the lower carrier region. In yet another preferred embodiment, a puck bundle, which projects into spaces of the long bundle, can also be arranged in each case in the upper and in the lower carrier region.

In a preferred manner, in category G the conventional bundles are arranged right at the front in the frontmost carrier region, where applicable additionally also right at the back in the rear carrier region.

Category H

Bristle carriers of category H preferably include at least cleaning elements of the second group of cleaning elements (puck bundles), of the third group of cleaning elements (mini bundles), of the fourth group of cleaning elements (grid bundles) and of the sixth group of cleaning elements (conventional bundles). Further preferably, category G additionally includes cleaning elements of the first group of cleaning elements (soft elements and/or injected bristles).

According to category H, a puck bundle is preferably arranged in each case in the upper and in the lower carrier region and a grid bundle in the form of assembled structural elements in the central carrier region. More conventional bundles and/or mini bundles (individually or in formations) are preferably arranged in the spaces surrounded by the individual structural elements.

As an alternative to this, in category H an elongated puck bundle is provided which is arranged centrally and extends over the upper, the central and the lower carrier region. In a preferred manner, in each case one or two grid bundles in the form of assembled structural elements are arranged to the side of these and, where applicable, one or multiple convention bundles. Mini bundles are preferably also arranged (individually or in formation) in the spaces surrounded by the individual structural elements.

However, the mini bundles and the conventional bundles can also be arranged in spaces between the puck bundles and the grid bundles.

Category I

Bristle carriers of category I preferably include at least cleaning elements of the third group of cleaning elements (mini bundles), of the fifth group of cleaning elements (long bundles) and of the sixth group of cleaning (conventional bundles). Further preferably, the category I can additionally also include cleaning elements of the first group of cleaning elements (soft elements and/or injected bristles). 50/5

One or two long bundles are preferably provided in category I. Where there is one long bundle, it is arranged centrally in a preferred manner and comprises point or mirror symmetry. The one long bundle can also extend into the upper and lower carrier regions and/or into the left-hand or right-hand carrier regions. The long bundle can also be flanked at the side by mini bundles and/or by conventional bundles. The mini bundles and/or the conventional bundles can also be arranged in spaces in the long bundle, where applicable also in correspondingly adapted geometries or formations.

Where there are two long bundles, they are preferably arranged mirror-symmetrically to one another. Once again, mini bundles and/or conventional bundles can be arranged in the spaces (where applicable also soft elements and/or injected bristles), in a preferred manner in each case also in correspondingly adapted geometries or formations.

The long bundles can surround a central formation of mini bundles in each case and, where applicable, be surrounded in turn by mini bundles which follow, at any rate in part, the outer contour of the bristle carrier.

Further preferably, in category I the conventional bundles are arranged right at the front in the frontmost carrier region, where applicable additionally also right at the back in the rear carrier region.

Category J

Bristle carriers of category J preferably include at least cleaning elements of the third group of cleaning elements (mini bundles), of the fourth group of cleaning elements (grid bundles) and of the sixth group of cleaning elements (conventional bundles). Further preferably, the category J can additionally also include cleaning elements of the first group of cleaning elements (soft elements and/or injected bristles).

The grid bundles in category J are preferably formed from multiple assembled structural elements which, in the surrounding area thereof, comprise a plurality of mini bundles surrounding them. The mini bundles, in this case, can surround the grid bundles at least in part or else they can be arranged in formations in spaces of the grid bundles. In addition, it is also possible to provide one grid bundle which follows the outer contour of the bristle carrier and encloses multiple mini bundles or formations of mini bundles.

Conventional bundles and/or soft elements and/or formations of injected bristles can also be arranged in the spaces surrounded by the individual structural elements of the grid bundles.

Further preferably, the conventional bundles in category J are arranged right at the front in the frontmost carrier region, where applicable additionally also right at the back in the rear carrier region.

Category K

Bristle carriers of category K preferably include at least cleaning elements of the second group of cleaning elements (puck bundles), of the fifth group of cleaning elements (long bundles) and of the sixth group of cleaning elements (conventional bundles). Further preferably, the category K can additionally include mini bundles or soft elements and/or formations of injected bristles.

In category K, in each case preferably one puck bundle is arranged in the upper carrier region and one puck bundle in the lower carrier region. Further preferably, the two puck bundles can be surrounded by one long bundle and, as an option, comprise conventional bundles arranged between them.

If the two puck bundles are not surrounded by a long bundle, a long bundle, in a preferred manner, is arranged between them, i.e. preferably in the central carrier region. The long bundle, in this case, can also extend into the upper and lower carrier regions and/or into the right-hand and left-hand carrier regions.

Further preferably, it is also possible to provide four puck bundles which are situated in the upper, lower, right-hand and left-hand carrier regions, where applicable with a long bundle and/or conventional bundles running centrally between them.

Further preferably, it is additionally possible to provide four puck bundles which are situated in the right-hand and left-hand upper carrier regions and in the right-hand and left-hand lower carrier regions, where applicable with a long bundle and/or conventional bundles running centrally between them.

Category L

Bristle carriers of category L preferably include at least cleaning elements of the fourth group of cleaning elements (grid bundles) and of the sixth group of cleaning elements (conventional bundles). Further preferably, category L can additionally include cleaning elements of the first group of cleaning elements (soft elements and/or injected bristles) or of the third group of cleaning elements (mini bundles). It is also possible to provide cleaning elements of the fifth group of cleaning elements (long bundles) in place of or together with the grid bundles.

The particular characteristics of said category are centrally arranged form-in-form structures and connections between the various forms which are each formed by grid bundles and/or long bundles.

Further preferably, in category L the conventional bundles are arranged right at the front in the frontmost carrier region, where applicable additionally also right at the back in the rear carrier region. They can also flank the form-in-form structures and form connections at the side.

The mini bundles and the soft elements and/or formations of injected bristles preferably extend along the outer contour. The soft elements and/or formations of injected bristles can also be arranged within larger form-in-form structures.

Category M

Bristle carriers of category M preferably include at least cleaning elements of the second group of cleaning elements (puck bundles) which further preferably comprise or surround recesses or spaces.

The recesses or spaces within the puck bundles can be left empty. However, soft elements and/or formations of injected bristles are preferably arranged in the recesses or spaces. In addition, mini bundles can be arranged in the spaces.

It is possible to provide a very large puck bundle which comprises for instance two symmetrically arranged recesses. However, it is also possible to provide two puck bundles, preferably in the upper and lower carrier regions, one puck bundle comprising one recess and the other puck bundle two recesses.

Further preferably, mini bundles can additionally also be arranged between two puck bundles.

Toothbrush Basic Body

The preferred design of a toothbrush basic body according to the invention or of the individual parts thereof is described below.

The bristle carrier can be realized as an independent part and for instance combined with a toothbrush exchanging mechanism. The bristle carrier can be provided additionally with an interface, by way of which subsequent assembly takes place or/and, in a preferred manner, the bristle carrier is realized as part of the basic body of the handle of a brush or toothbrush (i.e. in one piece).

The bristle holes (which in the present case predominantly include substantially round blind holes and recesses with other cross sections) comprise dimensions of between 0.8 mm and 3 mm and preferably of between 1 mm and 2 mm for the bundle size of "normal" or conventional bundle length or width dimensions.

Specifically, for hot-tufting or HT methods, the bristle holes, when viewed in top view, comprise fundamentally closed contours, all possible geometric forms being able to be used.

When viewed in longitudinal section, the side walls of the bristle holes (or of the blind holes and of the recesses) are realized in parallel. In a preferred embodiment, the side walls are designed opening toward the open end, which results in a bristle bundle, the outer bristles of the bundle being inclined outward at a corresponding angle.

The geometry in the bottom region of the bristle holes (or of the blind holes and of the recesses) can be realized in an even manner or else the bottom region can be provided with a profile; in this case, the middle can be realized in a recessed or elevated manner, however, it is also possible to provide a progression of multiple concentric rings or forms which follow the outer contour. The transition from the bottom to the walls can be realized in an angled or rounded manner.

The depth of the bristle holes (or of the blind holes and of the recesses) reaches between 1 mm and 5 mm and preferably between 2 mm and 4 mm.

The surfaces in the bristle holes (or of the blind holes and of the recesses) can be realized in a smooth or rough manner.

The minimum distance between the bristle holes (or the blind holes and the recesses) and the edge of the bristle carrier is between 1 mm and 3 mm and preferably between 1 mm and 2 mm.

Webs and/or cross sections can preferably be provided between the bristle holes (or the blind holes and the recesses). The respective width of the webs is dependent on the injection molding process and on the processing tool.

The webs and/or cross sections can comprise material reservoir elements, in the form of melt structures or of overheight structures (i.e. for instance a larger head thickness in the raw state than in the end state) or also in the form of indentations for receiving excessive displaced material.

The bristle carrier regularly comprises a constant head height. In this case, the front side and the rear side are substantially parallel to one another.

However, a variable head height can also be provided, i.e. there are different heights in the brush head. In this case, for example, the height can reduce toward the head end, which provides a little more flexibility.

The dimensions of the bristle carrier are between 3 mm and 8 mm and preferably between 3 mm and 5 mm.

The following preferred bristle carrier variants are additionally conceivable.

Soft material can be provided first of all on the bristle carrier. This can be in the form of massage and/or cleaning elements on the front side. However, the rear side can also or additionally be covered with soft material (e.g. with transparent geometry). In addition, the soft material can be formed into a tongue cleaner.

In a preferred manner, damping elements or shock absorbers produced from soft material are provided on the side edge.

In general, support surfaces are integrated in the HT method or geometries are designed such that the soft material on the rear side is not moved. The reason for this is that the cleaning is effected by the bristle carrier with the bristles by means of heat and pressure. Islands produced from hard material, which are supported on the tool side and project through the soft material or however recesses in the soft material which reach up to the basic body produced from hard material, are preferably provided.

When soft material is provided on the surface of the bristle carrier, this can be effected in the form of rings or frames about the bristle holes which protrude from the surface (so-called "boots").

Otherwise, the surface (front side) can also be coated at least in part with soft material.

The layer thickness of the soft material ranges between 0.1 mm and 2 mm and preferably between 0.5 mm and 1 mm.

Structures can be inserted into the surfaces on the bristle carrier using the HT method. The aim of such structures is to cover the rear side, as a result of which a visual effect is generally achieved (a transparent material becomes translucent, for instance, as a result of the insertion of the structure).

This preferably occurs when the bristle bundle is mounted in the bristle carrier. The sequence, in this case, is as follows: the bristle carrier is heated and held in the cavity when mounting, a structure being inserted into the cavity, the bristle carrier is then pressed into the structure, whereupon the structure is molded or impressed on the bristle carrier. Prerequisite for said process is that the rear side of the bristle carrier is also heated and is consequently deformable.

Possible structures which are inserted into the bristle carrier include an eroding structure (i.e. a roughness) or else larger structures with effective height differences.

The holes or recesses in the bristle carrier have the following possible functions: they can serve for rinsing or else for toothpaste dosing (e.g. in combination with a surrounding bristle structure). The toothpaste can be introduced from the front or via a hole in the basic body into the bristle structure or the bristle bundle. The size of the structure, in this case, corresponds to the volume or the amount of toothpaste required for a cleaning operation.

In a preferred design, the bristle bundle surface area includes the same geometry as the recess (e.g. a honeycomb-shaped hole in a grid-shaped or honeycomb-shaped bristle bundle).

The bristle field initially includes, as first group of cleaning elements, the soft elements and/or injected bristles (cf. the description above) which serve as massage elements for instance for the gums or for tooth cleaning.

The bristle field additionally includes preferably puck bundles as the second group of cleaning elements, mini bundles as the third group of cleaning elements, grid bundles as the fourth group of cleaning elements, long bundles as the fifth group of cleaning elements and conventional bundles as the sixth group of cleaning elements (cf. the description above).

The previously mentioned non-bristle-carrying (cleaning) elements or applicators can additionally also be inserted into the bristle field.

It is true to say regarding bristle bundles, in particular according to groups two to six, that in the present case multiple bristles always abut directly against one another.

Further forms, which can be designed with the above-named groups of cleaning elements, include, for example, scissor cut forms, ornaments, tribal tattoos, crystal forms (such as for instance ice/snow crystals), turbine forms and crop circles etc.

The dimensions of the bristle heights preferably range from between 4 mm and 17 mm and further preferably from between 8 mm and 13 mm.

It is also possible to provide height steps, the step height ranging from between 0.5 mm and 5 mm (i.e. in the bundle itself).

The bundle width is a minimum of between 0.3 mm and 1 mm and preferably between 0.5 mm and 0.8 mm (in the AFT method preferably a bundle of 0.6 mm in width).

The minimum distance between the individual bristle bundles is 0.4 mm, which corresponds at the same time to the minimum width of the webs.

The side closures of the bristle bundle can be designed in an angular manner so that a compartment-like appearance is produced.

As a general rule, the structures can also be realized in part of the bristle field in order to prevent a "carpet" forming (i.e. the creation of a bristle field that is too flat or too tightly packed is to be prevented).

All in all, maximum width parts provided with bristles can be prepared as a result of a favorable ratio of head width such that a very large filling of the bristle carrier is achieved.

In further preferred embodiments, a soft material shell around the bristle bundle, for example in the form of a soft material film about the bundle or within the bundle, can be provided as an additional part on/in the bristle bundle. The attachment on/in the bristle bundle is effected prior to insertion into the bristle carrier and fixing together with the bristle bundle in the body (i.e. directly in the same blind hole or the same recess).

Further preferably, additional parts can also be provided in the bristle field. The mounting of such additional parts provides, in principle, a further process step which is carried out prior to the affixing of the bristles or else after the affixing of the bristles.

A snap-on mounting is considered as a fixing variant. This can be effected with movement (in the longitudinal or transverse direction). However, it is also possible to provide an all-round guide (e.g. by mounting a soft-elastic cleaning and/or massage element after fixing the bristles or by snapping into a hole).

However, it is also possible to provide a fixing analogous to the bristle fixing (i.e. the mounting end is pressed in the body).

The additional part is preferably realized as a two-part element with a base part and with a function part. The base part, in this case, is fixed in the bristle carrier and is preferably formed from a hard material. The function part is mounted on the base part and is preferably realized in the form of injected bristle foam material parts, injected bristles or injected fins. i.e. injected soft elements. The function part is preferably a two-component injection molding part. The additional part can be mounted at the front and/or at the rear of the bristle carrier.

Different forms of the finished brush head are produced in this way as regards the bristle carrier, the bristle bundles and as regards the additional parts.

The handle part can be formed using a one-component or multi-component injection molding method. In this case, the components can only be guided in the handle or also in the head.

The production method is to be described below in general and by way of diverse preferred design variants.

The injection molding is carried out in an injection mold (or a corresponding machine) preferably in the form of multi-component injection molding. In this case, the materials can combine, as a result of a material closure or substance-to-substance bond. However, it is also possible for the materials not to combine, i.e. a shrink connection with mobility or a joint is generated for instance by means of a positive locking closure.

In general, both hot runner, cold runner or co-injection methods can be applied.

The preferred bristling methods are anchorless methods.

It must be noted in this respect in general that the bristles are not folded and that no anchor punching wire is used. The bristles are therefore only half as long when compared to the bristles from the anchor punching method.

The sequence of a first preferred method variant is as follows: First of all, the bristle bundles are separated into singles, the bristle ends are then melted and after this the bristle ends are directly overmolded. The bristle bundles can be joined together here in general, i.e. combined to form a larger bundle.

When the overmolding also includes the injection molding of the handle, this is referred to as a so-called in mold tufting method (IMT method). If the bristles are first of all overmolded with plates and then the plates overmolded with the handle, this is referred to as integrated anchorless production The sequence of a second preferred method variant is as follows: first of all, the bristle plates are injection molded with through-holes, then the bristles are prepared and guided through the bristle plate, the bristles are then melted on the rear side and melted with the bristle plate, finally the bristled bristle plate is welded with the separately produced handle by means of ultrasound.

If bristle bundles can be combined in the process, the so-called anchor free tufting method (AFT method) can be used.

The sequence of a third preferred method variant is as follows: first of all, the basic body is injection molded with through-holes for bristles in the head region, then the bristles are prepared and guided through the through-holes in the head region, the bristles are then melted on the rear side and the bristle melt is then overmolded with soft material (AMR method, i.e. anchorless with round holes).

The sequence of the fourth method variant, preferred the most in the present case, is as follows: first of all a basic body with blind holes or recesses in the head region is injected, then the bristles are prepared in bundles, after this the bristles are melted in bundles, the basic body in the head region (i.e. the bristle carrier) is then heated for instance to glass temperature and finally the molten bristle ends are introduced into the blind holes or recesses and the bristle bundle is anchored under pressure in the bristle carrier (i.e.

the size of the blind holes is reduced or the geometry is deformed and the bristle bundle is thus anchored). This is referred to as the hot tufting method (HT method), as already described above.

Individual aspects of the HT method are to be specified again in more detail below.

The preparation of the bristle bundle preferably includes that when the bristle bundles are singed, they are given a form. The form, in this case, is given prior to insertion into the bristle carrier by pressure being exerted onto the bristle melt. Angled bristle bundles or compartment-like bristle bundles can be generated in this way.

It must be noted in general that once again multiple picks can form a bristle bundle.

The heating of the bristle carrier can be effected in a targeted or controlled manner. For example, it is not necessary to heat the entire head or bristle carrier. In addition, the holding/pressing device can be provided, for instance, with different forms and temperatures in various regions. For instance, a cooling blade, which is placed onto certain points of the bristle carrier or can be driven into the bristle carrier (i.e. for partial cooling), can be used in this context.

In an optional intermediate step of said method variant, an intermediate layer can be inserted between the bristle bundles and the bristle carrier.

To this end, on the one hand a film can be inserted, i.e. the bristle bundles are guided through the film and the film is thus pulled into the bristle hole (i.e. the film is "punched" through the surface by means of the bristle bundle).

On the other hand, a layer can also be applied. In this connection, the bristle bundles are first of all dipped into a fluid and only then inserted into the bristle carrier (a viscous fluid such as, for instance, wax is regularly used for this purpose). As an alternative to this, the brush head can also be sprayed with a fluid.

The function of the intermediate layer can consist in the release of means or substances (chemical release). Furthermore, the adhesion between bristle bundle and basic body (for instance as a result of additives) can be improved. In addition, the space between bristle bundle and bristle carrier can be completely filled out by means of the intermediate layer, for example in order to achieve improved anchoring. Finally, a visual effect in a transparent bristle carrier can also be provided by means of the intermediate layer (e.g. a change in color as a result of the addition of highly sensitive additives with corresponding pressure control).

Preferred variants for combining/fixing/pressing the bristle bundles are described below.

When the bristle bundle combines, it is preferably given a form. The bristle bundle is inserted into the bristle carrier or the form of the bristle bundle is produced (the pressure on the bristles generates pressure on the melt with the aim of deforming).

In addition, the receiving means for the brush head can be movable. As a result of being closed at the side, for instance the bristle bundle is able to be pressed more at the side. It is also possible to provide a variable pressing zone on the underside of the brush head.

It is also possible, for instance, for punching to be effected during the pressing step such that multiple end products can be produced for one injection molded part. This can be of interest for single tuft oral hygiene products or also for cosmetic applicators such as, for example, nail lacquer brushes. They can be processed together in this way up to the bristling process and separated into individual products with the bristling process.

In addition, it is also possible for an embossing process to be effected during the pressing step, i.e. for instance a logo can be introduced into the bristle carrier or the head part by means of pressure.

It is also possible to introduce further structures. For example, a surface roughness can be created, for instance in the form of roughness on the bristle carrier or head part. As a result, on the one hand a visual effect can be achieved in such a manner that the rear side of the bristle bundle is less visible. On the other hand, it is also possible to achieve a functional effect, for instance, in the form of a tongue cleaner.

In addition, deviating forms of the bristle carrier can be created such as, for instance (particularly) flat production; it is also possible to press down a topography.

When closing the blind holes or recesses, on the one hand it is possible to create inclined bristle bundles. In a first variant, an angled recess is generated by creating a demoldable blind hole or a recess. The bristle carrier obtains a protruding material reservoir as a result. The bristle bundles move into the blind hole or the recess and the blind hole or the recess is then closed by the molten material reservoir.

In a second variant, asymmetric deformation is created, as a result of which the bristle carrier obtains asymmetric material reservoirs. During pressing, the material reservoirs are pushed such that the blind hole or the recess becomes asymmetric; the end effect is that the bristle bundles stand at an angle and are forcibly demolded (removal from the tool).

When the blind holes or recesses are closed, on the other hand bristle bundles can be created in the form of compartments. To this end, the bristle bundles must be prepared preferably in a round manner, i.e. for instance in a round blind hole. The closing elements or material reservoirs here, as a rule, are not realized concentrically to the blind hole, but in an elongated manner (i.e. the closing elements or material reservoirs extend to the left and the right of the blind hole).

The compressing of the closing elements or material reservoirs leads to the forming of a compartment, either a regular compartment or else a compartment with a stronger or somewhat wider center (cf. above).

The forming of barbs or of anchorages for the bristle bundles is effected as a result of material displacement (i.e. in heated material). In this case, in a first variant an originally injected material reservoir or a subsequently formed material accumulation is pushed.

In a second variant, material can be displaced from a level bristle carrier. To this end, the holding/pressing tool can comprise corresponding projections on the end face thereof (e.g. jagged projections or else beading-like projections). However, pushing correspondingly heated material by means of a flat end face of the holding/pressing tool in order to achieve a sufficiently good hold or anchorage of the bristle bundles can already suffice.

In a further preferred variant, the entire bristle carrier (where applicable also the entire basic body) including the bristle bundles is deformed once it has been fastened.

The present invention can be used in general in the case of brush products for personal hygiene, for medical brush products and for household brush products.

With reference to oral hygiene, manual toothbrushes in the form of reusable toothbrushes (including toothbrushes with changeable heads) or disposable toothbrushes are included. Single tuft toothbrushes (for interdental cleaning) are included as a special form.

In addition, electric toothbrushes with diverse movement forms of the brush head or of the plug-in brush such as for instance oscillating, pivoting or translatory or vibrating (or combinations and superimpositions of the afore-named movement forms) are additionally included.

Interdental cleaners, whether combined with injected elements or without, are also included and tongue cleaners (i.e. stand-alone tongue cleaners or tongue cleaners arranged on a toothbrush).

Mascara brushes, nail lacquer applicators or nail lacquer brushes (suited very well to HT methods as easier than AFT) are included in the cosmetic field. Production includes injecting the handle with the recesses at the front of the handle, needing to be supported at the side for bristling. Further cosmetic products include face brushes, applicators, massage devices, make-up brushes, shaving brushes, highlight brushes, hairbrushes or nailbrushes.

Also included are applicators for medical technology as well as washing-up brushes, household floor mops and brooms.

In the case of electric toothbrushes, the following drives are also conceivable: a transmission with 1:1 gear reduction or 1:1 gearing, an armature (the oscillating movement of the armature is transmitted directly to the plug-in brush, the rotational axis of the brush head is substantially parallel to the longitudinal axis of the electric toothbrush) or an electric motor (the continuous 360° rotary movement of the electric motor is converted into an oscillating rotary movement of the brush head by means of gearing, the rotational axis of the brush head is substantially perpendicular to the longitudinal axis of the electric toothbrush. Disposable batteries or accumulators (NiMh, Li-Ion) are preferably used as energy storage. Charging is preferably effected inductively or else directly with plug connection.

With regard to the nomenclature, it must be noted generally at this point that in the present case the side of the brush on which the thumb is placed is designated as the top side or front side of the toothbrush. The top or front side is normally also the side on which the bristle field is fixed.

The side of the toothbrush opposite the bristle field is designated as the underside or rear side of the toothbrush.

The side which lies to the left when looking perpendicularly onto the front side of the toothbrush is designated as the left-hand side of the toothbrush. The right-hand side lies to the right in this case.

The side which is placed into the recess of the basic body and points in the direction of the underside of the toothbrush is designated as the underside of the head or carrier plate. Correspondingly, the top side of the head plate points in the direction of the top side of the toothbrush.

Further preferably, a brush product, in particular a toothbrush is included in the present case, comprising a basic body having a head part with a front side and rear side which includes a bristle carrier with a bristle field protruding from the front side; a handle part; and a neck part which connects the head part to the handle part; wherein the bristle carrier is provided with bristles in an anchorless manner and wherein the head part is formed at least in part from a flexible material component.

Said brush product is formed in a preferred manner using the AMR method (AMR: anchorless with round holes). Examples of possible further production methods are IMT (in mold tufting), AFT or IAP (integrated anchorless production).

The conventional, cylindrical or tapered bristles or the bristle bundles are fastened to the head part or to a carrier plate without the aid of an anchor using the AFT method (anchor free tufting). The rounded bristles, in this case, are profiled in bundles and are guided through passages in the bristle carrier by way of the end thereof lying opposite the free usage end such that an end region of the bristle bundle projects beyond the underside of the bristle carrier. They are fastened as a result of melting, bonding or welding to said end region of the bristles projecting beyond the underside of the bristle carrier.

The bristle carrier is then anchored in the recess of the head region of the toothbrush with the conventional bristles fastened therein, for example as a result of ultrasound welding. The recess in the head region, in this case, is specially adapted to the geometry of the bristle carrier. Along with the conventional bristles, the bristle carrier or also the head region of the tooth brush can include soft elastic massage and cleaning elements.

In the IMT method, the conventional care bristles are overmolded by means of plastics material in an injection molding machine for anchoring purposes (in mold tufting IMT).

A further type of bristling machine for producing anchorless toothbrushes is disclosed in DE 10 2006 026 712. It combines the methods already mentioned above. A bristle carrier plate provided with bristle clumps (analogous to a bristled bristle carrier plate from the AFT process) is placed into a cavity of an injection mold, into which plastics material is then injected for anchoring and for forming the remaining part of the bristle head.

The following brush products are produced in the present case in particular: manual toothbrushes (disposable toothbrushes or reusable toothbrushes or toothbrushes with changeable heads), interdental cleaners (interdental brushes, flossers), electric toothbrushes (in all movement forms such as for instance rotating, oscillating, sideways pivoting, translatory, vibrating, combinations and superimpositions of the afore-named movements), tongue cleaners (stand-alone tongue cleaners or tongue cleaners arranged on toothbrushes), body care or cosmetic brushes such as, for example, hairbrushes, facial brushes, mascara brushes, nail lacquer brushes, massage devices, make-up applicators (such as make-up brushes), shaving brushes, highlight brushes, applicators for medical technology and household brushes such as, for example, washing-up brushes, floor mops or brooms.

In a preferred embodiment of the invention, the head part, the handle part and/or the neck part is or are formed from at least one hard and/or one or multiple soft material components. This depends in each case on the specifically desired design of the respective brush product.

In a further preferred embodiment of the present invention, the hard material component(s) is or are formed from styrene polymerizates such as styrene acrylonitrile (SAN), polystyrene (PS), acrylonitrile butadiene styrene (ABS), styrene methyl methacrylate (SMMA) or styrene butadiene (SB); polyolefins such as polypropylene (PP) or polyethylene (PE) (preferably also in the form of high density polyethylene (HDPE) or low density polyethylene (LDPE)); polyesters such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethyl terephthalate (PCT-A) or glycol-modified polycyclohexylene dimethyl terephthalate (PCT-G); cellulose derivatives such as cellulose acetate (CA), cellulose acetate butyrate (CAB), cellulose propionate (CP), cellulose acetate phthalate (CAP) or cellulose butyrate (CB); polyamides (PA) such as PA 6.6, PA 6.10 or PA 6.12; polymethyl methacrylate (PMMA); polycarbonate (PC); polyoxymethylene (POM); polyvinylchloride (PVC); and/or from polyurethane (PUR) (i.e. thermoplastics). Said materials have been proven as particularly suitable in production; however, other hard material components are also conceivable.

In a further preferred embodiment of the present invention, the soft material component(s) is or are formed from a thermoplastic polyurethane elastomer (TPE-U); from a thermoplastic styrene elastomer (TPE-S) (such as preferably a styrene ethylene butylene styrene copolymer (SEBS) or styrene butadiene styrene copolymer (SBS)); a thermoplastic polyamide elastomer (TPE-A); a thermoplastic polyolefin elastomer (TPE-O) and/or thermoplastic polyester elastomer (TPE-E) (i.e. thermoplastic elastomers). Said materials have been proven as particularly suitable in production; however, other soft material components are also conceivable.

In a further preferred embodiment of the present invention, the soft material component(s) comprises or comprise a Shore hardness A of less than 90. In particular, with regard to the use as cleaning/massage elements or as tongue cleaners, gentle treatment of the gum or of the tongue tissue can be ensured in this way.

In a further preferred embodiment of the present invention, the hard material component is formed from polypropylene (PP) with a modulus of elasticity of between 1000 and 2400 N/mm$^2$, preferably of between 1200 and 2000 N/mm$^2$ and particularly preferred of between 1300 and 1800 N/mm$^2$. The flexibility that is suitable in particular for the handling of the brush product and for tooth cleaning can be provided as a result. Further preferred, a thermoplastic styrene elastomer (TPE-S) such as preferably a styrene ethylene butylene styrene copolymer (SEBS) or styrene butadiene styrene copolymer (SBS) is hereby used.

Further preferably, the thermoplastics polyethylene (PE) and polyurethane (PUR) can be used within the framework of the present invention both as a hard material component and as a soft material component.

In a further preferred embodiment of the present invention, the soft material component(s) form a material closure with the hard material component(s), preferably by means of overmolding using the two-component or multi-component injection molding method. A particularly sturdy connection between the individual components can be ensured in this way.

In a further preferred embodiment of the present invention, the bristle field includes conventional, extruded bristles and/or rubber elastic massage/cleaning elements and/or injected bristles. As great a design freedom as possible can be achieved thereby. The conventional, extruded bristles are preferably combined in the form of (circle)-round bristle bundles or bristle bundles that are designed in any other geometric manner (where applicable in triangular, rectangular, square, rhomboid, trapezoidal, crescent-shaped, elliptical, polygonal, elongated, angled or curved geometries).

In a further preferred embodiment of the present invention, the material from which the injected bristles (i.e. bristles produced by means of injection molding) are formed has a Shore D hardness of between 0 and 100, preferably of between 20 and 90, more preferred of between 30 and 80 and further preferably between 40 and 70. A particularly effective cleaning action can be achieved in said ranges. Further preferably, in this connection, the injected bristles are formed from a polyamide elastomer, preferably Grillflex EG 5930 produced by EMS Chemie AG; a polyester elastomer, preferably Riteflex 672 AF Nat or Riteflex RKX 193 RF Nat by Ticona Polymers or Hytrel 7248 by DuPont; and particularly preferred from a thermoplastic polyurethane (TPU), preferably Ellastolan by BASF or Desmopan by Bayer. These materials comprise, among other things, a high degree of wear and abrasion resistance.

In a further preferred embodiment of the present invention, the conventional, extruded bristles are formed from polyamide (PA) or polyester (PBT). A good cleaning action (i.e. in the case of toothbrushes) and good durability are also ensured hereby. Conventional, extruded bristles have a substantially cylindrical form as a rule. The usage-side end is processed before, during or after the bristle anchoring process in order to remove sharp edges where necessary and to obtain as hemispherical-like a bristle end as possible.

However, the conventional, extruded bristles can also comprise a tapered form (cone-shaped) in order to develop a high level of interdental cleaning with the tapered ends.

Injected and conventional bristles comprise cross-sectional areas with similar dimensions (e.g. 0.02-0.5 mm$^2$).

The rubber-elastic massage/cleaning elements are preferably formed, for the rest, from one of the aforementioned soft material combinations. As a rule, they comprise significantly larger cross sections (cross-sectional area >0.5 mm$^2$) than the injected bristles and are produced from materials with a significantly lower Shore hardness.

Further preferably, within the framework of the present invention, bioplastics are usable as hard components, soft components or for producing bristles, i.e. plastics materials which are produced from renewable raw materials (e.g. cellulose acetate (CA), polylactic acid (PLA), polyhydroxy butyric acid (PHB) or thermoplastic starch).

In a further preferred embodiment of the present invention, the conventional, extruded bristles or bristle bundles are melted at the end thereof remote from the usage side, on the rear side of the bristle carrier and the bristle melt carpet created as a result is overmolded with a covering (preferably at least partially from one of the aforementioned material components). The injection point is preferably situated on the rear side of the brush head or in the neck region.

A soft material component is preferably used for this purpose and at the same time and in the same operation also forms cleaning/massage elements and/or tongue cleaners.

As an alternative to this, the material from which the injected bristles are produced, is used for this purpose and at the same time and in the same operation also forms the injected bristles.

As an alternative to this, a hard material is used for this purpose which at the same time and in the same operation forms a zone in the neck region and or in the handle region.

In this way, particularly efficient manufacturing can be obtained (i.e. for instance without welding for instance an AFT plate and without the accompanying loss of space, for example, for the bristling).

The material of the injected bristles does not as a rule form a material closure with the hard or soft material or with the melt carpet of the conventional extruded bristles. In order nevertheless to generate a perfect connection, a positive locking closure is generated as a rule, e.g. by means of undercuts, through-holes or overmolding.

The hard material and soft material do not as a rule form a material closure with the material of the injected bristles or with the melt carpet of the conventional, extruded bristles. In order nevertheless to generate a perfect connection, a positive locking closure is generated as rule by means of undercuts, through-holes or overmolding.

In a further preferred embodiment of the present invention, the head part of the brush product, when seen in cross section, comprises a layer-like design where the bristle carrier (without the boundary edge or seen next to the boundary edge) comprises a proportion of the overall thickness (D) of between 25% and 35%, the melt carpet a proportion of between 15% and 25% and the covering a proportion of between 40% and 60%.

In a further preferred embodiment of the present invention, the overall thickness (D) of the (finished) head part is between 2 and 6 mm and preferabaly between 2.5 and 4 mm. Overall thicknesses of less than 2.5 mm are also possible.

In the case of a very thin design (i.e. within the range of between 2.5 and 4 mm or less), the bristle carrier comprises a proportion of the overall thickness (D) of between 15% and 25%, the melt carpet a proportion of between 15% and 25% and the covering a proportion of between 50% and 70%.

At very flexible points (i.e. points with a material weakening or a film hinge or similar) the bristle carrier comprises a proportion of the overall thickness (D) of between 25% and 45%, the melt carpet a proportion of between 0% and 35% and the covering a proportion of between 30% and 55%. The melt carpet can be exposed at these points or have a weakening provided.

In a further preferred embodiment of the present invention, cleaning/massage elements such as, for example, lamella-like structures produced from a soft material component are arranged on the front side of the head part and, further preferably, a tongue cleaner (also) produced from a soft material component on the rear side of the head part. As a result, the versatility and application efficiency of the brush is increased.

In a further preferred embodiment of the present invention, the bristle field extends into the neck part of the brush product. This brings about additional positive cleaning effects. The bristle field can include diversely formed (conventional, extruded) bristle bundles. In addition, it can include injected bristles and/or soft-elastic cleaning/massage elements.

In a further preferred embodiment of the present invention, the bristle carrier is realized as a separately produced head plate. The head plate is then preferably inserted into a corresponding recess in the head part. The recess can be a continuous opening or else a groove-like recess (i.e. having a bottom which, where applicable, in turn comprises openings). The mounting of the head plate about the head part is effected in a preferred manner by means of overmolding with soft material. Mounting or fixing by means of (ultrasound) welding, bonding, or however by means of mechanical mounting (for instance by means of latching or snapping onto the head part) is basically also conceivable.

In a further preferred embodiment of the present invention, the bristle carrier (or the head plate) comprises bristle holes (in particular for the round bristle bundles) and/or openings (in particular for the, where applicable, triangular, rectangular, square, rhomboid, trapezoidal, crescent-shaped, elliptical, polygonal, elongated, angular bristle bundles) for passing the (conventional) bristles through. The injected bristles can (also) be injected for instance through the bristle holes or opening of the bristle carrier (or the head plate). As an alternative to this, a layer produced from material of the injected bristles is formed on the front side of the bristle carrier which preferably consists of hard material.

The bristle holes or openings in the bristle carrier according to the invention comprise, in the case of angular geometries, rounded corner regions with a radius of between 0.2 mm and 2 mm and preferably of between 0.2 mm and 0.8 mm. Further preferably, the bristle holes or openings comprise lead-in chamfers for the (conventional) bristle bundles, in each case at least on the side from which the bristles or bristle bundles are inserted into the bristle carrier. Corresponding chamfers can also be provided on the bristle carrier for the injected bristles, which chamfers can function as a type of nozzle (where applicable, they can be more pronounced than the lead-in chamfers for the insertion of the conventional bristles).

With regard to the nomenclature, it must be noted generally at this point that the top or front side is regularly also the side from which the bristle field protrudes (i.e. with the free usage ends thereof).

In a particularly preferred manner, the bristle carrier (or the head plate) comprises on the rear side thereof a circumferential boundary edge for the bristle melt or the covering material. The boundary edge also serves in a preferred manner for producing a material-to-material connection to the covering component. This is in particular when the bristle carrier consists of hard material and the covering component of soft material.

The side remote from the bristle field (with the free usage ends thereof) is once again designated as the underside or rear side of the brush product or toothbrush.

The side which lies to the left when looking perpendicularly onto the top or front side and the handle part is oriented in the direction of the observer is designated as the left-hand side of the brush product or toothbrush. The right-hand side of the brush product or toothbrush lies to the right in this case.

The side which is placed into the corresponding recess of the head part and points in the direction of the underside or rear side of the toothbrush is designated as the underside or rear side of the head plate (i.e. in the event of a separately produced bristle carrier). Correspondingly, the top or front side of the head plate points in the direction of the top side or front side of the brush product or the toothbrush.

A further design of the present invention additionally includes:

a method for producing a brush product, in particular a toothbrush, comprising a basic body having a head part, with a front side and a rear side which includes a bristle carrier with a bristle field which protrudes from the front side, as well as having a handle part and a neck part which connects the head part to the handle part, said method including the following steps:

(a) injection mold the basic body together with the bristle carrier from one or multiple hard and/or soft material components;

(b) insert the basic body with the bristle carrier as a part into a first half of a tool for bristling;

(c) guide bristles or bristle bundles through bristle holes or openings in the bristle carrier into corresponding bristle recesses of the first tool half;

(d) melt the fastening ends of the bristles or bristle bundles (opposite ends to the usage side) onto the bristle carrier, which fastening ends project beyond the bristle carrier;

(e) set up an injection molding cavity by mounting a second tool half onto the first tool half;

(f) injection mold a further material component, preferably a soft material component or material components to produce injected bristles for covering the bristle melt.

As an option, further cleaning/massage elements and/or massage structures and/or tongue cleaners and/or injected bristles and/or zones in the neck or handle and/or further handle components can already be produced in step (f) in the same operation using the material component used.

According to the further step (g), the second tool half is preferably changed or the product is moved into another tool and a further material component is injection molded, preferably a further material component, preferably a soft material component or a material component for producing injected bristles for molding a finished covering. Step (g) can be repeated as often as desired (i.e. for instance for generating further cleaning/massage elements and/or massage structures and/or tongue cleaners and/or further zones in the handle and/or further handle components and/or injected bristles; with reference to the possible material components, reference is made to the above listings), before the brush product is finally removed from the injection mold and packaged.

Step (f) preferably includes a so-called safety shot, i.e. a first provisional covering of the bristle melt with, where applicable, a relatively small material amount, preferably an amount of soft material. Step (g) includes if step (f) is designed as a safety shot, the so-called forming shot, by means of which a complete covering is generated. However, it is also possible for the complete covering already to be injected in step (f). It is, however, also conceivable that in step (f) further elements are already formed with the covering as mentioned above. Step (f) would be comparable to a step (g) in this case.

Instead of step (f), the melt carpet (bristle melt) can also be covered with a prefabricated covering cap preferably produced from hard material. The covering cap is then connected non-releasably to the hard material (e.g. by means of ultrasound welding or mechanical mounting e.g. by means of latching engagement).

A further method variant includes: a method for producing a brush product, in particular a toothbrush, comprising a basic body having a head part with a front side and a rear side which includes a bristle carrier with a bristle field which protrudes from the front side, and having a handle part as well as a neck part which connects the head part to the handle part, said method including the following steps:
- (a) injection mold the bristle carrier from one or multiple hard and/or soft material components;
- (b) injection mold the basic body separately from one or multiple hard and/or soft material components;
- (c) insert the bristle carrier into a first half of a tool for bristling;
- (d) guide bristles or bristle bundles through bristle holes or openings in the bristle carrier into corresponding bristle recesses of the first tool half;
- (e) melt the fastening ends of the bristles or bristle bundles onto the bristle carrier, which fastening ends project beyond the bristle carrier;
- (f) set up an injection molding cavity by mounting a second tool half onto the first tool half;
- (h) injection mold a further material component, preferably a soft material component for covering the bristle melt (as an option, further cleaning/massage elements and/or massage structures and/or tongue cleaners and/or injected bristles and/or zones in the neck or handle and/or further handle components can already be produced in step (h) in the same operation using the material component used).
- (i) join together the bristle carrier and the basic body;
- (j) move or change the second tool half and injection mold a further material component, preferably a further soft material component and/or material component to produce injected bristles for molding a further covering.

Step (j) can be repeated as often as desired (i.e. for instance for generating further cleaning/massage elements and/or massage structures and/or tongue cleaners and/or further zones in the handle and/or further handle components and/or injected bristles; with reference to the possible material components, reference is made to the above listings), before the brush product is finally removed from the injection mold and packaged.

Step (h) preferably includes a so-called safety shot, i.e. a first provisional covering of the bristle melt (of the melt carpet) with, where applicable, a relatively small amount of material. Step (j) includes if step (h) is designed as a safety shot, the so-called forming shot, by means of which a complete covering is generated. However, it is also possible for the complete covering already to be injected in step (h). It is, however, also conceivable that in step (h) further elements are already formed with the covering as mentioned above. Step (h) would be comparable to a step (j) in this case.

In a preferred embodiment, step (i) can also be effected already after step (e), steps (h) and where applicable (j) connecting to one another. Preferably, when the bristle carrier and the basic body are joined together according to step (i), the bristle carrier (for instance in the form of a head plate) is inserted or snapped into an opening in the head part which is designed in a manner corresponding thereto (and is defined for instance by a frame element). Where applicable, a connection to the head part (and where applicable the neck part) is then created with a further injection molding step (preferably with soft material and/or material for producing injected bristles).

In a favorable and consequently reduced variant steps (h) and (j) can also be entirely omitted.

However, a prefabricated handle with a neck part can also be integrally molded on the separately produced bristle carrier by means of a further tool part or further tool parts (and/or correspondingly designed sliders), so that the bristle carrier (on its own) forms the head part of the finished brush product (i.e. without a frame element).

Interruptions with intermediate storage or buffering of the semi-finished products can occur between each of the method steps.

Obviously conveying is also necessary at least between certain steps so that the sequence can occur.

The preparation of the bristles is not described any further. This occurs as described, for example, in conjunction with EP 2'130'454 A1.

In addition, included according to the invention is a tool for producing a brush product, in particular a toothbrush, comprising a basic body having a head part, with a front side and a rear side which includes a bristle carrier with a bristle field which protrudes from the front side and with a handle part and a neck part which connects the head part to the handle part, the tool comprising:
a first tool half for providing a bristle carrier with bristles having bristle recesses for receiving bristles or bristle bundles and having an insert recess for the bristle carrier, the tool being able to be utilized both for bristling and for injection molding;
a second tool half for injection molding which can be fitted onto the first tool half and which includes a cavity which, where applicable, together with free regions of the insert recess of the first tool half, defines an injection molding cavity.

In a preferred manner, the bristle recesses extend proceeding from the bottom of the insert recess into the body of the first tool half. The bristle recesses, in this case, can comprise different or identical lengths (this depends on the bristle profile desired in each case). Further preferably, the bristle recesses comprise bristle inlet openings which, in a preferred manner, correspond with the bristle holes or openings in the inserted bristle carrier. Thus, arbitrary bristle bundle forms are able to be processed (round bundles, triangular bundles, rectangular bundles, square bundles, rhomboid bundles, trapezoidal bundles, crescent-shaped bundles, elliptical bundles, polygonal bundles, curved bundles etc.). The bristle recesses extend, as a rule, perpendicularly into the tool body, however, designs with angled bristle recesses are also possible.

In a particularly preferred manner, all or at least some of the bristle recesses are realized in a continuous manner (i.e. they are open on both sides of the tool body). Further preferably, pins (with various lengths), which are insertable from the side of the first tool half opposite the bristle inlet openings into each of the corresponding bristle recesses, are provided for the continuous bristle recesses. The insertion depth of the bristles or of the bristle bundle is defined in this way and bristle topographies or bristle profiles can be created with a greater amount of variability. The pins are preferably inserted into the bristle recesses up to a stop in the tool body, then they are no longer movable in the bristle recesses. The pins preferably comprise a pin head and a pin shaft. In a preferred manner, the pin shaft comprises a concave recess or rounding on the free end thereof.

In a particularly preferred manner, the second tool half is suitable or provided for multi-component injection molding. In this case, hot runner, cold runner and co-injection technologies etc. can be included. Further preferably, the cavity of the second tool half corresponds with the insert recess of the first tool half and the body situated in the first tool half.

Further preferred design variants or design elements for the brush product, the method and the tool according to the present invention are described below.

Bristle Carrier

The bristle carrier preferably includes bristle holes (or openings), webs between the bristle holes (or openings), a circumferential boundary edge (in a preferred manner on the rear side thereof) and, where applicable, massage/cleaning elements produced from soft material and/or injected bristles produced from the corresponding material component. The bristle carrier can comprise diverse geometric designs, e.g. plate-shaped (flat), curved or arched or undulated (in each case in the longitudinal or transverse direction).

The bristle carriers are preferably formed from a hard material component.

The bristle carrier, for instance for technical material connection reasons, because the material is required for further processing steps, can be formed from a very thin hard material (i.e. with thicknesses of 1 mm or less). Then again, however, the (thin) hard material can also be overmolded at least partially with soft material and/or material for forming injected bristles in order to provide a combination of flexibility and stability.

In one variant, the bristle carrier can also be formed from a soft material (e.g. a TPE) or material for producing injected bristles. The conventional extruded bristles are then not fixed in a hard material. The bristle carrier then therefore comprises a soft material surface with bristle holes or openings therein and is correspondingly realized in a (very) flexible manner. The bristles are guided through the soft material.

A combination of the named materials and the corresponding characteristics is also conceivable as an option for the bristle carrier.

The boundary edge surrounds the bristle carrier or the bristle-carrying rear side thereof like a frame. The boundary edge is preferably formed from hard material for stability reasons, however this is not absolutely necessary. The bristle carrier here therefore comprises approximately the shape of a tennis racquet head, i.e. a hard boundary edge and a relatively soft, flexible (for instance trampoline-like) inner part.

The layer design when seen in cross section (i.e. not at the edge) (from top to bottom) in this case, is as follows: soft material—melt carpet—soft material. In other words, the melt carpet according to said embodiment is arranged in a soft material sandwich. Various soft materials can also be used in this connection for the upper and lower layers. The bristles are guided through the soft material (e.g. TPE). Material for the injected bristles can be provided as an option on one or both sides of the melt carpet in place of the soft material.

In a further variant, the bristle carrier includes sleeves and soft material. In this case, the sleeves are formed from a hard material component. The connection or the space between the individual sleeves is produced from soft material in a preferred manner. The connection can be designed in the manner of a membrane (i.e. continuously flat between the individual sleeves) or else in the manner of a net (i.e. there are individual connections or connection webs between the sleeves but no continuously flat connection). Each bristle bundle or each bristle surface, in this case, is arranged in a sleeve.

The rear overmolding (or covering) can be realized over the entire surface, or only substantially behind the sleeves or behind the sleeves and on the connecting webs (in the case of the net-like design).

In general it is true to say that when soft material is used in the bristle field, the soft-elastic elements (cleaning/massage elements) in the bristle field are preferably formed prior to the bristling. The same applies to injected bristles produced from the corresponding material component.

In yet another variant, the bristle carrier can be designed in a transparent manner (as well as also the brush product handle). The bristle carrier is then correspondingly manufactured from a transparent or translucent material, i.e. a quasi fully transparent brush product is realized (this is more easily possible in the present case than when using anchor free tufting (AFT method)).

The soft material for the covering (i.e. the plastics material which is overmolded) can be translucent or opaque. The single lack of transparency on the brush product would consequently be the melt carpet and/or the plastics material which is overmolded. However, the basic body of the brush product in the region of the neck and in the boundary region to the brush head can become a little brittle as a result of the processing/the production method. However, the fragility can be reduced as a result of a targeted application of a stretching process (as is described, for instance, in EP 2 347 673 A1).

With reference to the geometry/form of the bristle carrier, there are diverse variants within the framework of the present invention, as described above.

The bristle carrier can thus comprise certain bristle holes or openings which are not filled with conventional extruded bristles or bristle bundles. This involves, where applicable, through holes in the melt carpet, which is otherwise formed by the molten or welded ends of the bristles in the other bristle holes or openings. The non-filled bristle holes or openings can be utilized for instance as follows: the soft component or component of the covering can be injected through the (incomplete) melt carpet, which is provided with openings, or the through-holes (for example in order to form cleaning/massage elements from soft material and/or injected bristles from the corresponding material component between the conventional bristle bundles) or the through-holes are left in the end product (for example for rinsing with water or in order to administer media/liquids/paste through the openings).

The topography of the bristle carrier can comprise as shape, for instance, a (non-straight) longitudinal profile, a (non-straight) transverse profile or a combination of a (non-straight) longitudinal and transverse profile (3-D profile).

One variant includes a profile in the form of a wave (or also multiple waves) which extends (or extend) over the length and/or the width of the bristle carrier.

The design in the form of a wave is only to be looked at as an example and is to be discussed here as an example of a non-straight or non-flat topography. The discussed statements obviously also apply to non-straight or non-flat topographies.

In this case, for example, a correspondingly undulated injection molding cavity is used in the production process. The wave of the bristle carrier is reliably formed on the front side of the bristle carrier. It is preferably also formed on the rear side, however, it is also possible for the rear side to be designed in a flat manner and only the thickness of the bristle carrier to vary. The singeing punch (or the heat punch) for melting the bristles can, in this case, be realized correspondingly undulated or flat. Where a heat plate is realized in a undulated manner as bristle carrier, the fixing in the basic body occurs by means of injection molding as welding is not possible or is only possible with a great deal of difficulty.

In a further variant, all the bristles are at the same distance away from the front side of the bristle carrier (the bristle profile therefore corresponds to the topography of the bristle carrier, at any rate on the front side thereof). It is also possible for only the front side of the bristle carrier to comprise a topography but not, however, the rear side of the bristle carrier. There can, however, also be a topography present on the front side and on the rear side of the bristle carrier (was not possible using welding, as bound by welding geometry).

In a further possible variant, the bristle carrier can comprise one or multiple continuous notches and/or slots. For example, a slot in the bristle carrier can define a split head part (i.e. in the longitudinal direction) in order to provide particular flexibility. The slot can be realized in a straight, undulated, zigzag or crenellated manner.

The slot can also penetrate sideways into the head part. They can be arranged perpendicularly to the longitudinal axis at an acute or obtuse angle. It is also possible to provide multiple slots in the head.

With regard to further flexibility in the bristle field, film hinges, for instance, can be provided in the region of the bristle carrier (i.e. in the region of the connecting surfaces or webs between the bristle holes or openings) and/or the boundary edge. A film hinge refers in the present case to a reduction of material strength in certain regions. In this case, with reference to the longitudinal axis of the bristle field, transverse or longitudinally extending hinges can be formed or else combinations thereof. In this case, transverse hinges provide flexibility in the longitudinal direction. Longitudinal hinges provide lateral flexibility, for instance in the form of lateral wings.

In one variant, the hinges can also be arranged in the manner of a clover leaf, i.e. multiple hinges are provided which are not straight with reference to the longitudinal axis of the bristle field, i.e. are oriented perpendicularly or parallel, and form, for example, round or elliptical part bristle surfaces. The hinges can also be arranged at an angle, for instance in a X-shaped or star-shaped manner. It is naturally also possible to combine the abovementioned continuous notches or slots with film hinges. The ends of the notches or slots can also merge into regions with reduced material strength.

The film hinges (and where applicable the continuous slots or notches), if they are provided in both the connecting surfaces or webs and in the boundary edge, are preferably arranged in the same position in each case in the longitudinal or transverse direction.

Hard and/or soft material can be provided in the zones of the material weakening, or the film hinges.

As a further variant, the film hinges can be covered or filled in each case at least in part with soft material. For example, hard/soft bridges can be formed in this way in the bristle carrier, i.e. thin hard material bridges (film hinges) are overmolded with soft material.

Cleaning/massage elements produced from soft material and/or injected bristles produced from the corresponding material can be provided in the zones with the material weakening, or film hinges.

As further variants, (pure) soft material bridges can also be provided in the carrier. This means that multiple part regions or elements of the bristle carrier are connected together only by soft material (and where applicable a corresponding geometric shape).

In a further variant, an interrupted boundary edge is provided. As the boundary edge is similar to a frame, it bestows stability on the bristle carrier. The boundary edge, however, could also be interrupted or weakened at one or multiple points, that is to say reduced to the connecting surface or the connecting webs of the bristle carrier. This can also occur, for instance, in combination with film hinges. The boundary edge can also consist of various materials. In this way, it can consist of a softer material (e.g. soft material or material for injected bristles) in a flexible zone and of a harder material (e.g. hard material) in a rigid zone.

In a further variant, the bristle carrier comprises one or multiple continuous longitudinal or transverse slots such that a split head part is produced (cf. above). Such a head part would once again be more difficult to realize using conventional AFT technology because the head would become too large as weld surfaces/distances would be necessary on the edges (for the rest, the distances in the region of the longitudinal gap between the individual bristle bundles would be too large and the bristle field consequently porous). In addition, on account of the size, the individual wings of the split head part are somewhat flexible so that an AFT plate, where applicable, would not hold in an optimum manner.

The split head regularly defines an open geometry, i.e. the slot runs to the outside (or is open at the outer end thereof). The slots are preferably realized in a straight, wave-shaped, crenellation-shaped or zigzag-shaped manner.

The brush product head is multi-part as a result of the slot (i.e. multiple bristle carrier segments include conventional, extruded bristles or bristle bundles and/or also other cleaning and massage elements and/or also injected bristles).

In one variant, the head or the head part of the brush product comprises a cloverleaf-shaped design, i.e. the corresponding notches are directed inward at an angle, i.e. substantially in the direction of the center of the bristle geometry.

In one variant, a split head is mounted on the handle part. The bristle carrier, in this case, is (only) connected to the neck part at the non-split end thereof, the neck part running to the free brush end and the transition to the head part taking place at said free brush end. The wings of the split bristle carrier protrude freely from the neck part or handle part in the direction of the brush product handle and are flexibly movable in relation to the front end (i.e. as a rule at least in the direction of the neck and handle part). The same can also be realized with bristle carriers with notches.

In a further variant, the slot or a recess does not go through to the outside (i.e. beyond the bristle geometry), a closed geometry is therefore present. This variant is also more difficult to realize using AFT technology for the afore-named reasons. The slot, in one variant, comprises a U-shape such that a flexible tongue, which lies inside the bristle field, is realized inside the plane of the bristle carrier.

However, flexible structures of the bristle carrier can also be combined with structures which are fixed. Thus, it is not necessary for all the bristle bundles to be able to move in relation to the subsequent brush product handle part; it is possible to arrange, for example, a fixed element in the center of the bristle carrier and flexible elements on the outside.

In a further variant of the present invention, one or multiple hard material islands can be arranged on the rear side of the bristle carrier. These can project through the covering in the end product, on the one hand, in order to realize tongue cleaners or else stabilizing elements for further distribution.

On the other hand, the hard material islands can also be covered by the covering. In this connection, these can be, for instance, plastics material anchoring points (i.e. for producing a connection between the covering plastics material and the bristle carrier) or else sacrificial structures for holding or anchoring the melt carpet (i.e. the sacrificial structures are deformed by the heat punch and "pressed" by means of or into the melt bath). Rivet or mushroom-like structures can be created.

Bristle Holes or Openings (in the Bristle Carrier)

The arrangement of the bristle holes or continuous openings in the bristle support geometry is basically free, for instance they can be symmetrical, asymmetrical, etc. In principle, in the present case, bristle holes refer to round holes for receiving round bristle bundles consisting of conventional, extruded bristles and openings refer to other geometric forms, for example, for triangular, rectangular, square, rhomboid, trapezoidal, crescent-shaped, elliptical, polygonal, curved, elongated or angular bristle bundles consisting of conventional, extruded bristles or, where applicable, for individual bristles consisting of conventional, extruded bristles.

With reference to the distance between the bristles or bundle and the outside edge, it is basically true to say that the bristles or bristle bundles can be arranged close to the outside edge of the brush product as, according to the present method, simply no surfaces are necessary for possible welding (once again compared to AFT), at most the boundary edge is provided (i.e. on the rear side). Consequently, a comparably narrow brush head can be realized. In addition, more bristle bundles can be realized in a narrow space, i.e. the distances between the individual bundles can be smaller. This produces a larger bundle density.

The distances between the outermost edge of the bristle carrier and the outermost bundle or bundles are in a preferred manner between 0.5 mm and 3 mm and further preferably between 0.5 mm and 1.5 mm.

The bristle holes can extend into the neck part. This provides a new possibility as welding does not occur according to the present technology (welding can result in fragmentation of the plastics material body). This is made possible by the overmolding or overspraying of the rear side of the bristle carrier (production of a covering of the bristle melt).

Triangular, rectangular, square, rhomboid, trapezoidal, crescent-shaped, elliptical, polygonal, (circle) round, oval, or n-angled forms are considered as forms for the bristle holes or openings (however, in principle, they have to produce a closed contour). Specific further embodiments are openings in the form of curved contours or individual bristles or micro bundles with a flat bristle carpet (very large bristle bundles).

The following dimensions are preferred within the framework of the present invention: the length of the bristle holes or openings is between 0.5 mm and 4 mm and preferably between 1 mm and 2 mm (this also corresponds to the measurement of the respective bristle bundle). The same measurements as for the length apply to the width of the bristle holes or openings.

The (cross-sectional) area of the bristle holes or openings is between 0.5 mm$^2$ and 25 mm$^2$ and is preferably between 2 mm$^2$ and 6 mm$^2$.

The smallest bundles (micro bundles) have a very small number of conventional, extruded bristles. These can include between 2 and 25 and preferably between 3 and 20 conventional bristles.

Bristle bundles with a flat bristle carpet have a very large number of conventional, extruded bristles. These can include between 200 and 2000 and preferably between 500 and 1500 conventional bristles.

For the webs/connecting surfaces between the bristle holes or openings, it is true to say that they separate the individual bristle bundles and at the same time form the holder frame for the bundles or the melt carpet.

The webs/connecting surfaces comprise at least a width of between 0.3 mm and 2 mm and preferably between 0.4 mm and 1.3 mm (measurement between the bristle holes, measured on the front side of the bristle carrier). The webs/connecting surfaces comprise at least a height of between 0.3 mm and 2 mm and preferably of between 0.5 mm and 1.5 mm (overall height of the individual web). However, not all webs/connecting surfaces have these dimensions, they are to be understood as minimum dimensions.

As further variants, injected bristles are provided on the webs or connecting surfaces between the bristle holes or between the bristle holes and the outside edge. They can be produced from the same material as the bristle carrier (or the web/the connecting surface) or can be injected from different material. The material has to be suitable, however, for realizing injected bristles.

A flat structure produced from material for injected bristles is preferably formed on the front side. Cleaning/massage elements produced from soft material can naturally also be provided in the same zones instead of or in addition to the injected bristles.

Different heights of webs or connecting surfaces can also be provided on the rear side in a bristle carrier. The aim in this connection is to form boundaries in the melt carpet. The melt carpet is, as it were, divided into different zones by the webs, i.e. the separated regions do not run together. Various melt carpets are therefore formed on the bristle carrier. This provides, for example, advantages with regard to the flexibility. The melt carpets can also be situated in different planes.

The height elevation does not necessarily have to relate to the entire web, it can simply relate to part (for example a central part). Consequently, it is possible for the melt to be able to rest nevertheless at least in part on the web.

The preferred number of bristle bundles in a melt carpet region (with division) is between 1 and 40 and further preferably between 2 and 10.

Boundary Edge

The rear side of the bristle carrier, which carries the conventional, extruded bristles or bristle bundles, comprises in a preferred manner an outer boundary edge. The bristle carrier thus forms a type of basin together with the boundary edge. The reasons for this are that the melt carpet, formed from the molten or welded bristle ends, is not displaced over the boundary edge in the molten state (i.e. the melt bath or bristle melt). It additionally bestows stability. No connection (material closure) is preferably generated between the bristle melt and other plastics material components (i.e. the overspraying), rather the plastics material component of the covering or overspraying is connected to the boundary edge by means of material closure and is anchored in this way. In addition to this, a covering or overspraying can also connect to possible sacrificial structures by means of material closure.

The boundary edge preferably protrudes perpendicularly from the rear side of the bristle carrier. If an inclination is provided, it can be realized inwardly (i.e. in the direction of the center of the bristle carrier) or outwardly (beyond the outer edge of the bristle support geometry). The preferred angle of inclination in each case is between 30° and 90° and preferably between 60° and 90°.

The boundary edge, when seen parallel to the melt bath, comprises a largely uniform, constant cross section. However, the cross section preferably reduces toward the free end of the head.

The course of the boundary edge height (independently of the topography of the bristle carrier) can be, for instance, straight or undulated. However, interruptions or points without a boundary edge or points consisting of another material can also be provided, e.g. in the form of notches or recesses—for more flexibility. If the bristle carrier is connected in one piece to the handle part, the boundary edge can merge into the neck part, i.e. the boundary edge is no longer perceived as such.

The boundary edge comprises in cross section, when seen parallel to the melt bath, a width of between 0.3 mm and 2 mm and preferably between 0.5 mm and 1.2 mm. The height of the boundary edge (measured between the rear side of the bristle carrier and the free end of the boundary edge) is between 0.2 mm and 3 mm and preferably between 0.5 mm and 2.5 mm.

In one possible variant, the bristle carrier does not comprise a boundary edge. Here then, the overspraying component is pulled over the outer edge of the rear side of the bristle carrier or on the side surface thereof in the direction of the front side of the bristle carrier. It is further possible, if no boundary edge is present, for the bristle carrier to lie freely at the side and not to be covered with bristle melt. Said surface then forms a connection possibility again to the overspraying (covering) by means of material closure.

A topography of the boundary edge (boundary edge does not lie in a plane) would once again be difficult to realize using AFT technology as 3D welding would be less practical or also not sturdy/reliable enough.

The bristle carrier can be directly provided with massage/cleaning elements produced from soft material and/or injected bristles produced from the corresponding material. These are produced in an injection molding step in addition/subsequent to the step of producing the bristle carrier.

Bristle Field

In principle, the conventional, extruded bristles or bristle bundles are guided through the bristle carrier. The bristles are melted (or welded) on the rear side of the bristle carrier. The molten bristle ends thus form the melt carpet on the rear side of the bristle carrier. When the bristles are separated into singles, holding/separating a group of conventional extruded bristles in the bristling machine preferably corresponds to a bristle bundle.

Conventional, extruded bristles are preferably processed in the present case. These can be, for instance, cylindrical bristles or tapered bristles. The processing of the tapered bristles can be effected in multiple ways.

On the one hand, the processing can be effected as described in EP 2 130 454 A1 (i.e. rounding the bristles or grinding the etching threads/residual threads in order to create as small a point as possible which is greater than the largest tolerance of the correspondingly used bristling tool).

However, additional processing of the bristles to create the fitness for production does not necessarily have to be effected as the bristles are moved less than in the known AFT method (in particular, the bristle bundles are no longer moved when they are in the bristle hole of the tool such that the risk of jamming is smaller). The tapered bristles can be handled like cylindrical bristles in the process (where applicable by adapting the processing machine in the region of the supply channel with reference to the position of the presser, cf. EP 2 130 454 A1 in this respect).

In a further variant, cylindrical and tapered bristles can be mixed in a bristle bundle (i.e. each bundle is mixed). However, it is also possible for only one bundle to be mixed.

Other bristle types can also be mixed in this sense in a bristle bundle. Examples are the different cross-sectional forms and/or different diameters and/or different materials and/or different bristle lengths and/or different colors, etc.

Bristle bundles consisting of different bristle types are not homogenously intermixed, but preferably have individual zones of bristles of different types.

In addition, it is also possible to provide cleaning/massage elements which, for example, in the form of lamellae, nubs, etc. are injected from behind or are moved into positive locking closure. Combinations are also possible.

With regard to the cross-sectional forms of the bristle bundles, reference is made to the preceding statements concerning the bristle holes. The bristle bundles preferably have the same cross section as the bristle holes.

With regard to the bristle lengths, different lengths are possible in a bristle bundle. As a result of mixing the bristles and positioning the bristles in the bristle hole in the tool, a contour can be created, for example, as is disclosed for instance in EP 2 420 156 A1 or EP 2 420 157 A1. Part of the bristles, in this case, can be realized in a tapered and higher manner and another part of the bristles can be realized in a cylindrical and lower manner.

In a further variant, the bristle bundles can be arranged at an angle α relative to the bristle carrier. The angle α is basically dependent on the position of the bristle bundles in relation to one another.

Individual conventional, extruded bristles can also assume different angles to the bristle carrier within the bundle.

There are no great restrictions with reference to the alignment of the bristle bundles. The bristle bundles can be correspondingly inclined to the front, to the rear, to the left or to the right, however they can also be aligned in a combination thereof. Example of forms which can be formed in this way are shown below.

One possibility consists in a hedgehog-like orientation of the individual bundle (e.g. in the transverse direction, the bristle bundles being aligned within an angle range φ of no more than 120°, i.e. they are aligned within the range of −60° to 0° to +60° with reference to the angle thereof to the perpendicular). Said alignment can be effected longitudinally, transversely or generally in any direction whatsoever, it can be symmetrical but does not have to be. The bundle distribution does not have to be regular either.

A further possibility consists in a truncated cone-like alignment (i.e. upside down) with a wreath produced from angled bristle bundles (not gapless contour) or else in the form of the individual bundle (a compartment-like design is present here for instance, the bristle hole in at least one dimension being smaller than the dimension at the free end of the bundle or of the bristles).

In a preferred manner, the length of the conventional, extruded bristles is between 3 mm and 18 mm and further preferred between 7 mm and 14 mm.

The bristling density in the bristle bundle on the bristle carrier or head plate is between 10 bristles per $mm^2$ and 300 bristles pro $mm^2$ (preferably between 20 bristles per $mm^2$ and 80 bristles per $mm^2$).

Preferred angles α of the bristles in relation to the bristle carrier are between 45° and 90° and further preferably between 70° and 90°.

The melt carpet can be designed such that the melt of the bristles (or of the bristle ends) realizes a surface proportion on the finished product. Stability can be given to the melt carpet by the overspraying or overmolding material (covering) (for example only part of the melt carpet is overmolded (e.g. the edge)). In this case, the bristle melt has to be formed sufficiently thickly in order to achieve a hold inside the melt carpet and to avoid the risk of the melt carpet breaking.

Finished Brush Product Head

In a preferred manner, the finished brush product head (head part or bristle carrier) comprises the dimensions mentioned below.

The layer thickness of the bristle carrier is between 0.3 mm and 2 mm and preferably between 0.4 mm and 1.3 mm (regularly corresponds to the height of the connecting surfaces or connecting pieces).

The layer thickness of the melt carpet is between 0.1 mm and 0.8 mm and further preferably between 0.2 mm and 0.4 mm.

The layer thickness of the covering (overmolding) is between 0.5 mm and 5 mm and preferably between 0.5 mm and 3 mm. A variation in the layer thickness of the covering over the length of the head part is certainly possible.

The head part as a unit is realized fundamentally thin, however it can also comprise a variable thickness. In a preferred manner, the thickness of the head part is between 2 mm and 6 mm and further preferably between 2.5 mm and 4 mm.

The layer thickness ratios in a normal design are: bristle carrier between 25% and 35%; melt carpet between 15% and 25%; covering between 40% and 60%.

With a thin design, the layer thickness ratios are: bristle carrier between 15% and 25%; melt carpet between 15% and 25%; covering between 50% and 70%.

The layer thickness ratios at very flexible points are: bristle carrier between 25% and 35%; melt carpet between 25% and 35%; covering between 30% and 55%.

The head part or bristle carrier dimensions are as follows: length (free head part end to neck attachment) between 25 mm and 45 mm and further preferably between 30 mm and 40 mm. Width between 10 mm and 18 mm and further preferably between 12 mm and 16 mm. Height between 2 mm and 6 mm and further preferably between 2.5 mm and 4 mm (cf. above).

The dimensions of the overall product are as follows: length between 100 mm and 240 mm and further preferably between 140 mm and 200 mm. Width between 10 mm and 20 mm and further preferably between 12 mm and 18 mm. Height between 10 mm and 35 mm and further preferably between 15 mm and 25 mm (i.e. when resting on a surface).

The overall surface of the bristle carrier (corresponds for instance to head part width×head part length in the end product) is preferably between 150 $mm^2$ and 600 $mm^2$ and particularly preferred between 300 $mm^2$ and 500 $mm^2$.

The overall surface of the bristle holes (totalized) is preferably between 50 $mm^2$ and 200 $mm^2$ and particularly preferred between 80 $mm^2$ and 150 $mm^2$.

The ratio between the surface of the bristle holes to the surface of the bristle carrier geometry is preferably between 1:6 and 1:1.2 and particularly preferred between 1:4 and 1:1.5 (the ratio is generally higher than AFT as there are no weld distances).

Covering

The covering serves in general for covering and for securing the melt carpet. It is basically always present, the material of the covering is applied correspondingly after the bristling process.

The covering always consists of at least one component, preferably a soft material component, however it can also be a hard material or the material for injected bristles. In addition, combinations with the abovementioned materials are also possible, for example a combination of soft material components and/or hard material components and/or materials for injected bristles (see above for example of preferred materials).

Cleaning/massage elements and/or injected bristles and/or a tongue cleaner, for instance, can also be provided on the brush product in combination with the application of the covering.

When using a soft component, soft elastic cleaning/massage elements are preferably formed on the front side and/or on the rear side and/or on the boundary edge of the bristle carrier. Lamellae, nubs/fingers or tongue cleaners can be named as specific examples.

The soft material can be applied in each case in one injection molding step or in multiple injection molding steps and at multiple points with one or multiple injection points of the brush product or of the bristle carrier.

If the bristle carrier is produced in one piece with the handle part and the neck part, the following possibilities are produced:

When the covering is injected, soft-elastic zones of soft material, which reduce the potential for injury, are preferably also formed at the side of the toothbrush head.

The soft material can be arranged in the form of lateral elements or structures on the head part (i.e. on the left and/or right in the longitudinal direction) or else on the front, free end of the head part (for instance in the form of damping elements on the front end). Examples of possible elements include lateral cleaning elements (i.e. cleaning elements act in the transvers direction, as for example ribs) or else cleaning elements of the bristle field which protrude from the side (i.e. in the bristle direction such that the cleaning elements act in the bristle direction, as for example lamellae or rubber cylinders). In addition, the soft material can form, for instance, cleaning elements on the front side or soft material can be applied around the head part.

The soft material can be arranged around the head part. Among other things, also on the front side, in addition to the side surfaces (where applicable, the front side can be provided with soft material as early as when the bristle carrier is created with the bristle holes, however not right in the bristle holes, at most as a cut layer in the region of the hole opening). It is possible, however, to form elements of soft material on each side of the head part (for example cleaning elements).

The soft material can also be drawn over the neck part, for example in order to increase the flexibility of the neck part in order to create a damper or a covering here or else in order to draw cleaning elements into the neck part.

Damping elements can be designed such that they rest directly on/are connected directly to the bristle carrier or that they are connected only at certain points. If the damping elements are only connected at certain points, the spring/damping action is improved because the crumple zone becomes larger.

The soft material can also form a zone in the handle part. This variant is often realized in combination with the variant "drawing soft material into the neck part" as the neck part lies on the path from the head part to the handle part of the brush product. In this case, a surface zone is formed in the neck part with the soft material. A soft material component functioning in the head part supplies a further handle component (i.e. the handle part receives an additional material component). The additional component of the handle part can be injected with the component of the head part. In one variant, a combination with soft material is realized with soft elastic massage/cleaning elements (such as, for example, lamellae) in the head part from an injection point in the handle.

Zones produced from soft material and/or material for injected bristles can contact, support, surround and/or penetrate conventional, extruded bristles.

Variants for soft material applications, which are also possible if the bristle carrier is produced as above or is produced separately, are specified below.

The soft material forms cleaning elements on the front side of the bristle carrier, for instance in the form of a possibly hollow, compliant cleaning/massage element produced from soft material. The cleaning/massage element is preferably open toward the head part rear side, the end surface thereof preferably lies in the bristle field and can be designed in a smooth, structured manner or in the manner of (multiple) lamellae or cleaning structures. The element is preferably formed in a slightly conical manner (for instance in the shape of a trumpet). The production of cleaning/massage elements is effected as a result of injection molding, either before or after the anchoring of the conventional, extruded bristles on the bristle carrier.

It is also possible to form multiple soft material sections/zones, i.e. two or multiple soft material components realize two or multiple sections/zones in the brush product head.

In addition, sprung bristle bundles can also be provided. In this case, in each case one single or a few bristle bundles is/are connected and melted per se and form a contiguous bristle carpet only per se. During melting a melt geometry (e.g. a ball) is formed which does not connect to the bristle carrier. The rear side of the bristle carrier is overmolded with soft material, no soft material passing between the bristle melt and the bristle carrier. In this way, the bristle bundles are able to be moved on the soft material in a sprung manner relative to the bristle carrier.

The following injection points for the overmolding material for producing the covering of the bristle melt are considered: position in the head part (for both variants, i.e. bristle carrier in one piece with handle and neck parts or bristle carrier produced separately (head plate)); position in the neck (for variant bristle carrier produced in one piece with handle and neck parts) and in the handle part (for variant bristle carrier produced in one piece with handle and neck parts).

The respective injection point can be covered by a further material component or the material component injected at an injection point can cover another injection point such that quasi planes of injection points (and consequently corresponding material planes) are generated.

In one variant, the covering can also be generated by the mounting of a cover part, for example a cover.

In this case, the cover can simply be mounted or else it is applied to the melt carpet prior to mounting of the material in the form of a safety shot. In the case of the safety shot, as a rule a small amount of material is used (however, it is also possible for an entire component to be injected) in order to ensure a secure hold or sealing. Soft material is preferably used as the material. It is naturally also possible to use hard material or material for injected bristles.

The cover part or the cover is produced separately, in the form of a single-component or multi-component plastics material part. The cover part can also be a non-plastics material part (e.g. an insert part). The cover part can be inherently stable or not.

The cover part can be applied as a result of welding—that is to say mounting and welding. This operation corresponds in principle to a reverse AFT operation, i.e. the cover part is welded instead of the bristle carrier plate (however, the afore-described disadvantages of welding in conjunction with AFT remain).

The cover part, however, can also be mounted by means of pressing-in, i.e. once the bristles have been melted (and possible after a safety shot). Secure holding can be provided by cams (with click fixing) or else by pressing.

The cover part can fundamentally also be mounted by means of overmolding. Variants: safety shot/mounting/overmolding or mounting/overmolding. The hold is generated by the overmolding. It is possible for complete overmolding to be effected or else only partial overmolding (for example on the boundary edge).

The cover part can also comprise more additional features. For example, cleaning/massage elements which extend from the rear side to the front side of the brush product (for instance corresponding elements which are guided through a recess in the bristle carrier or in the bristle field melt carpet). In addition, chemical and/or biological substances directly in the cover or else a mirror or else a film are possible (for instance with image etc.).

Further Specific Characteristics

In the case of the variant where the bristle carrier is produced in one piece with the neck and handle parts, the handle part (without bristles) comprises between 1 K (K=material component) and X K (X being a natural number between 2 and 10) and preferably between 1 K and 4 K. In the case of material components with origin in the head and which are drawn into the handle part, between 0 K and X K and preferably between 0 K and 2 K. The number of material components in the handle part in the end product is preferably between 1 K and X K and further preferably between 1 K and 6 K.

In this case, a brush product basic body (i.e. handle part, neck part and bristle carrier or head part) can be used for multiple different brush products. The design can be as follows: the basic body includes 1 K; the bristle field can include multiple variants with identical bundle positions, variability with reference to bristle material, bristle type, bristle color, bristle length, bristle angle etc. prevails (i.e. as described in the framework of the present application); a safety shot can be provided where required (can be part of the overmolding body); the overmolding body does not form any further element but is only covering or the overmolding body forms cleaning elements on the front side and/or the rear side or else the overmolding body forms a handle component (combinations of the aforenamed possibilities are also possible).

An advantage in this connection is that the specific design does not have to be set until late in the process, namely not until the bristles are inserted.

An additional soft component, an additional hard component and/or a material for producing injected bristles is/are considered as possible further material in the bristle field region which is injected directly with the handle (see above for the materials). The additional component(s) is/are applied directly to the handle part and to the brush product head before the bristling process. Examples of such elements are cleaning/massage elements (e.g. in the form of lamellae, nubs) and/or injected bristles. The requirements are directed in each case to the specific application of the product. In this case, there can be specific requirement for storage so that the elements do not become damaged. Thus, for example, a tray with defined holding positions and corresponding spaces can be used.

In principle, it is possible to use simple injection molding tools (tools with many components are more complicated and more expensive). As a result of further injection molding following the bristling process, it is possible to integrate further injection molding components. For example, it is possible to design a four-component brush product with a two-component tool (e.g. a 2 K brush product handle combined with a bristle carrier with a 2 K covering, the 2 K covering being able to be drawn additionally into brush product handle as described).

With regard to the variant where the bristle carrier is produced separately, there are two possibilities once again.

Firstly, the bristle carrier or the head part can be produced with standard interface geometry and thus mounted on different handles. In this case, the bristle carrier is provided, for example, with an interface geometry on the rear end or on the rear end and on parts of the left-hand and right-hand side. Apart from this, the interface geometry can also be around the bristle carrier on the side edges; a frame element is correspondingly formed on the handle body, the bristle carrier being able to be placed into the frame element and the fixing being effected for instance as a result of overmolding, snapping-in, bonding or welding, in particular ultrasound welding. A further possibility corresponds to the use of the AFT technology. In this case, the bristle carrier or the head plate is already occupied with bristles, etc. and is provided with at least one safety shot on the rear side. A basin-shaped, plate-like recess, into which the bristle carrier or the head plate can be inserted, is situated in the head part of the basic body. On the side edges on the rear side edge, the bristle carrier or the head plate has an interface geometry or edge which is inserted into the basic-shaped, plate-like recess serving as means for the ultrasound connection. The bristle carrier or the head plate, when inserted in the recess, rests on said interface geometry and during welding said elements serve as connecting element or as energy concentrator and material reservoir for the liquefying material. Further fixing variants include, for instance, snapping-in, welding as mentioned, in particular ultrasound welding, or bonding.

Secondly, the brush handle (and where applicable the neck part) can be injected completely on the bristle carrier. The bristle carrier is provided with bristles and then overmolded for this purpose; the brush handle is then also injected and formed with the overmolding.

In a further embodiment it is possible to arrange conventional, extruded bristles on the front and on the rear sides for both previously mentioned variants (bristle carrier produced in one piece with the neck and handle parts or bristle carrier produced separately). To this end, two bristle carriers must be present, the bristle carriers each standing alone or one being provided with a brush product handle. Each bristle carrier, in this case, is treated individually per se, i.e. the bristles are in each case introduced and melted. A safety shot for a covering can also possibly be provided (as a rule, however, only when spaces are generated between the bristle carriers when they are joined together). In a preferred manner, namely, the bristle carriers are placed together back to back and connected (connection possibilities as mentioned above: welding, overmolding, etc.). In this way, either a finished brush product is generated or a finished bristle carrier.

Apart from this, (prefabricated) mounting parts can also be installed in the bristle field. These are not mounted until the remaining bristle field has been finished (including overmolding).

Method

Preferred designs and aspects concerning the individual method steps and method variants for producing a brush product within the framework of the present invention are specified below.

Producing the Bristle Carrier:

Either the basic body of the brush product is injection molded together with the bristle carrier or a separate or stand-alone bristle carrier (preferably in the form of a head plate) is injection molded.

The injection molding, in this case, can be effected inline (i.e. as a directly chained process) or offline (i.e. for instance linked to intermediate storage).

Preparing the Bristles/Bristle Bundles:

The bristles are preferably rounded first of all. Individual bristle bundles are then separated and introduced into bristle recesses in a punching tool.

In this context, it is possible to use a variable circular arc (variability in the quantity of bristles which are fed in one step), in particular when various conventional, extruded (bristle) filament types are to be used or various bristle hole sizes are to be provided. The circular arc is preferably adjusted during the proceed, i.e. whilst the conventional, extruded bristles are prepared for a bristle field (for bristle bundles with a varying number of bristles). Holding/separating-off conventional, extruded bristles in the bristling machine preferably corresponds in this connection to a bristle bundle.

In the present case, compared to the conventional AFT method, no funnel plate is used. This means that the bristle bundles are complete just as provided from the circular arc. The number of bristles in a bristle bundle can be varied, in this case, within a machine-specific range.

Examples of different characteristics in the filament types (conventional, extruded bristles) include, for instance, the bristle form (cylindrical, tapered or rounded, etc.), the form of the bristle cross section, the bristle color, the bristle diameter, the bristle hardness and the bristle material types.

In one variant, before the bristles are pushed into the bristle recess in the tool, the following sequence can also be provided: first of all a small quantity of bristles is held/ separated-off and held in a standby position; at the same time, a second small quantity of bristles is held/separated-off; then the first and the second small quantities of bristles are joined together and then inserted into the bristle hole or the opening.

However, this can also be carried out using the above-mentioned variable circular arc, which allows for more scope.

Specific to Tool Loading:

There are basically two possibilities for feeding the bristles or bristle bundles for loading the tool.

Firstly, the conventional, extruded bristles or bristle bundles are introduced from the front, i.e. from the subsequent front side of the brush product through the bristle carrier (that is to say initially comparable to the known AFT machines—only that there does not need to be any welding at the end of the bristle carrier, but rather the rear side is overmolded).

In the preferred variant, however, the prepared bristles or bristle bundles are guided through the bristle carrier from the fastening side (i.e. from the subsequent rear side of the brush product). The conventional, extruded bristles or bristle bundles coming from the separating process are therefore inserted through the bristle carrier into the tool. To do this, lead-in chamfers are preferably realized at the bristle holes of the bristle carrier so that the bristles can be guided in a trouble-free manner.

Profiling or Adjustment of the Bristle Length:

In principle, it must firstly be noted that the tool which receives the conventional, extruded bristles for processing comprises recesses which are designed corresponding to the desired profiling (i.e. the profiling is effected, for instance, as a result of variously deep recesses).

In other words, the profiling is generated by means of the depth or form of the bristle recesses in the tool. The tool itself does not carry out any movement in the present case but is designed as a rigid part (i.e. in contrast to the AFT method no movable (profile) pins are basically provided here). The design of the geometry of the bristle bundle is therefore effected in the bristle recess of the tool.

Variants in Tool Design:

In a first variant, the bristle recesses are provided in a first plate. The first plate comprises an interface to a second plate which is not flat. The unevenness of the second plate, in this case, produces the profiling of the bristles or bristle bundles by it closing off the bristle recesses. The production of the two parts of such a tool is simple, but it comprises only limited variability.

In a second variant, the bristle recesses are provided in a tool part (or a plate), the available recess length or the end profile is defined by means of (as a rule stationary) pins with different lengths. The pins, in this case, are inserted into the recesses on the side of the tool part opposite the insertion openings for the bristle bundles and are thus able to be changed in a simple manner. A high level of variability can be achieved in this manner, however the production of such tool parts is more complex.

In a further variant, the bristle recesses are provided in the tool part (or a plate), no pins being provided as in the second variant. The bristle recesses are designed as blind holes without variability. The bristle field is just as the tool, otherwise a new tool has to be created.

Cutting the Bristles:

It must be noted, in principle, that since the bristles are preferably already rounded, they can only be cut at the opposite (i.e. non-processed) bristle end.

In a first variant, the bristles have already been cut to length when they are inserted into the tool (i.e. the inserted bristles are present, where applicable, in different lengths).

Before the conventional, extruded bristles are inserted into the bristle recess of the tool, they have to be cut quasi group by group. This can occur once prior to separation by means of the circular arc or else after the separation (i.e. as it were "en route" in the circular arc) when there is only one bristle bundle separated and in a preferred manner shortly before insertion into the bristle recess of the tool (shortly before the pushing or positioning above the bristle recess).

In another variant, the conventional, extruded bristles or bristle bundles can also be cut to length when they are moved into the tool or the bristle recesses (and the fastening ends of the bristles so to speak protrude). Longitudinal and/or transverse profiling is/are possible then as geometric possibilities for cutting, as a result of which it is possible to control the distribution of the quantity of bristle melt in the melt bath or in the melt carpet as the quantity of bristles to be melted varies.

However, it is also possible for the conventional, extruded bristles not to be cut to length, i.e. the excessive material or the projecting fastening ends of the bristles are (simply) melted. In this connection, a relatively thicker melt carpet can be formed, excessive material, where applicable, being removed or punched off.

Possible cutting methods to be considered are: cutting by means of hot wire, cutting by milling (e.g. all fastening ends are processed with a milling cutter, it being possible, where applicable, to mill a geometry (i.e. various heights of the rear bristle ends in relation to the carrier structure) and cutting by means of a blade.

Fastening the Bristles/Melting the Rear Bristle Ends:

In a preferred manner, the bristle ends are melted and pressed against the bristle carrier for this purpose. In this connection, it must be noted that the melt carpet has to be sealed so that proper overmolding can subsequently be effected. The melting can be effected, for instance, as a result of welding (contactless or contacting) or by means of a heat punch or radiant heater.

The pressing operation is carried out by means of the (heat) punch. The surface geometry of the punch should be such that the course of the melt material can easily be controlled. As a rule, the punch comprises a continuous, closed surfaced which is aligned parallel to the bristle carrier.

In one variant, however, the punch surface can be provided with recesses or with a profile in relation to the bristle carrier. The melt distribution can be controlled in this way. It is possible to create, for instance, points with more melt and points with less melt (as a result, a topography or a height profile of the melt carpet is created). This can be undulated or else cambered concavely or convexly. Other forms, such as for instance a zigzag or crenellated profile are conceivable.

As an option, the punch surface, however, can also comprise recesses which fill with bristle melt during the melting process. Excessive melt, where applicable, can be removed in this way. The melt material sticks in the recesses and, where applicable, a special movement of the punch away from the melt is effected. However, the recesses have to be emptied after each melt operation, for example by being brushed out.

The punch is preferably constructed from multiple parts. In particular, the surface contacting the melt is preferably formed from multiple parts. This is simple to produce and ensures good changeability of the individual parts. In addition, the basic punch is thus utilizable for various punch forms (e.g. in the case of a three-part punch, the middle element is exchanged in dependence on the brush product). The punch is further preferably mounted in a sprung manner in order to compensate for tolerances.

In the case of a multi-part punch, each element can also be sprung individually or for itself. The pressure is thus adapted to the contour or the desired course of the bristle melt.

In a preferred manner, the steps of melting and pressing are combined (i.e. in a heat punch). The punch is preferably moved relatively quickly. Further preferably, the punch is always heated (but only where heating is needed). As a result of such a short quick melting process, the bristle carrier is deformed little or not at all, which is advantageous with regard to the fit.

In a further variant, the bristle material can interconnect. This is, for example, the case when all conventional extruded bristles or bristle bundles are formed from the same material or when materials related to one another are used. If, however, materials which are not compatible with one another are chosen, no interconnection is formed between the bristle materials.

The bristle material and the material of the bristle carrier are not connected as a rule, i.e. the materials are chosen in the majority of cases such they are not compatible with one another (no material closure is created). However, a positive locking closure can be formed, for example as a result of protruding structures such as journals or cylinders on the bristle carrier which are also melted and thus form anchors in each case for the melt carpet (so-called sacrificial structures).

In a further variant, bristle bundles that have already been completed are supplied and integrated into the bristle carrier (i.e. in the bristle holes or in sleeves in or on the bristle carrier). In this way melting of the bristle ends in the tool is no longer necessary or fixing can be effected by means of a safety shot (i.e. overmolding with little material or else with a full component).

Covering the Rear Side:

When overspraying or overmolding the head part, the bristle melt in particular is covered with soft material (preferred), with hard material or material for injected bristles. A better hold or better support of the melt carpet is ensured as a result.

The melt carpet has a sealing function during injection molding and prevents the cover material passing through the bristle carrier during the overmolding process. In this respect, the spray pressure must not be too high as otherwise, for example, overmolding could occur in the region of the bristles, i.e., for example, cover material passes (in an unwanted manner) between bristles and bristle carrier or breaks through the melt carpet.

The advantage of overmolding compared to the AFT method consists in that no cavity is formed between melt carpet and handle part. In addition, in general the spray pressure of soft material is lower than that of hard material such that fewer problems occur with overmolding when soft material is used.

After overmolding, the brush product is then ready for use.

In one process variant, the brush head, with the bristles already melted, is placed into an injection molding tool, i.e. a separate process is started with an injection molding machine besides the punching machine. This can be effected inline (direct link with the punching machine) or offline (process separate from the punching machine with intermediate storage). In the case of the inline process, the punching tool directly forms part of the injection molding machine.

The cover material is preferably compatible with the material of the handle body (i.e. the two materials enter into a material closure); however, it is basically also possible to provide a positive locking connection, e.g. by means of undercuts, recesses and overmolding.

The cover material, as a rule, is incompatible with the material of the bristle melt, i.e. these materials do not enter into a connection/material closure. However, the cover material can also include connecting aids which enable a connection to the material of the bristle melt.

The spray pressure for applying the cover material is between 200 bar and 1000 bar and preferably between 300 bar and 500 bar.

In a preferred manner, soft materials are used as cover material as they comprise lower processing pressures than hard materials in the majority of cases (more molding than injecting). It is also possible to use hard material components or materials for injected bristles, but they must have a very low processing pressure.

In principle, one-component or multi-component injection molding processes are possible (e.g. for different colors, safety shot and/or cleaning elements etc.).

A water-soluble polymer material can also be used for the covering which dissolves during use (i.e. in conjunction with water) or dissolves in part (as is described, for instance, in EP 1 639 913 A1). On the one hand, an active substance can be emitted in this way or else an indicator function can be realized (e.g. for a possible change of toothbrush head).

As a rule, however, soft materials are preferred, further soft materials can be taken from the above list.

In a further variant, a forming shot can be combined with the application of a water-soluble polymer material. In this case, the covering is initially injected in the form of the safety shot (it must not dissolve as it serves to protect the bristles) and the water-soluble polymer material is then injected as a forming shot.

In a further variant, a safety shot is carried out initially and then a forming shot (i.e. two injection molding procedures) for covering the rear side.

The bristle melt or the melt carpet is covered once again with the safety shot. The material (preferably soft material) is applied at low processing pressure. The aim is the fixing of the bristle melt or the bristles in relation to the bristle carrier, the safety shot can also include, for example, visible surfaces on the end product.

Overmolding or at least partial overmolding of the safety shot is then effected with the forming shot. A material can be applied here at a higher processing pressure as possible cracks in the melt carpet have already been sealed by the safety shot. Cleaning structures can also be formed on the front side or the rear side (for instance tongue cleaners) within the framework of the forming shot.

In yet another variant, the two-time injection molding can be carried out using the co-injection method. I.e. the covering and everything else are effected in one step in the same tool cavity. The first component (preferably a soft material) is injected at low pressure and represents quasi the safety shot. The second component is injected at high pressure (when the first component is already partially set and sealing) and represents quasi the forming shot. A special design or decoration and a special soft touch surface in the head region can be achieved in this way.

The co-injection method is applied, in particular, when the bristle carrier is formed in one piece with the basic body of the brush product. The injection point can be in the head part or in the handle part.

The present invention is demonstrated below as an example by way of preferred embodiments which are illustrated and described in the accompanying drawings.

In particular, the cleaning elements or bundle forms described in these preferred embodiments can also be used in other arrangements, sizes, embodiments or also on other brush head sizes and or forms and the cleaning elements or bundle forms can certainly differ in the position, quantity and number thereof on the bristle head without departing from the framework of the invention. For example, cleaning elements or bundle forms in FIGS. 1-55 and 97-99 can be designed not only as brush heads for manual toothbrushes, but, corresponding to size and head form, also designed as plug-in heads for electric toothbrushes or plug-in heads for facial brushes. It is obvious that the number, position, form and size of the cleaning elements or bristle forms must then be adapted to the head form or head size. In reverse, the cleaning elements or bristle forms in FIGS. 66-79 and 101-114 can not only be designed as brush heads for electric toothbrushes but, adapted in size and form, also as brush heads for manual toothbrushes or plug-in heads for facial brushes.

The figures are as follows:

FIGS. 1-5: show category A bristle carriers as examples;

FIGS. 6-9: show category B bristle carriers as examples;

FIGS. 10-13: show category C bristle carriers as examples;

FIGS. 14-19: show category D bristle carriers as examples;

FIGS. 20-24: show category E bristle carriers as examples;

FIGS. 25-28: show category F bristle carriers as examples;

FIG. 29: shows a category G bristle carrier as an example;

FIGS. 30-32: show category H bristle carriers as examples;

FIGS. 33-36: show category I bristle carriers as examples;

FIGS. 37-40: show category J bristle carriers as examples;

FIGS. 41-47: show category K bristle carriers as examples;

FIGS. 48-51: show category L bristle carriers as examples;

FIGS. 52-55: show category M bristle carriers as examples;

FIGS. 56*a-b*: show a cross-sectional representation of the mode of action of a preferred embodiment of a holding/pressing device according to the invention for the HT method;

FIGS. 57*a-b*: show a cross-sectional representation of the mode of action of an embodiment of a holding/pressing device according to the invention for the HT method for generating an inclined bundle;

FIGS. 58*a-b*: show a cross-sectional representation of the bristle carrier basic body with a material reservoir in the bristle carrier for generating a regular compartment;

FIGS. 59*a-b*: show a cross-sectional representation of the generation of a regular compartment in the basic body according to FIGS. 58*a-b;*

FIGS. 60*a-b*: show a cross-sectional representation of the generation of a compartment with a stronger center;

FIGS. 61*a-b*: show a cross-sectional representation of an embodiment for the HT method for generating an inclined bundle by means of an asymmetrical material reservoir;

FIGS. 62*a-b*: shows an embodiment of a bundle with the second component at the mounting end;

FIG. 63: shows exposed melt (produced using the AFT method);

FIG. 64: shows exposed melt (produced using the HT method);

FIG. 65: shows a tool for producing exposed melt (using the AFT method);

FIGS. 66-70: show (round) bristle carriers for single tuft toothbrushes as an example;

FIGS. 71-79: show (round) bristle carriers for nail lacquer applicators as an example;

FIGS. 80-84: show bristle carriers for mascara applicators as an example;

FIG. 85*a*: shows a perspective view of the front side of an embodiment of a basic body or handle body according to the invention with bristle carrier;

FIG. 85*b*: shows a perspective view of the rear side of the basic body or handle body according to the invention with bristle carrier according to FIG. 85*a;*

FIG. 85*c*: shows a top view of the front side of a basic body or handle body according to the invention with bristle carrier according to FIG. 85*a;*

FIG. 85*d*: shows a top view of the rear side of a basic body or handle body according to the invention with bristle carrier according to FIG. 85*b;*

FIG. 85*e*: shows a side view of a basic body or handle body according to the invention with bristle carrier according to FIG. 85*a;*

FIG. 85*f*: shows a cross-sectional view through a bristle carrier according to the invention along the line F-F in FIG. 85*c;*

FIG. 85*g*: shows a side cross-sectional view through a bristle carrier according to the invention along the longitudinal axis X in FIG. 85*c* (view of a detail);

FIG. 86*a*: shows a perspective view of the rear side of a basic body or handle body according to FIG. 85*b* with bristled bristle carrier and molten rear bristle ends;

FIG. 86*b*: shows a top view of the rear side of a basic body or handle body according to the invention according to FIG. 86*a;*

FIG. 86*c*: shows a cross-sectional view of a bristle carrier according to the invention according to FIG. 86*a* (only the cutting plane is shown);

FIG. 86*d*: shows a side cross-sectional view of a bristle carrier according to the invention according to FIG. 86*b* (only the cutting plane is shown);

FIG. 87*a*: shows a perspective view of the front side of a brush product according to the invention with covering;

FIG. 87*b*: shows a perspective view of the rear side of a brush product according to the invention with covering according to FIG. 87*a;*

FIG. 87*c*: shows a top view of the front side of a brush product according to the invention according to FIG. 87*a;*

FIG. 87*d*: shows a top view of the rear side of a brush product according to the invention according to FIG. 87*a;*

FIG. 87*e*: shows a side view of a finished brush product according to the invention according to FIG. 87*a;*

FIG. 87*f*: shows a cross-sectional view of bristle carrier according to the invention according to FIG. 87*a* (only the cutting plane is shown);

FIG. 87*g*: shows a side cross-sectional view of bristle carrier according to the invention according to FIG. 87*a* (only the cutting plane is shown);

FIG. 88*a*: shows a perspective view of the rear side of a bristle carrier according to the invention which has been produced separately from the basic body or handle body;

FIG. 88b: shows a perspective view of the rear side of a bristle carrier according to the invention according to FIG. 88a with bristling and molten rear bristle ends;

FIG. 88c: shows a perspective view of the rear side of a bristle carrier according to the invention according to FIG. 88b with covering;

FIG. 88d: shows a perspective view of the front side of a basic body or handle body according to the invention which has been produced separately from the bristle carrier;

FIG. 88e: shows a perspective view of the front side of a basic body or handle body according to the invention with mounted bristle carrier;

FIG. 89a: shows a perspective view of the rear side of a further embodiment according to the invention with a split head part or bristle carrier;

FIG. 89b: shows a perspective view of the rear side of the split head part or bristle carrier according to FIG. 89a with bristling and molten rear bristle ends;

FIG. 89c: shows a perspective view of the rear side of the split head part or bristle carrier according to FIG. 89b with covering;

FIG. 89d: shows a top view of the rear side of yet another embodiment according to the invention with a cloverleaf-shaped head part or bristle carrier;

FIG. 90a: shows a perspective view of the rear side of yet another embodiment according to the invention with a portion with reduced material strength in the head part or bristle carrier;

FIG. 90b: shows a perspective view of the rear side of the head part or bristle carrier according to FIG. 90a, the region with reduced material strength having been filled out with cover material or soft material (with damping elements at the edge);

FIG. 90c shows a side cross-sectional view along the line B-B in FIG. 90b;

FIG. 91a: shows a side cross-sectional view of yet another embodiment according to the invention with a bristle carrier which is undulated in the longitudinal direction (only the cutting plane is shown);

FIG. 91b: shows a side cross-sectional view of the bristle carrier according to FIG. 91a with variably oriented bristling and undulated covering (only the cutting plane is shown);

FIG. 91c: shows a side cross-sectional view of yet another embodiment according to the invention with a bristle carrier which arches convexly in the longitudinal direction (only the cutting plane is shown);

FIG. 91d: shows a side cross-sectional view of the bristle carrier according to FIG. 91c with bristling and undulated covering (only the cutting plane is shown);

FIG. 92: shows yet another embodiment according to the invention analogous to FIG. 91d, the bristle carrier being surrounded all round by cover or soft material (i.e. also at the edge and on the front side) (only the cutting plane is shown);

FIG. 93a: shows yet another embodiment according to the invention with cleaning elements produced from cover or soft material realized on the sides of the bristle carrier (only the cutting plane is shown);

FIG. 93b: shows yet another embodiment according to the invention similar to FIG. 93a, the bristle carrier being surrounded all round by cover or soft material (but without lateral cleaning elements) (only the cutting plane is shown);

FIG. 93c: shows yet another embodiment according to the invention similar to FIG. 93a, the outer edge of the bristle carrier being surrounded for instance only up to half the height of the boundary edge by cover or soft material (without lateral cleaning elements) (only the cutting plane is shown);

FIG. 93d: shows a side cross-sectional view of the embodiment according to FIG. 93c (only the cutting plane is shown);

FIG. 94a: shows a side cross-sectional view of a first tool half of a tool for producing brush products according to the invention with bristle recesses and (stationary) pins;

FIG. 94b: shows a side cross-sectional view of a first tool half according to FIG. 94a with bristle carrier or head plate inserted;

FIG. 94c: shows a side cross-sectional view of a first tool side according to FIG. 94b with bristle bundles inserted;

FIG. 94d: shows a side cross-sectional view of a first tool half according to FIG. 94c with molten bristle ends;

FIG. 94e: shows a side cross-sectional view according to FIG. 94d with the second tool half mounted with an injection molding cavity;

FIG. 94f: shows a side cross-sectional view according to FIG. 94e with injected covering;

FIG. 95: shows the sequence of the method according to the invention for the variant where the basic body or handle body of the brush product is injected together with the bristle carrier (i.e. in one piece);

FIG. 96: shows the sequence of the method according to the invention for the variant where the basic body or handle body of the brush product and the bristle carrier are produced or injected separately from one another (initially in two separate parts) and are subsequently joined together;

FIG. 97a-d: show a further category F bristle carrier for a manual toothbrush or for a sonic toothbrush as an example;

FIG. 98a-d: show a further category L bristle carrier for a manual toothbrush or for a sonic toothbrush as an example;

FIG. 99a-d: show a further category K bristle carrier for a manual toothbrush or for a sonic toothbrush as an example;

FIG. 100: shows a further bristle carrier for a manual toothbrush or for a sonic toothbrush as an example with a combination of various long bundles;

FIGS. 101-115: show further bristle carriers for an oscillating electric toothbrush as examples;

FIGS. 1 to 5 show category A bristle carriers as examples.

Figure 6:
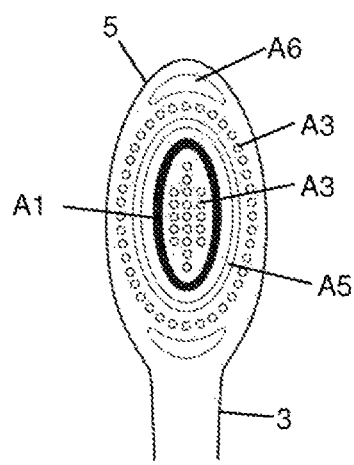

FIG. 1 illustrates a head part 2 for a toothbrush which includes a bristle carrier 5 and a neck part 3. The bristle carrier 5 comprises a longitudinal axis $X_{LT}$ and a transverse axis $X_{QT}$. The two axes intersect at the intersection point $S_P$.

To the left of the longitudinal axis $X_{LT}$ is substantially the left-hand carrier region, to the right of the longitudinal axis $X_{LT}$ is substantially the right-hand carrier region, above the transverse axis $X_{QT}$ is substantially the upper carrier region and below the transverse axis $X_{QT}$ is substantially the lower carrier region. The central carrier region is spanned substantially around the point of intersection $S_P$ between the two axes. It is obvious that the individual carrier regions comprise overlaps and are thus able to be divided in a finer manner, for instance into the left-hand upper, the left-hand middle, the left-hand lower, the right-hand lower, the right-hand middle and the right-hand lower carrier regions. The central carrier region can also extend into the upper, the lower and the right-hand and left-hand carrier regions in dependence on the individual case. The central carrier region, however, can also be defined in a compressed manner when, for instance, large surface bundle groups are arranged in the upper and lower carrier regions. The central region can also be compressed in the same way longitudinally when large surface bundle groups are arranged, for instance, in the left-hand and right-hand carrier regions. These statements apply to all the embodiments of the bristle carrier according to the invention shown in the following figures.

The bundles shown in the figures can deviate in form and size without departing from the framework of the invention. Essential to an optimum cleaning and care performance is the corresponding arrangement.

In the case of the bristle carrier 5 shown FIG. 1, mini bundles A3, which are correspondingly arranged in a formation or edging of the puck bundle, are provided following the outside contour of the bristle carrier. Puck bundles A2, which between them define a central carrier region, which comprises four soft elements arranged in a circular form and/or a formation of injection bristles A1, which once again surround a conventional bundle A6, are arranged in the upper and lower carrier regions in a mirror-symmetrical manner to the axes. The soft elements lie within the formation of mini bundles and between 2 puck bundles. A conventional bristle bundle lies between both puck bundles.

FIG. 2 illustrates a bristle carrier 5 which comprises puck bundles A2, which are arranged in a mirror symmetrical manner to one another in the upper and lower carrier regions. The puck bundles A2, in this case, comprise an approximately cone-shaped design with an upper or lower rounding (which each follow the outer contour). Mini bundles A3, which also reach into the left-hand and right-hand central regions, are arranged in a formation in the central carrier region between the two puck bundles A2. Soft elements and/or formations of injected bristles A1 are arranged in the spaces to the left and the right above and to the left and the right below the mini bundles A3. The formation of mini bundles is surrounded in part by soft elements and/or injected bristles.

The description of the geometric form(s) of the individual groups of cleaning elements always refers, apart from this, to the top view shown in the figures.

FIG. 3 illustrates a bristle carrier 5 which once again comprises a puck bundle A2 in each case in the upper and in the lower carrier regions, both puck bundles A2 comprising a recess 51 in which soft elements and/or formations of injected bristles A1 are arranged. A formation of mini bundles A3, which extend into the left-hand and right-hand central carrier regions, are arranged in the central carrier region between the two puck bundles A2. The formation consisting of mini bundles assumes a considerable proportion of the free space between the puck bundles.

FIG. 4 once again shows another bristle carrier 5 which comprises a puck bundle A2 in the central carrier region. Soft elements and/or formations of injected bristles A1, which when viewed together once again form a formation, are arranged in the spaces between the individual open recesses of the puck bundles A2. Mini bundles A3 are arranged following the contour above and below these two formations. Conventional bundles A6, which each follow at least in part the contour of the tip of the bristle carrier or the contour of the transition to the neck part 3, are arranged in each case in the frontmost and in the rearmost carrier regions. The puck bundle is arranged between conventional bundles. Mini bundles and soft elements and/or formations of injected bristles are arranged between conventional bundles and puck bundles. Soft elements and/or formations of injected bristles are arranged between the mini bundles and the puck bundle.

The bristle carrier 5 shown in FIG. 5 comprises in each case in the upper and in the lower carrier regions a puck bundle A2 which is realized with a recess which is open toward the center of the bristle carrier. The two puck bundles A2 thus span a central carrier region between them, in which soft elements (or a soft element) and/or injected bristles A1 are arranged, which is at least partially surrounded by mini bundles A3 in the left-hand and in the right-hand carrier regions. The diamond-shaped configuration specifically includes three diamond elements connected together in the longitudinal direction. The soft elements (or a soft element) and/or injected bristles are surrounded in part by mini bundles and in part by puck bundles.

FIGS. 6 to 9 show category B bristle carriers as examples.

In this case, FIG. 6 illustrates a bristle carrier 5, which, in the central carrier region, comprises a soft element with a recess (or a soft element) and/or injected bristles A1 which enclose a formation of mini bundles A3. The soft element (or the one soft element) and/or injected bristles A1 are enclosed in turn by a larger, closed long bundle A5. This is once again enclosed by a formation of mini bundles A3 which, in turn, realize an edging. Conventional bundles A6, which are aligned or curved in the direction of the tip of the bristle carrier or in the direction of the neck part 3, are arranged again in each case in the frontmost and in the rearmost carrier regions.

Figure 7:
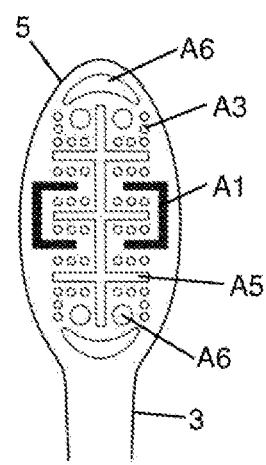

FIG. 7 then illustrates a bristle carrier 5 which comprises a centrally arranged, fishbone-shaped long bundle A5 which extends into the upper and into the lower carrier regions. The long bundle A5, in this case, comprises side arms which are spaced apart from one another. Individual side arms are surrounded in each case at least in part by soft elements and/or injected bristles in the left-hand and the right-hand central carrier regions. Mini bundles A3 can be additionally arranged between the individual side arms of the long bundle A5, as also between the central side arms and the soft elements and/or injected bristles. In addition, conventional bundles A6 are arranged in again each case in the uppermost and lowermost carrier regions. Further conventional bundles A6 and further formations of mini bundles A3 are additionally provided between said arcuate conventional bundles A6 and the upper or lower side arms of the long bundle A5, the arrangements being realized in each case in a mirror symmetrical manner here too. The mini bundles are arranged between the side arms of the long bundle. The long bundle runs between conventional bundles. The long bundle additionally runs in a preferred manner between soft elements and/or injected bristles.

Figure 8:
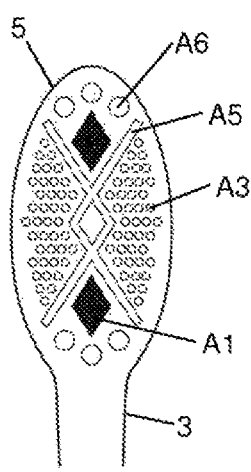

The bristle carrier 5 shown in FIG. 8 initially comprises a centrally arranged, long bundle A5 which realizes a substantially x-shaped configuration with a closed form in the middle. Mini bundles A3 are arranged to the left and right of the x-shaped, long bundle A5 going substantially as far as the outer contour of the bristle carrier. Soft elements and/or formations of injected bristles A1 are arranged in each case in the upper and lower spaces in the x-shaped long bundle A5. In contrast to the diamond of the x-shaped long bundle A5, which leaves a central space, the soft elements and/or injected bristles A1 arranged in a diamond-shaped manner are without space, i.e. are designed in a substantially full-surface manner. Circular, conventional bundles A6 are arranged on an arched curve in each case in the uppermost and in the lowermost carrier regions. The long bundle is arranged between conventional bundles. The long bundle is arranged between mini bundles. The long bundle is arranged between soft elements and/or injected bristles A1. The long bundle has a closed recess and has multiple free arms.

Figure 9:
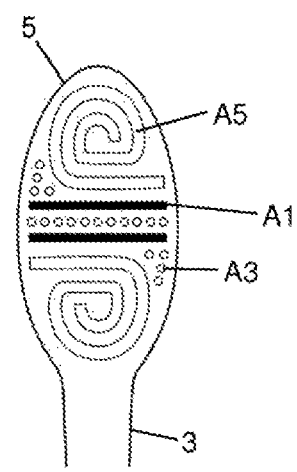

FIG. 9 illustrates a bristle carrier 5 which comprises in the upper and in the lower carrier regions in each case a spiral or helical long bundle A5, said two helical long bundles A5 being arranged in a point symmetrical manner to one another. Two elongated, parallel lines of soft elements and/or injected bristles A1 are provided in the central carrier region. The spiral or helical long bundle follows at least in part the outer contour of the brush head. Mini bundles A3 are arranged between said two parallel lines and in the left-hand upper carrier region and in the right-hand lower carrier region between the helical long bundle A5 and the soft elements and/or injected bristles A1. Soft elements are arranged between the long bundles. Mini bundles are additionally arranged in a preferred manner between the long bundles.

FIGS. 10 to 13 show category C bristle carriers as examples.

Figure 10:
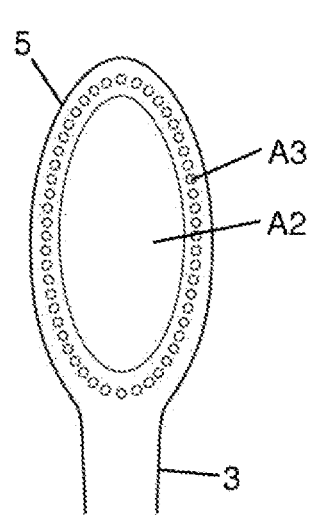

FIG. 10 provides a bristle carrier 5 with a large, centrally arranged, oval puck bundle A2. Mini bundles A3 are arranged around said puck bundle A2 in an oval formation which follows the outer contour of the bristle carrier 5.

Figure 11:
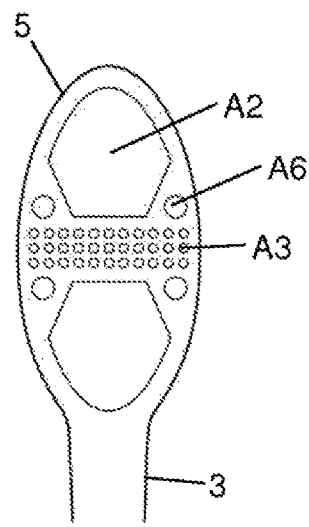

FIG. 11 illustrates a bristle carrier 5 which comprises a puck bundle A2 in each case in the upper and in the lower carrier region. The two puck bundles A2 are realized in an approximately cone-shaped manner, with an upper or lower rounding (cf. FIG. 2). A formation of mini bundles A3, which also extends into the left-hand and right-hand middle carrier regions, is provided in the central carrier region between the two puck bundles A2. Circular, conventional bundles A6 are still provided in each case on the left-hand and right-hand side above and below the rectangular formation of mini bundles A3.

Figure 12:
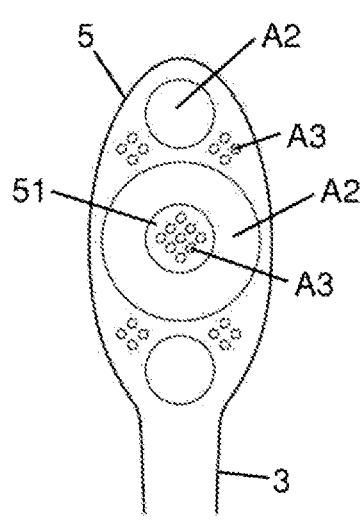

The bristle carrier 5 according to FIG. 12 comprises a centrally arranged circular ring-shaped or donut-shaped puck bundle A2. A formation of mini bundles A3 is provided in the recess 51 formed by the donut-shaped puck bundle A2. A smaller puck bundle A2 is provided in each case above and below the donut-shaped puck bundle A2 (as an alternative to this, a larger conventional bundle A6 can also be provided here) and in each case even smaller formations of mini bundles A3 being provided in the left-hand and right-hand upper and in the left-hand and right-hand lower regions.

Figure 13:
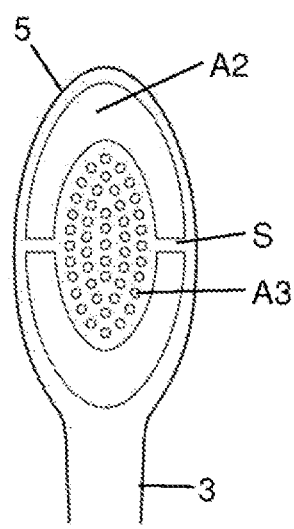

FIG. 13 illustrates a bristle carrier 5 with two puck bundles A2, open on one side, in the lower and upper carrier regions, which are arranged in a mirror symmetrical manner to one another. A formation of mini bundles A3 is arranged in the central carrier region which is enclosed by them. The gap S between the horseshoe ends remains unoccupied.

FIGS. 14 to 19 show category D bristle carriers as examples.

Figure 14:
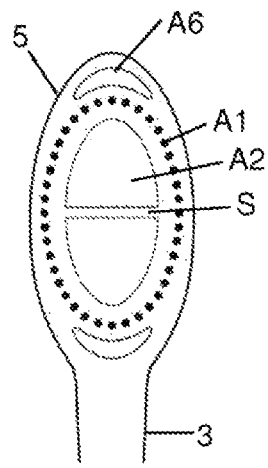
Figure 15:
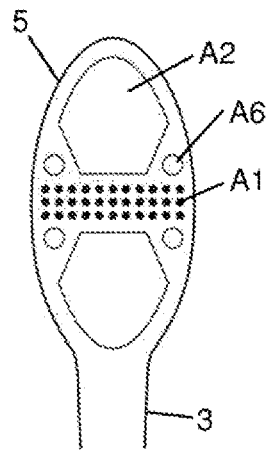

The bristle carrier 5 according to FIG. 14 includes two semi-oval-shaped puck bundles A2 which are arranged in the central carrier region and are separated from one another by a gap S. The gap S remains unoccupied. An oval formation or edging of soft elements and/or injected bristles A1 is provided around the two semi-oval-shaped puck bundles A2. A conventional bundle A6 is arranged in each case in the frontmost and in the rearmost carrier regions. Soft elements and/or injected bristles are mounted between the puck bundles and the conventional bundles.

The bristle carrier 5 according to FIG. 15 once again includes two puck bundles A2 each with an upwardly or downwardly directed rounding (cf. FIG. 2). A formation of soft elements and/or injected bristles A1 is provided in the central region between the two mirror-symmetrically arranged puck bundles A2. Another point-shaped, conventional bundle A6 is provided in each case in the left-hand and right-hand upper and in the left-hand and right-hand lower regions of the rectangular formation of soft elements and/or injected bristles A1. Soft elements and/or injected bristles lie between the puck bundles.

Figure 16:
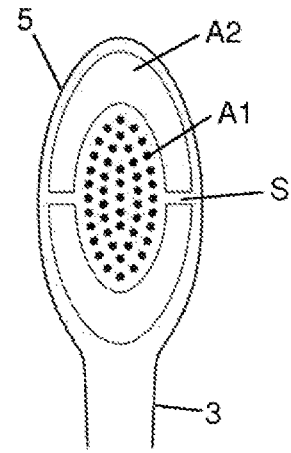

The bristle carrier, which is illustrated in FIG. 16, comprises two puck bundles A2 which are open on one side, one in the upper carrier region and one in the upper carrier region, which define an oval central carrier region in which a formation of soft elements and/or injected bristles A1 is arranged. The gap S between the puck bundles remains unoccupied. The formation of soft elements and/or injected bristles is surrounded substantially by puck bundles.

Figure 17:
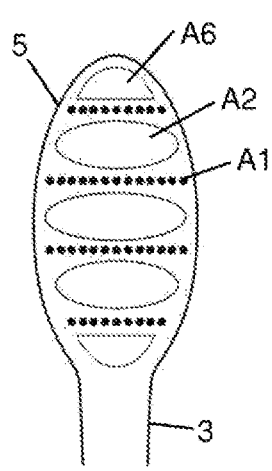

The bristle carrier 5 according to FIG. 17, when viewed from top to bottom, includes one conventional bundle A6, multiple pack bundles A2 which extend in the direction of the transverse axis of the carrier and one lower conventional bundle A6. The conventional bundles A6 and the puck bundles A2, in this case, are separated from one another in each case by a formation of soft elements and/or injected bristles A1. The multiple puck bundles distributed on the brush head are separated from one another by a formation of soft elements and/or injected bristles A1.

Figure 18:
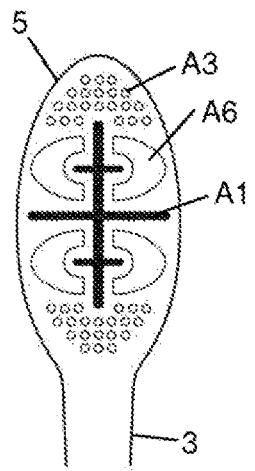

The bristle carrier, which is illustrated in FIG. 18, initially comprises centrally arranged, antennae-shaped soft elements (or a soft element) and/or injected bristles. The antennae form consists substantially of cross-shaped protruding arms. The two cross-shaped geometries, in this case,—when viewed in the transverse direction—are surrounded in each case by two conventional bundles A6 which are open on one side. Formations of mini bundles A3 are arranged in the upper and in the lower carrier regions. The soft elements (or a soft element) and/or injected bristles are arranged between formations of mini bundles.

Figure 19:
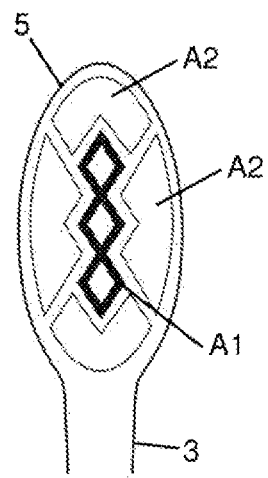

The bristle carrier 5 shown in FIG. 19 initially includes a formation of soft elements (or a soft element) and/or injected bristles A1. In said design form, they are designed in the form of three diamonds connected together in the longitudinal direction, the diamonds each forming an unoccupied space. As an alternative, the space can be occupied with a cleaning element described in this document. Multiple puck bundles A2 are arranged around said diamond formation. In the outside contour thereof, they form approximately an oval or follow the outer contour of the bristle carrier. On the inside thereof, however, they follow the formation of the soft elements (or the soft element) and/or of the injected bristles A1.

FIGS. 20 to 24 show category E bristle carriers as examples.

Figure 20:
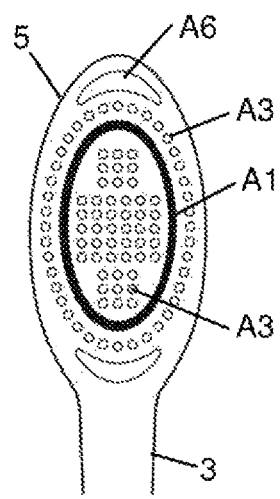

The bristle carrier 5 shown in FIG. 20 includes a centrally arranged, thin, closed soft element (or a soft element) and/or a formation of injected bristles A1, which surrounds a formation of mini bundles A3. An oval of mini bundles A3 is once again arranged around the oval produced from soft elements (or a soft element) and/or injected bristles A1. A conventional bundles A6 is arranged in each case on the frontmost and on the rearmost end of the bristle carrier 5. The soft element and/or a formation of injected bristles surrounds a formation of mini bundles. The soft element and/or a formation of injected bristles are additionally surrounded in a preferred manner by mini bundles.

Figure 21:
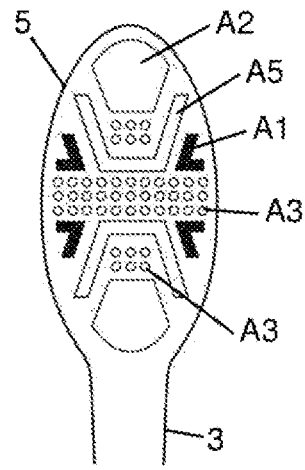
Figure 22:
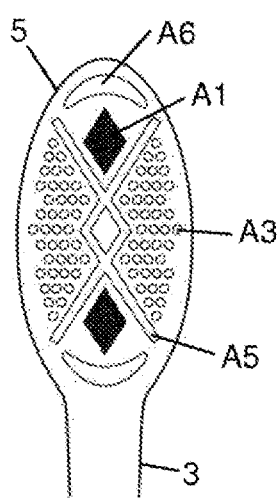

The bristle carrier 5 according to FIG. 21 includes in the central carrier region a formation of mini bundles A3 which extends into the left-hand and right-hand central carrier regions. An outwardly open C-profile-like long bundle A5 is additionally arranged in each case in a mirror-symmetrical manner to the transverse axis and protruding outwardly (i.e. to the front or rear) in the upper and in the lower carrier regions, a formation of mini bundles A3 being arranged in each case within said long bundle A5. A smaller puck bundle A2, having in each case a rounding which follows the outer contour of the bristle carrier or the outer contour of the half-side lower end of the bristle carrier, is once again arranged in each case in the uppermost and in the lowermost carrier regions. Soft elements and/or formations of injected bristles A1 are provided to the left and right above and to the left and right below the rectangular formation of mini bundles A3. Long bundles are arranged between formations of mini bundles. Long bundles are additionally arranged in a preferred manner between puck bundles.

The bristle carrier 5 according to FIG. 22 initially once again comprises an X-shaped long bundle A5 which forms a diamond with an unoccupied space in the central part thereof. Soft elements (or a soft element) and/or injected bristles A1 are provided in each case in the upper and in the lower spaces of the X-shaped long bundle A5. The long bundle forms, in the center, a space which can be empty or can be occupied by a cleaning element. Formations of mini bundles A3 are arranged up to the left-hand and right-hand outer contour of the bristle carrier 5 in the left-hand and right-hand spaces of the X-shaped long bundle A5. A conventional bundle A6 is arranged in each case in the uppermost and in the lowermost carrier regions. Mini bundles are arranged between the protruding arms of the long bundle. Further soft elements (or a soft element) and/or injected bristles A1 are preferably provided between protruding arms of the long bundle.

Figure 23:
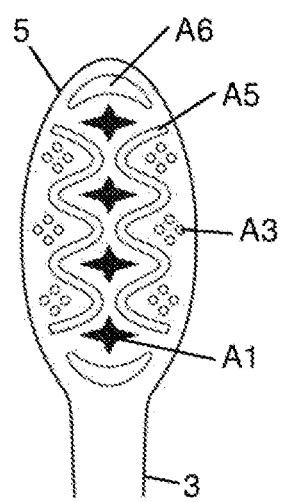
Figure 24:
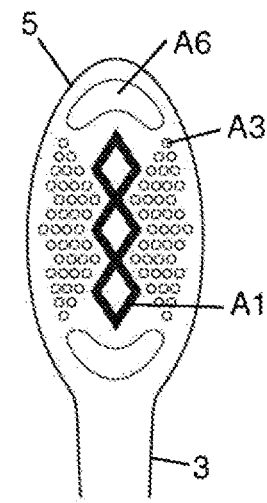

FIG. 23 illustrates a bristle carrier 5 which comprises multiple soft elements and/or formations of injected bristles A1 along the longitudinal axis of the bristle carrier. A wave-shaped long bundle A5 is situated in each case between the spaces to the left and to the right of said soft elements and/or injected bristles A1, following the star formations, both long bundles A5 being arranged in a mirror-symmetrical manner to one another. Small formations of mini bundles A3 are arranged in each case in the outwardly lying spaces of the wave-shaped long bundle A5. A conventional bundle A6 is arranged in each case in the uppermost and in the lowermost carrier regions. Soft elements and/or formations of injected bristles are situated between the two long bundles. They project into the spaces of the wave-shaped long bundles. Mini bundles are situated in the spaces.

The bristle carrier 5 shown in FIG. 24 once again comprises a centrally arranged soft element (or a soft element) and/or injected bristles A1. Said element assumes a diamond formation which specifically consists of three interconnected diamonds which in each case surround an unoccupied space. One or multiple spaces can be occupied by cleaning elements. Formations of mini bundles A3 are arranged up to the left-hand and right-hand outer contour of the bristle carrier 5 to the left and right of the diamond formation. A somewhat larger conventional bundle A6 is arranged in each case in the lower and in the upper carrier regions.

FIGS. 25 to 28 show category F bristle carriers as examples.

Figure 25:
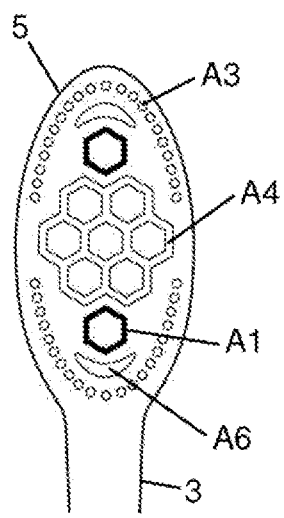

FIG. 25 shows, in this case, a bristle carrier 5 with a centrally arranged grid bundle A4 which is composed of multiple honeycomb-shaped, polygonal structural elements. The spaces formed by the honeycomb-shaped structural elements are unoccupied. The spaces could be occupied as an option by cleaning elements or formations of cleaning elements (or a soft element) and/or injected bristles A1 is realized in each case above and below the grid bundle A4. A conventional bundle A6 is once again arranged in each case above and below said individual single honeycomb form. In addition, mini bundles A3 form a proportion of the outer contour in the upper and in the lower carrier region. The grid bundles are arranged between soft elements (or a soft element) and/or injected bristles A1. The grid bundles are additionally arranged in a preferred manner between mini bundles.

Figure 26:
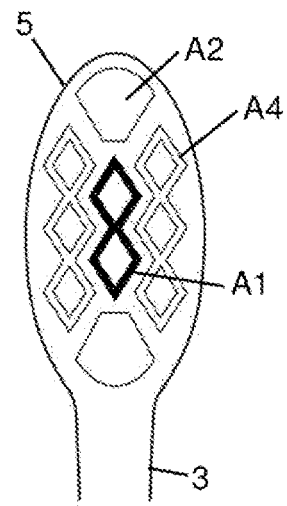

The bristle carrier 5 illustrated in FIG. 26 includes in the central region a diamond formation of soft elements (or a soft element) and/or injected bristles A1 which, in the present case, is realized by two diamonds that are interconnected in the longitudinal direction, the diamonds surrounding in each case an unoccupied space. The space can be occupied with cleaning elements as an option. A diamond formation, produced from a grid bundle A4 which includes in each case three diamond structural elements which are interconnected in the longitudinal direction and also surround an unoccupied space, is arranged in each case on the left-hand and on the right-hand side of said diamond formation produced from soft elements and/or injected bristles A1. Said spaces can also be occupied by cleaning elements as an option. The two grid bundles A4 are arranged in a mirror-symmetrical manner to one another and the central diamond structural element projects into the space between the two diamonds produced from soft elements (or a soft element) and/or injected bristles A1. A smaller puck bundle A2, which comprises a rounding which follows the outer contour of the tip of the bristle carrier or the contour of the lower neck-side end of the bristle carrier 5, is arranged in the upper and in the lower bristle carrier regions. The soft elements (or a soft element) and/or injected bristles A1 are situated between the grid bundles. The grid bundles lie between two puck bundles.

Figure 27:
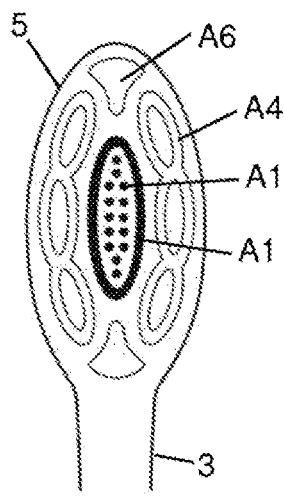

FIG. 27 additionally illustrates a bristle carrier 5 which comprises, in the central region, a thin soft element and/or a formation of injected bristles A1 which surround a space which is occupied by further soft elements and/or injected bristles A1. A grid bundle A4, which is formed from oval-shaped, interconnected ring structural elements and in each case follows the outer contour of the bristle carrier, is provided in each case on the left-hand and on the right-hand side. Another conventional bundle A6 is provided finally in the upper and in the lower carrier regions.

Figure 28:
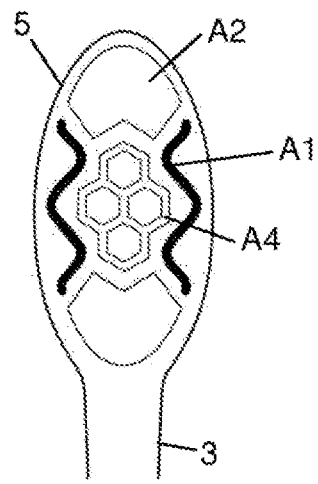

The bristle carrier 5 illustrated in FIG. 28 comprises a centrally arranged grid bundle A4 which is composed of honeycomb-shaped, polygonal structural elements. Puck bundles A2, which each follow the upper or lower honeycomb structure at the inwardly directed end thereof and follow the outer contour of the bristle carrier 5 at the end thereof directed outwardly or to the neck part, are arranged in each case above and below the honeycomb-shaped grid bundle A4. An undulated element produced from soft elements (or a soft element) and/or formations of injected bundles A1, which follows the honeycomb structure on the inside, is arranged to the side of the honeycomb-shaped grid bundle A4 on the left and the right in each case.

Figure 29:
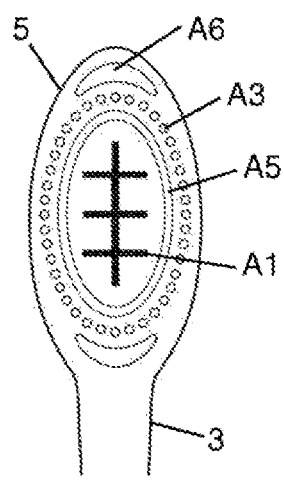

FIG. 29 finally shows a category G bristle carrier 5 which initially comprises a centrally arranged fishbone-shaped formation of soft elements (or a soft element) and/or a formation of injected bundles A1. This is surrounded by an oval, closed, thin long bundle A5 which is surrounded, in turn, by an oval formation of mini bundles A3. A conventional bundle A6 is once again arranged in each case on the uppermost and on the lowermost end of the bristle carrier 5.

Figure 30:
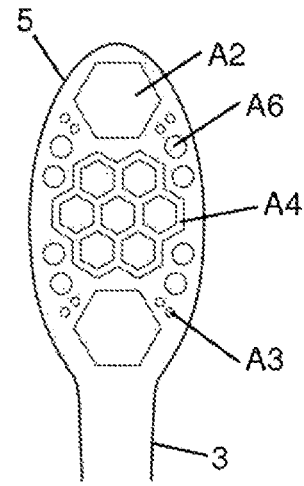
Figure 31:
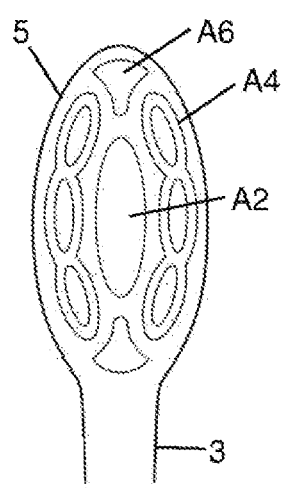
Figure 32:
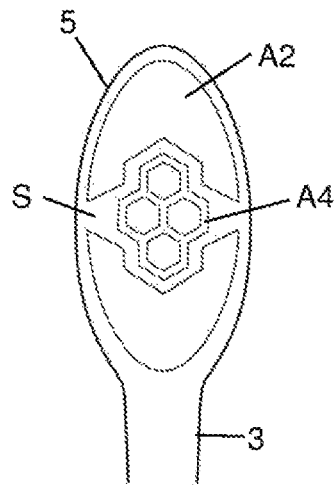

FIGS. 30 to 32 show category H bristle carriers as examples.

FIG. 30, in this case, shows a bristle carrier 5 which comprises a centrally arranged grid bundle A4 which is composed of multiple honeycomb-shaped structural elements. The spaces in the structural elements can be occupied by cleaning elements as an option. A puck bundle A2 is arranged in each case above and below the grid bundle A4. More mini bundles A3 and point-shaped conventional bundles A6 are arranged in each case in the remaining spaces in the left-hand and right-hand upper and in the left-hand and right-hand lower regions of the bristle carrier 5.

The bristle carrier 5 shown in FIG. 31 corresponds substantially to the bristle carrier 5 shown in FIG. 27 with the difference that an oval puck bundle A2 is arranged in the central region thereof. The puck bundle lies between the grid bundles.

The bristle carrier 5 shown in FIG. 32 corresponds substantially to the bristle carrier 5 shown in FIG. 28 with the difference that no undulated soft elements and/or formations of injected bristles A1 are provided here and consequently the puck bundles A2 extend in each case somewhat further in the direction of the transverse axis, the gap S formed between remaining unoccupied. The grid bundle lies between the puck bundles.

FIGS. 33 to 36 now show category I bristle carriers as examples.

Figure 33:
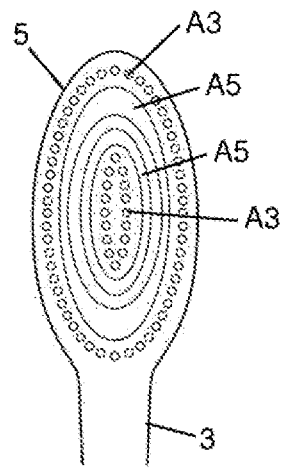

The bristle carrier 5 shown in FIG. 33 initially includes a centrally arranged, oval, closed long bundle A5, in the space of which a formation of mini bundles A3 is arranged. Said long bundle A5 is surrounded by a further oval long bundle A5 which is surrounded, in turn, once again by an oval formation of mini bundles A3. The larger long bundle has a changing cross section, specifically at the upper and lower extremities. The long bundles are surrounded by formations of mini bundles.

Figure 34:
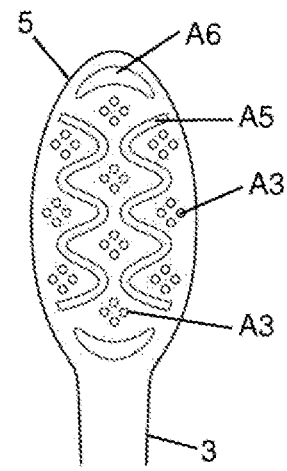

The bristle carrier 5 illustrated in FIG. 34 corresponds substantially to the bristle carrier shown in FIG. 23 with the difference that no soft elements and/or injected bundles A1 are provided here along the longitudinal axis, but rather small formations of mini bundles A3. Mini bundles are arranged anew in the openings of the long bundle.

Figure 35:
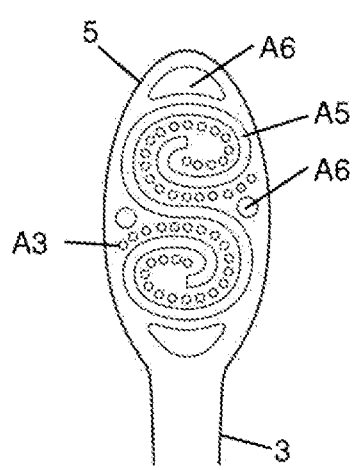

FIG. 35 illustrates a bristle carrier 5 which comprises a centrally arranged long bundle A5 in the form of a point symmetrical (or working in the opposite direction) twin screw or twin spiral. Mini bundles A3 follow the contour of the twin screw in each case on the inside. A circular conventional bundle A6 is arranged in each case in the left-hand and right-hand central regions of the bristle carrier 5. A conventional bundle A6 is provided once again in each case in the uppermost and in the lowermost carrier regions.

Figure 36:
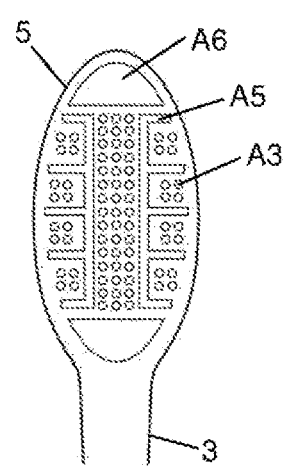

The bristle carrier 5 shown in FIG. 36 includes a formation of mini bundles A3, which are aligned along the longitudinal axis and on which an outwardly directed comb-shaped long bundle A5 is arranged in each case on the left-hand and right-hand sides. Further formations of mini bundles A3 are arranged in each case in the spaces defined by the two comb-shaped long bundles A5. A conventional bundle A6 is arranged in each case, for instance, in the upper and in the lower carrier region.

FIGS. 37 to 40 illustrate category J bristle carriers as examples.

Figure 37:
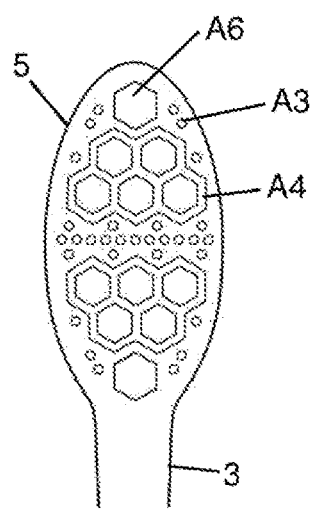

FIG. 37 illustrates a bristle carrier 5 which comprises a grid bundle A4 with honeycomb-shaped structural elements in each case in the upper and lower carrier parts thereof. Mini bundles A3 in, for instance, fishbone-like formations are arranged along the transverse axis of the bristle carrier 5. Another honeycomb-shaped or hexagonal conventional bundle A6 and, where applicable, more individual mini bundles A6 are arranged in each case in the upper and in the lower carrier regions.

Figure 38:
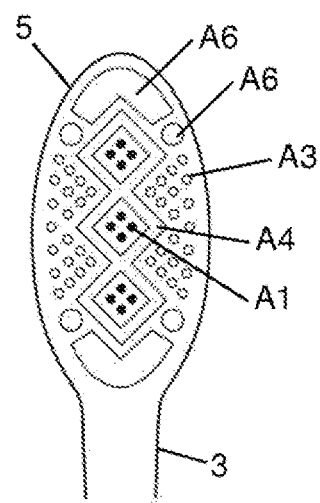

FIG. 38 illustrates a bristle carrier 5 with a centrally arranged grid bundle A4 in the form of three diamond structures which are interconnected in the longitudinal direction and in the spaces of which, in each case, soft elements and/or formations of injected bristles A1 are arranged. Formations of mini bundles A3 are provided to the left and right of the grid bundle A4 up to the outer contour of the bristle carrier 5. A conventional bundle A6, which follows the contour of the grid bundle A4 in the inside thereof, is provided in each case in the uppermost and in the lowermost carrier regions. Another point-shaped, conventional bundle A6 is provided in each case in the left-hand and right-hand upper and in the left-hand and right-hand lower regions of the bristle carrier 5 between the conventional bundles A6 and the mini bundles A3. Conventional bundles serve in general for filling smaller gaps between larger bundles or bundle formations.

Figure 39:
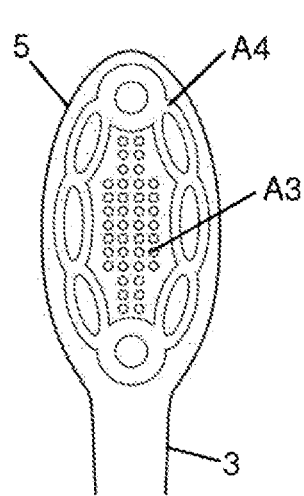

The bristle carrier 5 according to FIG. 39 comprises a grid bundle A4 which is formed from ring-shaped or (oval) chain-shaped structural elements and runs along the outer contour of the bristle carrier 5. The grid bundle is closed and forms a space in the center. The grid bundle A4 surrounds a formation of mini bundles A3 in the central region. The spaces surrounded by the individual structural elements of the grid bundle A4 remain unoccupied but can also be occupied by cleaning elements as an option.

Figure 40:
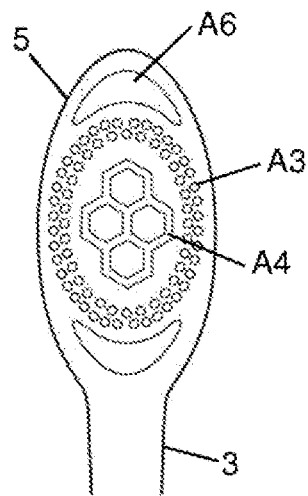

The bristle carrier 5 according to FIG. 40 comprises, in the central region thereof, a grid bundle A4 which is composed of honeycomb-shaped structural elements and is surrounded by a closed formation of mini bundles A3. The formation of mini bundles forms a space in the center. The space is occupied by a cleaning element, specifically here by a grid bundle. An arcuate conventional bundle A6 is arranged in each case in the upper and in the lower carrier regions.

FIGS. 41 to 47 now show category K bristle carriers as examples.

Figure 41:
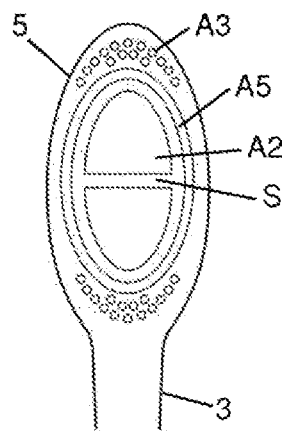

The bristle carrier 5 according to FIG. 41 comprises, in the central region thereof, two puck bundles A2 which are arranged mirror-symmetrically to one another and which realize a transversely extending gap S between them, which remains unoccupied. A closed long bundle A5 extends around the semi-oval-shaped puck bundle A2. Formations of mini bundles A3, which follow the contour of the bristle carrier or of the neck-side end of the bristle carrier, are arranged in each case on the upper carrier region and in the lower carrier region. The puck bundles are situated in the central space that is formed by the long bundle.

Figure 42:
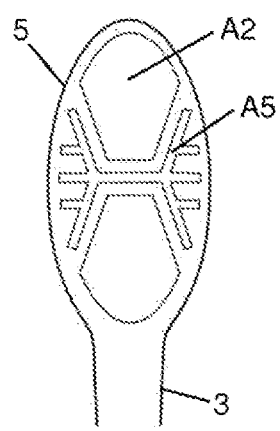

The bristle carrier according to FIG. 42 includes a puck bundle A2 which comprises a rounding, which follows the outside contour of the tip of the bristle carrier or the outside contour of the neck-side end of the bristle carrier 5 part 3, in each case in the upper and in the lower carrier regions. An antenna-shaped long bundle A5 having outwardly protruding projections which reach, for instance, up to the outer contour of the bristle carrier 5, extends along the transverse axis of the bristle carrier both in the central left-hand and right-hand regions of the bristle carrier. The long bundle lies between the puck bundles.

Figure 43:
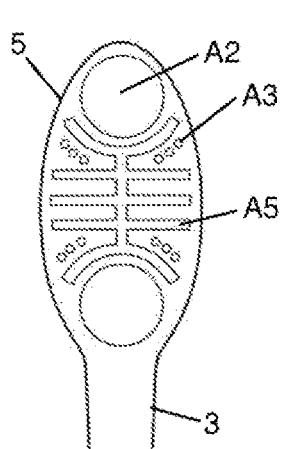

FIG. 43 illustrates a bristle carrier 5 having a centrally arranged long bundle A5 in fishbone form, which still comprises in each case at the upper and the lower ends thereof geometry that follows the puck bundle. A circular puck bundle A2, which follows the geometry of the long bundle A5 and the outside contour of the bristle carrier, is arranged in each case in the upper and in the lower carrier regions. Mini bundles A3 in the form of an arc are arranged between the crescent-shaped geometry of the long bundle A5 and the bones of the long bundle A5 lying the closest.

Figure 44:
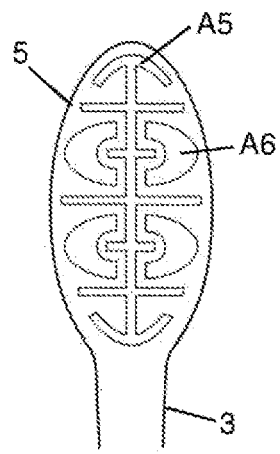

The bristle carrier 5 illustrated in FIG. 44 corresponds approximately to the bristle carrier illustrated in FIG. 18 with the difference that the antenna-like structure is formed by a long bundle A5 and the long bundle A5 comprising another anchor-shaped geometry which is separated from the transversely aligned convention bundle A6 by a transverse web in each case in the upper and in the lower regions of the carrier. The mini bundles A3 from FIG. 18 are replaced by structures of the long bundle A5.

Figure 45:
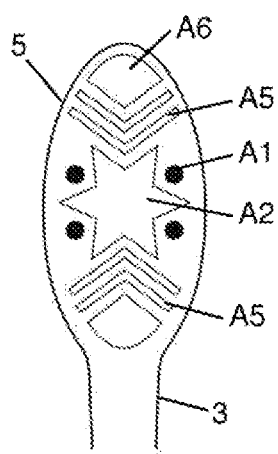

FIG. 45 shows a bristle carrier 5 with a puck bundle A2 arranged in the central carrier region. Circular soft elements and/or formations of injected bristles A1 are arranged in the spaces of the puck bundles A2 formed on the left-hand and right-hand side. Long bundles A5, which are parallel to one another, are arranged in each case parallel with the upper or lower space of the star-shaped puck bundle A2. Arcuate (or circle-segment-shaped) conventional bundles A6, once again aligned with the arrowhead-shaped long bundles A5, are arranged in the uppermost and lowermost carrier regions. The puck bundle lies between multiple long bundles.

Figure 46:
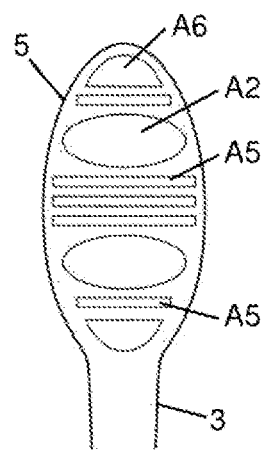

FIG. 46 illustrates a bristle carrier in the central region thereof multiple strip-shaped long bundles A5, which are aligned parallel to one another in the transverse direction, are arranged. A transverse oval puck bundle A2 is arranged in each case above and below said strip-shaped long bundle A5. In addition, a further transverse strip-shaped long bundle A5 is arranged in each case above or below the transverse puck bundle A2. Approximately semicircular, conventional bundles A6 are then arranged again in each case in the uppermost and in the lowermost carrier region. The long bundles generally form, in preferred manner, formations of multiple elements arranged in parallel.

Figure 47:
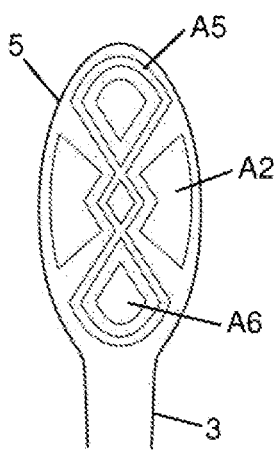

The bristle carrier according to FIG. 47 initially includes an X-shaped arrangement of a long bundle A5 which is aligned along the longitudinal axis and forms a diamond in the center and comprises at the upper and lower ends thereof a rounding which follows the outer contour of the carrier. The upper and lower regions of the long bundle A5, in this case, surround a drop-shaped conventional bundle A6, whereas the central region of the long bundle A5 or the diamond surrounds an unoccupied space. A puck bundle A2, which follows the outer contour of the carrier and follows the contour of the diamond of the long bundle A5 on the inwardly directed side thereof, is arranged in each case to the left and right of the long bundle A5.

FIGS. 48 to 51 now show category L bristle carriers as examples.

Figure 48:
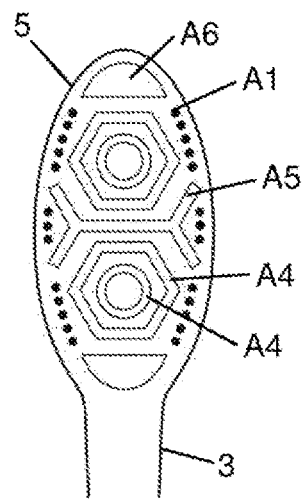

The bristle carrier according to FIG. 48 comprises a, for instance, H-shaped long bundle A5 with kinked side walls in its central region along the transverse axis. The space defined by the kinked side walls is occupied by point-shaped soft elements and/or injected bristles A1. Grid bundles A4 in the form of honeycomb-shaped or hexagonal grid bundle structural elements, which in each case surround one single ring-shaped grid structural element A4, are provided above and below the H-shaped long bundle A5. An approximately semicircular conventional bundle A6 is arranged in each case in the upper and lower carrier regions. Point-shaped soft elements and/or formations of injected bristles A1 are provided in each case in the left-hand and right-hand upper and lower regions of the bristle carrier once again following the outer contour.

Figure 49:
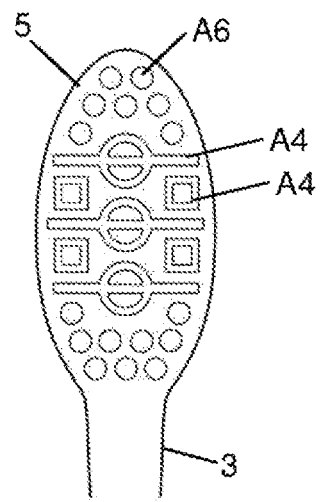

The bristle carrier according to FIG. 49 comprises, in the central region, three grid bundles A4 in the form of three ring-shaped grid bundle structural elements which lie (separately) one on top of another and have a cross beam running right through them. Individual square grid bundles A4 are provided between said grid bundles A4 in each case in the left-hand and right-hand carrier regions. In addition, even more point-formed conventional bundles A6, which follow the outer contour and fill out the upper and lower carrier regions, are provided in the upper and lower carrier regions.

Figure 50:
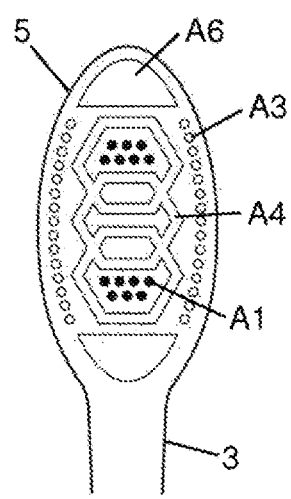

The bristle carrier 5 illustrated in FIG. 50 includes, in the central region thereof, multiple interlocking or interwoven honeycomb-shaped grid bundles A4 (form in form), the space defined by the upper and the central honeycomb and by the lower and the central honeycomb being occupied by point-shaped soft elements and/or injected bristles A1. Mini bundles A3, which follow the outer contour of the bristle carrier, are arranged in each case to the left and right of said honeycomb-shaped grid bundle structures. An approximately semicircular conventional bundle A6 is provided in each case in the upper and lower carrier regions.

Figure 51:
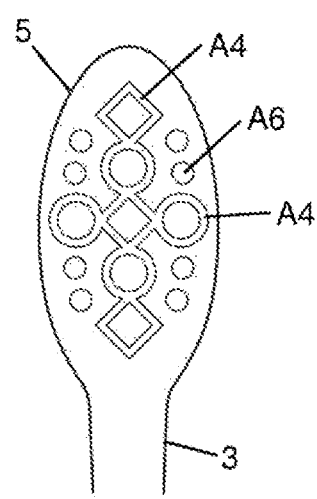

The bristle carrier 5 according to FIG. 51 comprises a centrally arranged grid bundle A4 in which individual diamond-shaped or square structural elements are alternately connected to ring-shaped structural elements such that an approximately cross-shaped overall structure is produced. More point-shaped conventional bundles A6 are arranged in each case in the left-hand and right-hand upper spaces and in the left-hand and right-hand lower spaces.

FIGS. 52 to 55 now show category M bristle carriers as examples.

Figure 52:
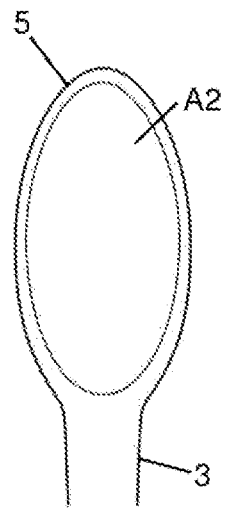

FIG. 52 initially shows a bristle carrier 5 which comprises a single large oval puck bundle A2 which fills out the bristle carrier surface up to the outside contour.

Figure 53:
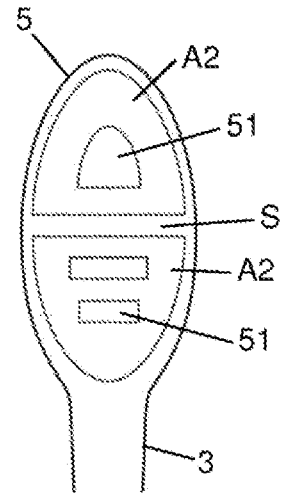

FIG. 53 shows a bristle carrier 5 with a semi-oval-shaped puck bundle A2 in each case in the upper and in the lower carrier regions. In this case, the upper puck bundle A2 surrounds a recess 51 in the form of an unoccupied space which is also realized in a semi-oval-shaped manner. The lower semi-oval-shaped puck bundle A2 surrounds two rectangular recesses 51 each in the form of a rectangular space which also remains unoccupied. The gap S between the puck bundles A2 also remains unoccupied.

Figure 54:
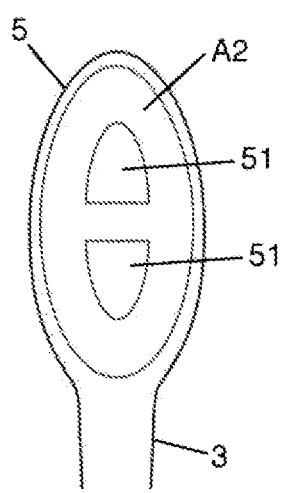

The bristle carrier 5 illustrated in FIG. 54 now comprises an oval puck bundle A2 which surrounds two also semi-oval-shaped recesses 51 which are arranged symmetrically to one another such that a transverse web is realized within the puck bundle A2, for instance along the transverse axis of the bristle carrier.

Figure 55:
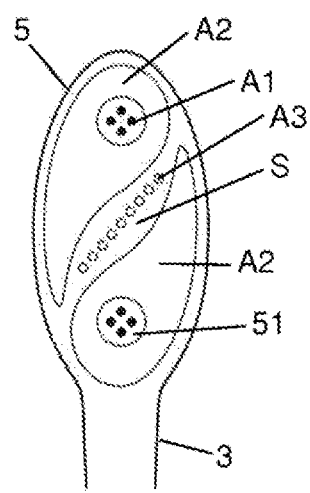

FIG. 55 finally shows a bristle carrier 5 with two drop-shaped puck bundles A2, of which one ranges from the upper region (with the reducing end) into the lower region and the other ranges from the lower region (with reducing end) into the upper region. Both puck bundles A2 surround a round recess 51, in which point-shaped soft elements and/or formations of injected bristles A1 are arranged. A transversely extending formation of mini bundles A3 is arranged in the space/gap defined between the two drop-shaped puck bundles A2.

FIGS. 56 a and b illustrate the method of action of a preferred embodiment of a holding/pressing device 60 according to the invention in conjunction with the hot tufting (HT) method.

The holding/pressing device 60 (shown in a cross-sectional view) includes a receiving means 62 for a conventional bundle A6 shown here as an example, which has been inserted by way of the molten end thereof 10 into a blind hole 7 of a bristle carrier 5. The holding/pressing device 60 includes projections 61 which are realized in a zigzag manner in the present case and are aligned to the direct surrounding area of the blind hole 7 on the bristle carrier 5 (they are preferably realized proceeding from the recess 62).

The projections 61 can also be realized selectively in a bead-shaped or cone-shaped manner, etc.

In addition, they can be arranged parallel to one another or else they can be realized circumferentially.

The holding/pressing device 60 can additionally comprise a heating element (not shown here) for heating the bristle carrier 5 or the bristle carrier surface. Said holding/pressing device 60 according to the invention is capable of ensuring both particularly good clamping of the bundle A6 and particularly good anchoring in the region of the molten end 10 of the bundle A6.

The crucial point is that as can be seen in FIG. 56 $b$, the projections 61 of the holding/pressing device 60 are capable of pressing the material of the bristle carrier 5, previously heated beforehand, where applicable, by the holding/pressing device 60 itself, in the region of the direct surrounding area of the blind hole 7 in such a manner into the bristle carrier 5 (notch 63 generated as a result of displacement) that initially lateral clamping of the bundle A6 in the region of the surface of the bristle carrier 5 is created. Furthermore, additional anchoring for the mounting end of the bundle A6 (that is to say the end with the molten bristle 10) can be achieved as the displacement of the bristle carrier material acts deeper than, for instance, using a flat tool end face (on account of the zigzag-shaped, cone-shaped or bead-shaped design of the projections). In this way, particularly good hold or particularly good anchoring (or pull-out strength) of the bristle bundles within the bristle carrier 5 is achieved.

FIGS. 57 $a$ and $b$ show the generation of an inclined bundle using the conventional bundle A6 as an example. As can be seen in FIG. 57 $a$, first of all a demoldable blind hole 7 is created, as a result of which the bristle carrier 5 obtains a protruding material reservoir 64. Said material reservoir 64 can then be crushed or pressed in the heated state in such a manner that the conventional bundle A6, shown as an example here, obtains a permanent inclined position. Preferred angles of inclination $\beta$ for the bundles are between 85° and 50° and preferably between 80° and 65°, in relation to the surface of the bristle carrier 5.

FIGS. 58 $a$ and $b$ show a material reservoir 64 on a bristle carrier 5 which is realized here in the form of two elongated projections 64 which extend, as can be seen in the top view according to FIG. 58$b$, on both sides of the blind hole 7 beyond the same.

By means of said basic configuration, an approximately round conventional bundle A6 can then moved into various compartment-like forms.

As illustrated in FIG. 59$a$, a conventional bundle has been inserted into the blind hole 7 and the two lateral projections 64 of the material reservoir have been pressed laterally against the bundle such that a regular compartment is generated, as can also be seen FIG. 59$b$ (compare reference symbol A6').

As an alternative to this, as shown in FIGS. 60 $a$ and $b$, a compartment with a stronger center can also be generated by means of the two lateral material reservoirs 64. As illustrated in FIG. 60$b$, the two material reservoirs are pressed together laterally in a stronger manner here, at the same time a somewhat wider or stronger center being generated around the bundle (compare reference symbol A6"). The wider compartmentalization of the corresponding bundle A6" is also highlighted by the double lines in FIG. 60$a$.

Figure 61A:
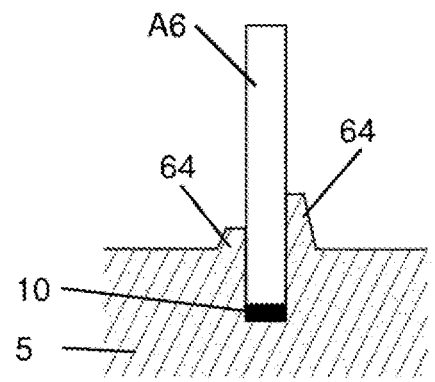
Figure 61B:
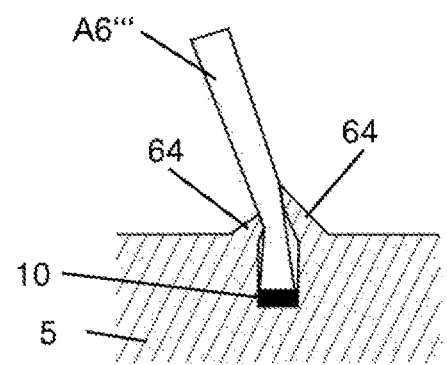

FIGS. 61$a$ and $b$ then show an asymmetrical material reservoir 64 which—in the case of a perpendicularly arranged blind hole 7—results in an inclined position of the conventional bundle A6, shown here as an example. By the right-hand side wall of the material reservoir 64 being somewhat higher here than the left-hand side wall of the material reservoir 64, when pressing or crushing the heated bristle carrier material, the bundle is bent to the left, as can be seen well in FIG. 61$b$. The bundle A6''', in this case, is correspondingly bent round the "shorter" side wall of the material reservoir 64.

Figure 62A:
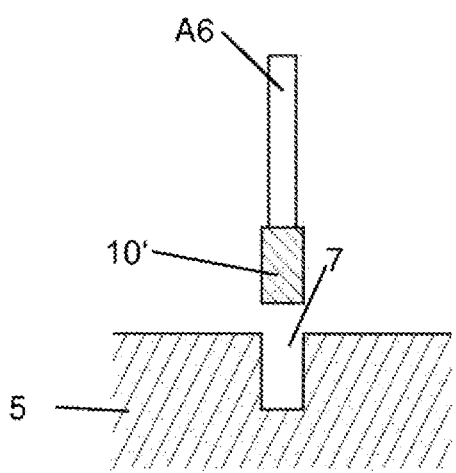
Figure 62B:
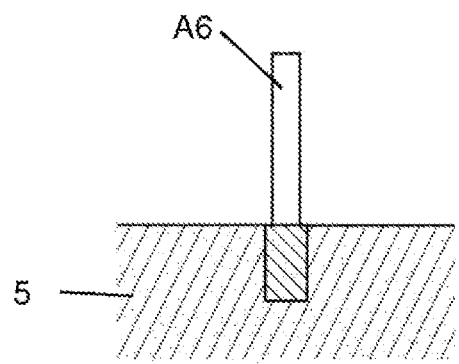

FIGS. 62$a$ and $b$ then illustrate a bundle A6 which comprises a fastening component 10' on the lower mounting end 10' thereof in place of a bristle melt. The fastening component, in this case, can consist of an overmolded plastics material, however it can also be placed around the lower end of the bundle in the form of a film or else the lower or mounting end of the bundle can be dipped into a special fluid (for example a wax) in order then to be inserted into the blind hole 7.

The finished mounted bundle A6 is shown in FIG. 62$b$. The adhesion between the bundle and the bristle carrier 5 can be improved with this embodiment and spaces between the bundle and the bristle carrier can be filled out completely. In addition, said embodiment can be utilized in order to generate, for instance, a visual effect in a transparent bristle carrier.

Figure 63:
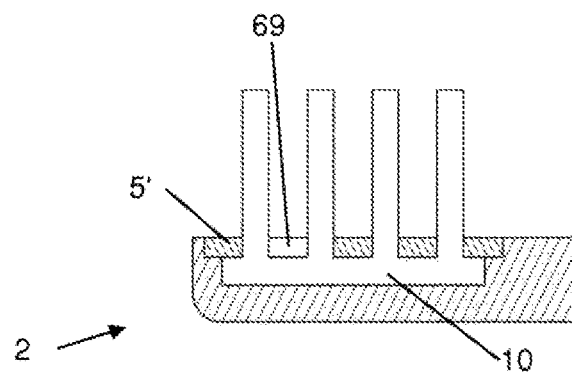

FIG. 63 then illustrates an exposed or bare melt 69 which has been produced here using the AFT method. It is possible to see the head part 2 with the mounted carrier plate 5' and the bristle bundle which projects through the carrier plate 5' and has been melted at the lower end thereof to form a bristle melt or a bristle carpet 10.

Figure 65:
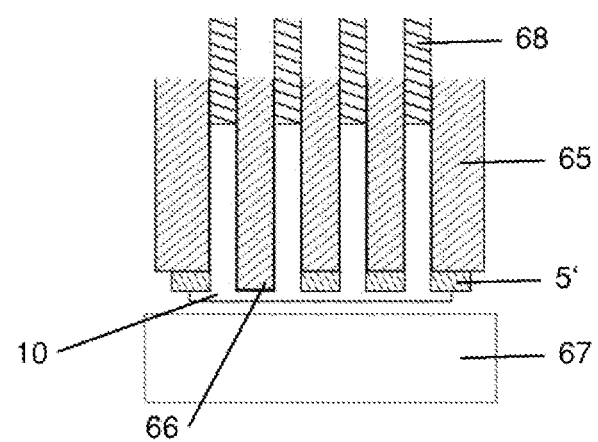

The exposed or bare bristle melt 69 comes about according to the AFT method as a result of, as shown FIG. 65, a special tool being used according to the invention, which tool 65 comprises, in particular, a preferably pin-shaped exposing element 66 simply for the subsequently exposed or bare bristle melt 69. In other words, in the region of the bristle melt subsequently to be exposed there is an opening in the carrier plate 5', through which the exposing element 66 passes and thus, when the bristle melt 10 is generated, is able to expose the corresponding position. That is to say that the bristle melt 10 or the formed bristle melt carpet 10 is realized in a substantially flat manner on the top side thereof. The heating device for melting the rear bristle ends is designated in the present case by way of reference symbol 67. Pins 68, which provide a profiling of the free bristle ends, are additionally inserted into the bristles or bristle bundle openings of the tool 65.

Figure 64:
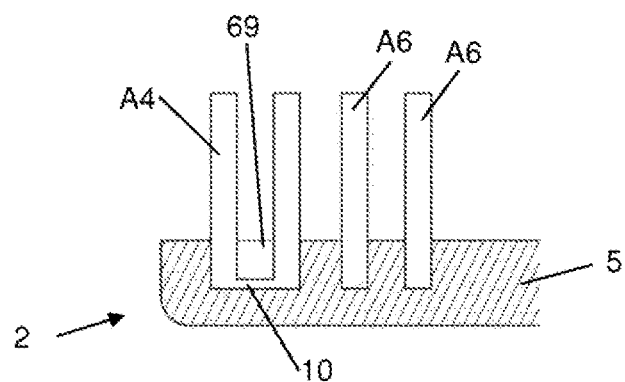

FIG. 64 illustrates the bare bristle melt or the exposed bristle melt 69 as is generated according to the HT method. Here, for instance, a round grid bundle A4 has been inserted into the correspondingly preformed bristle carrier 5 by means of the holding/pressing device 60. The tool can also comprise a corresponding exposing element here too.

It is possible to create more freedom of movement for the surrounding bristles or bristle bundles as a result of the bare or exposed melt.

FIGS. 66 to 70 illustrate (round) bristle carriers as an example of single tuft applications, in particular single tuft toothbrushes. Single tuft toothbrushes are toothbrushes with a very small brush head which are used, in particular, for cleaning wisdom teeth, gums and crooked teeth, for which purpose they have a particularly high level of cleaning efficiency.

FIG. 66 illustrates a bristle carrier 5, for instance for a single tuft toothbrush, which comprises a spiral long bundle A5 which extends substantially over the entire surface of the bristle carrier 5.

FIG. 67 illustrates a further bristle carrier 5, in the central region of which a star-shaped arrangement of soft elements (or a soft element) and/or injected bristles A1 is provided. Said star-shaped arrangement is surrounded by mini bundles A3 and/or point-shaped conventional bundles A6, which follow the star-shaped contour.

FIG. 68 illustrates a further bristle carrier 5. It comprises, in the central region, a point-shaped or circular arrangement of soft elements (or a soft element) and/or injected bristles A1, which is surrounded by a circular-ring-shaped or a donut-shaped puck bundle A2. A recess 51 is preferably formed between the point-shaped arrangement and the puck bundle A2 or in the puck bundle A2, for better mobility of the bristles.

FIG. 69 illustrates a further bristle carrier 5. Four mini bundles A3 and/or point-shaped, conventional bundles A6 are arranged in a square formation here in the central region of the bristle carrier. They are once again surrounded by a circular-ring-shaped or donut-shaped puck bundle A2, freedom of movement for the individual bristles being provided here also by the recess 51.

FIG. 70 finally illustrates yet another bristle carrier 5. It comprises a large, circular puck bundle A2 which extends substantially over the entire surface thereof.

FIGS. 71 to 79 now show (round) bristle carriers in particular for nail lacquer applicators as an example.

Figure 71:
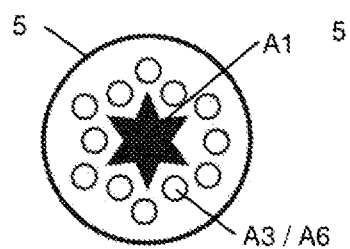

The bristle carriers 5 shown in FIG. 71, in this case, correspond to the bristle carrier shown in FIG. 67.

Figure 72:
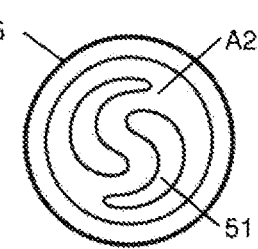

FIG. 72 illustrates a bristle carrier 5 for nail lacquer applicators which comprises a large, circular puck bundle A2 which extends substantially over the entire surface of the bristle carrier 5. Two approximately kidney-shaped recesses 51, which are arranged counter or point symmetrically to one another, are provided within the puck bundles A2.

Figure 73:
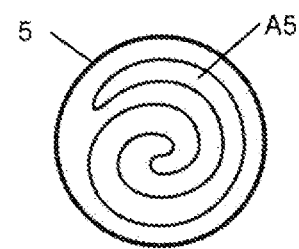

FIG. 73 shows a further bristle carrier 5 for nail lacquer applicators which comprises a helical long bundle A5 which extends substantially over the entire surface of the bristle carrier (i.e. corresponding to FIG. 66).

Figure 74:
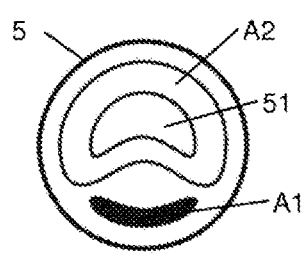

FIG. 74 illustrates a further bristle carrier 5 which comprises a puck bundle A2 in the form of an impressed circular ring, having a corresponding recess 51. An arcuate arrangement of soft elements (or a soft element) and/or injected bristles A1 is provided opposite the indentation of the puck bundle A2.

Figure 75:
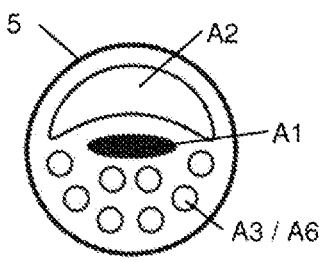

FIG. 75 shows a further bristle carrier 5 which comprises an oval arrangement of soft elements (or a soft element) and/or injected bristles in the central carrier region thereof. A larger arcuate puck bundle A2, which follows the contour of the oval, is arranged above said oval. Multiple mini bundles A3 and/or point-shaped conventional bundles A6, which follow the outer contour of the bristle carrier 5 and the oval, are arranged below the oval.

Figure 76:
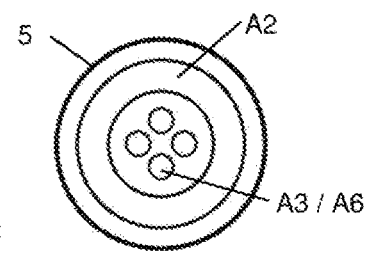

The bristle carrier 5 shown in FIG. 76 in particular for nail lacquer applicators corresponds to the embodiment shown in FIG. 69.

Figure 77:
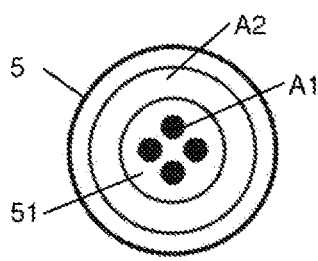

The bristle carrier 5 shown in FIG. 77 for nail lacquer applicators corresponds substantially to the embodiments according to FIG. 69 and FIG. 76, with the difference that point-shaped, soft elastic elements and/or injected bristles A1 are arranged in an approximately square formation in the central region in place of mini bundles A3 or conventional bundles A6.

Figure 78:
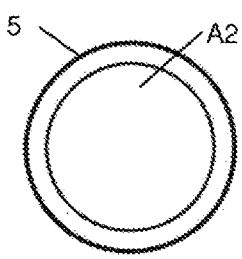

The bristle carrier 5 shown in FIG. 78 in particular for nail lacquer applicators corresponds to the embodiment shown in FIG. 70, i.e. with a large, circular puck bundle which extends substantially over the entire surface of the bristle carrier.

Figure 79:
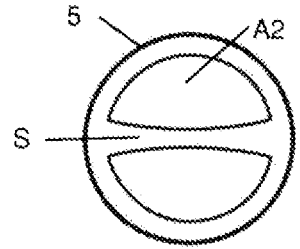

FIG. 79 finally illustrates an embodiment of a bristle carrier 5 in particular for nail lacquer applicators, which comprises two circle-segment-shaped puck bundles A2, the base side or chord thereof comprising a light convex curvature. The gap between the two puck bundles A2 remains unoccupied and is curved concavely in a correspondingly light manner.

FIGS. 80 to 84 illustrate more bristle carriers in particular for mascara applicators as an example.

The bristle carriers 5, in this case, are realized in an elongated manner with rounded side parts.

Figure 80:
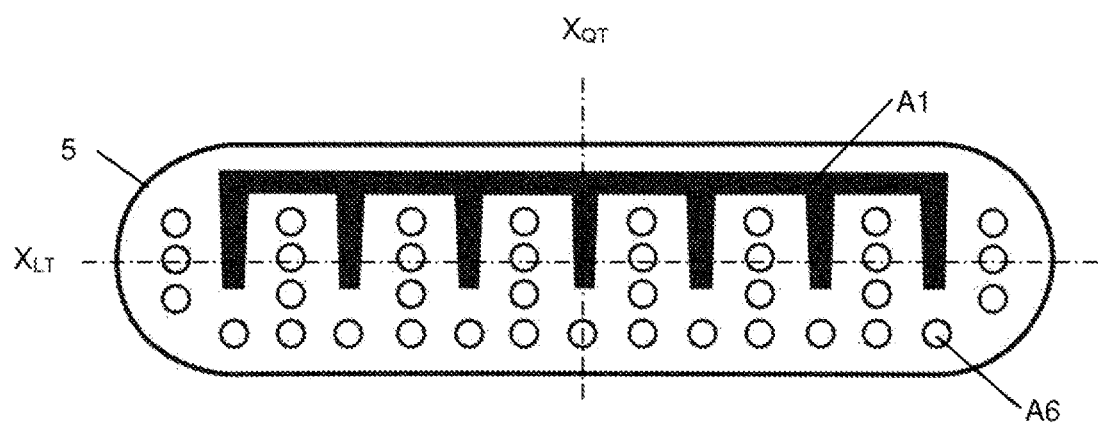

The bristle carrier 5 shown in FIG. 80 initially comprises an inwardly directed comb-shaped arrangement of soft elements and/or injected bristles A1 (the "teeth", in this case, extend somewhat beyond the longitudinal axis $X_{LT}$). A comb-shaped arrangement, which is produced from individual point-shaped conventional bundles A6 realized in the opposite direction, engages in said structure, the side parts of the comb-shaped arrangement produced from point-shaped conventional bundles A6 surround the outer side parts of the comb-shaped arrangement of soft elements and/or injected bristles A1.

Figure 81:
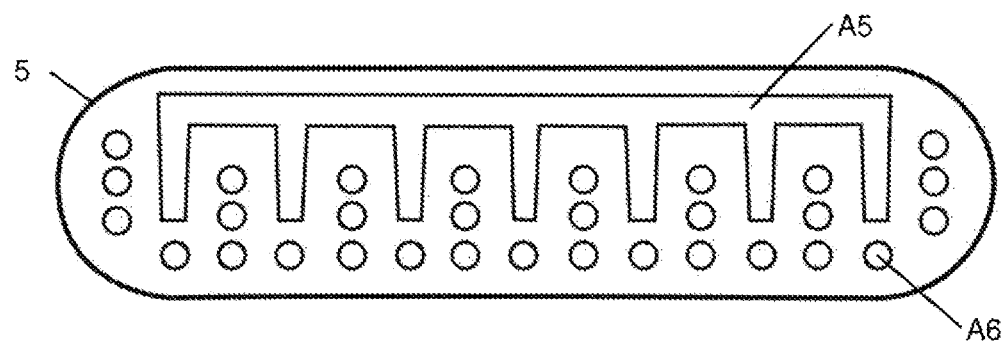

The bristle carrier 5 shown in FIG. 81 corresponds substantially to the embodiment according to FIG. 80, with the difference that a comb-shaped long bundle A5 is provided instead of the comb-shaped arrangement of soft elements and/or injected bristles A1.

Figure 82:
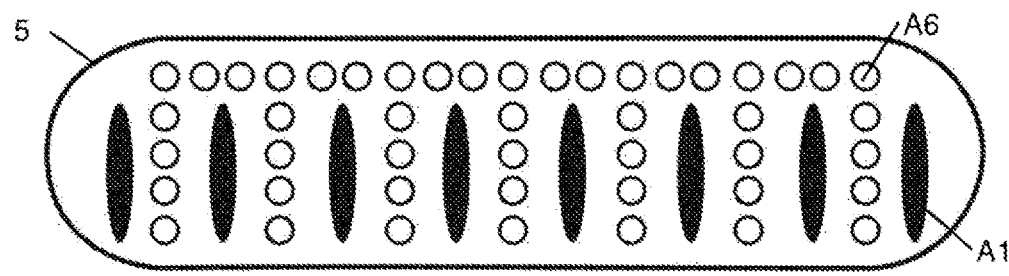

The bristle carrier 5 shown in FIG. 82 in particular for mascara applicators comprises a comb-shaped arrangement of individual point-shaped conventional bundles A6, the individual "teeth" of the comb extending substantially over the entire width of the bristle carrier 5. Oval arrangements of soft elastic elements and/or injected bristles A1 are provided in each case between the individual teeth and on the outsides.

Figure 83:
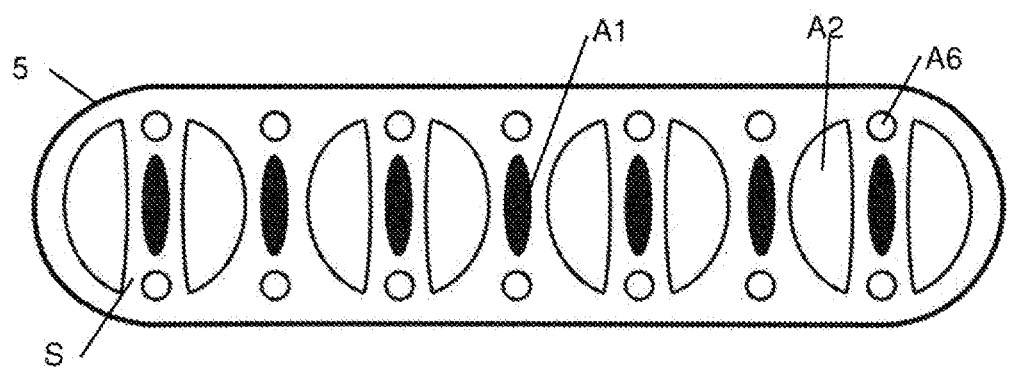

FIG. 83 illustrates a bristle carrier 5 in particular for mascara applicators which comprises multiple pairs of circle-segment-shaped puck bundles A2 which are arranged in a mirror symmetrical manner to one another (i.e. in the transverse direction of the bristle carrier 5) and have in each case a convexly curved base side or chord. An oval arrangement of soft elements and/or injected bristles A1 is provided in the gap S between the two puck bundles A2 and above and below said oval arrangement a point-shaped conventional bundle A6. Corresponding arrangements of oval soft elements and/or injected bristles A1 each with a point-shaped conventional bundle A6 above and below them are also provided between the individual pairs of mirror-symmetrical puck bundles A2.

Figure 84:
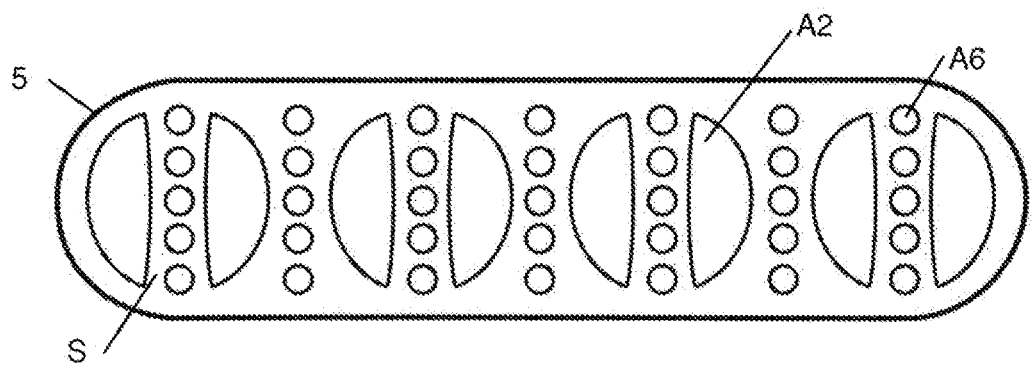

The bristle carrier 5 shown in FIG. 84 in particular for mascara applicators corresponds substantially to the embodiment shown in FIG. 83 with the difference that a formation arranged in rows produced from individual point-shaped conventional bundles A6 is arranged in each case between the respective puck bundles A2 or the puck bundle pairs arranged in a mirror-symmetrical manner.

FIGS. 85a to g illustrate a basic body 1 for a brush product according to the invention with a bristle carrier which is produced in an integrated manner or in one piece with the basic body 1, as is provided by injection molding.

Figure 85A:
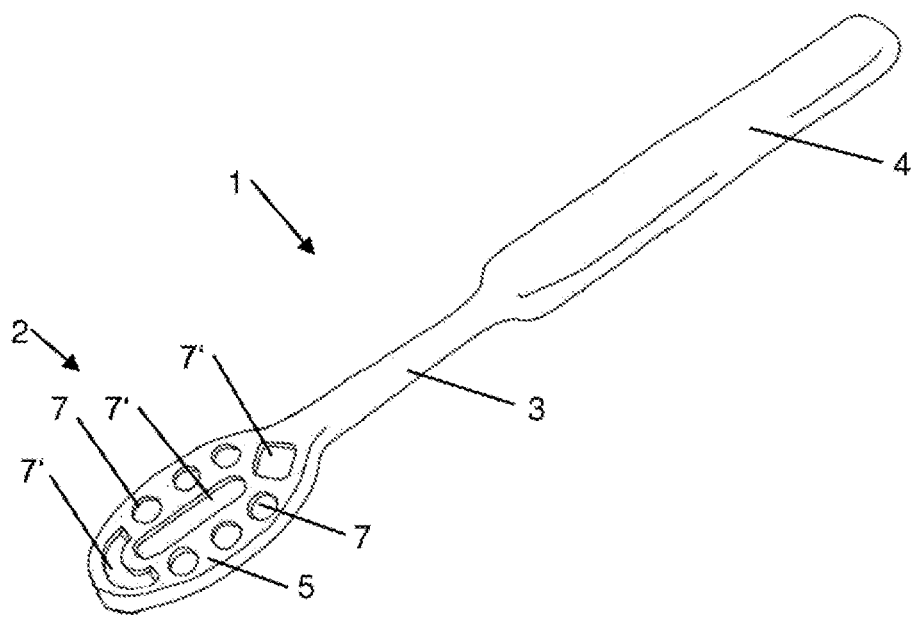

FIG. 85a shows, in this case, the front side of the basic body 1. The basic body 1 includes the head part 2, the handle part 4 and the neck part 3 which connects the head part 2 to the handle part 4. The head part 2, in turn, includes the bristle carrier 5, which is provided with (round) bristle holes 7 or openings 7' which serve for receiving (round) bristle bundles 9 or bristle bundles 9" with other geometry, for instance in the shape of curved, elongated or angular bristle bundles or else bristle bundles with an enlarged surface.

In the present embodiment six bristle holes 7 are provided for round bristle bundles 9 as an example as well as three openings 7' which are provided, in turn, as an example of a curved bristle bundle 9", an elongated bristle bundle 9" and a rectangular bristle bundle 9". It is naturally also possible to provide different numbers and arrangements of bristle holes 7 or openings 7' and bristle bundles 9 as well as bristle bundles 9" without departing from the framework of the present invention.

Figure 85B:
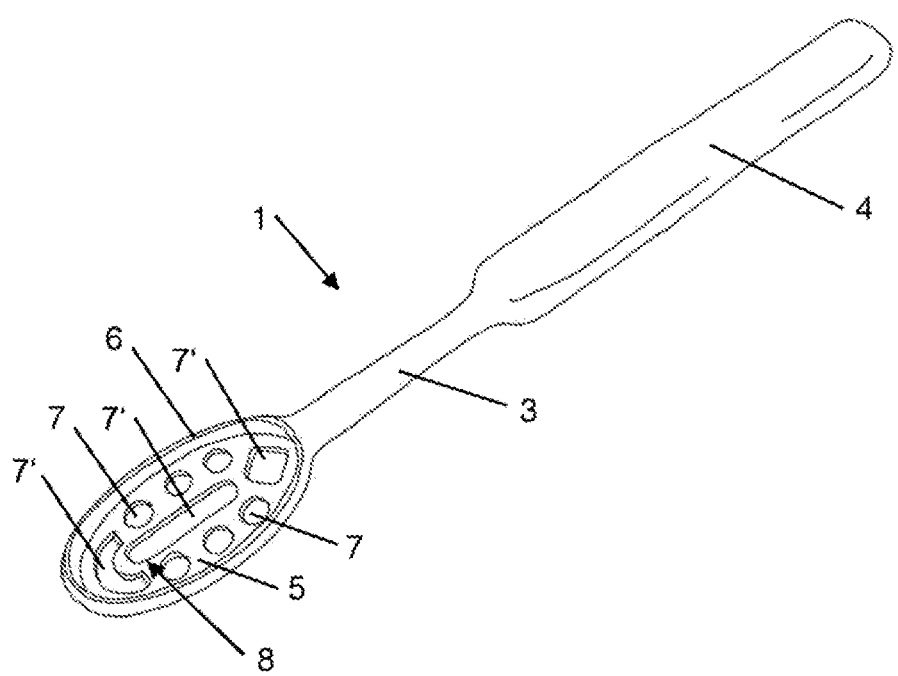

FIG. 85b then shows the rear side of a basic body 1 according to the invention. In this connection, it is possible to see, in particular, the boundary edge 6 which extends on the outer extent of the bristle carrier 5 and closes off the bristle carrier toward the outside. In this way, the circumferential boundary edge 6 and the bristle carrier 5 form a type of basin, i.e. a bristle carrier recess in which subsequently the bristle melt can be received preferably completely and the cover material at least in part.

Figure 85C:
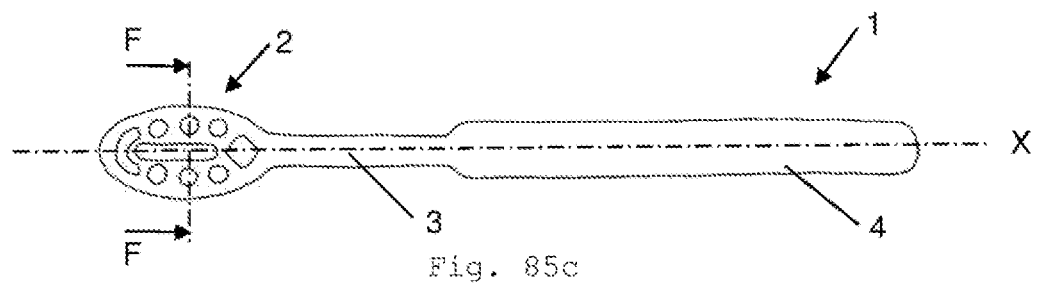
Figure 85D:
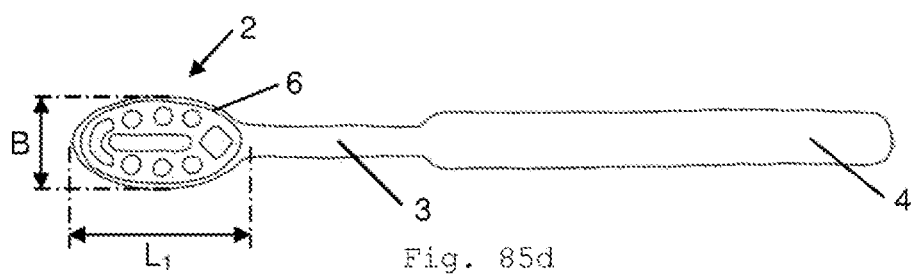

FIG. 85c shows a top view of the front side of a basic body 1 according to the invention. It is possible to see, in particular, the longitudinal axis X of the basic body 1. The width B and the length L1 of the head part 2 of the basic body according to the invention are specified in the rear view according to FIG. 85d (the preferred values for these are specified in the general description mentioned above). Once again, the circumferential boundary edge 6 can also be seen here.

Figure 85E:
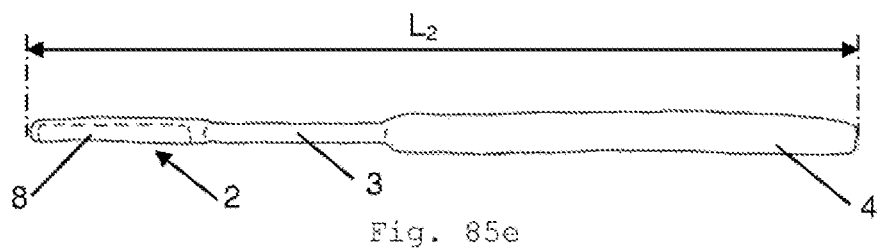

The length L2 of the basic body 1 according to the invention is designated in FIG. 85e (the preferred values for this are also specified in the general description mentioned above). It is possible to see, in particular, shown by the broken line, the basin-shaped bristle carrier recess 8 for the subsequent receiving of the complete bristle melt and of at least part of the cover material.

Figure 85F:
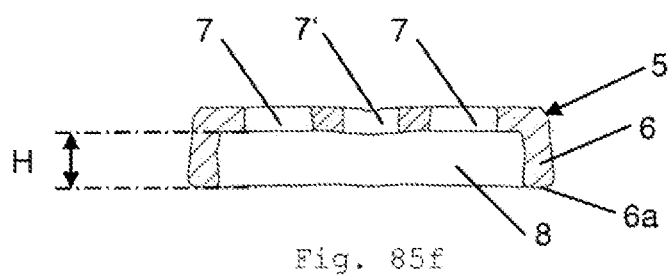

FIG. 85f corresponds to a cross-sectional view along the line F-F in FIG. 85c. It is possible to see the basin-shaped recess 8, the boundary edge 6, the height H of the boundary edge 6 (see general description above for preferred values) and the bristle holes 7 or the opening 7.

Figure 85G:
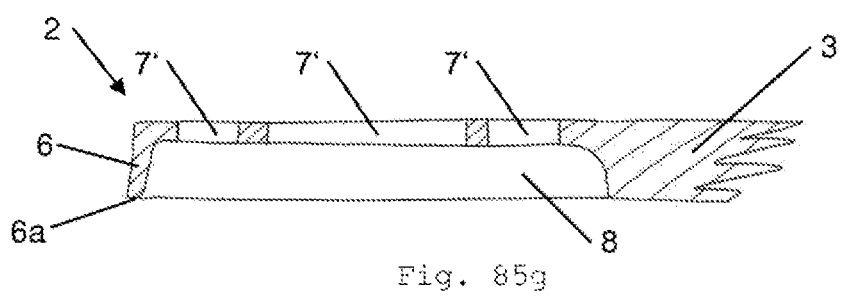

A longitudinal section along the axis X according to FIG. 85c through the head part 2 or the bristle carrier 5 of the basic body 1 according to the invention is shown in FIG. 85g as a view of a detail. It is possible to see, once again, the boundary edge 6, the bristle carrier recess 8 and the bristle holes 7 or the opening 7' (here for the elongated bristle bundle 7', the rectangular bristle bundle 7' and the curved bristle bundle 7') and the neck part 3. The free end 6a of the boundary edge (or of the lower edge of the boundary edge), in this case, is in preferably alignment with the underside of the neck part 3.

FIGS. 86a to 86d then show the basic body 1 according to the invention according to FIGS. 85a to 85g after insertion of the bristles and the melting of the bristle ends of the bristle bundle 9 or the bristle bundle 9".

Figure 86A:
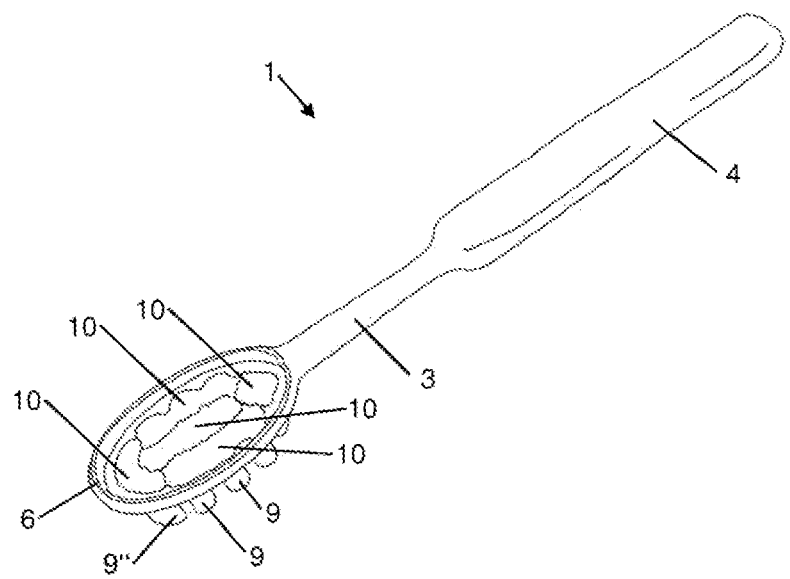
Figure 86B:
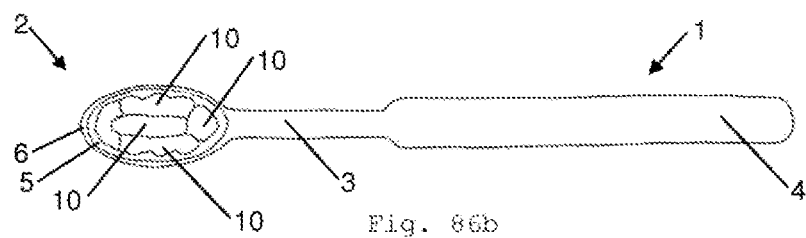

FIGS. 86a and 86b, in this case, show the rear side of the basic body 1 according to the invention, it being possible to see the individual melt carpets 10, adjacent to one another, of the molten bristle ends of the bristle bundle 9 or bristle bundle 9" in the region of the bristle carrier surface surrounded by the boundary edge 6. The individual melt carpets 10, however, can merge into one another entirely or they can be realized as surfaces that are spatially separated from one another.

Figure 86C:
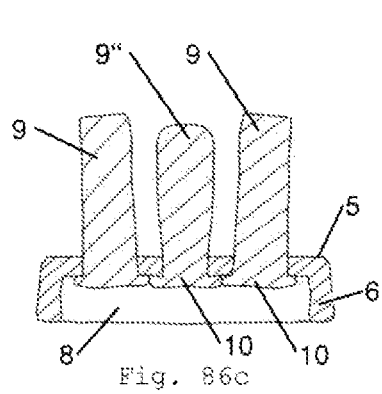
Figure 86D:
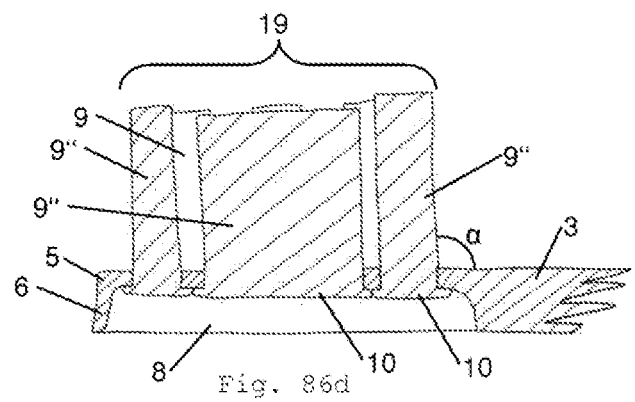
Figure 87A:
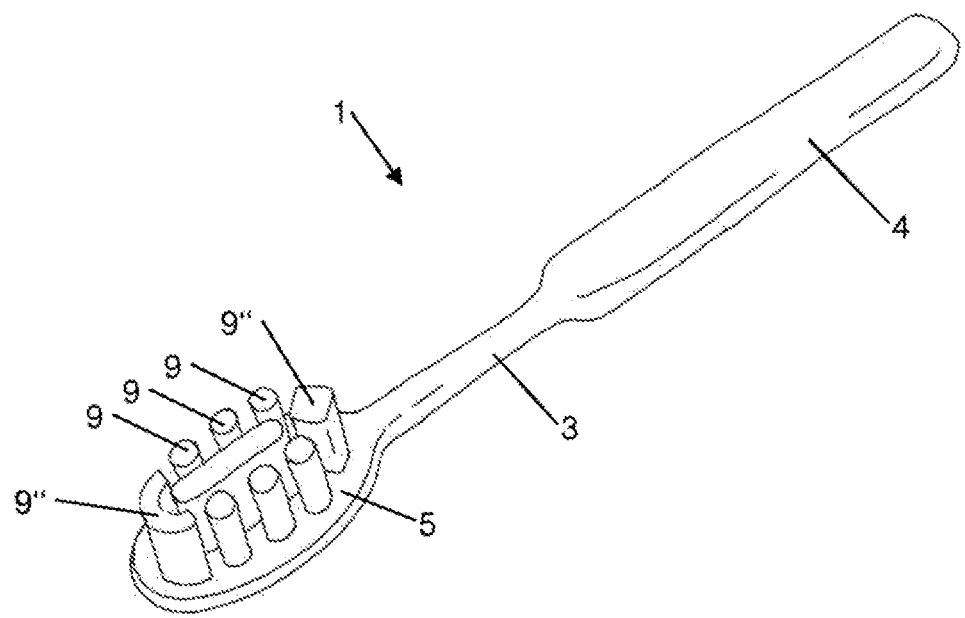
Figure 87B:
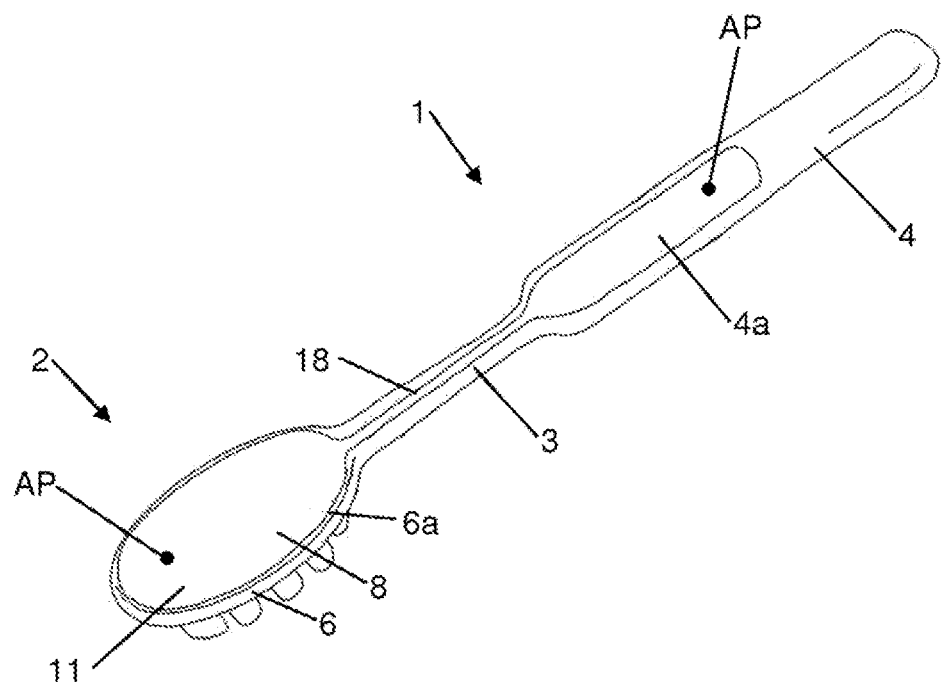

It is possible to see in the cross sectional view according to FIG. 86c how the individual melt carpets of the bristle bundles 9 or bristle bundles 9" form a type of anchoring in relation to the bristle carrier 5 in the bristle carrier recess 8 and the boundary edge 6 is clearly higher than the melt carpets 10. FIG. 86d illustrates the bristle field 19 which is composed of the bristle bundles 9" and the bristle bundles 9. Here too, it is easily possible to see the anchoring by means of the individual melt carpets 10. As a rule, the bristle bundles 9 or the bristle bundles 9" stand perpendicularly to the surface of the bristle carrier; by way of the angle α, it is, however, indicated that an inclined position of the bristle bundles 9 and bristle bundles 9" can also be provided. Corresponding values for these are once again specified in the abovementioned general description.

FIGS. 87a to 87g then show a finished brush product according to the invention having an injected covering. It is possible to see, once again, the individual bristle bundles 9 or bristle bundles 9" on the front side of the bristle carrier 5 according to FIG. 87a. The rear view according to FIG. 87b then shows the cover material 11 injected onto the bristle melt 10 or the melt carpets 10 which fills out the bristle carrier recess 8 approximately up to the lower edge 6a of the boundary edge 6 (or where applicable a little beyond this). The cover material 11 extends via a corresponding channel 18 into the handle part 4 (the channel is not shown in FIG. 1 and FIG. 2), where it fills out or covers a corresponding receiving recess 4a. In other words, the cover material 11 is present both in the head part 2 and in the neck part 3 as well as in the handle part 4. The injection point AP for the cover material is provided in a preferred manner in the region of the head part 2 or else in the region of the handle part 4 (an injection point in the neck part 3, however, is also conceivable). Two possibilities for injection points AP are shown in FIG. 3b, however preferably only one is realized per material/cavity.

As can be seen in FIG. 87c, no cover material is situated on the front side of the finished brush product. It is possible to see, once again, in the side view according to FIG. 87e, the bristle field 19 with a profile realized in a crenellated manner in the longitudinal direction (i.e. with irregularly alternating higher and lower bristle bundles 9 or bristle bundles 9"). It is possible to see on the underside that covering 11 even protrudes somewhat from the head part 2 or the neck part 3 and the handle part 4. I.e. even in the region of the head part 2, the covering 11 protrudes somewhat beyond the boundary edge 6 or the lower edge 6a thereof. This is illustrated again in FIG. 87f, where the overall thickness D of the head part 2 of the finished brush product is specified.

FIG. 87g specifies the layer design of the finished head part 2 with $D_B$ for the layer thickness of the bristle carrier 5 (without boundary edge 6), $D_S$ for the layer thickness of the bristle melt 10 or melt carpets 10 and with $D_A$ for the layer thickness of the covering 11. The preferred values for the thickness of the head part or of the individual layer thicknesses and for the ratios of the layer thicknesses to one another are specified in the general description mentioned above.

Figure 88A:
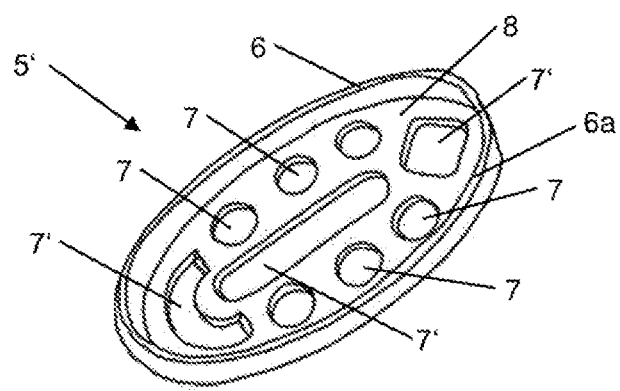
Figure 88B:
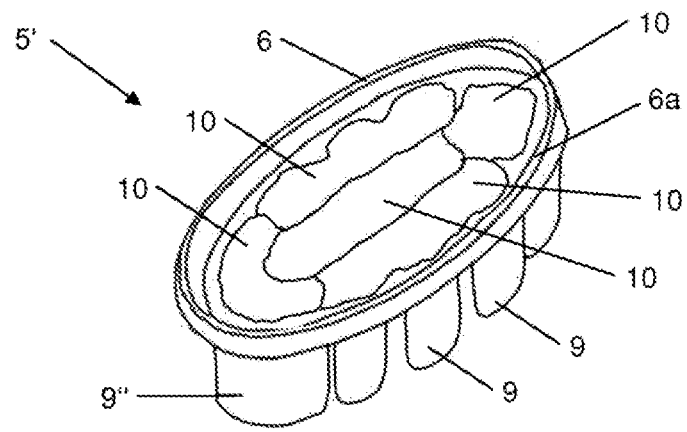
Figure 88C:
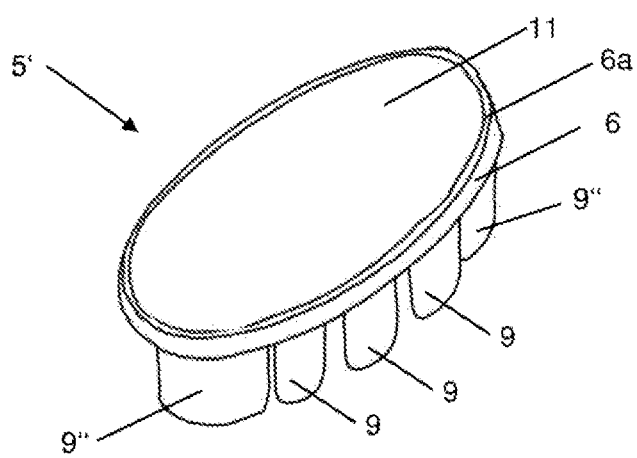

FIG. 88a to c then illustrate an embodiment in which the bristle carrier and the basic body are produced separately from one another and are then joined together. FIG. 88a shows the separate bristle carrier 5' in the form of a head plate. The bristle carrier 5' or the head plate also includes a boundary edge 6 and the corresponding bristle holes 7 or openings 7 for the bristle bundles 9 or bristle bundles 9".

In FIG. 88b, once again the bristle bundles 9 and the bristle bundles 9" are inserted into the bristle carrier 5' and are melted with the rear ends thereof such that, once again, the melt carpets 10 are produced. In FIG. 88c, finally the covering 11 is once again sprayed onto the bristle melt or the bristle carpets 10 and substantially fills out the bristle carrier recess 8 completely and can, where applicable, once again also extend somewhat beyond the boundary edge 6 or the lower edge 6a thereof.

Figure 88D:
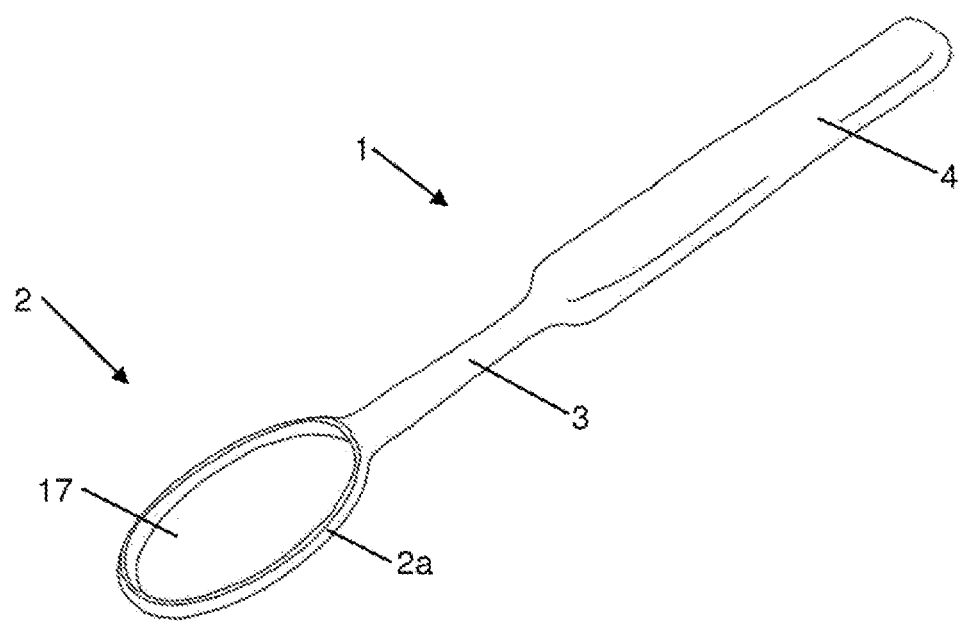
Figure 88E:
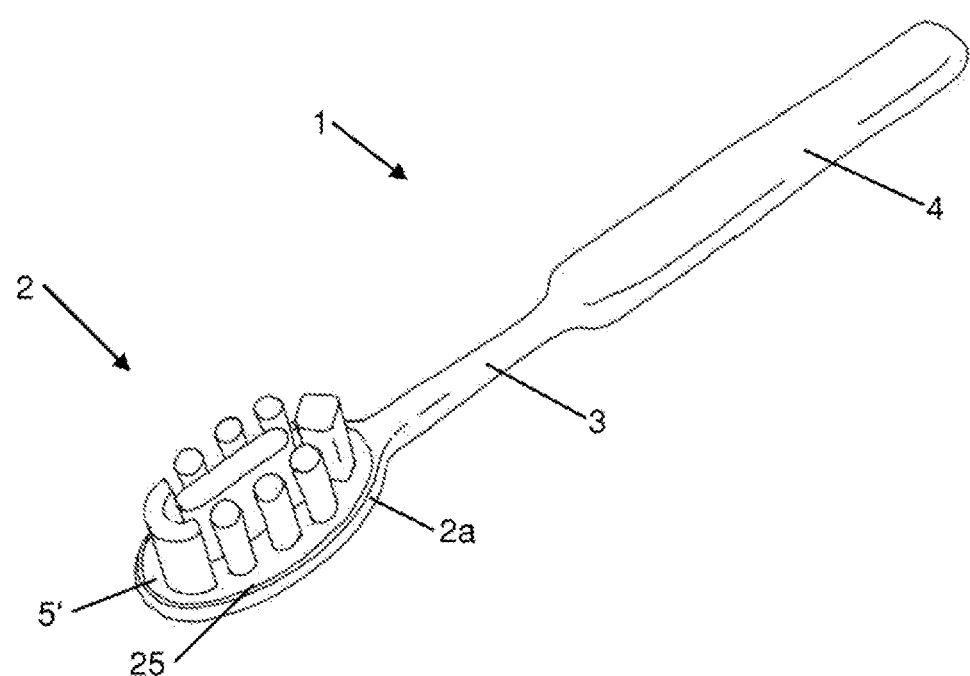

FIG. 88d then shows the separately produced basic body 1 for said embodiment. It includes once again a head part 2 which is connected via a neck part 3 to the handle part 4. The head part 2 is realized in the present case, however, in the form of a frame 2a which surrounds a ring-shaped opening 17. The bristle carrier 5' is inserted into the frame 2a of the head part 2 or into the ring-shaped opening 17, as is illustrated in FIG. 88e. The frame 2a is realized so as to correspond with the bristle carrier 5' such that the bristle carrier 5', for example, can be snapped into the frame and welded or bonded to said frame. A further possibility consists in that the bristle carrier 5' is first of all placed loosely or with a positive locking closure into the frame 2a and then is overmolded again with a cover component.

It is basically also possible for the ring-shaped opening 17 not to be continuous but rather to comprise a bottom such that the bristle carrier 5' is inserted again into a bristle carrier recess; the cover material would therefore not form the rear side of the head part 2 (i.e. apart from the equally conceivable variant where the bottom comprises openings).

The interface 25 between the bristle carrier 5' and the frame element 2a is shown circumferentially in the embodiment shown, however, it is also possible for the interface 25 or the interface geometry only to be realized in portions on the sides and/or the free or rear end of the head part 2.

FIGS. 89a to 89c and FIG. 89d then show different bristle carrier variants which, as a rule, are produced in one piece with the basic body. The bristle carrier 5 shown in FIG. 89a comprises a gap S which extends, for example, in an undulated manner from the free end of the bristle carrier up to almost the rear end thereof and thus divides the bristle carrier 5 into two bristle carrier part segments 5a and 5b or wings. Bristle holes 7 or openings 7' for bristle bundles 9 or bristle bundles 9" are provided once again in the bristle carrier part segments 5a, 5b. Here too, the rear bristle ends are melted, for instance, by means of a heat punch such that corresponding melt carpets 10 are formed which are then once again overmolded with cover material 11 (cf. FIGS. 89b and 89c). In this embodiment too, the cover material can once again extend via a channel 18 in the neck part 3 into the handle part 4. It is also possible, however, to provide two or more gaps. The gap or gaps can also extend in a straight, zigzag-shaped or crenellated manner, depending on what degree of flexibility is desired or required. It is also possible for flexible webs, which connect the individual part segments together, to be arranged in the gap.

Figure 89A:
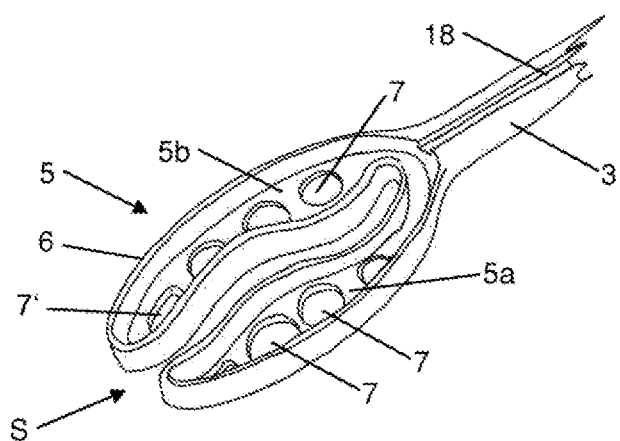
Figure 89B:
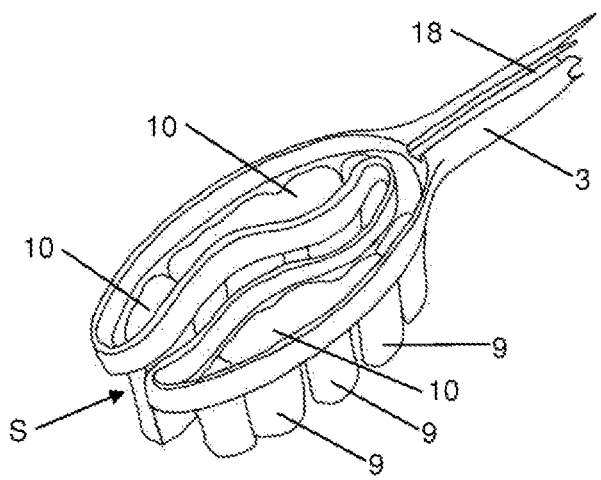
Figure 89C:
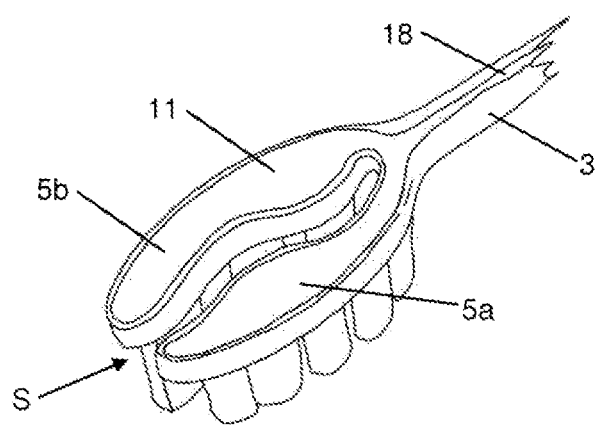
Figure 89D:
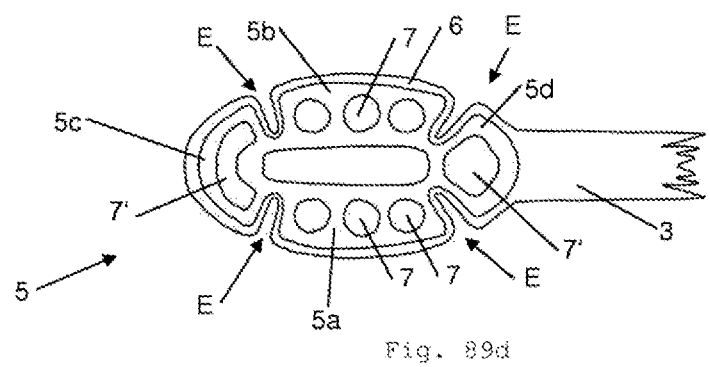

In the embodiment according to FIG. 89d, the bristle carrier 5 comprises four notches E which are directed inclinedly inward and bestow a cloverleaf-shaped form on the bristle carrier 5 and divide it correspondingly into the four part segments 5a, 5b, 5c and 5d. In this case, the lateral bristle carrier part segments 5a and 5b (with the bristle holes 7) are realized so as to be somewhat greater than the front bristle carrier part segment 5c (with the curved opening 7') or the rear bristle carrier part segment 5d (with the, for instance, rectangular opening and which merges into the neck part 3). As a result of the wing-like realization of the "free" bristle carrier part segments 5a, 5b and 5c, particular flexibility of the bristle carrier 5 is provided once again which leads to improved cleaning effects in application. The notches E, in this case, can also be realized variously long. In addition, the notches E can also be directed inward in an even stronger manner so that they intersect, for instance, in the center of the bristle carrier 5.

Figure 90A:
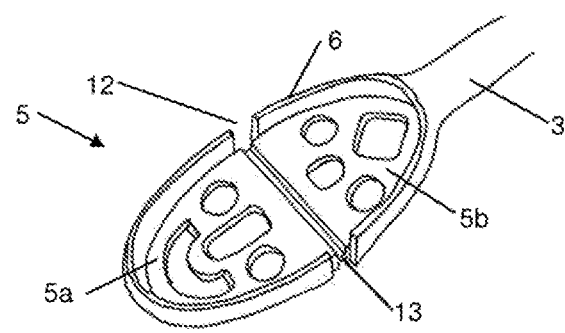
Figures 90B, 90C:
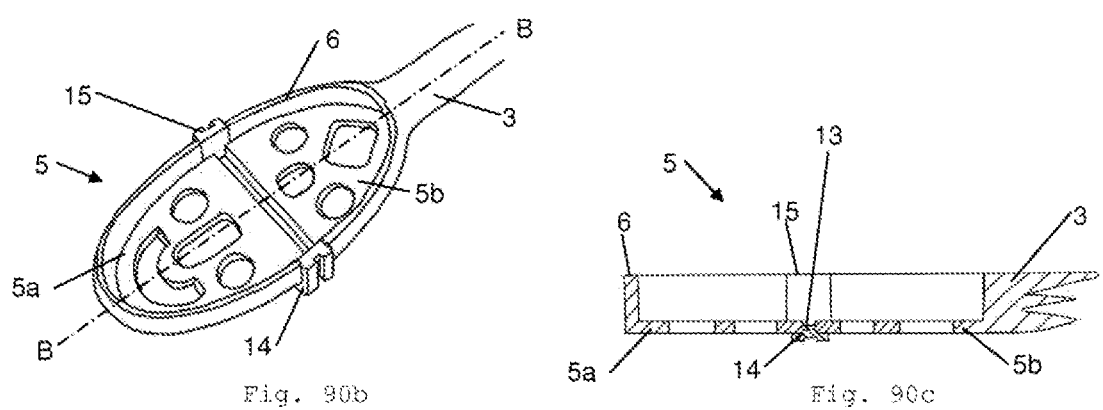

FIGS. 90a to 90c illustrate a bristle carrier variant where a film hinge or a region with reduced material thickness is present and further also the boundary edge is interrupted.

The film hinge 13, in this case, as can be seen in FIG. 90a, divides the bristle carrier 5 into a front bristle carrier part segment 5a and a rear bristle carrier part segment 5b. In the region of the film hinge 13, the boundary edge 6 of the bristle carrier 5 comprises interruptions 12 so that the corresponding flexibility, which is provided by means of the film hinge 13, takes full effect. The film hinge 13 can be provided with cover material both on the top side thereof and on the bottom side thereof, which cover material, as can be seen for instance in FIG. 90b, can also be present in the region of the interruption 12 in the boundary edge and there realizes, for example lateral damping elements 15. It can be seen, in FIG. 6b, that the film hinge 13 is only already covered on the front side with soft material. A covering can also be provided on the rear side, for example with the safety shot or the forming shot. FIG. 90c shows a lateral sectional view of said embodiment along the line C-C in FIG. 6b. It is easy to see the film hinge 13 which is covered with soft material 14 on the front side and is not (yet) covered with soft material on the rear side.

Figure 91A:
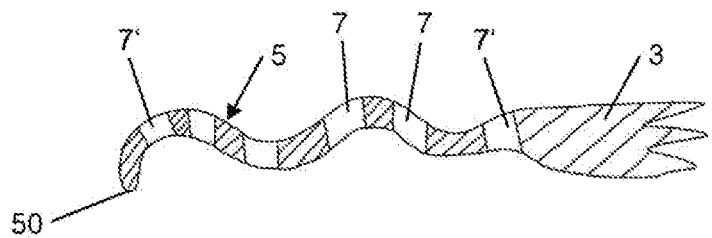
Figure 91B:
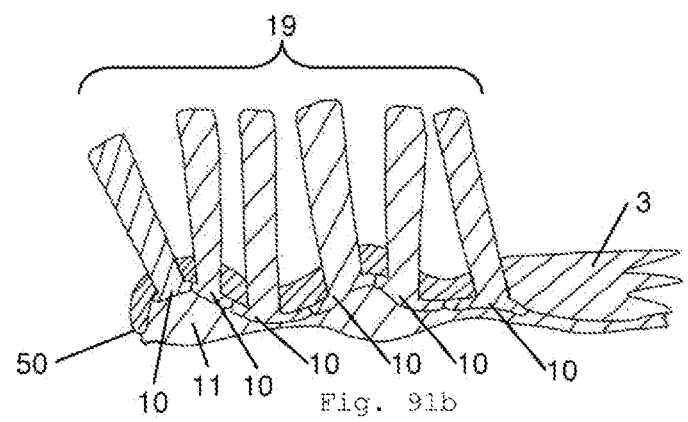

FIGS. 91a to 91d show cross-sectional views of further embodiments of bristle carriers according to the invention with longitudinal profiles. Thus, the bristle carrier 5 shown in FIG. 91a comprises an undulated longitudinal profile with bristle holes 7 or openings 7' which can be arranged both in the hills and valleys of the undulating structure (as well as in between). The rearmost opening 7' is almost already arranged here in the neck part 3. Some of the bristle holes 7 or openings 7' comprise an inclined position, which as can be seen in FIG. 91b, results in a bristle field 19 which comprises forwardly sloping bristle bundles or bristle bundles and upright bristle bundles and, where applicable, also rearwardly sloping bristle bundles. The free end 50 of the bristle carrier 5 is curved downward in the present case, i.e. toward the rear side of the bristle carrier 5. Embodiments with an upwardly curved free end 50 are conceivable.

According to FIG. 91b, the cover material 11 on the rear side of the bristle carrier 5 is also realized in an undulated manner and projects a little beyond the free end 50 of the bristle carrier 5. Naturally, the bristle melt 10 or the individual melt carpets 10 correspondingly also form a profile that is undulated in the longitudinal direction. The cover material 11 is preferably, as can be seen, drawn into the neck part 3 (and the handle part where applicable).

Figure 91C:
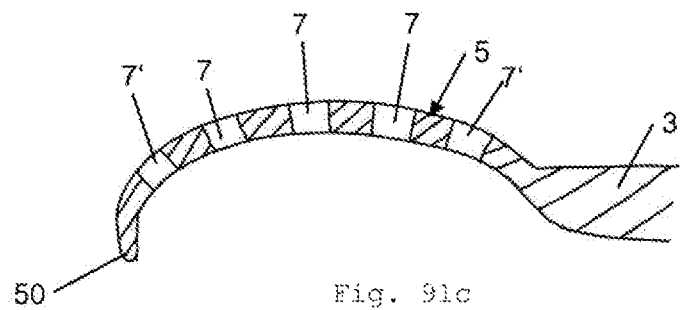
Figure 91D:
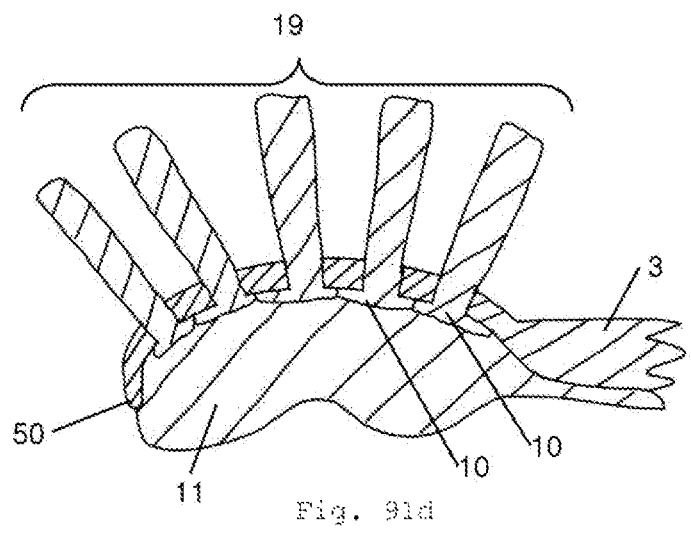

FIG. 91c shows a further embodiment of a bristle carrier 5 according to the invention with a different longitudinal profile. Here, the front side of the bristle carrier 5 is curved convexly such that, as illustrated in FIG. 91d, a hedgehog-shaped arrangement is produced for the bristle field 19. That is to say, the bristle bundle or bristle bundles, which, when viewed in the longitudinal direction, are arranged toward the neck part 3, comprise a rearward inclination, whereas the bristle bundles arranged toward the free end 50 of the bristle carrier 5 comprise a forward inclination and the bristle bundles arranged in the central region of the bristle carrier 5 project in a substantially perpendicular manner from the bristle carrier 5. The same occurs when viewed laterally—bristle bundles which, when viewed in the transverse direction, are arranged to the left of the longitudinal axis, comprise an inclination to the left, whereas those that are arranged to the right of the longitudinal axis when viewed in the transverse direction comprise an inclination to the right. In the central region, i.e. bristle bundles arranged in the region of the longitudinal axis protrude substantially perpendicularly from the bristle carrier 5. The bristle melt or bristle melt carpets 10, when viewed in the longitudinal direction, comprise a correspondingly curved profile. Here too, the cover material 11 protrudes beyond the free end 50 of the bristle carrier 5 and comprises an undulated longitudinal profile. The undulated realization of the cover material can serve, for example, as a tongue cleaner or massage element.

Figure 92:
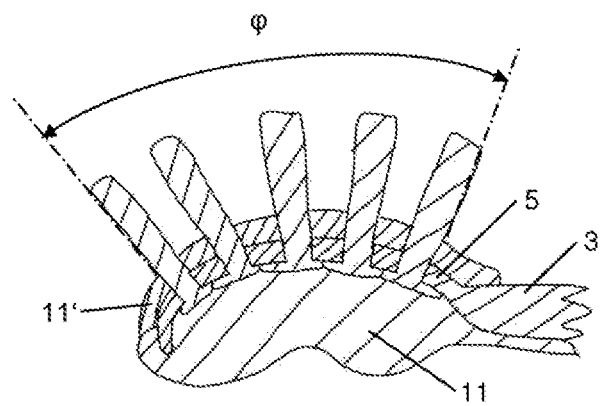

FIG. 92 specifies with the angle the angular range cp in which the bristle field 19, as also in FIG. 7*d*, is preferably arranged. The preferred values for the angle cp are specified in the aforesaid general description. The difference to the embodiment according to FIG. 91*d* consists in that here an (additional) cover material 11', which is regularly applied on the front side of the bristle carrier 5, is provided. In this connection, this can once again be a soft and/or hard material component. However, a soft material component is preferably used. The cover material 11' extends from the neck part 3 almost to the free end of the bristle carrier 5. However, the cover material of the rear side, once again applied here in an undulated manner, is also injected around the free end 50 of the bristle carrier 5 such that it meets the cover material 11 of the rear side on the front side of the bristle carrier 5. The cover material 11, as can be seen, is preferably drawn into the neck part 3 (and where applicable the handle part).

Further arrangement variants for the cover material on the front or rear side of a bristle carrier 5 according to the invention are shown in FIGS. 93*a* to 93*d*.

Figure 93A:
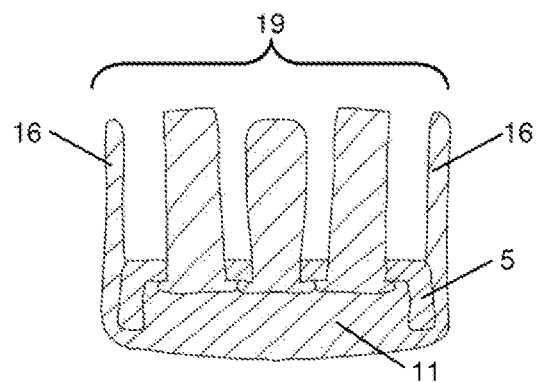
Figure 93B:
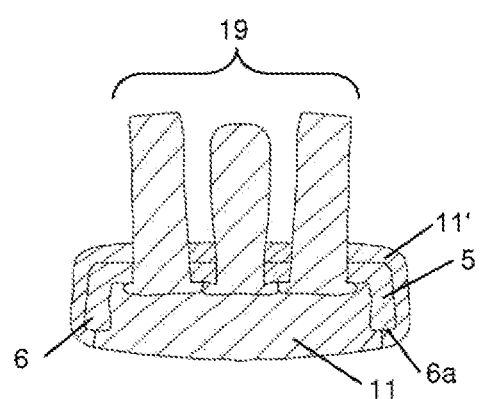

In the embodiment according to FIG. 93*a*, elongated cleaning elements 16, which protrude a similar distance from the bristle carrier 5 as the individual bristle bundles and in this respect supplement the bristle field 19, are realized on the side surfaces of the bristle carrier 5 by the cover material 11 of the rear side. In the embodiment according to FIG. 93*b*, the cover material 11' of the front side extends up to the lower edge 6*a* of the boundary edge 6 longitudinally of the bristle carrier 5 where it meets the cover material 11 of the rear side. Both cover materials 11 or 11' therefore protrude beyond the boundary edge such that the bristle carrier 5 is completely encased.

Figure 93C:
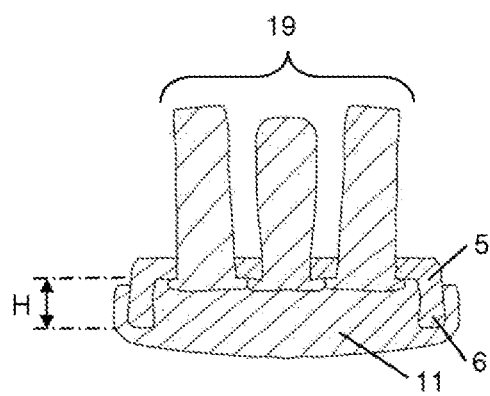

FIG. 93*c* illustrates an embodiment where the cover material 11 of the rear side is injected or drawn around the boundary edge 6 of the bristle carrier, for instance up to the rear side of the bristle carrier. A circumferential lateral damping element can be formed in this way. It is also possible in this way, however, to realize multiple lateral damping elements that are spaced apart from one another. These serve to protect the tissue of the mouth but can also assume a cleaning and/or massage function.

Figure 93D:
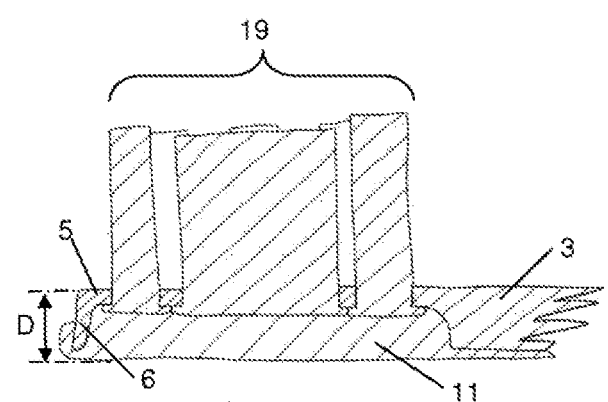

FIG. 93*d* shows correspondingly a longitudinal section of the embodiment according to FIG. 93*c*, it being possible to see that the cover material 11 of the rear side is also drawn at the free end 50 of the bristle carrier up to, for instance, half the height D of the head part and there realizes a front damping element or multiple damping elements that are spaced apart from one another. Here too, the cover material 11 is also once again drawn into the neck part 3 (and where applicable the handle part).

FIGS. 94*a* to 94*e* finally illustrate another tool (punching/injection molding tool) according to the invention for producing a brush product according to the invention.

Figure 94A:
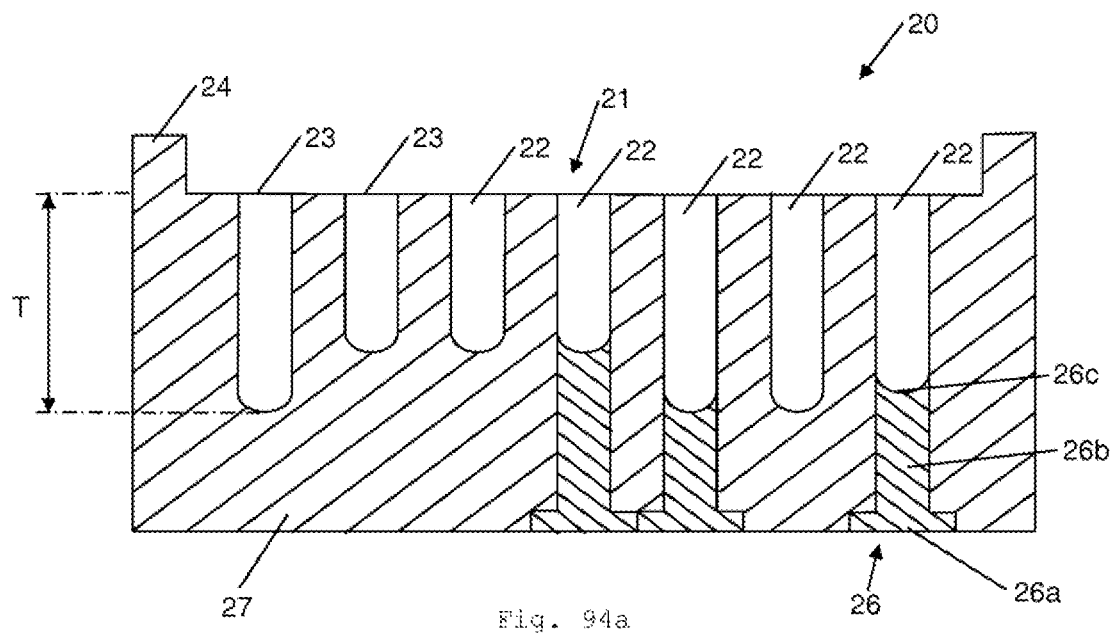

FIG. 94*a* shows a first tool half 20 which comprises a tool body 27. On the top side, the first tool half 20 or the tool body 27 comprises an edge 24 which defines an insert recess 21 into which subsequently a bristle carrier can be inserted for the purposes of bristling. In the region of the insert recess 21, multiple bristle recesses 22 are admitted into the tool body 27. The bristle recesses 22 each comprise corresponding bristle inlet openings 23. The bristle recesses 22 can each comprise different depths T so that corresponding bristle profiles can be produced. In order to increase the variability of the first tool half, all or at least some of the bristle recesses 22 can be realized in a continuous manner, in the case of said continuous bristle recesses, it then being possible to insert pins 26 from the underside of the first tool half 20 in order to be able to design the depth of the bristle recesses, thus formed, in a variable manner. The pins 26 each include a pin head 26*a* and a pin shaft 26*b* which can be designed so as to be variable in length. The free pin end 26*c* comprises, for example, a concave rounding for receiving the corresponding bristle bundles. The pin body 26*a* preferably corresponds to corresponding recesses in the tool body 27 such that the pins close off flush with the underside of the first tool half.

Figure 94B:
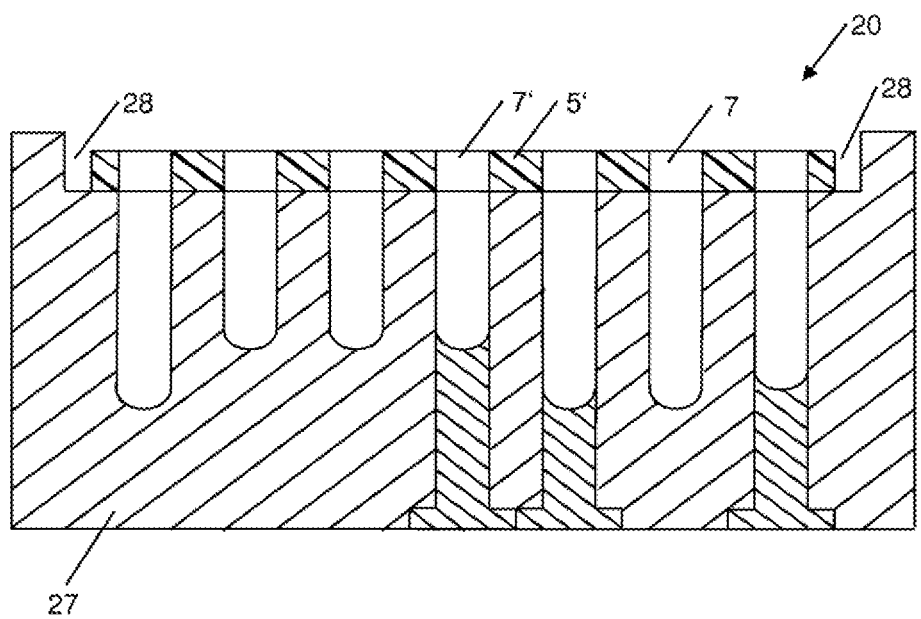

In FIG. 94*b* a bristle carrier 5' has been placed in the insert recess 21 (here, as an example, a bristle carrier produced separately from the handle, the tool is, however, also usable for the variants having a basic body produced in one piece). The corresponding bristle holes or openings 7, 7' are in alignment with the bristle inlet openings 23 of the bristle recesses 22. Free regions 28 of the insert recesses 21 preferably remain on each of the sides to the left and right. This is the case, in particular, when the bristle carrier 5' is to be overmolded on the sides with cover material.

Figure 94C:
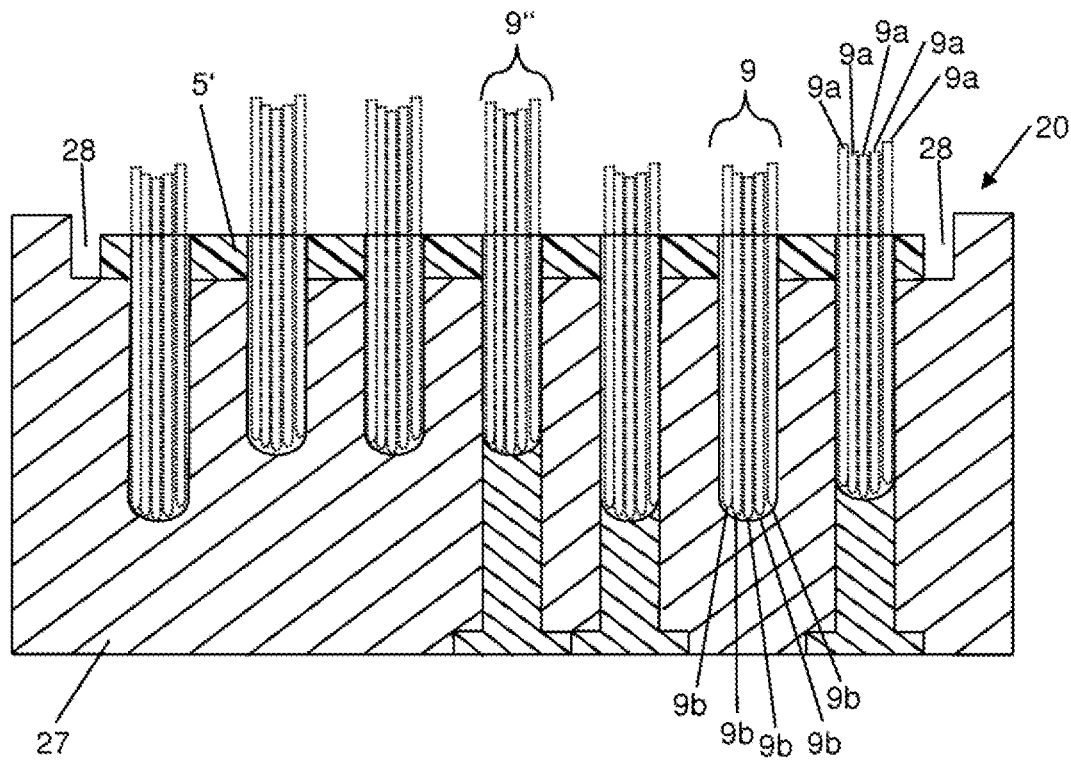

FIG. 94*c* then shows the bristle bundles 9" or bristle bundles 9 inserted through the bristle holes or openings 7, 7' (chosen purely as an example) in the bristle carrier 5' into the bristle recesses 22. The fastening ends 9*a*, in this case, protrude beyond the surface of the bristle carrier 5'. The free ends 9*b* of the individual bristles 9' are received in the concave roundings of the pins 26 within the bristle recesses 22.

Figure 94D:
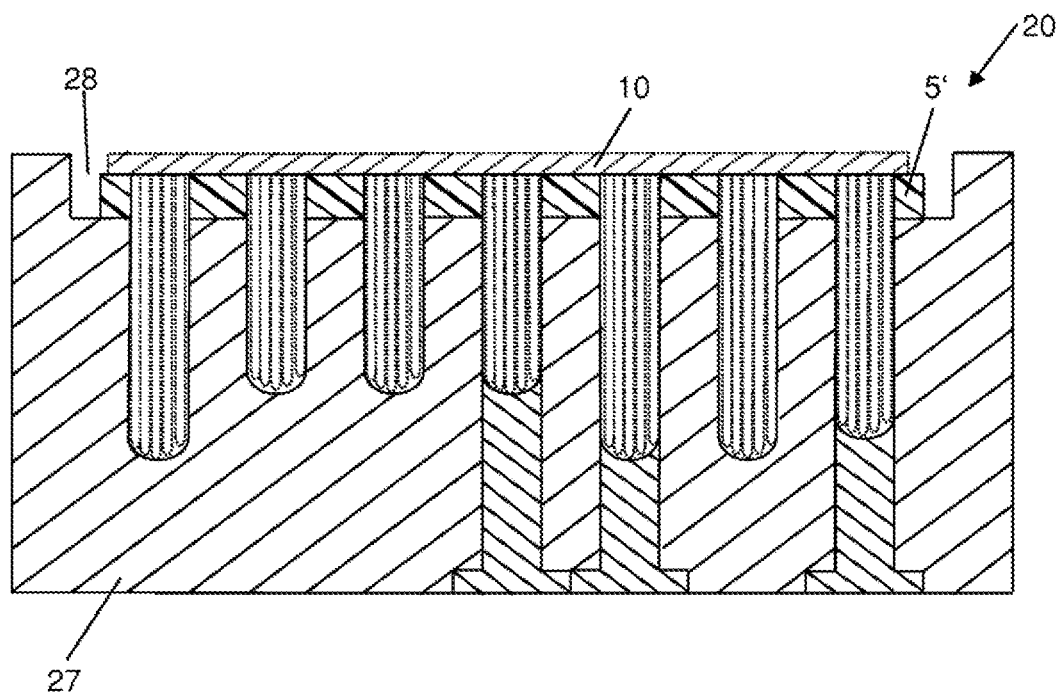
Figure 94E:
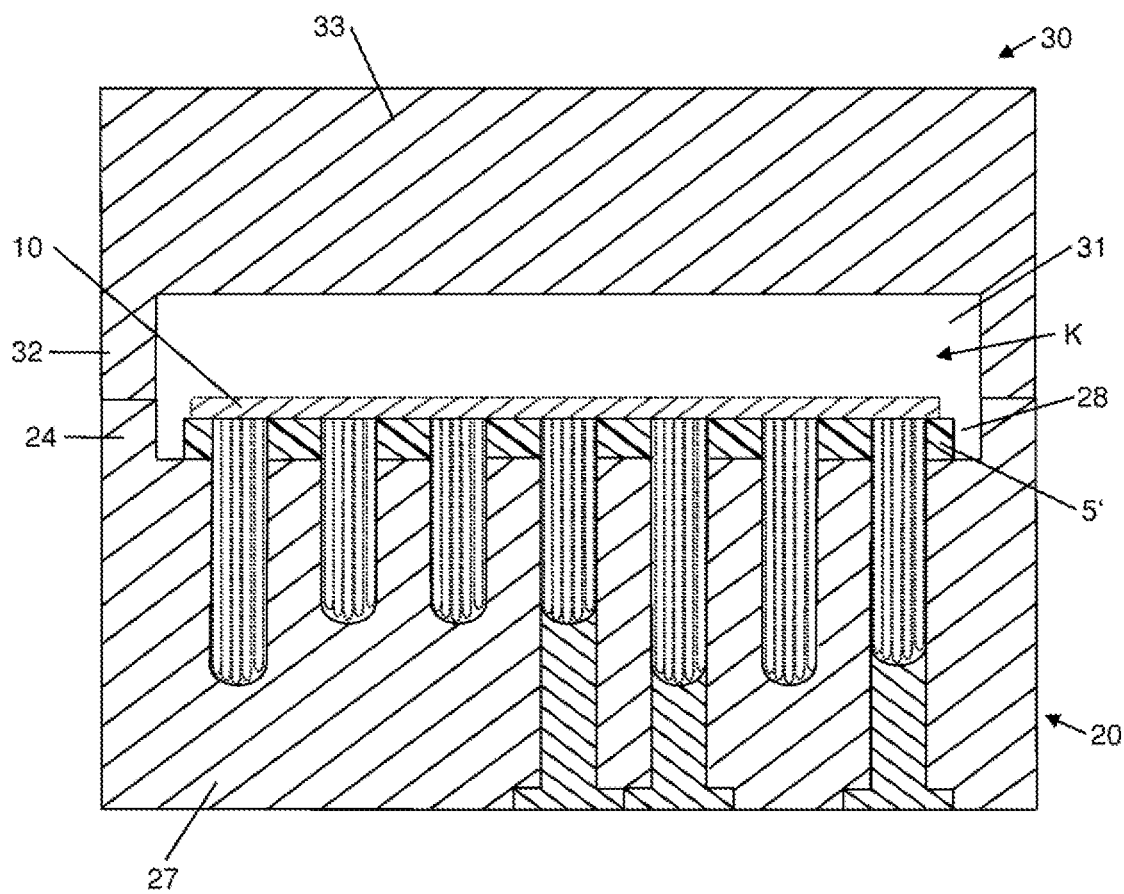

In FIG. 94*d*, the (rear) bristle fastening ends 9*a* have been melted onto the top side of the bristle carrier 5' for instance by means of a heat punch such that the melt carpet 10 has been formed. A second tool half 30—as shown in FIG. 94*e*—is then fitted onto the first tool half 20. The second tool half 30 includes a tool body 33 and defines a hollow space 31, which, together with the free regions 28 of the first tool half, realizes the injection molding cavity K. The edge 32 of the second tool half preferably closes off flush with the edge 24 of the first tool half.

Figure 94F:
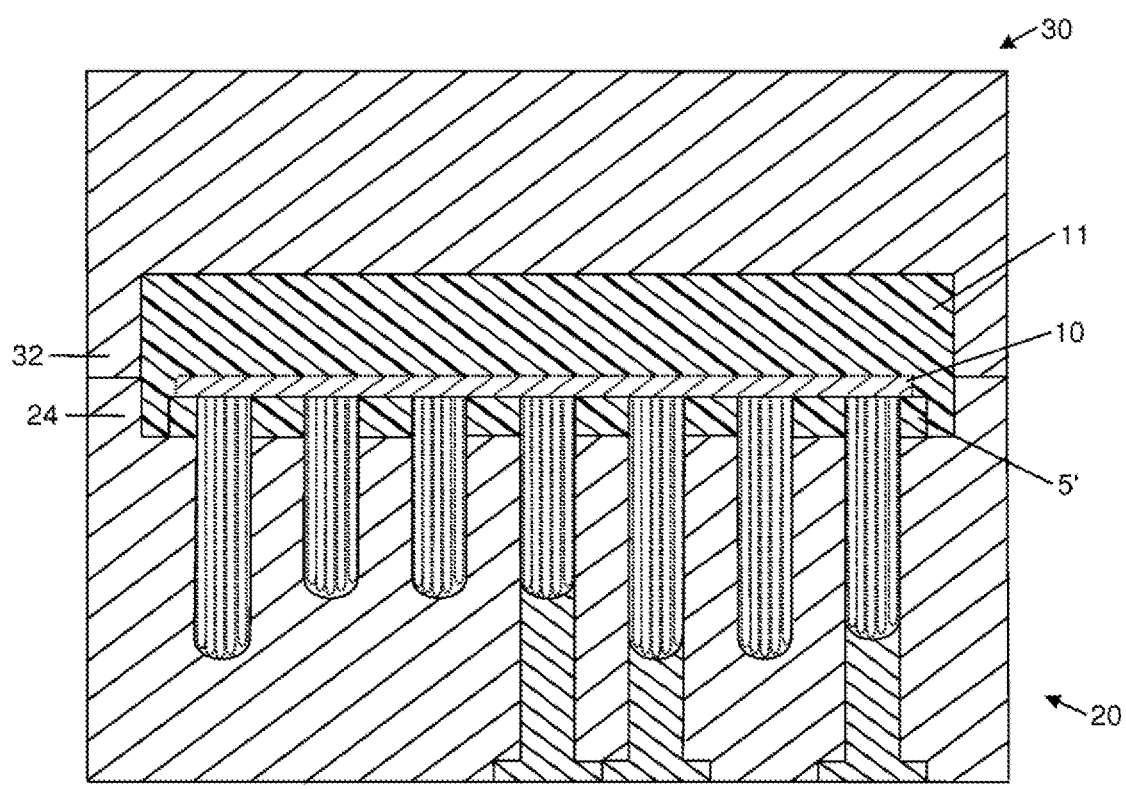

As shown in FIG. 94*f*, the cover material 11 for the rear side is then injected in an injection molding step into the injection molding cavity K, which cover material completely fills out the injection molding cavity K, the melt carpet 10 and the sides of the bristle carrier 5' being surrounded by the cover material 11. The bristle carrier 5' or the head plate is then finished and can be removed from the tool 20, 30. The tool 20, 30 is usable for both variants (separately produced bristle carrier or basic body and basic body produced in one piece), where applicable with corresponding modifications for receiving or injecting a neck part.

Figure 95:
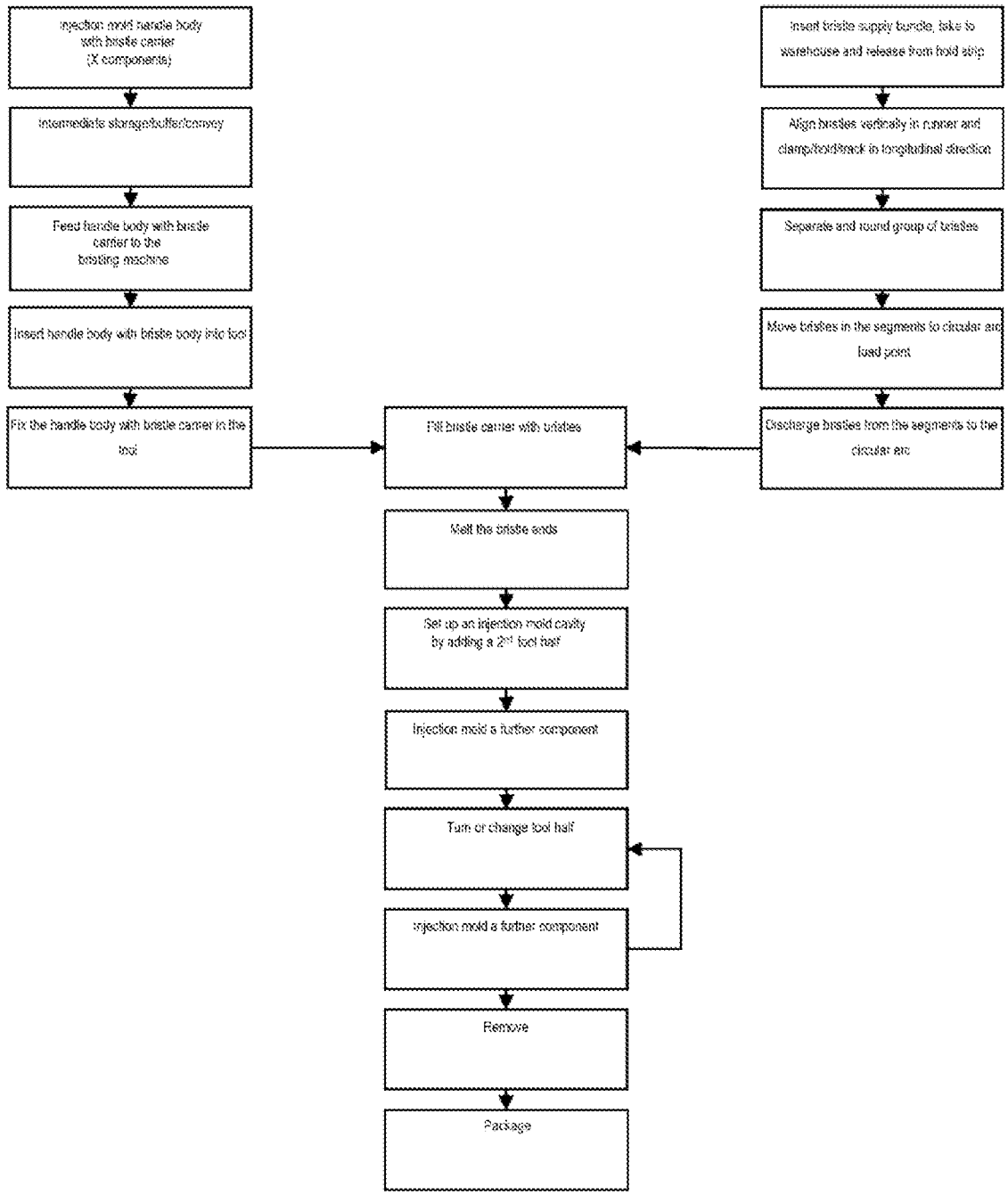

FIG. 95 shows a flowchart for the variants of the method according to the invention where basic bodies (or handle bodies) of the brush product are injected together with the bristle carrier (i.e. in one piece). For further details and options with regard to the individual method steps or parameters reference is made to the general description above.

Figure 96:
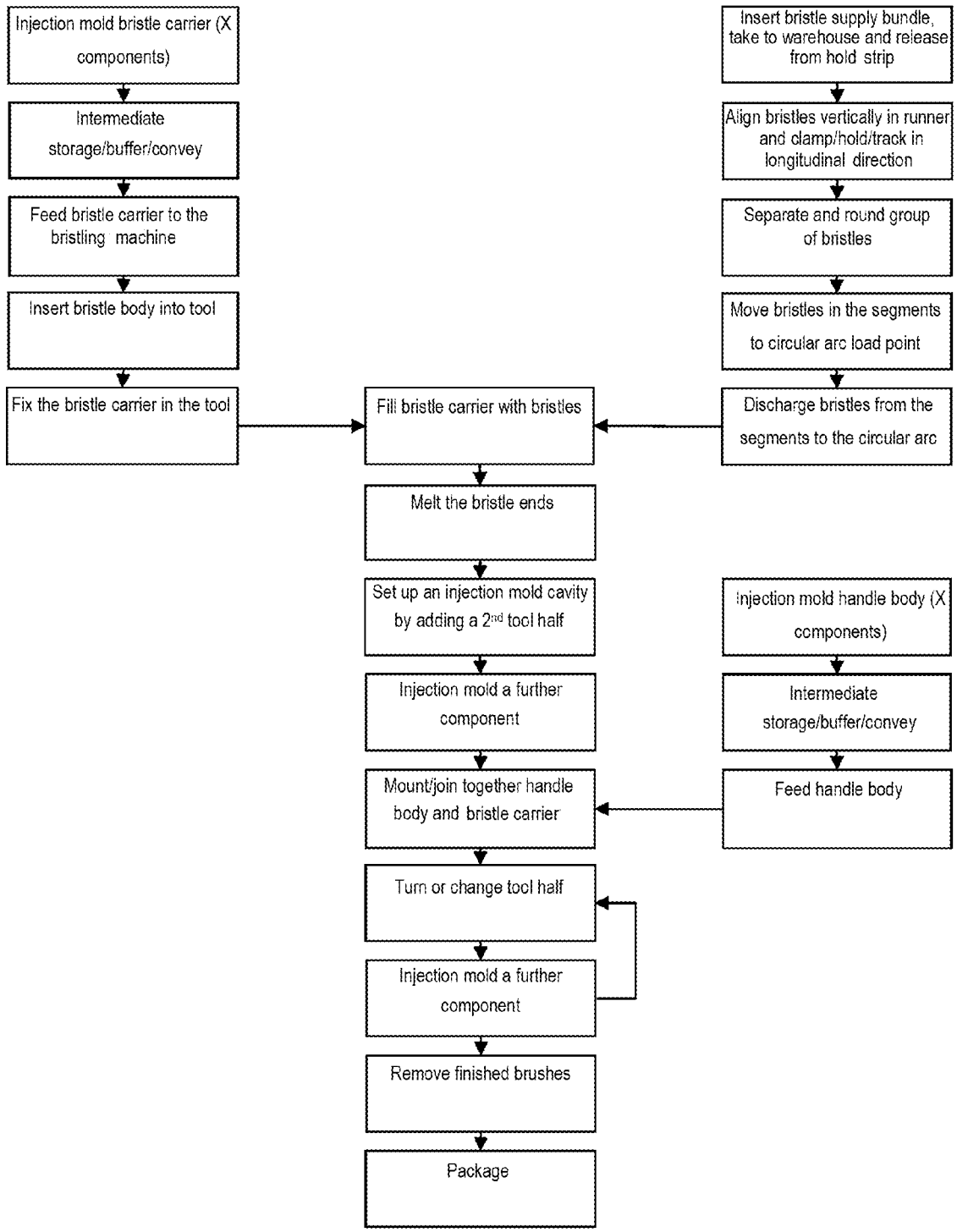

FIG. 96 finally shows a flowchart for the method according to the invention with the variant where basic bodies (or handle bodies—both terms can be used synonymously in the present case) of the brush product and the bristle carrier are produced separately from one another (i.e. initially in two separate parts). With reference to further details and options with regard to the individual method steps or parameters reference is once again made to the general description above.

The embodiment according to FIGS. 97a-d generally relates to bristle carriers where a puck bundle A2 is arranged in each case at the top and at the bottom, and intertwined grid bundles A4 in between which can be filled additionally with one or multiple puck bundles A2.

Figure 97A:
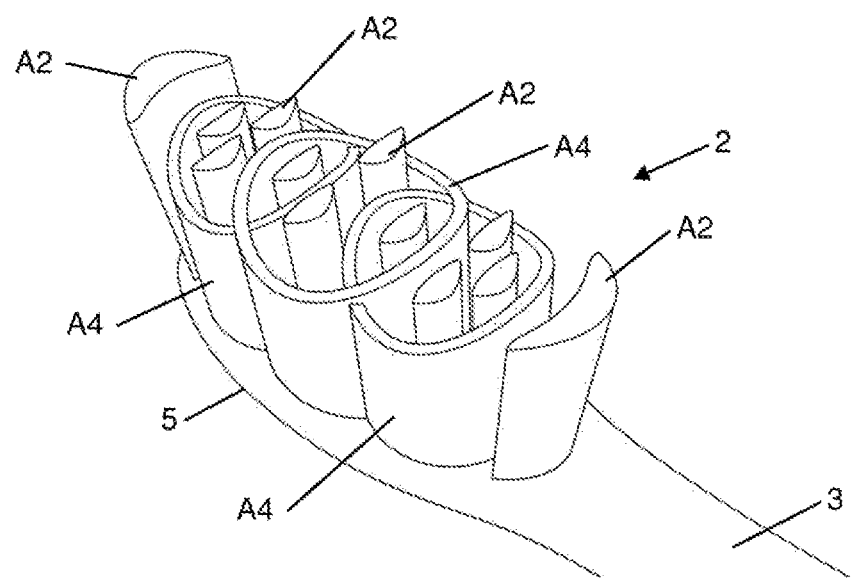

FIG. 97a shows a perspective view of a head part 2 for a manual toothbrush or for a sonic toothbrush which includes a bristle carrier 5 and a neck part 3. As can be seen in the top view according to FIG. 97d, the bristle carrier 5 (as also in the preceding embodiments) comprises a longitudinal axis $X_{LT}$ and a transverse axis $X_{QT}$. The two axes intersect at the point of intersection $S_P$. The left-hand carrier region lies substantially to the left of the longitudinal axis $X_{LT}$, the right-hand carrier region lies substantially to the right of the longitudinal axis $X_{LT}$, the upper carrier region lies substantially above the transverse axis $X_{QT}$ and the lower carrier region lies substantially below the transverse axis $X_{QT}$. The central carrier region spans around the point of intersection $S_P$ between the two axes.

It is obvious that the individual carrier region comprise overlaps and thus can be divided in a finer manner, for instance into the left-hand upper, the left-hand center, the left-hand lower, the right-hand upper, the right-hand center and the right-hand lower carrier regions.

The central carrier region can also extend, in dependence on the individual case, into the upper, the lower and the right-hand and left-hand carrier regions. The central carrier region, however, can also be distinct in a compressed manner when, for instance, large-area bundle groups are arranged in the upper and lower carrier regions. In the same way, the central region can also be longitudinally compressed when, for instance, large-area bundle groups are arranged in the left-hand and right-hand carrier regions.

Said statements apply to all embodiments of the bristle carrier according to the invention shown in the following figures. The bundles shown in the figures can deviate in form and size without departing from the framework of the invention. The corresponding arrangement is essential to an optimum cleaning and care performance.

The bristle carriers 5 shown in FIGS. 97a-d comprise an arcuate puck bundle A2 in each case in the upper and in the lower carrier region. Arranged centrally between the two puck bundles A2 is a grid bundle A4 which is formed from three grid bundle structural elements in the form of three intertwined rings. The centrally arranged ring of the grid bundle A4, in this case, comprises the largest diameter and forms in each case an overlap region 54 with the ring arranged in the upper and in the lower carrier regions. The upper and the lower rings do not form an overlap region together. Embodiments where the upper and the lower ring of the grid bundle A4 form an overlap region are however conceivable. A total of preferably four further puck bundles A2 are arranged in the lower ring of the grid bundle A4, one of said puck bundles A2 being arranged in the overlap region with the central ring. A total of preferably four further puck bundles A2 are also arranged in the upper ring of the grid bundle A4, one of said puck bundles A2 being arranged once again in the overlap region 52 with the central ring. In a preferred manner, four further puck bundles A2 are also arranged in the central ring, one of each thereof being arranged in the overlap region 52 with the upper or with the lower ring. The total of preferably ten further puck bundles A2 comprise a substantially elliptical form.

Figure 97B:
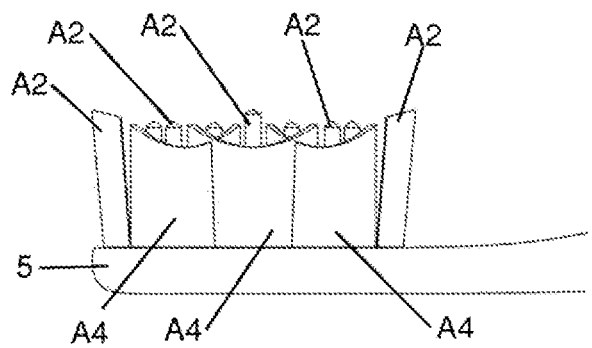

It can be seen in the side view according to FIG. 97b that the three rings of the grid bundle A4 comprise a concave curvature laterally along the upper edge thereof, the further puck bundles A2 surrounded by them projecting in part beyond the top edge of the rings. In this case, the further puck bundles A2 arranged centrally in the central ring protrude the furthest. The arcuate puck bundles A2 arranged in the upper and lower carrier region are chamfered inward according to the side view according to FIG. 97b.

Figure 97C:
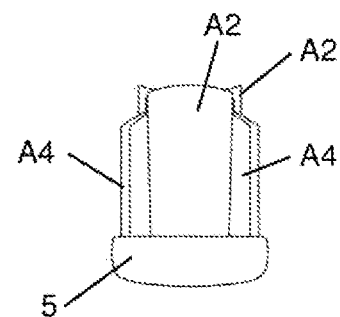
Figure 97D:
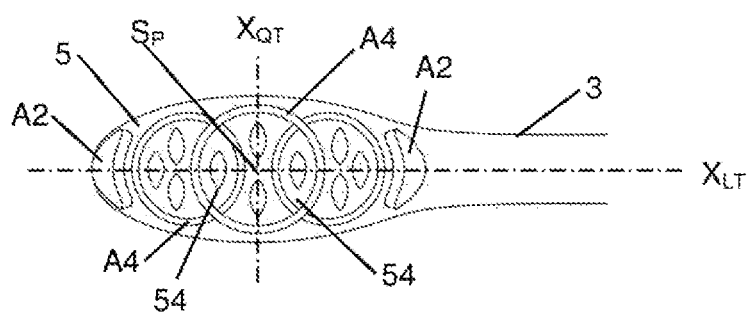

In the front view according to FIG. 97c, it can be seen that the puck bundle A2 in the central ring is somewhat wider than the upper arcuate puck bundle A2. In addition, it can be seen once again that the central ring comprises a larger diameter than the upper ring. The upper and the lower arcuate puck bundles protrude in each case beyond the grid bundles A4 and preferably beyond the further puck bundles A2 or are at least the same height.

The embodiment according to FIGS. 98a-d relates in general to bristle carriers with a puck bundle A2 in the upper and a puck bundle A2 in the lower carrier regions, said puck bundles A2 providing the outer shell of the bristle field. Then come long bundles A5 in different forms and a grid bundle A4 in the center, it being possible at all times to insert conventional bundles A6 in some empty spaces of the grid bundle A4.

The bristle carrier 5 shown in FIGS. 98a-d comprises an arcuate puck bundle A2, which is notched in each case on the inside, in each of the upper and the lower carrier regions. A honeycomb-shaped grid bundle A4, which, in the present case, is preferably formed from nine hexagonal grid bundle structural elements, is once again arranged centrally between the two puck bundles A2. When viewed in the longitudinal direction, said grid bundle A4 comprises one, two, three, two and one hexagon(s). The hexagons are interconnected at the sides and do not intersect. The honeycomb structure of the grid bundle A4 is arranged in a mirror-symmetrical manner to the transverse axis $X_{QT}$ and to the longitudinal axis $X_{LT}$ of the bristle carrier 5, the in each case two or the three hexagons being arranged transversely side by side. Two arrowhead-shaped long bundles A5, which correspond in each case to the notch of the upper or the lower puck bundle A2, are arranged between the upper and the lower puck bundles A2 and the grid bundle A4. Four further long bundles A5, which are realized in an approximately S-shaped or lightening-shaped manner, are arranged in each case in the free regions laterally next to the grid bundle A4. Conventional bundles A6 are arranged in each case in the central left-hand and in the uppermost and lowermost hexagons of the grid bundle A4. However, it is also possible to provide conventional bundles A6 in all hexagonal grid bundle structural elements.

Figure 98A:
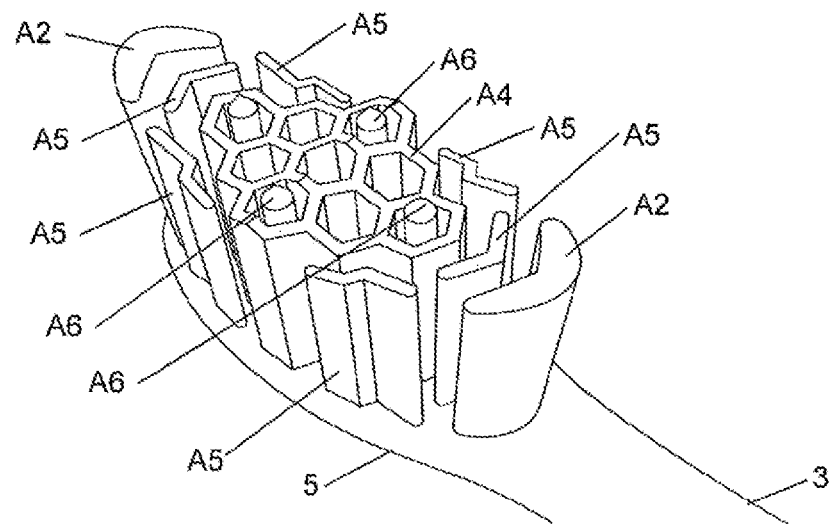
Figure 98B:
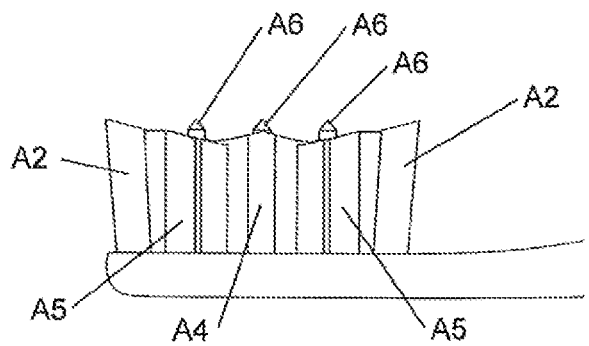

As can be seen in the side view according to FIG. 98b, the two puck bundles A2 are in each case chamfered inwardly. The S-shaped or lightening-shaped long bundles A5 are also chamfered inwardly in each case, whereas the grid bundle A4 comprises a roof-like lateral profile. The conventional bundles A6 protrude beyond the grid bundle A6 and beyond the long bundles A5 and can be tapered at the free end thereof.

Figure 98C:
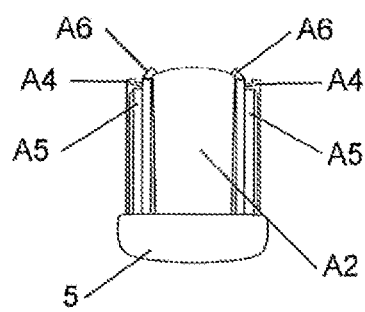
Figure 98D:
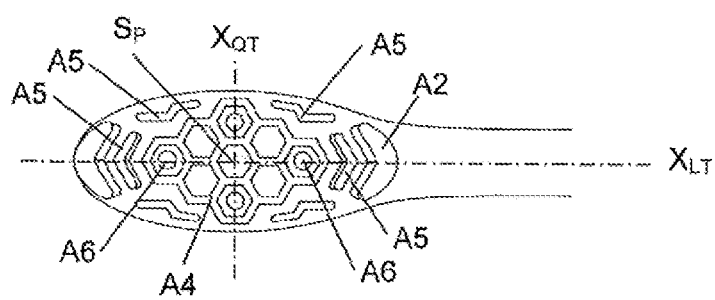

In the front view according to FIG. 98c, the upper puck bundle A2, the two upper S-shaped or lightening-shaped long bundles A5, the tips of the conventional bundles A6 and part of the roof-shaped profile of the grid bundles A4 can be seen.

The embodiment according to FIGS. 99a-d relates in general to bristle carriers with a puck bundle A2 at the top and at the bottom and with a pair of long bundles A5 which form the outer ring of the bristle field. Further spirally curved long bundles A5 with a conventional bundle A6 in the center form further elements, between which further conventional bundles A6 can be arranged.

The bristle carrier 5 according to FIGS. 99a-d comprises an arcuate puck bundle A2 in each case in the upper and in the lower carrier regions. Multiple long bundles A5 in the form of elliptical cylinders, multiple spirally curved long bundles A5 and multiple conventional bundles A6 are provided between the two puck bundles A2.

In each case two long bundles A5 in the form of elliptical cylinders are arranged, in this case, along the lateral edges of the bristle carrier 5 in the upper right-hand and left-hand and in the lower right-hand and left-hand regions of the bristle carrier 5. A spirally curved long bundle A5, which in each case surrounds a conventional bundle A6, is arranged in each case above the lower puck bundle A2 and below the upper puck bundle A2. Said two spirally curved long bundles A5 are arranged, for instance, in a point-symmetrical manner to the point of intersection $S_P$.

Another three conventional bundles A6 are arranged in each case around the spirally curved long bundles A5—toward the central region of the bristle carrier 5. In between, two further spirally wound long bundles A5, which in each case once again surround a conventional bundle A6, are arranged side by side in the central region of the bristle carrier 5. Said two spirally wound long bundles A5 are arranged, for instance, in a point-symmetrical manner to the point of intersection $S_P$.

Figure 99A:
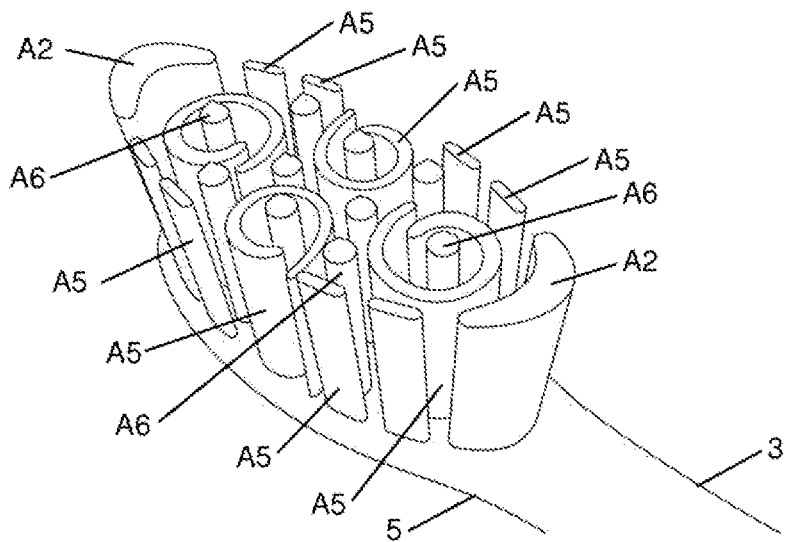
Figure 99B:
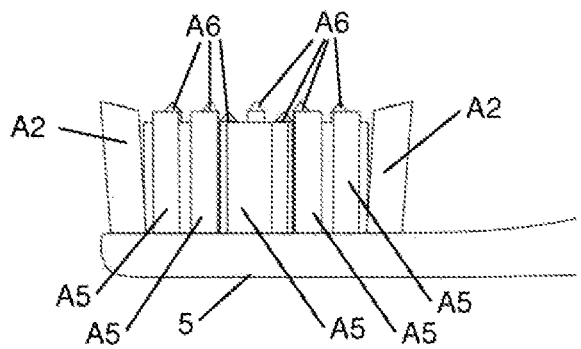

It can be seen in the side view according to FIG. 99b that the two puck bundles A2 are chamfered inwardly. The long bundles A5 in the form of elliptical cylinders are a little longer than the spirally wound long bundles A5. The tips of the conventional bundles A6 protrude somewhat beyond the long bundles A5 in the form of elliptical cylinders.

Figure 99C:
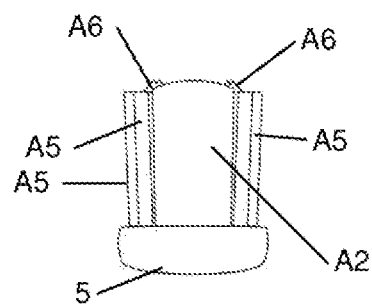
Figure 99D:
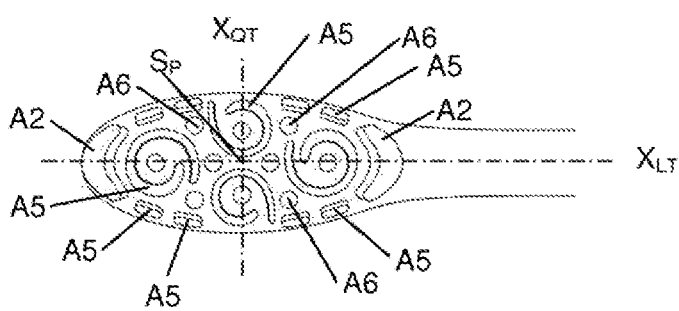

The front view according to FIG. 99c shows the upper puck bundle A2, the long bundle A5 in the form of elliptical cylinders and the tips of the conventional bundles A6 placed to the side of the longitudinal axis $X_{LT}$.

Figure 100:
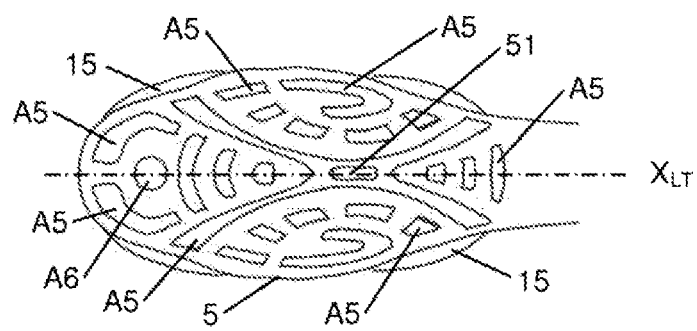

The embodiment according to FIG. 100 relates in general to bristle carriers 5 which comprise combinations of diversely formed long bundles A5 which are divided by a central-cross-like element and comprise a totally symmetrical arrangement.

The bristle carrier 5 shown in FIG. 100 comprises a combination of different long bundles A5. Arranged substantially centrally on the bristle carrier 5, in this case, is an X-shaped long bundle A5 preferably with a space 51 in the center. Multiple individual long bundles A5 with a rectangular form are arranged in a mirror-symmetrical manner to the longitudinal axis $X_{LT}$ of the bristle carrier 5 along the arcuate side walls of the X-shaped long bundle A5. Another hook-shaped long bundle A5 is arranged in each case between these preferably five rectangular long bundles A5 and the side edge of the bristle carrier, the two hook-shaped long bundles A5 also being arranged in a mirror-symmetrical manner to the longitudinal axis $X_{LT}$ of the bristle carrier 5.

In the lower carrier region, i.e. in the region of the lower notch of the X-shaped long bundle A5, three further rectangular long bundles A5, with a width that increases in the direction of the lower bristle carrier end, are arranged in a preferred manner transversely to the longitudinal axis $X_{LT}$. In the upper carrier region, i.e. in the region of the upper notch of the X-shaped long bundle A5, three substantially rectangular long bundles A5, with a width that increases in the direction of the upper bristle carrier end, are also arranged in a preferred manner transversely to the longitudinal axis $X_{LT}$. Said long bundles A5 can, where applicable, comprise a slight curvature. Two curved long bundles A5, which enclose a circular or oval long bundle A5, are arrange in a mirror-symmetrical manner to the longitudinal axis $X_{LT}$ at the upper end of the bristle carrier 5. In a preferred manner, damping elements or shock absorbers 15 produced from soft material are provided additionally on the side edges of the bristle carrier 5.

In the present case, however, smaller long bundles A5 could also be realized as conventional bundles for example in the front region, in the central region, in the rear lateral region or in the rear central region.

FIGS. 101-115 show round bristle carriers 5 for oscillating electric toothbrushes.

Figure 101:
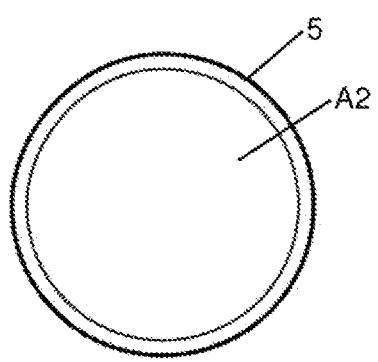

The embodiment according to FIG. 101 relates in general to bristle carriers with a puck bundle A2.

The bristle carrier shown in FIG. 101, in this case, comprises a large round puck bundle A2 which covers almost the entire surface of the bristle carrier 5.

Figure 102:
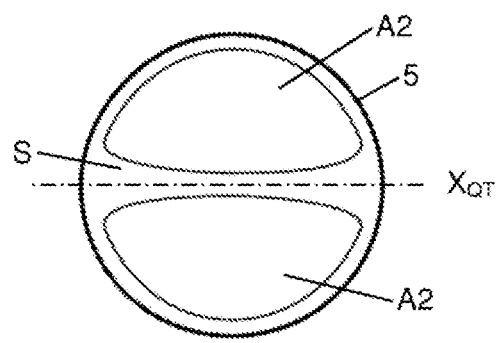

The embodiment according to FIG. 102 relates in general to bristle carriers with two puck bundles A2 and a gap S in between.

The bristle carrier shown in FIG. 102 comprises two substantially kidney-shaped puck bundles A2 which are arranged in a mirror-symmetrical manner to the transverse axis $X_{QT}$ of the bristle carrier 5. A gap S is formed between the two puck bundles A2.

Figure 103:
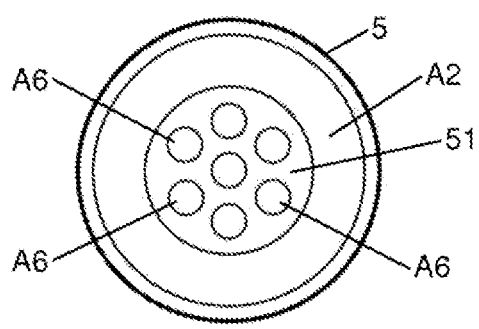

The embodiment according to FIG. 103 relates in general to bristle carriers with a ring produced from a puck bundle A2 with further elements admitted therein, such as, for example, conventional bundles A6 or mini bundles A3.

The bristle carrier 5 according to FIG. 103 comprises a ring-shaped puck bundle A2 which surrounds a free space 51 in which seven round regions with conventional bundles A6 are preferably arranged in a star-shaped manner. However, it is also possible to provide mini bundles A3 in place of conventional bundles A6.

Figure 104:
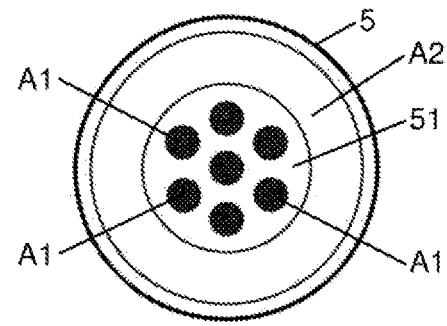

The embodiment according to FIG. 104 relates in general to bristle carriers with a ring produced from a puck bundle A2 with further elements admitted therein, such as, for example, soft elements and/or injected bristles A1. The bristle carrier 5 according to FIG. 104 also comprises a ring-shaped puck bundle A2 which surrounds a space 51. Seven round regions with soft elements and/or injected bristles A1 are preferably arranged in a star-shaped manner in the space 51.

Figure 105:
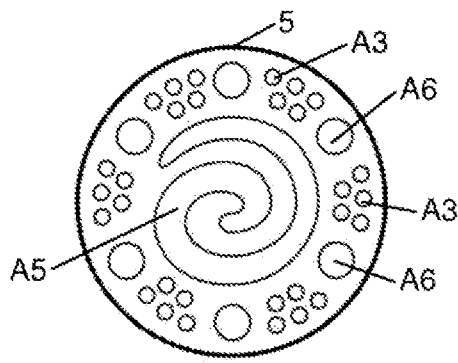

The embodiment according to FIG. 105 relates in general to bristle carriers with a long bundle A5 in spiral form which is surrounded by conventional bundles A6 and/or mini bundles A3.

FIG. 105 shows a bristle carrier 5 with a centrally arranged spiral long bundle A5. The spiral long bundle A5 is surrounded by groups of mini bundles A3 and by individual conventional bundles A6. The groups of mini bundles A3 and individual conventional bundles A6, in this case, are arranged alternately around the spiral long bundle A5. The groups of mini bundles A3, in this case, preferably include five mini bundles. Six conventional bundles A6 and six groups of mini bundles A3 are preferably provided in total.

Figure 106:
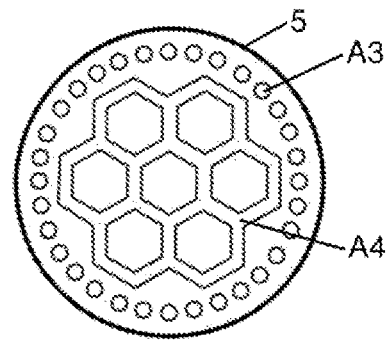

The embodiment according to FIG. 106 relates in general to bristle carriers with a grid bundle A4 in the center which is surround by mini bundles.

FIG. 106 shows a bristle carrier 5 with a centrally arranged honeycomb-shaped grid bundle A4. The grid bundle A4 comprises a total of preferably seven hexagonal grid bundle structural elements, the central grid bundle structural element being surround by a further six grid bundle structural elements such that a contiguous honeycomb shape is produced. The grid bundle A4 is surrounded by a ring produced from individual mini bundles A3.

Figure 107:
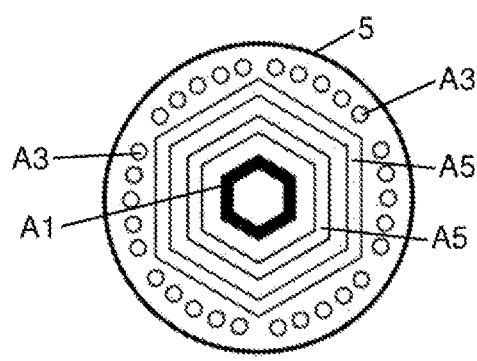

The embodiment according to FIG. 107 relates in general to bristle carriers with multiple interlocking long bundles A5 in the form of hexagons, an innermost element including a soft element and/or injected bristles A1 with the same form and the entire structure being surrounded by mini bundles A3.

FIG. 107 shows a bristle carrier 5 with a centrally arranged hexagonal soft element and/or injected bristles A1 which is present in the form of an individual honeycomb. Said soft element and/or injected bristles A1 is surrounded by a long bundle A5 which is also in the form of an individual hexagonal honeycomb. This is once again surrounded by a further long bundle A5 which is also present in the form of an individual hexagonal honeycomb. Said further long bundle A5 is surrounded by a ring produced from individual mini bundles A3 which, where applicable, is interrupted at the tips of the further long bundle A5.

Figure 108:
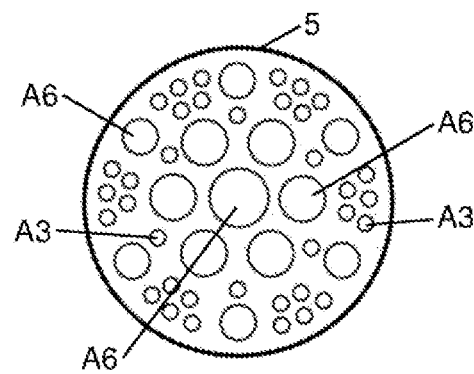

The embodiment according to FIG. 108 relates in general to bristle carriers with a star-shaped arrangement of conventional bundles A6 which is supplemented by mini bundles A3.

The bristle carrier 5 shown in FIG. 108 includes a star-shaped arrangement of individual conventional bundles A6. In this case, the conventional bundle A6 arranged centrally on the bristle carrier 5 preferably comprises the largest diameter and is further preferably surrounded by six further conventional bundles A6 with a somewhat smaller diameter. These, in turn, are surrounded by another six further conventional bundles A6 with another even smaller diameter. Groups of preferably five individual mini bundles A3 are arranged in each case between said another six further conventional bundles A6. Further individual mini bundles A3 can be arranged in the spaces between the conventional bundles A6. It is also conceivable for the inner conventional bundles A6 to be designed at least in part as puck bundles A2.

Figure 109:
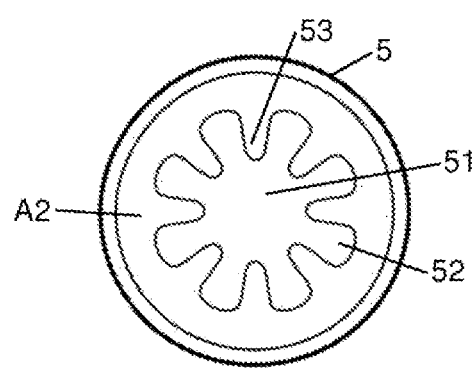

The embodiment according to FIG. 109 relates in general to bristle carriers with puck bundles A2 which comprise a recess/a space 51 in the center.

The bristle carrier 5 shown in FIG. 109 includes a puck bundle A2 with a centrally arranged space 51. The space is realized in the shape of an octopus such that the puck bundle A2 comprises corresponding indentations 52 and bulges 53. The puck bundle preferably comprises eight indentations and bulges.

Figure 110:
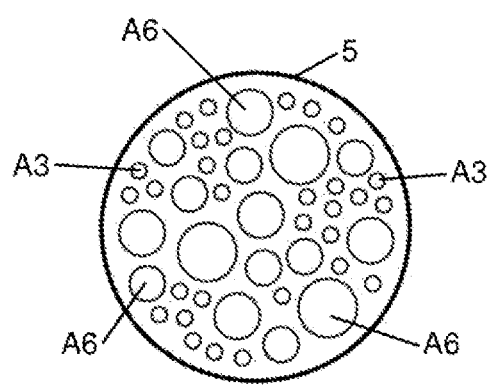

The embodiment according to FIG. 110 relates in general to bristle carriers with conventional bundles A6 in various sizes and/or mini bundles A3, the bundles being arranged in a random manner.

The bristle carrier 5 shown in FIG. 110 includes the same bundle types as the bristle carrier according to FIG. 108, i.e. conventional bundles A6 with different size diameters and mini bundles A3 which can be arranged individually or in groups. Conventional bundles A6 with three different size diameters are provided in the present case. The spatial arrangement of the conventional bundles A6 and of the mini bundles A3 does not follow any particular pattern in this embodiment but is purely random. It is also conceivable here for the conventional bundles A6 to be designed at least in part as puck bundles A2.

Figure 111:
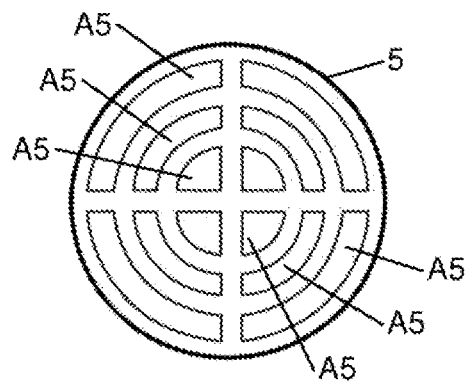

The embodiment according to FIG. 111 relates in general to bristle carriers with various long bundles A5 which are arranged concentrically, the long bundles A5 covering in each case substantially one circle segment of the bristle carrier surface. Three, four or five circle segments are preferably formed.

FIG. 111 shows a bristle carrier 5 which consists of multiple long bundles A5. The long bundles A5, in this case, are realized as arcuate elements which are arranged concentrically to one another. In this case, four circle segments are formed in which three arcuate elements or long bundles A5 are in each case arranged concentrically to one another. The long bundles A5 lying on the inside in each case are preferably realized in the form of a quadrant. In a preferred manner, the individual long bundles A5 are uniformly spaced apart from one another.

In the present case, however, smaller long bundles A5 could also be realized as conventional bundles for example in the central region.

Figure 112:
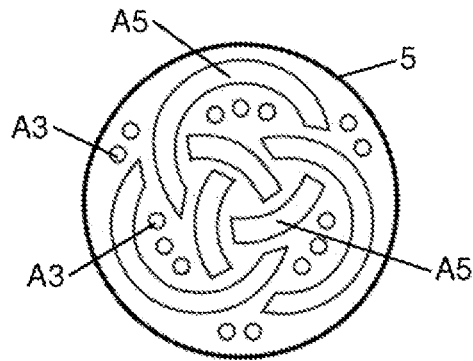

The embodiment according to FIG. 112 relates in general to bristle carriers with long bundles A5 in two different sizes which are arranged similarly to the form of a Celtic pattern.

The bristle carrier 5 shown in FIG. 112 includes long bundles A5 as well as preferably also mini bundles A3. The long bundles A5 are realized in an arcuate or also crescent-shaped manner and are preferably present in two different sizes, i.e. two different curve lengths. The long bundles A5, in this case, are in the form of a Celtic pattern, individual or smaller groups (preferably in groups of twos or threes) of mini bundles being arranged in the spaces. The shorter long bundles A5, in this case, are arranged centrally and rotated against one another and are surrounded by the larger long bundles A5 which are also rotated against one another. The curve roundings of the long bundles A5, in this case, each point outwardly.

Figure 113:
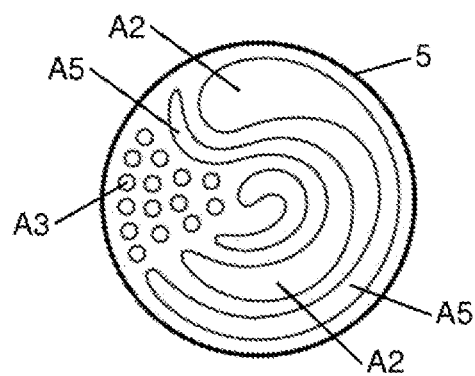

The embodiment according to FIG. 113 relates in general to bristle carriers with long bundles A5 which merge into puck bundles A2 and are interwoven. Mini bundles A3 preferably fill out remaining empty spaces.

FIG. 113 illustrates a bristle carrier 5 which includes long bundles A5 which merge into puck bundles A2. Said combined bundles are additionally interwoven. Three long bundles A5 are provided in the present case. The spaces are filled out by multiple mini bundles A3.

Figure 114:
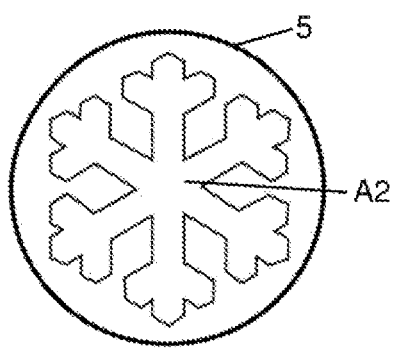

The embodiment according to FIG. 114 relates in general to bristle carriers with a puck bundle A2 in the form of a snowflake.

The embodiment according to FIG. 114 includes a puck bundle A2 which is realized in the form of a snowflake preferably with six arms with in each case three free ends.

Figure 115:
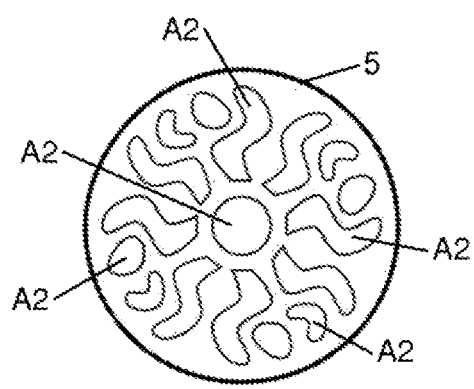

The embodiment according to FIG. 115 relates in general to bristle carriers with different forms of puck bundles A2 which are combined in one arrangement.

FIG. 115 shows a bristle carrier 5 which comprises multiple variously formed puck bundles A2. A round puck bundle A2, in this case, is arranged centrally on the bristle carrier and is surrounded by multiple S-shaped puck bundles A2 which are aligned from in to out. Smaller round and/or kidney-shaped puck bundles A2 are arranged between the S-shaped puck bundles in the outer region of the bristle carrier 5. Four pairs of S-shaped puck bundles A2, which are realized substantially mirror symmetrically to one another and receive two smaller round and/or kidney-shaped puck bundles A2 between them, are preferably provided in the present case.

FIGS. 116-123 finally show oval or egg-shaped bristle carriers for facial brushes which can be operated manually or electrically.

Figure 116:
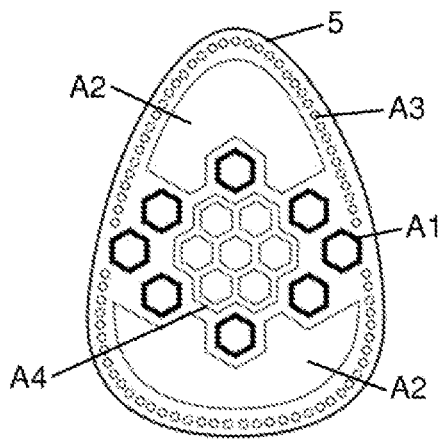
FIGS. 116-123 show further bristle carriers for manual or electric facial brushes as examples.

The embodiment according to FIG. 116 relates in general to bristle carriers with two larger puck bundles A2, one at the front and one at the rear, which frame a honeycomb-shaped grid bundle A4 of multiple grid bundle structural elements, which once again continues in soft elements and/or injected bristles A1 which are realized in the same manner as the grid bundle structural elements. Mini bundles A3 are arranged around the named structure as a quasi continuous frame.

The bristle carrier 5 according to FIG. 116 shows a centrally arranged honeycomb-shaped grid bundle A4. The grid bundle A4 comprises a total of preferably seven hexagonal grid bundle structural elements, the central grid bundle structural element being surrounded by six further hexagonal grid bundle structural elements such that a contiguous honeycomb form is produced. The grid bundle A4 is surrounded by further, preferably eight, hexagonal soft elements and/or injected bristles A1 in the form of individual honeycombs. Of which, in a preferred manner, three hexagonal soft elements A1 are arranged in each case laterally of the grid bundle A4 and in each case one above or below the grid bundle A4.

A puck bundle A2 is arranged in each case at the upper and lower end of the bristle carrier 5. The upper puck bundle A2 is realized in an arcuate manner and frames the upper hexagonal soft element and/or injected bristles A1. The lower puck bundle A2 is also realized in an arcuate manner and frames the lower hexagonal soft element and/or injected bristles A1 as well as the two lower lateral hexagonal soft elements A1. A continuous frame of individual mini bundles A3, which, where applicable, is briefly interrupted by the outer lateral hexagonal soft elements and/or injected bristles A1, runs along the outer edge of the bristle carrier 5.

Figure 117:
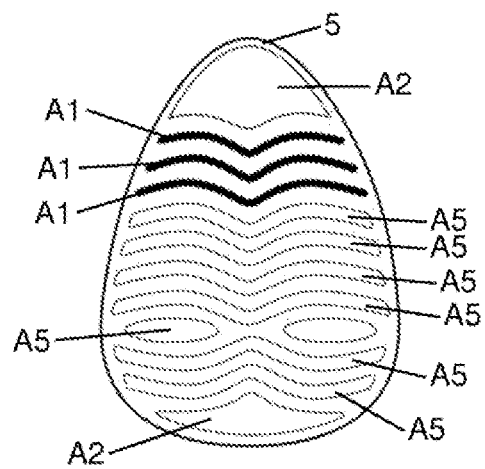

The embodiment according to FIG. 117 relates in general to bristle carriers each with a puck bundle A2 which is arranged on the front and on the rear end of the bristle carrier. Soft elements and/or injected bristles A1 in the form of lamellae are arranged in between and connected thereto are similarly formed long bundles A5.

The bristle carrier according to FIG. 117 shows a lamella structure which comprises multiple, preferably three, lamella-shaped soft elements and/or injected bristles A1 in an upper region of the bristle carrier 5. Below the lamella-shaped soft elements and/or injected bristles A1 connect multiple, preferably four, also lamella-shaped long bundles A5, which are aligned in the same way as the lamella-shaped soft elements and/or injected bristles A1.

Further, preferably two, lamella-shaped long bundles A5, which are arranged mirror-symmetrically to the lamella-shaped long bundles A5 arranged above, are arranged in a lower region of the bristle carrier 5. Another two oval long bundles A5 can be arranged between the pair of lamella-shaped long bundles A5, which can be situated directly opposite in a mirror-symmetrical manner. The lamella-shaped long bundles A5 are defined in each case at the upper and at the lower end of the bristle carrier 5 by a puck bundle A2 which, on the inside thereof, follows the contour of the lamella-shaped soft elements and/or injected bristles A1 or of the lamella-shaped long bundle A5.

The oval long bundles A5 can also be designed as puck bundles.

Figure 118:
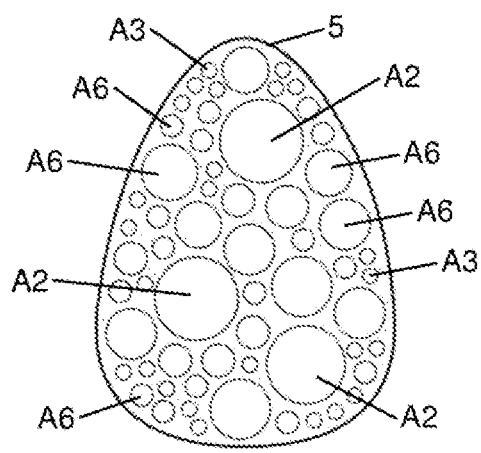

The embodiment according to FIG. 118 relates in general to bristle carriers with variously sized bundles which are integrated in a random manner on the bristle carrier. In this case, the smallest bundles are mini bundles A3, different sizes of conventional bundles A6 follow as well as one or multiple puck bundles A2 as the largest element.

FIG. 118 shows a bristle carrier 5 where puck bundles A2, mini bundles A3 and conventional bundles A6 are arranged in a random manner. The consistently round bundles comprise different diameters or different sizes, the mini bundles A3 being the smallest bundle and the puck bundles A2 the largest bundles. The remaining bundles are conventional bundles A6 which are present in multiple sizes, preferably four.

Figure 119:
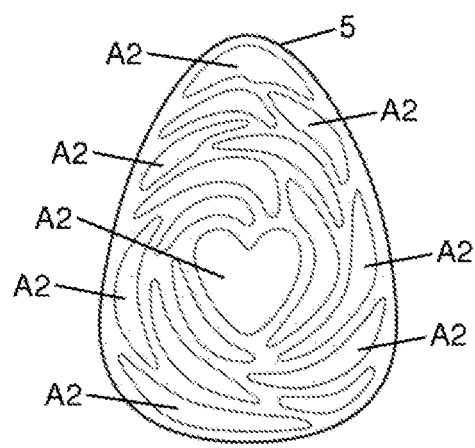

The embodiment according to FIG. 119 relates in general to bristle carriers with variously formed and variously sized puck bundles A2 which are arranged in heart form around a puck bundle A2 as a bristle field.

FIG. 119 shows a bristle carrier 5 where a heart-shaped puck bundle A2, which is surrounded by further variously formed puck bundles A2, is arranged centrally. The further puck bundles A2 comprise substantially curved forms and are arranged in a somewhat shell-like manner around the heart-shaped puck bundle A2.

Figure 120:
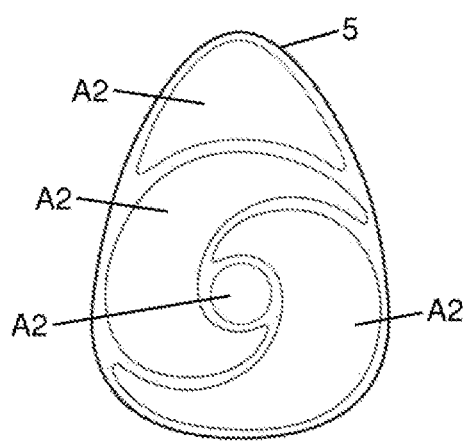

The embodiment according to FIG. 120 relates in general to bristle carriers on which multiple puck bundles A2 are arranged. In the upper region a large puck bundle A2 in the form of a delta. Below this, a circular puck bundle A2 which is surrounded by two puck bundles A2 in ying yang form.

The bristle carrier 5 according to FIG. 120 shows a centrally arranged round puck bundle A2 which is surrounded by two puck bundles A2 arranged in a ying-yang-shaped manner. A delta-shaped puck bundle A2 is arranged at the upper end of the bristle carrier 5 corresponding to the ying-yang form.

Figure 121:
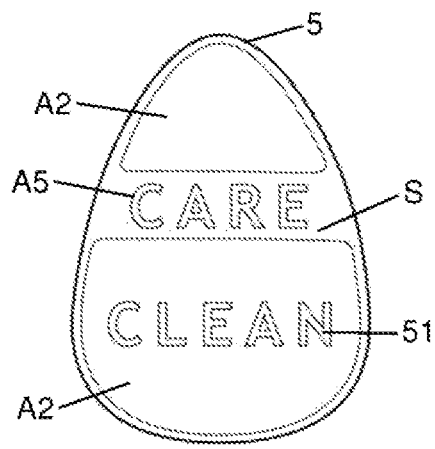

The embodiment according to FIG. 121 relates in general to bristle carriers where a puck bundle A2 is arranged in each case at the top and at the bottom. The lower puck bundle A2 comprises a recess 51 in the form of lettering. Further lettering is arranged in the form of one or multiple long bundle(s) A5 between the two puck bundles A2.

FIG. 121 illustrates a bristle carrier 5 which comprises, in the lower region thereof, a puck bundle A2 with a recess 51 in the form of lettering. A further puck bundle A2 is arranged in the upper region of the bristle carrier 5. Further lettering in the form of multiple long bundles A5 is arranged in the gap S between the two puck bundles A2.

Figure 122:
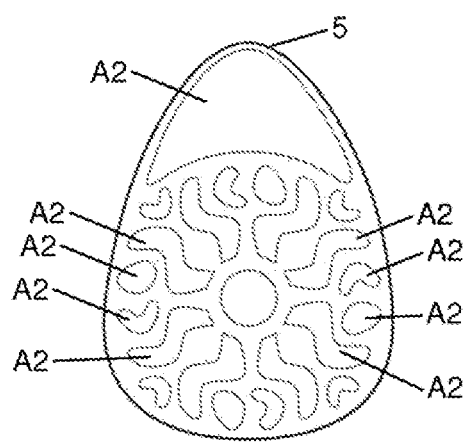

The embodiment according to FIG. 122 relates in general to bristle carriers which involve an at least partially symmetrical arrangement of puck bundles A2 in various forms, such as, for instance, round, oval, S-shaped and/or kidney-shaped.

FIG. 122 illustrates a bristle carrier which comprises multiple variously formed puck bundles A2. A round puck bundle A2, in this case, is arranged substantially centrally on the bristle carrier 5 and is surrounded by multiple S-shaped puck bundles A2 which are aligned from in to out. Smaller round and/or kidney-shaped puck bundles A2 are arranged between the S-shaped puck bundles in the outer region of the bristle carrier 5. Four pairs of S-shaped puck bundles A2 which are realized in an approximately mirror-symmetrical manner to one another and receive two smaller round and/or kidney-shaped puck bundles A2 between them, are preferably provided in the present case. An approximately delta-shaped puck bundle A2 is additionally arranged at the upper end of the bristle carrier 5.

Figure 123:
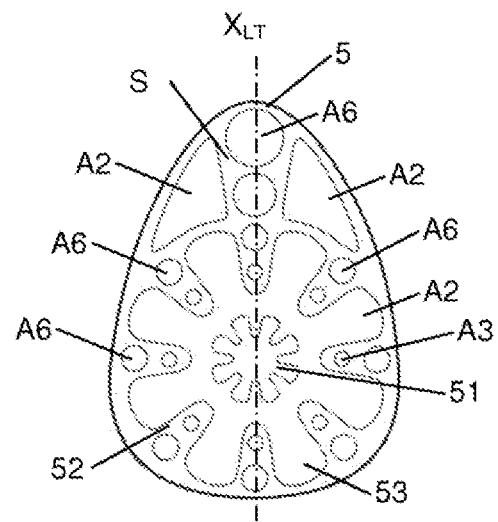

FIG. 123 finally shows another bristle carrier 5 which consists of a combination of mini bundles A3, conventional bundles A6, puck bundles A2 and puck bundles with a recess or space 51. The bristle carrier 5 comprises, in this case, a substantially centrally arranged puck bundle A2 with a substantially centrally arranged space 51. The puck bundle A2 and the space 51 are realized in the shape of octopus. The puck bundle A2 comprises corresponding indentations 52 and bulges 53 (both in the space 51 and on the outer edges thereof), a mini bundle A3 and a conventional bundle A6 preferably being arranged in each case in the outer indentations. The puck bundle A2 preferably comprises eight indentations and bulges on the outside and the inside. Half of an approximately delta-shaped puck bundle A2 is arranged in each case on the left-hand and on the right-hand side at the upper end of the bristle carrier 5. Two conventional bundles A6 are arranged in the gap S between said two half-delta-shaped puck bundles A2. In this case, in a preferred manner the conventional bundle A6 comprises a larger diameter at the tip of the bristle carrier 5 than the conventional bundle A6 placed below it. In a preferred manner, the conventional bundles A6 arranged in the indentations 52 comprise the smallest diameter of the conventional bundles A6. Further preferably, a mini bundle and three conventional bundles, which extend from the uppermost indentation 52 into the gap S, are arranged with an increasingly large diameter in the upper region of the bristle carrier 5 along the longitudinal axis $X_{LT}$.

Figure 124A:
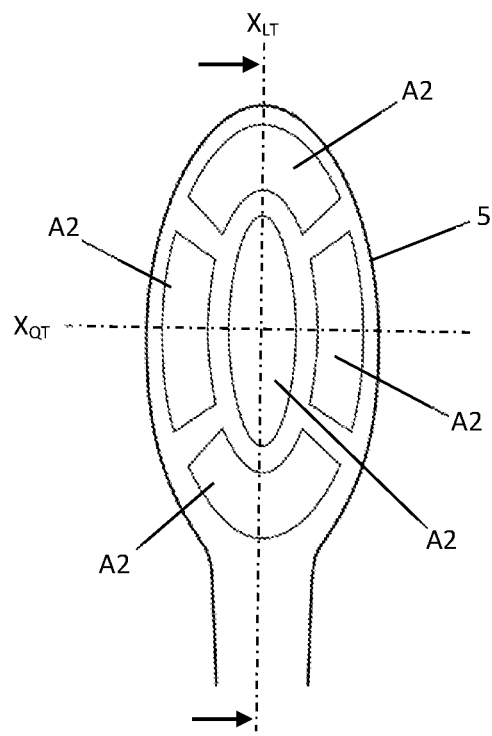
FIGS. 124a-b show a further bristle carrier for a manual toothbrush or for a sonic toothbrush as an example.
Figure 124B:
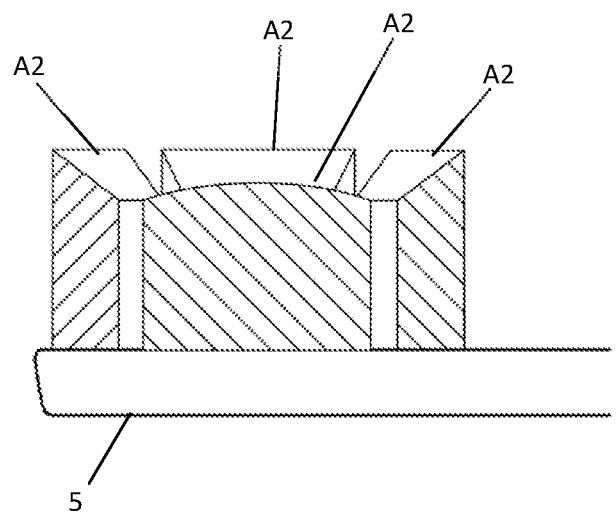

FIG. 124a shows a bristle carrier 5 with a longitudinal axis $X_{LT}$ and a transverse axis $X_{QT}$ and with multiple puck bundles protruding from the bristle carrier 5. In a central region of the bristle carrier 5 the cleaning elements of a central puck bundle A2 are arranged substantially symmetrically, in the upper carrier region the cleaning elements of an upper puck bundle A2 are arranged above the transverse axis $X_{QT}$ of the bristle carrier 5, in the lower carrier region the cleaning elements of a lower puck bundle A2 are arranged below the transverse axis $X_{QT}$ of the bristle carrier 5, in the right-hand carrier region the cleaning elements of a right-hand puck bundle A2 are arranged to the right of the longitudinal axis $X_{LT}$ of the bristle carrier 5 and in the left-hand carrier region the cleaning elements of a left-hand puck bundle A2 are arranged to the left of the longitudinal axis $X_{LT}$ of the bristle carrier 5. The cleaning elements of the central puck bundle A2 comprise a dome-shaped topography. FIG. 124b is a cross-sectional view taken along longitudinal axis $X_{LT}$ which in particular illustrates the dome-shaped topography of the cleaning elements of the central puck bundle A2.

The design variants shown in this document are obviously given as examples. Within the framework of the present invention, the individual expressions and elements of said design variants can be combined with other design variants without departing from this invention.

The descriptions given for specific figures can obviously also be transferred to other figures which show identical or similar expressions and in which the expressions, where applicable, have not described in the same detail.

LIST OF REFERENCES

1 Basic body
2 Head part
2a Frame
3 Neck part
4 Handle part
4a Receiving recess (in handle part)
5 Bristle carrier
5a Bristle carrier part segment
5b Bristle carrier part segment
5c Bristle carrier part segment
5d Bristle carrier part segment
5' Bristle carrier or head plate
6 Boundary edge
6a Free end or boundary edge bottom edge
7 Bristle holes (round)
7' Openings (other forms)
8 Bristle carrier recess
9 Bristle bundle (round)
9' Bristles (single)
9" Bristle bundle (other forms)
9a Fastening ends
9b Free ends
10 Bristle melt/melt carpet/melt bath
10' Alternative or modified mounting end
11 Cover material (rear side)
11' Cover material (front side)
12 Interruption in the boundary edge
13 Film hinge/region with reduced material thickness
14 Covering film hinge
15 Damping element
16 Cleaning element
17 Ring-shaped opening
18 Channel (in the neck part)
19 Bristle field
20 First tool half
21 Insert recess
22 Bristle recesses
23 Bristle inlet openings
24 Edge (first tool half)
25 Interface
26 Pin
26a Pin head
26b Pin shaft
26c Free pin end/with concave rounding
27 Tool body
28 Free regions
30 Second tool half
31 Cavity
32 Edge (second tool half)
33 Tool body
50 Free end bristle carrier
51 Recess/space
52 Indentations
53 Bulges
54 Overlap region
60 Holding/pressing tool
61 Projections
62 Bundle receiving means
63 Notch via displacement
64 Material reservoir
65 Tool (for exposed melt)
66 Exposing element
67 Heat element (AFT)
68 Profile pins
69 Exposed or prominent bristle melt
A1 Soft elements and/or injected bristles
A2 Puck bundle
A3 Mini bundle
A4 Grid bundle
A5 Long bundle A6 Conventional bundle
AP Possible injection points for the covering
A1' Regular compartments
A1" Compartments with strong centers
A1'" Inclines or kinked bundle
B Width bristle carrier/Head part (or head plate)
D Overall thickness head part (finished brush product)
$D_A$ Layer thickness covering
$D_B$ Layer thickness bristle carrier
$D_S$ Layer thickness bristle melt/melt carpet
E Notches
H High boundary wall
K Injection molding cavity
$L_1$ Length head part
$L_2$ Length basic body
S Gap
$S_P$ Intersection point of the axes
T Depth bristle recesses
X Longitudinal axis
$X_{LT}$ Longitudinal axis bristle carrier
$X_{QT}$ Transverse axis bristle carrier
α Angle
β Angle of inclination (bristles)
φ Angle range

The invention claimed is:

1. A brush product comprising a basic body having
a head part with a front side and rear side having an overall thickness of 2.5 mm to 4 mm and which includes a bristle carrier with a longitudinal axis and a transverse axis as well as a bristle field protruding therefrom, wherein the bristle field is formed by a group of cleaning elements, the group of cleaning elements including puck bundles;
a handle part; and
a neck part which connects the head part to the handle part, wherein:
the bristle carrier is provided with bristles in an anchorless manner,
the bristle carrier comprises substantially a central carrier region, an upper carrier region, a lower carrier region, a right-hand carrier region and a left-hand carrier region, in which the puck bundles are arranged;
in the central carrier region the cleaning elements of a central puck bundle are arranged substantially symmetrically, in the upper carrier region the cleaning elements of an upper puck bundle are arranged above the transverse axis of the bristle carrier, in the lower carrier region the cleaning elements of a lower puck bundle are arranged below the transverse axis of the bristle carrier, in the right-hand carrier region the cleaning elements of a right-hand puck bundle are arranged to the right of the longitudinal axis of the bristle carrier and in the left-hand carrier region the cleaning elements of a left-hand puck bundle are arranged to the left of the longitudinal axis of the bristle carrier,
the cleaning elements of the central puck bundle comprise rounded bristles made from polyester and a dome-shaped topography,
the cleaning elements of the upper puck bundle, the lower puck bundle, the right-hand puck bundle and the left-hand puck bundle comprise tapered bristles made from polyester, and
the puck bundles assume a surface on the bristle carrier of at least 25 $mm^2$.

2. The brush product as claimed in claim 1, wherein at the puck bundles abut against one another.

3. The brush product as claimed in claim 1, wherein the puck bundles assume a surface on the bristle carrier of at least 50 $mm^2$.

4. The brush product as claimed in claim 1, wherein the head part, the handle part and the neck part are formed from at least one hard and/or one or multiple soft material components.

5. The brush product as claimed in claim 4, wherein the hard material component(s) is or are formed from styrene polymerizates such as styrene acrylonitrile (SAN), polystyrene (PS), acrylonitrile butadiene styrene (ABS), styrene methyl methacrylate (SMMA) or styrene butadiene (SB); polyolefins such as polypropylene (PP) or polyethylene (PE) (preferably also in the form of high density polyethylene (HDPE) or low density polyethylene (LDPE)); polyesters such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethyl terephthalate (PCT-A) or glycol-modified polycyclohexylene dimethyl terephthalate (PCT-G); cellulose derivatives such as cellulose acetate (CA), cellulose acetate butyrate (CAB), cellulose propionate (CP), cellulose acetate phthalate (CAP) or cellulose butyrate (CB); polyamides (PA) such as PA 6.6, PA 6.10 or PA 6.12; polymethyl methacrylate (PMMA); polycarbonate (PC); polyoxymethylene (POM); polyvinylchloride (PVC); polyurethane (PUR) and/or from polyamide (PA).

6. The brush product as claimed in claim 4, wherein the hard material component is formed from polypropylene (PP) with a modulus of elasticity of between 1000 and 2400 $N/mm^2$.

7. The brush product as claimed in claim 4, wherein the soft material component(s) is or are formed from a thermoplastic styrene elastomer (TPE-S) (preferably a styrene ethylene butylene styrene copolymer (SEBS) or styrene butadiene styrene copolymer (SBS)); a thermoplastic polyurethane elastomer (TPE-U); a thermoplastic polyamide elastomer (TPE-A); a thermoplastic polyolefin elastomer (TPE-O); thermoplastic polyester elastomer (TPE-E) and/or silicone.

* * * * *